(12) United States Patent
Book et al.

(10) Patent No.: US 8,490,176 B2
(45) Date of Patent: Jul. 16, 2013

(54) SYSTEM AND METHOD FOR CONTROLLING A MOBILE DEVICE

(75) Inventors: Neil Book, Columbus, OH (US); Daniel V. Hoffman, Shorewood, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 368 days.

(21) Appl. No.: 12/756,001

(22) Filed: Apr. 7, 2010

(65) Prior Publication Data

US 2011/0065419 A1    Mar. 17, 2011

Related U.S. Application Data

(60) Provisional application No. 61/167,483, filed on Apr. 7, 2009.

(51) Int. Cl.
*G06F 12/00*    (2006.01)
*H04L 29/06*    (2006.01)

(52) U.S. Cl.
USPC ............................................ 726/17; 713/165

(58) Field of Classification Search
USPC .................. 726/1, 2, 17, 25, 26–30
See application file for complete search history.

(56) References Cited

U.S. PATENT DOCUMENTS

| | | | |
|---|---|---|---|
| 6,553,378 B1 | 4/2003 | Eschelbeck | |
| 6,970,697 B2 | 11/2005 | Kouznetsov et al. | |
| 7,007,302 B1 | 2/2006 | Jagger et al. | |
| 7,062,553 B2 | 6/2006 | Liang | |
| 7,096,501 B2 | 8/2006 | Kouznetsov et al. | |
| 7,171,690 B2 | 1/2007 | Kouznetsov et al. | |
| 7,210,168 B2 | 4/2007 | Hursey et al. | |
| 7,228,565 B2 | 6/2007 | Wolff et al. | |
| 7,231,440 B1 | 6/2007 | Kouznetsov et al. | |
| 7,231,637 B1 | 6/2007 | McEwan | |
| 7,243,373 B2 | 7/2007 | Muttik et al. | |
| 7,661,147 B2 * | 2/2010 | Pastorelli et al. | 726/27 |
| 8,126,456 B2 * | 2/2012 | Lotter et al. | 455/432.3 |
| 8,225,393 B2 * | 7/2012 | Park et al. | 726/22 |
| 2002/0042886 A1 | 4/2002 | Lahti et al. | |
| 2003/0065793 A1 | 4/2003 | Kouznetsov et al. | |
| 2003/0115483 A1 | 6/2003 | Liang | |
| 2003/0120951 A1 | 6/2003 | Gartside et al. | |
| 2003/0229801 A1 | 12/2003 | Kouznetsov et al. | |
| 2003/0233566 A1 | 12/2003 | Kouznetsov et al. | |
| 2003/0233574 A1 | 12/2003 | Kouznetsov et al. | |
| 2004/0003276 A1 | 1/2004 | Kouznetsov et al. | |
| 2004/0025042 A1 | 2/2004 | Kouznetsov et al. | |
| 2004/0123117 A1 | 6/2004 | Berger | |
| 2004/0209609 A1 | 10/2004 | Kouznetsov et al. | |
| 2004/0250115 A1 | 12/2004 | Gemmel et al. | |
| 2006/0191011 A1 | 8/2006 | Korkishko et al. | |
| 2006/0200863 A1 | 9/2006 | Ray et al. | |
| 2006/0224742 A1 * | 10/2006 | Shahbazi | 709/226 |

(Continued)

*Primary Examiner* — Nathan Flynn
*Assistant Examiner* — Abdullah Almamun
(74) *Attorney, Agent, or Firm* — Shumaker & Sieffert, P.A.

(57) ABSTRACT

A system includes a controlling module for controlling a mobile device remotely A system includes a controlling module for controlling a mobile device remotely, wherein the controlling module includes a parental control module for controlling a mobile device used by a child. A system includes a controlling module for controlling a mobile device remotely, wherein the controlling module includes a parental control module for controlling a mobile device used by a child, wherein the parental control module includes a monitoring module for monitoring a use of the mobile device, and a filtering module for filtering an inappropriate content.

12 Claims, 126 Drawing Sheets

U.S. PATENT DOCUMENTS

| | | |
|---|---|---|
| 2006/0277408 A1 | 12/2006 | Bhat et al. |
| 2007/0028296 A1 | 2/2007 | Wachtler et al. |
| 2007/0030539 A1 | 2/2007 | Nath et al. |
| 2007/0240215 A1 | 10/2007 | Flores et al. |
| 2007/0240220 A1 | 10/2007 | Tuvell et al. |
| 2007/0240222 A1 | 10/2007 | Tuvell et al. |
| 2008/0086773 A1 | 4/2008 | Tuvell et al. |
| 2008/0178294 A1 | 7/2008 | Hu et al. |
| 2008/0229388 A1* | 9/2008 | Maes .................. 726/1 |
| 2009/0265754 A1* | 10/2009 | Hinds ................. 726/1 |
| 2009/0325615 A1* | 12/2009 | McKay et al. ................ 455/466 |
| 2010/0003923 A1* | 1/2010 | McKerlich et al. ........ 455/67.11 |
| 2010/0050271 A1* | 2/2010 | Saarisalo ........................ 726/28 |
| 2012/0214441 A1* | 8/2012 | Raleigh ........................ 455/406 |

* cited by examiner

SYSTEM AND METHOD FOR CONTROLLING A MOBILE DEVICE

CROSS-REFERENCE TO RELATED APPLICATION

This application claims the benefit of provisional U.S. Application No. 61/167,483, filed Apr. 7, 2009, which is incorporated herein by reference.

BACKGROUND

The description herein generally relates to the field of mobile devices. The description also generally relates to controlling mobile devices remotely.

Conventionally, mobile devices such as cell phones have been used primarily for communication with a user of the cell phone controlling the device. However, there have been instances where it may be desirable to control the cell phones remotely. For example, it may be advantageous to control a cell phone when used by a child when a parent wishes to monitor the use of the cell phone by the child. Thus, there is a need to control a mobile device such as a cell phone remotely in such a personal setting, as well as a variety of other types settings, such as, for example, business or governmental use.

SUMMARY

In one aspect, a system includes a controlling module for controlling a mobile device remotely.

In another aspect, a system includes a controlling module for controlling a mobile device remotely, wherein the controlling module includes a parental control module for controlling a mobile device used by a child.

In another aspect, a system includes a controlling module for controlling a mobile device remotely, wherein the controlling module includes a parental control module for controlling a mobile device used by a child, wherein the parental control module includes a monitoring module for monitoring a use of the mobile device, and a filtering module for filtering an inappropriate content.

In addition to the foregoing, other system aspects are described in the claims, drawings, and text forming a part of the present disclosure The foregoing summary is only illustrative and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
FIG. 1 is an exemplary embodiment of the present invention.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Exemplary systems and methods for controlling a mobile device remotely are disclosed herein. Many details of exemplary implementations are set for in the following description and in FIGS. 1 through 126 to provide an understanding of such implementations. One skilled in the art will understand from the teachings of the present disclosure, however, that the present disclosure may have other possible implementations, and that such other implementations may be practiced with or without a detail or some of the details set forth in the following description. Again, it will be appreciated, however, that the following description of exemplary systems and environments is not exhaustive of all possible environments in which the teachings of the present disclosure may be implemented.

For example, FIG. 1 illustrates an exemplary system 100 that includes a controlling module 101 for controlling a mobile device remotely. In this exemplary system, a mobile device such as a cell phone or a smartphone may be used. However, any other types of the mobile devices may also be used. The controlling module itself may reside on a computing device or on the mobile device itself. When the controlling module resides on a computing device, it communicates with the mobile devices so as to control the mobile device remotely.

Figure 2:
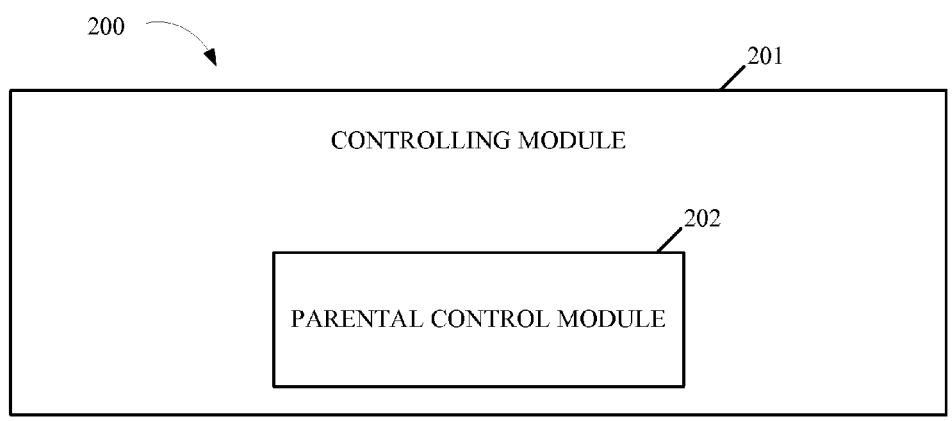
FIG. 2 is an exemplary embodiment of the present invention.

As exemplified in FIG. 2, an exemplary system 200 includes a controlling module 201 for controlling a mobile device remotely, wherein the controlling module 201 may include a parental control module 202 for controlling a mobile device used by a child. As noted above, the present invention may be implemented in settings other than the parent-child setting, such as for example, for business or governmental use.

Figure 3:
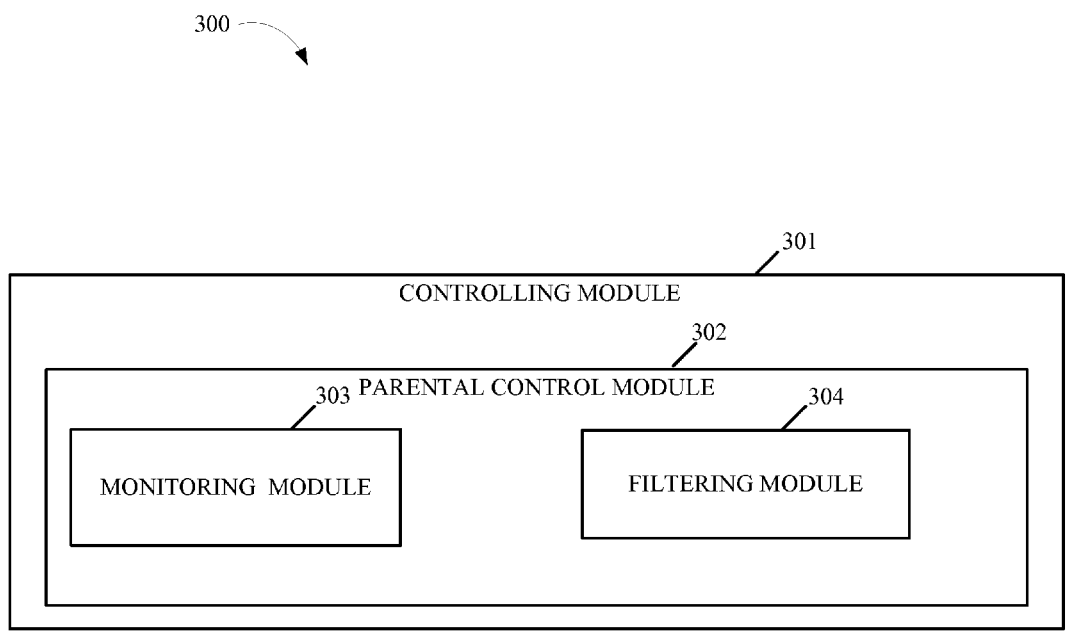
FIG. 3 is an exemplary embodiment of the present invention.

As further exemplified in FIG. 3, an exemplary system 300 includes a controlling module 301 for controlling a mobile device remotely, wherein the controlling module 301 may include a parental control module 302 for controlling a mobile device used by a child, and wherein the parental control module 302 may include a monitoring module 303 for monitoring a use of the mobile device and a filtering module 304 for filtering an inappropriate content.

Figure 4:
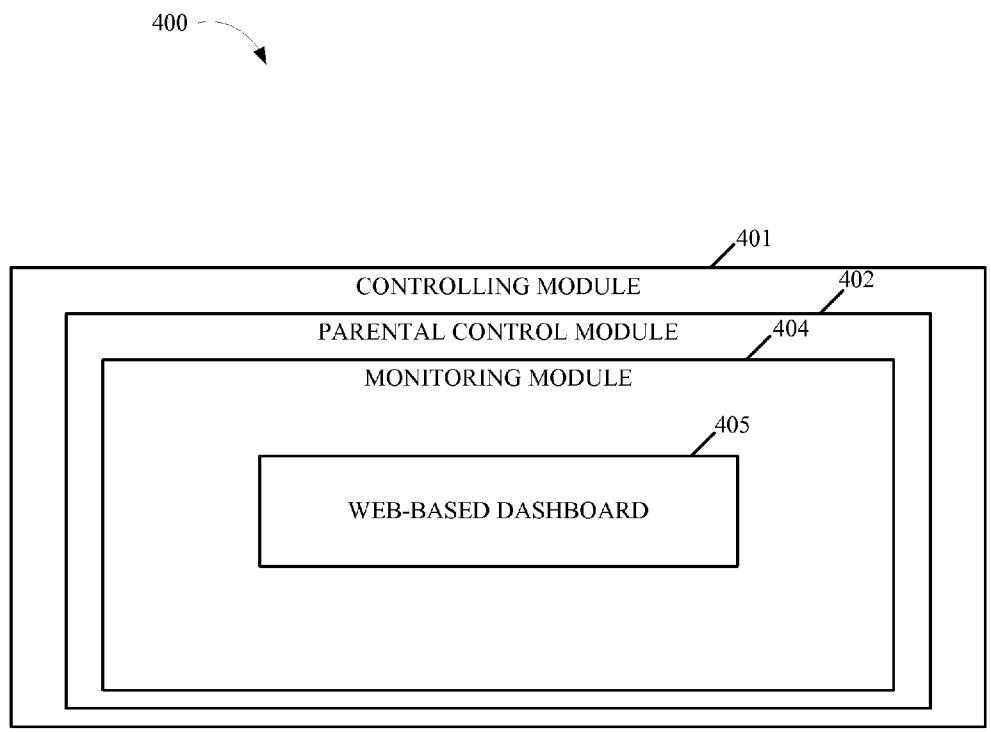
FIG. 4 is an exemplary embodiment of the present invention.

FIG. 4 illustrates another exemplary system 400 including a controlling module 401 for controlling a mobile device remotely, wherein the controlling module 401 may include a parental control module 402 for controlling a mobile device used by a child, wherein the parental control module 402 may include a monitoring module 404 for monitoring a use of the mobile device and a filtering module for filtering an inappropriate content (not shown but similar to 304 of FIG. 3), and wherein the monitoring module includes a web-based monitoring dashboard 405 for monitoring at least one of a text message, voice data, video data, and online activity of the mobile device. The dashboard may be created with any suitable arrangement, features, and other characteristics, and just as an example, may be on a monitor presented to a user. The types, nature, and other characteristics of the information related to the mobile device may also be varied, as needed.

Figure 5:
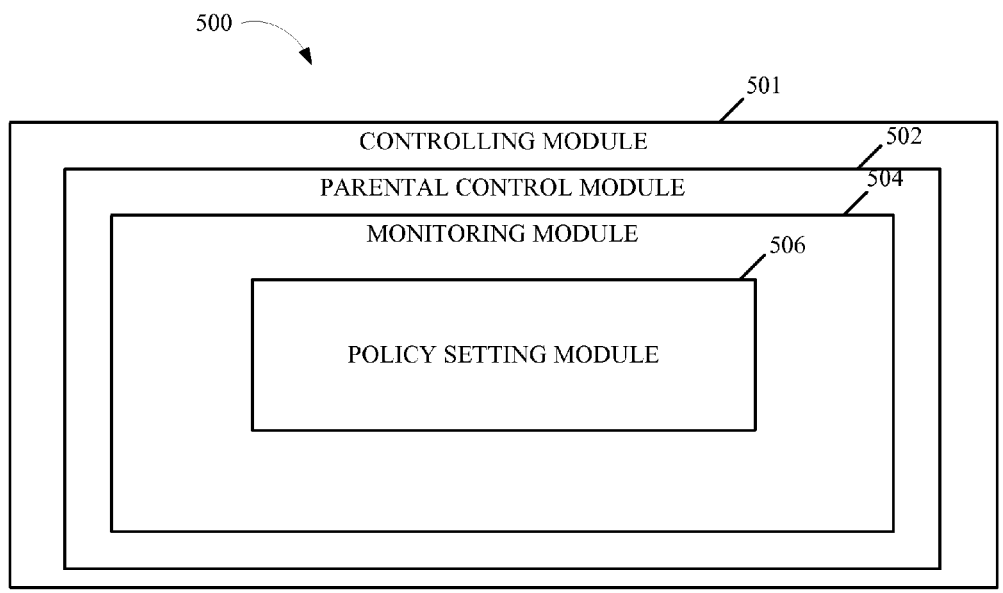
FIG. 5 is an exemplary embodiment of the present invention.

FIG. 5 illustrates another exemplary system 500 including a controlling module 501 for controlling a mobile device remotely, wherein the controlling module 501 may include a parental control module 502 for controlling a mobile device used by a child, wherein the parental control module 502 may include a monitoring module 504 for monitoring a use of the mobile device and a filtering module for filtering an inappropriate content (not shown but similar to 304 of FIG. 3), wherein the monitoring module includes a web-based monitoring dashboard for monitoring at least one of a text message, voice data, video data, and online activity of the mobile device (not shown but similar to dashboard 405 in FIG. 4), and wherein the monitoring module 504 further includes a policy setting module 506 for determining a use policy for what use is permitted on the mobile device. Also, the dashboard may be created in any suitable arrangement, features, and other characteristics on a, just as an example, a monitor presented to a user. The types, nature, and other characteristics of the information related to the mobile device may also be varied, as needed.

Figure 6:
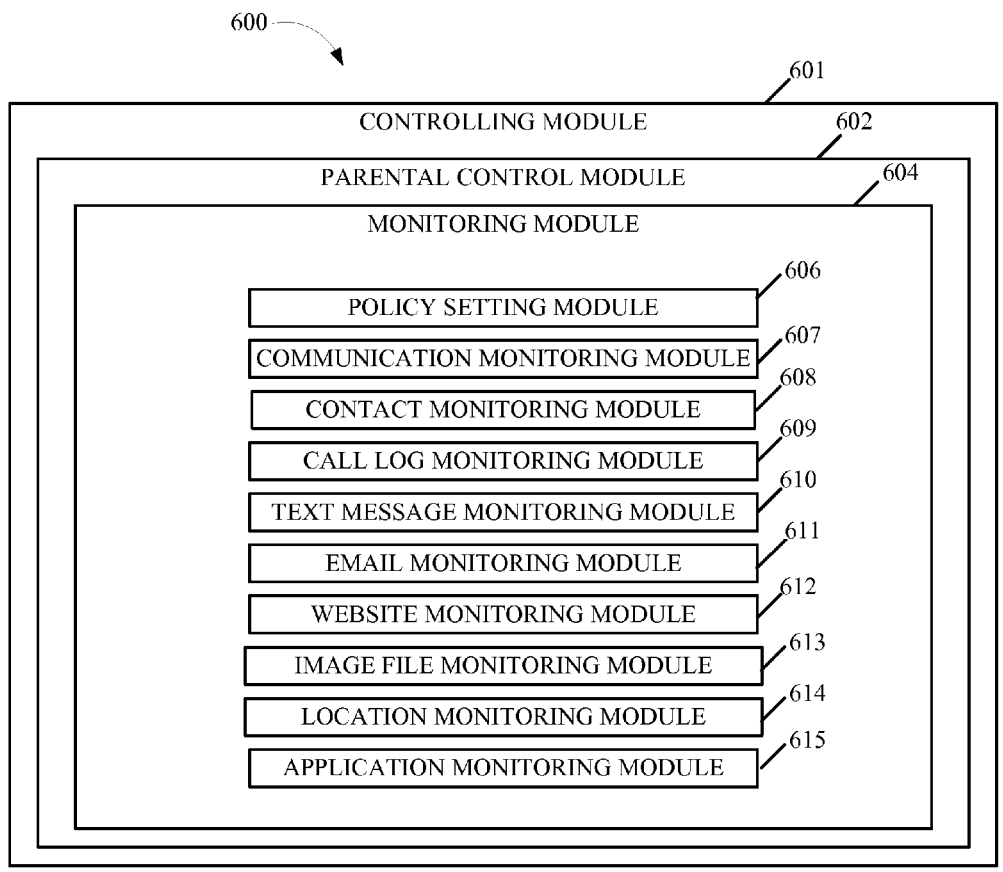
FIG. 6 is an exemplary embodiment of the present invention.

FIG. 6 illustrates another exemplary system 600 including a controlling module 601 for controlling a mobile device remotely, wherein the controlling module 601 may include a parental control module 602 for controlling a mobile device used by a child, wherein the parental control module 602 may include a monitoring module 604 for monitoring a use of the mobile device and a filtering module for filtering an inappropriate content (not shown but similar to 304 of FIG. 3), wherein the monitoring module includes a web-based monitoring dashboard for monitoring at least one of a text message, voice data, video data, and online activity of the mobile device (not shown but similar to dashboard 405 in FIG. 4), wherein the monitoring module 604 further includes a policy setting module 606 for determining a use policy for what use is permitted on the mobile device, and wherein the monitoring module 604 further includes a communication monitoring module 607 for viewing a communication with the mobile device; a contact monitoring module 608 for viewing information relating to a party communicating with the mobile device; a call log monitoring module 609 for viewing a log of a call on the mobile device; a text message monitoring module 610 for viewing at least one of a text message and a text message attachment transferred to and from the mobile device; an email monitoring module 611 for viewing an email transferred to and from the mobile device; a website monitoring module 612 for viewing a website visited on the mobile device; an image file monitoring module 613 for viewing an image transferred to and from the mobile device; a location monitoring module 614 for viewing a location of the mobile device; and an application monitoring module 615 for viewing an application on the mobile device. Modules 606-615 are provided just as an example, and of course, other types of modules may be used and different combinations of the modules may be included instead of the one shown in FIG. 6. For example, the combination containing just each one of the modules 606-615 may be used, or in the alternative, the combination using modules 611-613, and 615 may be used.

Figure 7:
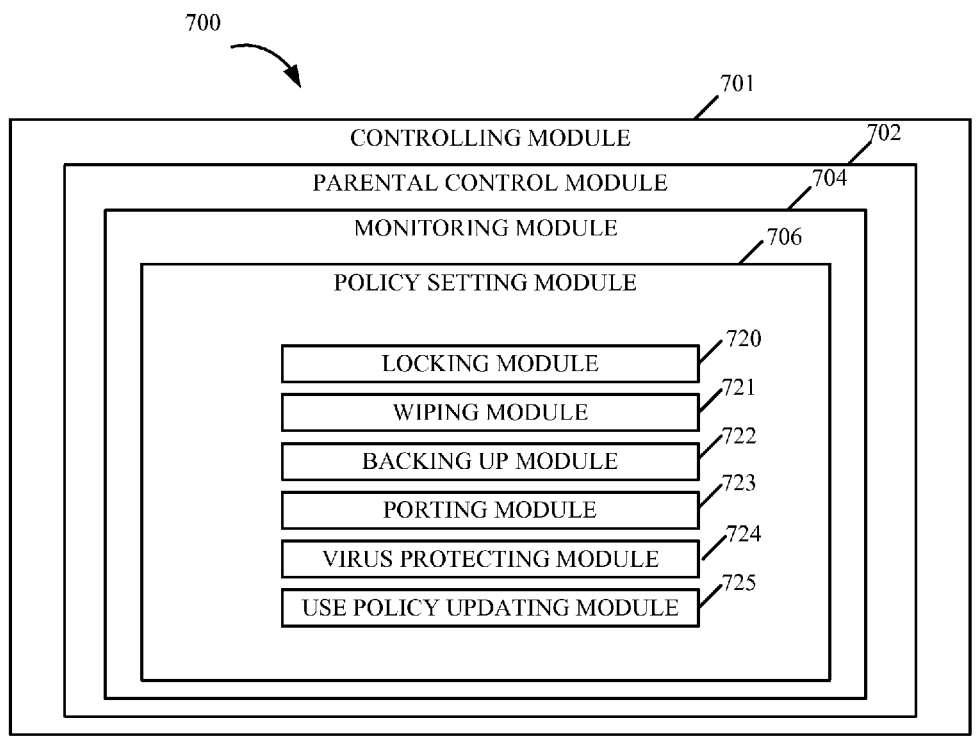
FIG. 7 is an exemplary embodiment of the present invention.

FIG. 7 illustrates another exemplary system 700 including a controlling module 701 for controlling a mobile device remotely, wherein the controlling module 701 may include a parental control module 702 for controlling a mobile device used by a child, wherein the parental control module 702 may include a monitoring module 704 for monitoring a use of the mobile device and a filtering module for filtering an inappropriate content, wherein the monitoring module includes a web-based monitoring dashboard for monitoring at least one of a text message, voice data, video data, and online activity of the mobile device (not shown but similar to dashboard 405 in FIG. 4), wherein the monitoring module 704 further includes a policy setting module 706 for determining a use policy for what use is permitted on the mobile device, and wherein the policy setting module 706 further includes a locking module 720 for initiating a locking of the mobile device; a wiping module 721 for initiating a wiping of at least one file on the mobile device; a backing up module 722 for backing up data of the mobile device; a porting module 723 for porting a file in the mobile device to another mobile device; a virus protecting module 724 for initiating an update of a virus protection on the mobile device; and a use policy updating module 725 for at least one of amending, adding or deleting an existing use policy. Again, modules 720-724 are provided just as an example, and of course, other types of modules may be used and different combinations of the modules may be included instead of the one shown in FIG. 7. For example, the combination containing just each one of the modules 720-724 may be used, or in the alternative, the combination using modules 720-722, and 724 may be used.

Figure 8:
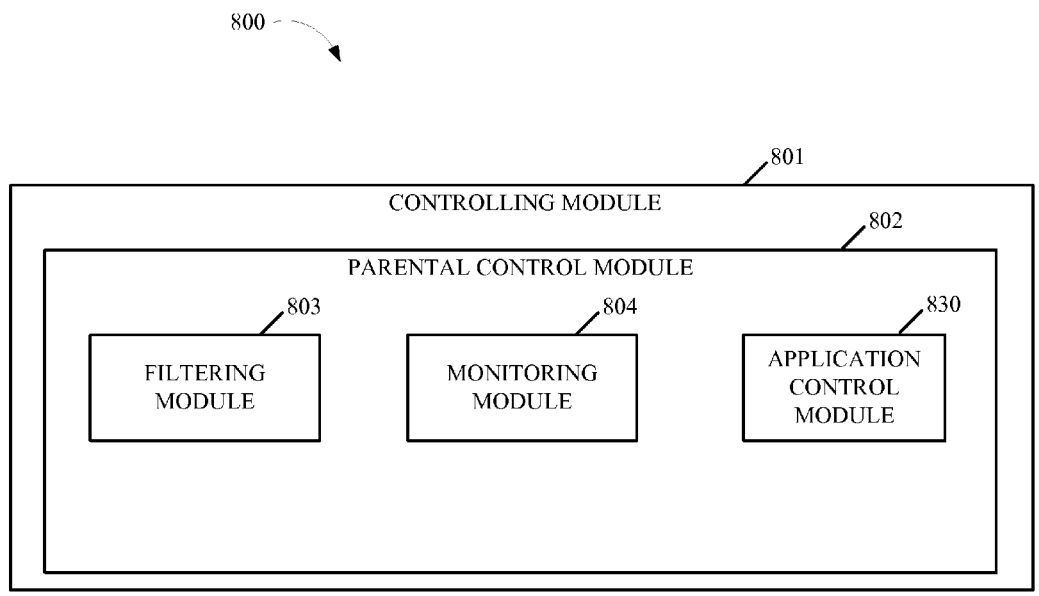
FIG. 8 is an exemplary embodiment of the present invention.

As further exemplified in FIG. 8, an exemplary system 800 includes a controlling module 801 for controlling a mobile device remotely, wherein the controlling module 801 may include a parental control module 802 for controlling a mobile device used by a child, and wherein the parental control module 802 may include a monitoring module 804 for monitoring a use of the mobile device and a filtering module 803 for filtering an inappropriate content, and further includes an application control module 830 for controlling an application allowed to run on the mobile device.

Figure 9:
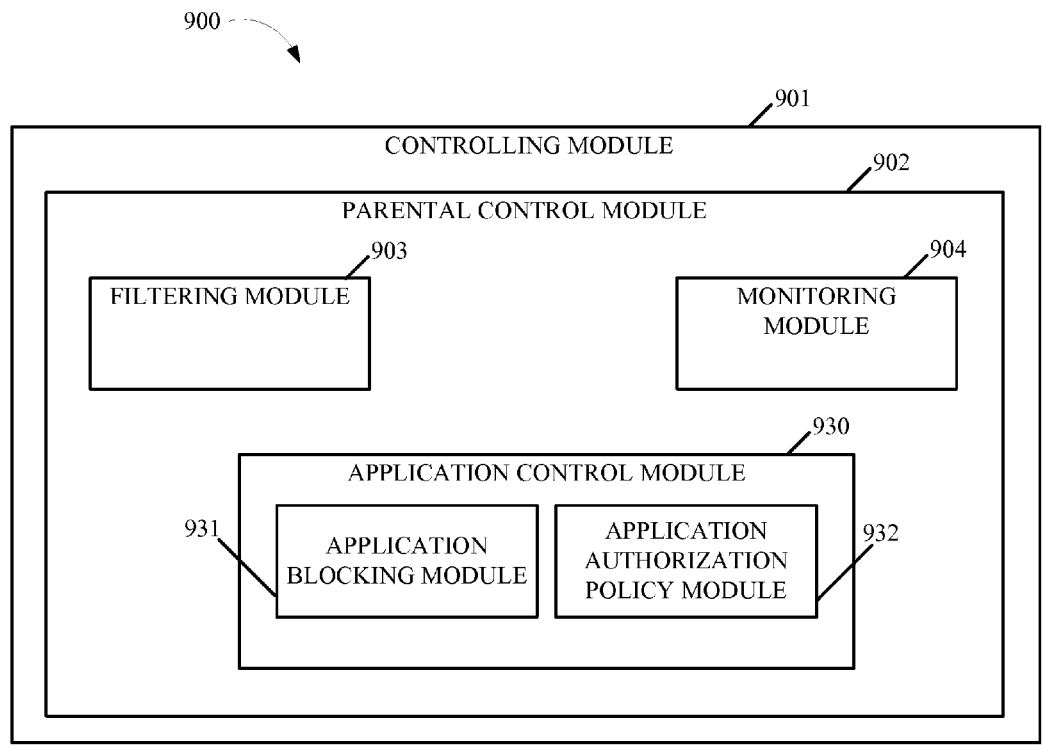
FIG. 9 is an exemplary embodiment of the present invention.

As further exemplified in FIG. 9, an exemplary system 900 includes a controlling module 901 for controlling a mobile device remotely, wherein the controlling module 901 may include a parental control module 902 for controlling a mobile device used by a child, and wherein the parental control module 902 may include a monitoring module 904 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy.

Figure 10:
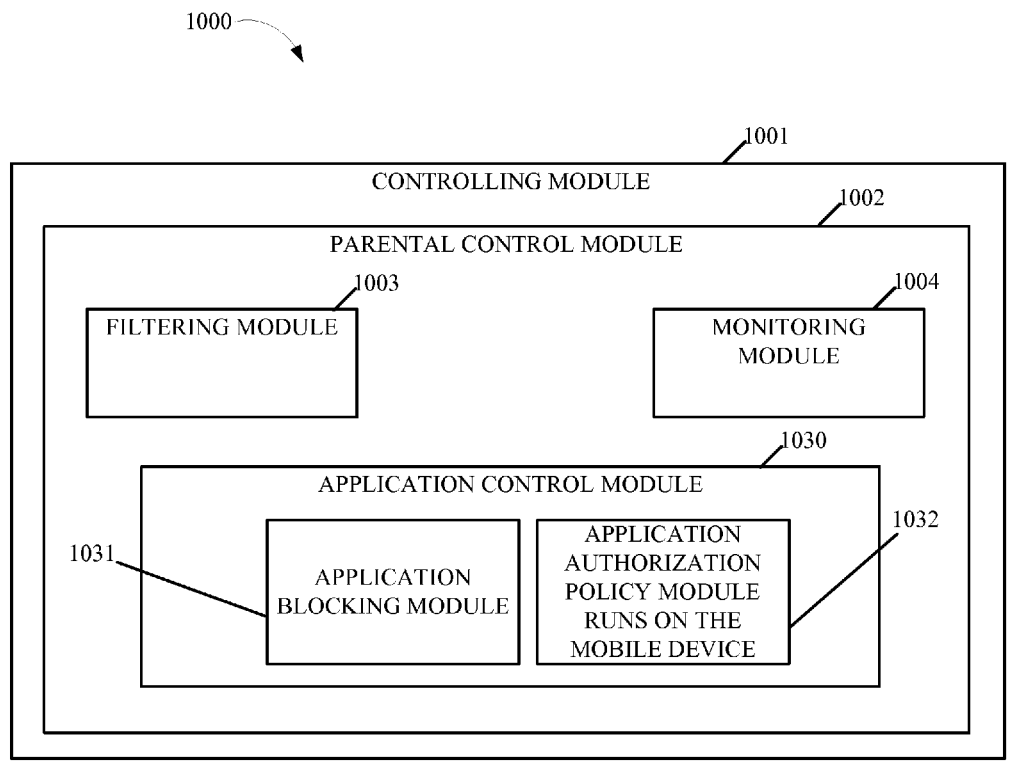
FIG. 10 is an exemplary embodiment of the present invention.

As further exemplified in FIG. 10, an exemplary system 1000 includes a controlling module 1001 for controlling a mobile device remotely, wherein the controlling module 1001 may include a parental control module 1002 for controlling a mobile device used by a child, and wherein the parental control module 1002 may include a monitoring module 1004 for monitoring a use of the mobile device and a filtering module 1003 for filtering an inappropriate content, and further includes an application control module 1030 for controlling an application allowed to run on the mobile device, wherein the application control module 1030 includes an application blocking module 1031 for blocking an installation of an unauthorized application; and an application authorization policy module 1032 for authorizing an installation of an application according to a predetermined policy, wherein the application control module 1030 runs on the mobile device.

Figure 11:
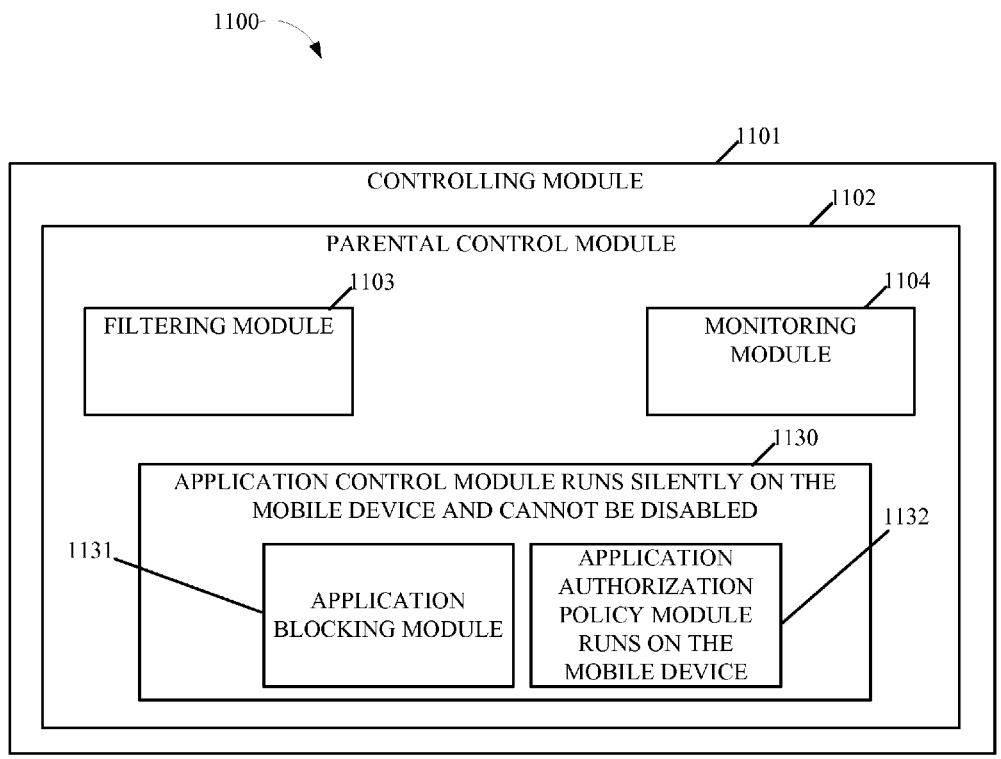
FIG. 11 is an exemplary embodiment of the present invention.

As further exemplified in FIG. 11, an exemplary system 1100 includes a controlling module 1101 for controlling a mobile device remotely, wherein the controlling module 1101 may include a parental control module 1102 for controlling a mobile device used by a child, and wherein the parental control module 1102 may include a monitoring module 1104 for monitoring a use of the mobile device and a filtering module 1103 for filtering an inappropriate content, and further includes an application control module 1130 for controlling an application allowed to run on the mobile device, wherein the application control module 1130 includes an application blocking module 1131 for blocking an installation of an unauthorized application; and an application authorization policy module 1132 for authorizing an installation of an application according to a predetermined policy, wherein the application control module 1130 runs on the mobile device, and wherein the application control module 1130 runs silently on the mobile device and cannot be disabled.

Figure 12:
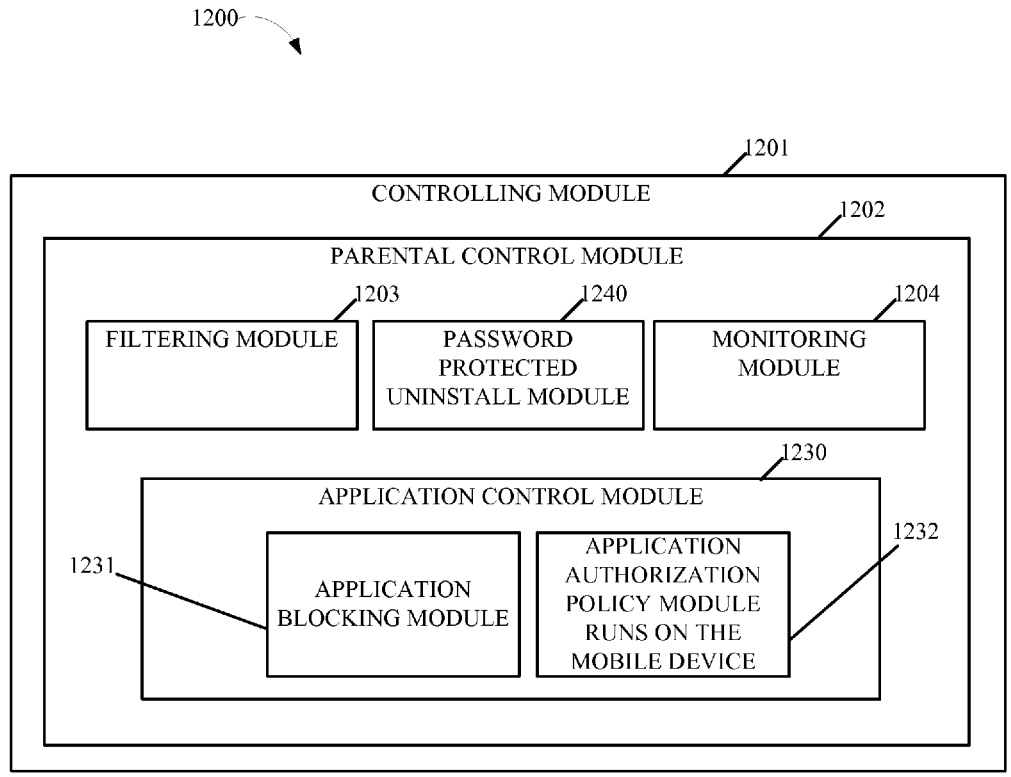
FIG. 12 is an exemplary embodiment of the present invention.

As further exemplified in FIG. 12, an exemplary system 1200 includes a controlling module 1201 for controlling a mobile device remotely, wherein the controlling module 1201 may include a parental control module 1202 for controlling a mobile device used by a child, and wherein the parental control module 1202 may include a monitoring module 1204 for monitoring a use of the mobile device and a filtering module 1203 for filtering an inappropriate content, and further includes an application control module 1230 for controlling an application allowed to run on the mobile device, wherein the application control module 1230 includes an application blocking module 1231 for blocking an installation of an unauthorized application; and an application authorization policy module 1232 for authorizing an installation of an application according to a predetermined policy, wherein the application control module 1230 runs on the mobile device, and wherein the application control module 1230 runs silently on the mobile device and cannot be disabled, and further includes a password protected uninstall module 1240 for preventing an uninstalling of the application control module 1230 with password protection.

Figure 13:
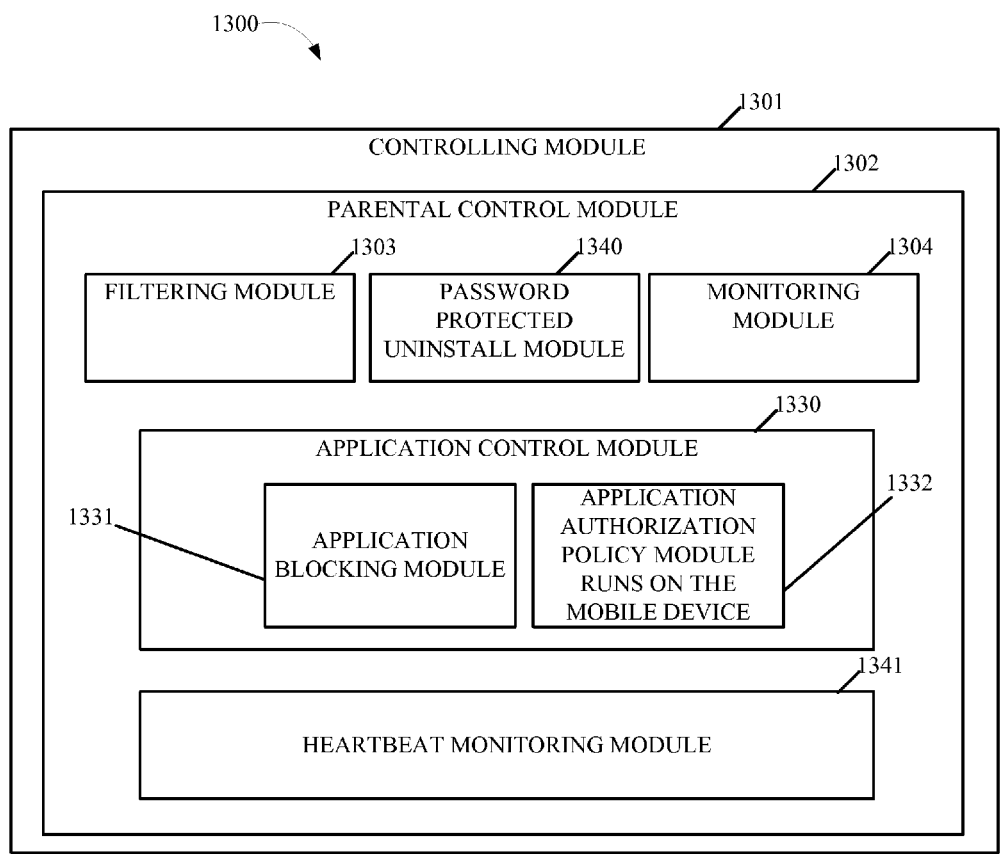
FIG. 13 is an exemplary embodiment of the present invention.

As further exemplified in FIG. 13, an exemplary system 1300 includes a controlling module 1301 for controlling a mobile device remotely, wherein the controlling module 1301 may include a parental control module 1302 for controlling a mobile device used by a child, and wherein the parental control module 1302 may include a monitoring module 1304 for monitoring a use of the mobile device and a filtering module 1303 for filtering an inappropriate content, and further includes an application control module 1330 for controlling an application allowed to run on the mobile device, wherein the application control module 1330 includes an application blocking module 1331 for blocking an installation of an unauthorized application; and an application authorization policy module 1332 for authorizing an installation of an application according to a predetermined policy, wherein the application control module 1330 runs on the mobile device, and wherein the application control module 1330 runs silently on the mobile device and cannot be disabled, and further includes a password protected uninstall module 1340 for preventing an uninstalling of the application control module 1330 with password protection and a heartbeat monitoring module 1341 for automatically restarting the application control module 1330 if the application control module 1330 terminates.

Figure 14:
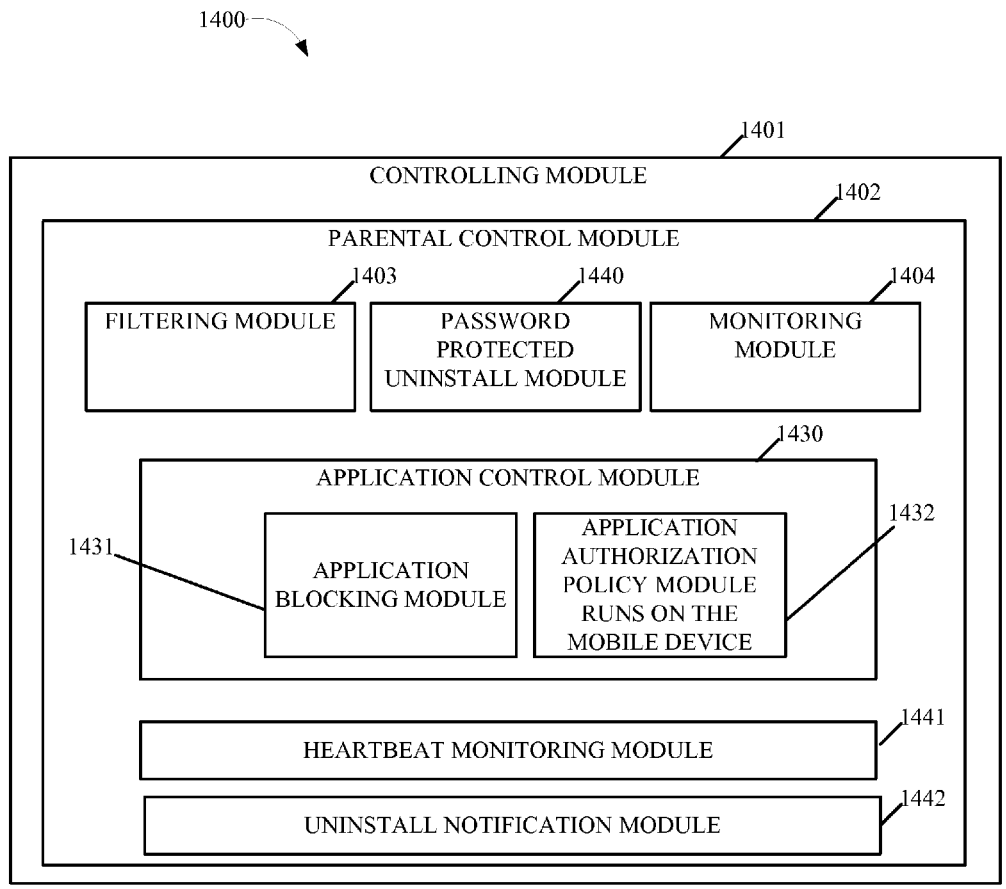
FIG. 14 is an exemplary embodiment of the present invention.

As further exemplified in FIG. 14, an exemplary system 1400 includes a controlling module 1401 for controlling a mobile device remotely, wherein the controlling module 1401 may include a parental control module 1402 for controlling a mobile device used by a child, and wherein the parental control module 1402 may include a monitoring module 1404 for monitoring a use of the mobile device and a filtering module 1403 for filtering an inappropriate content, and further includes an application control module 1430 for controlling an application allowed to run on the mobile device, wherein the application control module 1430 includes an application blocking module 1431 for blocking an installation of an unauthorized application; and an application authorization policy module 1432 for authorizing an installation of an application according to a predetermined policy, wherein the application control module 1430 runs on the mobile device, and wherein the application control module 1430 runs silently on the mobile device and cannot be disabled, and further includes a password protected uninstall module 1440 for preventing an uninstalling of the application control module 1430 with password protection, a heartbeat monitoring module 1441 for automatically restarting the application control module 1430 if the application control module 1430 terminates, and an uninstall notification module 1442 for notifying an occurrence of at least one of an attempted uninstall or an attempted modification of the application control module 1430.

Figure 15:
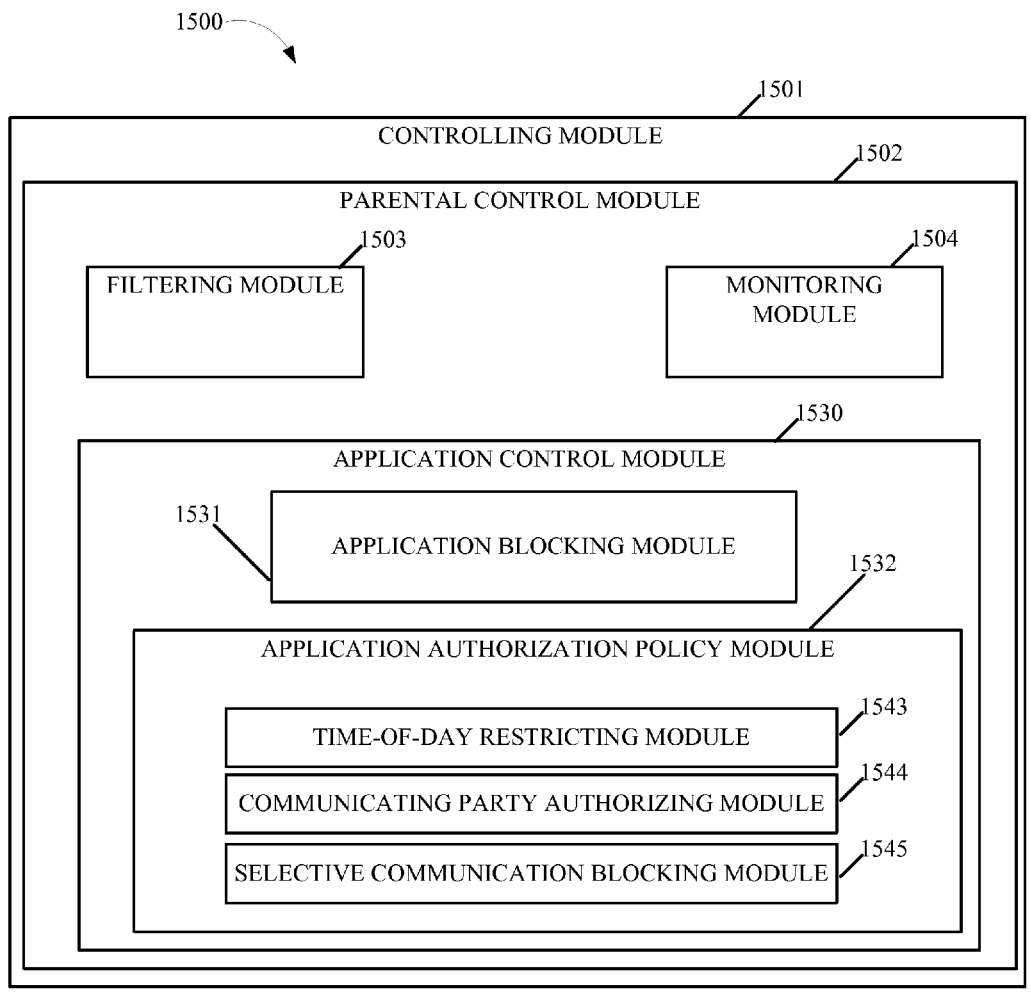
FIG. 15 is an exemplary embodiment of the present invention.

As further exemplified in FIG. 15, an exemplary system 1500 includes a controlling module 1501 for controlling a mobile device remotely, wherein the controlling module 1501 may include a parental control module 1502 for controlling a mobile device used by a child, and wherein the parental control module 1502 may include a monitoring module 1504 for monitoring a use of the mobile device and a filtering module 1503 for filtering an inappropriate content, and further includes an application control module 1530 for controlling an application allowed to run on the mobile device, wherein the application control module 1530 includes an application blocking module 1531 for blocking an installation of an unauthorized application; and an application authorization policy module 1532 for authorizing an installation of an application according to a predetermined policy, wherein the application authorization policy module includes a time-of-day restricting module 1543 for restricting a communication of the mobile device to a predetermined time period; a communicating party authorizing module 1544 for enabling a communication with an authorized communicating party; and a selective communication blocking module 1545 for blocking a communication having a predetermined communication characteristic.

Figure 16:
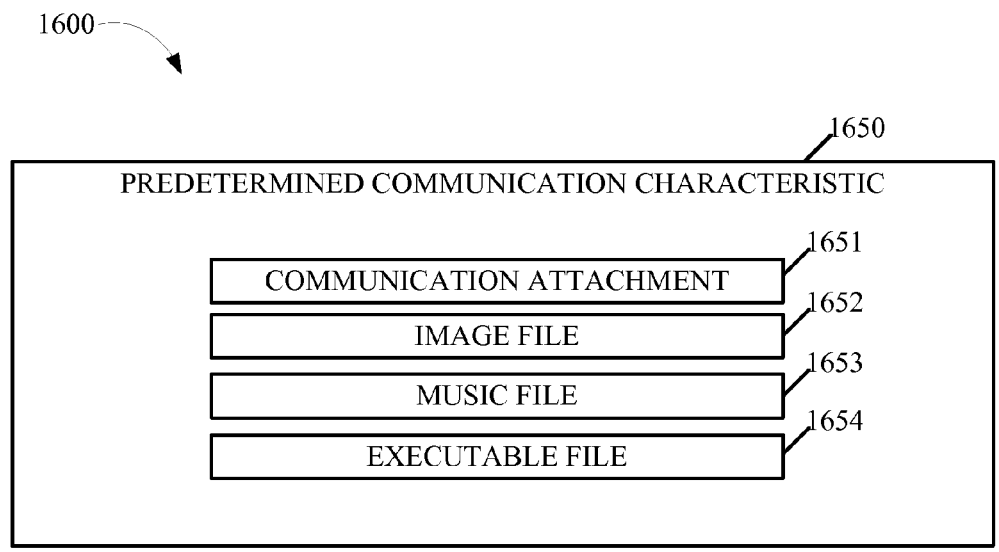
FIG. 16 is an exemplary embodiment of the present invention.

As further exemplified in FIGS. 15 and 16, an exemplary system 1600 may include a controlling module 1501 for controlling a mobile device remotely, wherein the controlling module 1501 may include a parental control module 1502 for controlling a mobile device used by a child, and wherein the parental control module 1502 may include a monitoring module 1504 for monitoring a use of the mobile device and a filtering module 1503 for filtering an inappropriate content, and further includes an application control module 1530 for controlling an application allowed to run on the mobile device, wherein the application control module 1530 includes an application blocking module 1531 for blocking an installation of an unauthorized application; and an application authorization policy module 1532 for authorizing an installation of an application according to a predetermined policy, wherein the application authorization policy module includes a time-of-day restricting module 1543 for restricting a communication of the mobile device to a predetermined time period; a communicating party authorizing module 1544 for enabling a communication with an authorized communicating party; and a selective communication blocking module 1545 for blocking a communication having a predetermined communication characteristic, wherein the predetermined communication characteristic includes whether a communication includes a communication attachment 1651, wherein the communication attachment includes at least one of an image file 1652, a music file 1653, or an executable file 1654.

Figure 17:
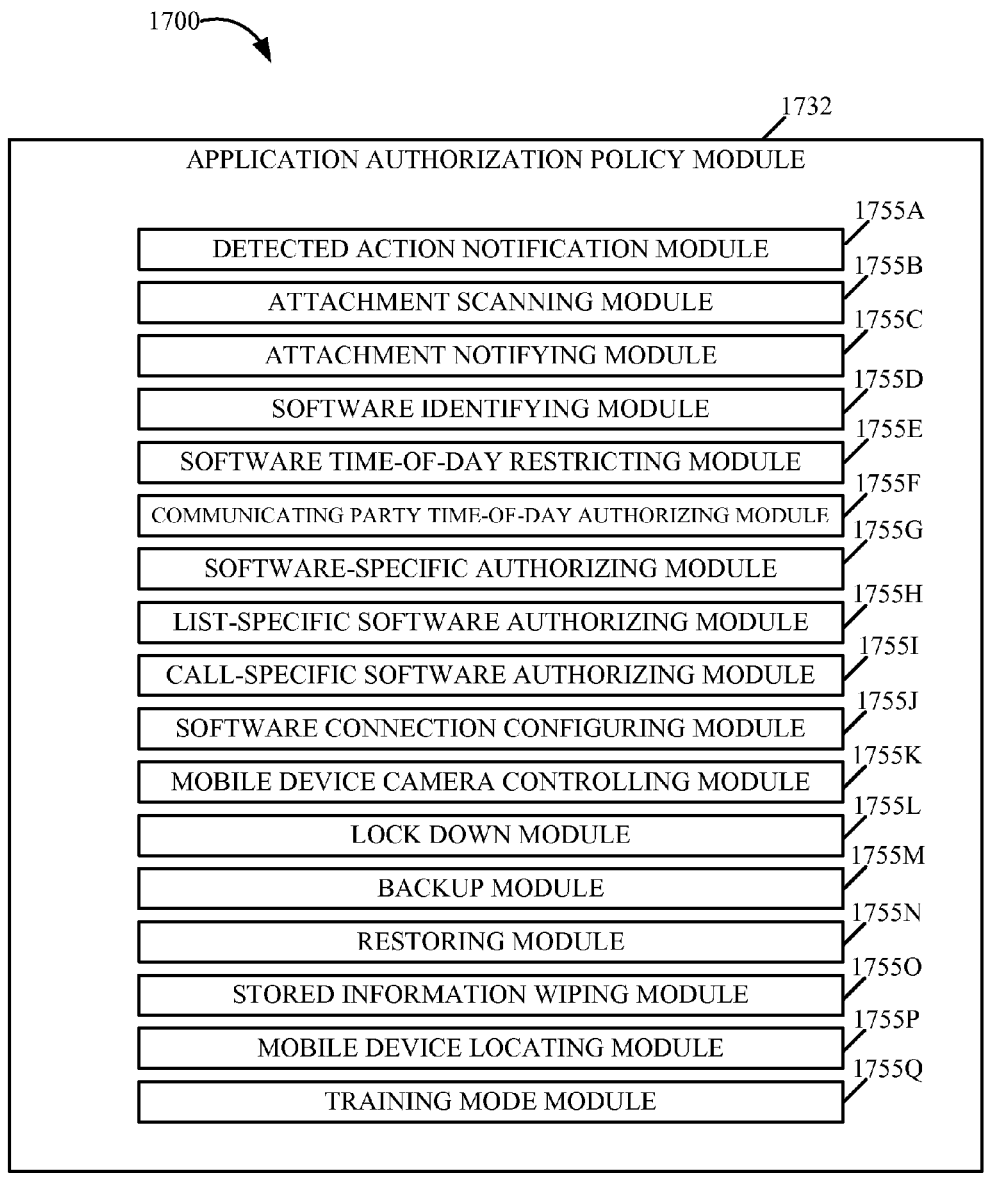
FIG. 17 is an exemplary embodiment of the present invention.

As further exemplified in FIGS. 9 and 17, an exemplary system 900 and 1700 includes a controlling module 901 for controlling a mobile device remotely, wherein the controlling module 901 may include a parental control module 902 for controlling a mobile device used by a child, and wherein the parental control module 902 may include a monitoring module 904 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the application authorization policy module 932 and 1732 may include any number, order and combination of the following: a detected action notification module 1755A for notifying an occurrence of a notification triggering action; an attachment scanning module 1755B for scanning an attachment to a communication; an attachment notifying module 1755C for notifying an occurrence of an attachment scanned by the attachment scanning module; a software identifying module 1755D for identifying a software running on the mobile device; a software time-of-day restricting module 1755E for allowing a use of a software during a predetermined time period; a communicating party time-of-day authorizing module 1755F for controlling communication with a party during a predetermined time period; a software-specific authorizing module 1755G for controlling a running of a predetermined specific software on the mobile device; a list-specific software authorizing module 1755H for controlling a running of a software based on a list, wherein the list includes at least one of a whitelist and a blacklist; a call-specific software authorizing module 1755I for controlling a running of a software based on a call-type, wherein the call-type includes at least one of a type of system call or a type of function call; a software connection configuring module 1755J for configuring a connection that a software is authorized to utilize; a mobile device camera controlling module 1755K for controlling a use of a camera of the mobile device; a lock down module 1755L for locking down the mobile phone, wherein locking down includes at least one of locking down connectivity, locking down installation activity, or powering down; a backup module 1755M for backing up stored information on the mobile device, wherein stored information includes at least one of an application or a data; a restoring module 1755N for restoring the stored information on the mobile device; a stored information wiping module 1755O for wiping at least a portion of the stored information; a mobile device locating module 1755P for locating the mobile device, wherein the locating may be accomplished via at least one of network triangulation or an internal Global Positioning System device; and a training mode module 1755Q for pre-configuring an application during initial setup of the mobile device.

Figure 18:
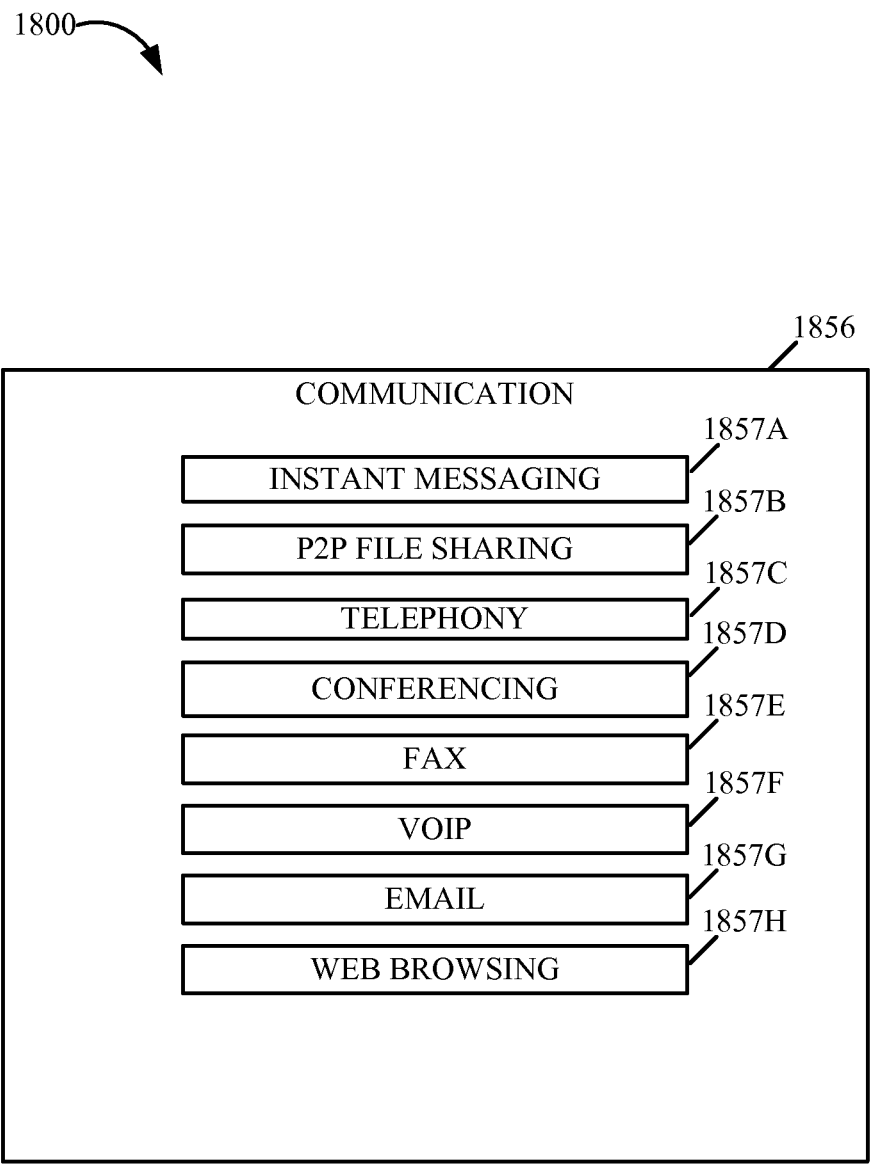
FIG. 18 is an exemplary embodiment of the present invention.

As further exemplified in FIGS. 9, 17, and 18, an exemplary system 900, 1700, and 1800 includes a controlling module 901 for controlling a mobile device remotely, wherein the controlling module 901 may include a parental control module 902 for controlling a mobile device used by a child, and wherein the parental control module 902 may include a monitoring module 904 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the application authorization policy module 932 and 1732 may include any number, order and combination of the following: a detected action notification module 1755A for notifying an occurrence of a notification triggering action; an attachment scanning module 1755B for scanning an attachment to a communication; an attachment notifying module 1755C for notifying an occurrence of an attachment scanned by the attachment scanning module; a software identifying module 1755D for identifying a software running on the mobile device; a software time-of-day restricting module 1755E for allowing a use of a software during a predetermined time period; a communicating party time-of-day authorizing module 1755F for controlling communication with a party during a predetermined time period; a software-specific authorizing module 1755G for controlling a running of a predetermined specific software on the mobile device; a list-specific software authorizing module 1755H for controlling a running of a software based on a list, wherein the list includes at least one of a whitelist and a blacklist; a call-specific software authorizing module 1755I for controlling a running of a software based on a call-type, wherein the call-type includes at least one of a type of system call or a type of function call; a software connection configuring module 1755J for configuring a connection that a software is authorized to utilize; a mobile device camera controlling module 1755K for controlling a use of a camera of the mobile device; a lock down module 1755L for locking down the mobile phone, wherein locking down includes at least one of locking down connectivity, locking down installation activity, or powering down; a backup module 1755M for backing up stored information on the mobile device, wherein stored information includes at least one of an application or a data; a restoring module 1755N for restoring the stored information on the mobile device; a stored information wiping module 1755O for wiping at least a portion of the stored information; a mobile device locating module 1755P for locating the mobile device, wherein the locating may be accomplished via at least one of network triangulation or an internal Global Positioning System device; and a training mode module 1755Q for pre-configuring an application right during initial setup of the mobile device, and wherein a communication 1856 may include at least one of instant messaging 1857A, P2P file sharing 1857B, telephony 1857C, conferencing 1857D, fax 1857E, VoIP 1857F, email 1857G, or web browsing 1857H.

Figure 19:
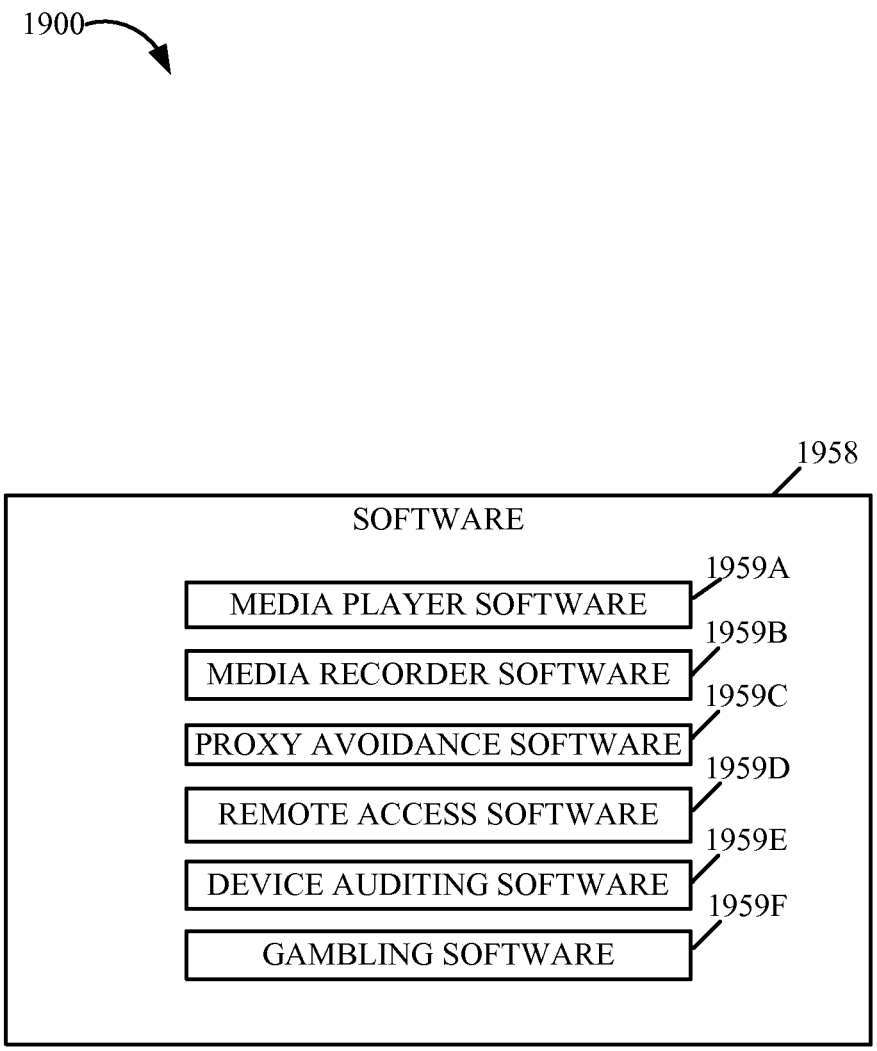
FIG. 19 is an exemplary embodiment of the present invention.
Figure 20:
FIG. 20 is an exemplary embodiment of the present invention.

As further exemplified in FIGS. 9, 17 and 19, an exemplary system 900, 1700 and 1900 includes a controlling module 901 for controlling a mobile device remotely, wherein the controlling module 901 may include a parental control module 902 for controlling a mobile device used by a child, and wherein the parental control module 902 may include a monitoring module 904 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the application authorization policy module 932 and 1732 may include any number, order and combination of the following: a detected action notification module 1755A for notifying an occurrence of a notification triggering action; an attachment scanning module 1755B for scanning an attachment to a communication; an attachment notifying module 1755C for notifying an occurrence of an attachment scanned by the attachment scanning module; a software identifying module 1755D for identifying a software running on the mobile device; a software time-of-day restricting module 1755E for allowing a use of a software during a predetermined time period; a communicating party time-of-day authorizing module 1755F for controlling communication with a party during a predetermined time period; a software-specific authorizing module 1755G for controlling a running of a predetermined specific software on the mobile device; a list-specific software authorizing module 1755H for controlling a running of a software based on a list, wherein the list includes at least one of a whitelist and a blacklist; a call-specific software authorizing module 1755I for controlling a running of a software based on a call-type, wherein the call-type includes at least one of a type of system call or a type of function call; a software connection configuring module 1755J for configuring a connection that a software is authorized to utilize; a mobile device camera controlling module 1755K for controlling a use of a camera of the mobile device; a lock down module 1755L for locking down the mobile phone, wherein locking down includes at least one of locking down connectivity, locking down installation activity, or powering down; a backup module 1755M for backing up stored information on the mobile device, wherein stored information includes at least one of an application or a data; a restoring module 1755N for restoring the stored information on the mobile device; a stored information wiping module 1755O for wiping at least a portion of the stored information; a mobile device locating module 1755P for locating the mobile device, wherein the locating may be accomplished via at least one of network triangulation or an internal Global Positioning System device; and a training mode module 1755Q for pre-configuring an application right during initial setup of the mobile device, and wherein a software 1958 includes at least one of media player software 1959A, media recorder software 1959B, proxy avoidance software 1959C for enabling a bypassing of proxy server features, remote access software 1959D for accessing at least one of a computing device or a network, device auditing software 1959E for auditing activity on the mobile device, or gambling software 1959F.

As further exemplified in FIGS. 9, 17, 18 and 20, an exemplary system 900, 1700, 1800, and 2000 includes a controlling module 901 for controlling a mobile device remotely, wherein the controlling module 901 may include a parental control module 902 for controlling a mobile device used by a child, and wherein the parental control module 902 may include a monitoring module 904 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the application authorization policy module 932 and 1732 may include any number, order and combination of the following: a detected action notification module 1755A for notifying an occurrence of a notification triggering action; an attachment scanning module 1755B for scanning an attachment to a communication; an attachment notifying module 1755C for notifying an occurrence of an attachment scanned by the attachment scanning module; a software identifying module 1755D for identifying a software running on the mobile device; a software time-of-day restricting module 1755E for allowing a use of a software during a predetermined time period; a communicating party time-of-day authorizing module 1755F for controlling communication with a party during a predetermined time period; a software-specific authorizing module 1755G for controlling a running of a predetermined specific software on the mobile device; a list-specific software authorizing module 1755H for controlling a running of a software based on a list, wherein the list includes at least one of a whitelist and a blacklist; a call-specific software authorizing module 1755I for controlling a running of a software based on a call-type, wherein the call-type includes at least one of a type of system call or a type of function call; a software connection configuring module 1755J for configuring a connection that a software is authorized to utilize; a mobile device camera controlling module 1755K for controlling a use of a camera of the mobile device; a lock down module 1755L for locking down the mobile phone, wherein locking down includes at least one of locking down connectivity, locking down installation activity, or powering down; a backup module 1755M for backing up stored information on the mobile device, wherein stored information includes at least one of an application or a data; a restoring module 1755N for restoring the stored information on the mobile device; a stored information wiping module 1755O for wiping at least a portion of the stored information; a mobile device locating module 1755P for locating the mobile device, wherein the locating may be accomplished via at least one of network triangulation or an internal Global Positioning System device; and a training mode module 1755Q for pre-configuring an application right during initial setup of the mobile device, and wherein a communication 1856 may include at least one of instant messaging 1857A, P2P file sharing 1857B, telephony 1857C, conferencing 1857D, fax 1857E, VoIP 1857F, email 1857G, or web browsing 1857H, and wherein the web browsing 2057H may include an access to at least one of an adult site 2060A, a gambling site 2060B, or a game site 2060C.

Figure 21:
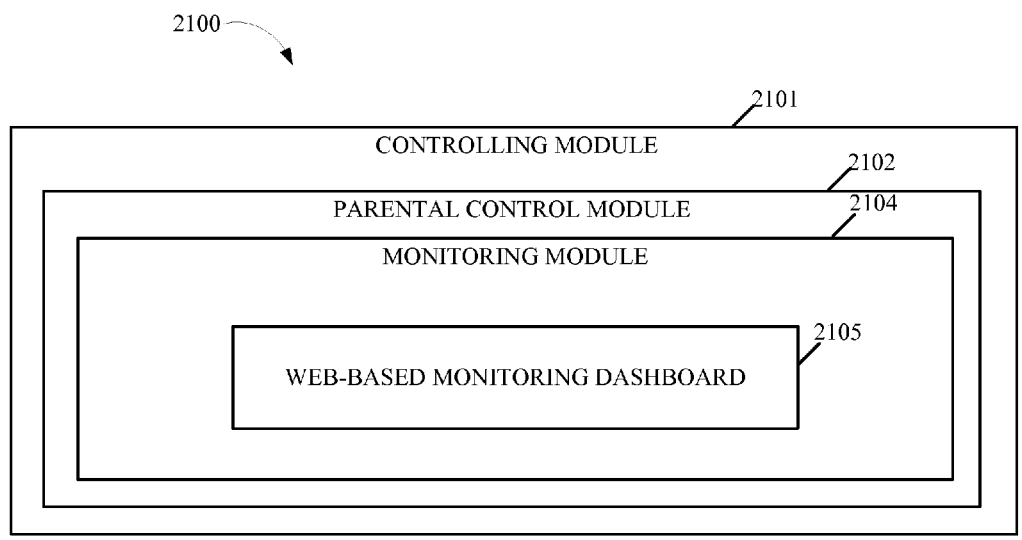
FIG. 21 is an exemplary embodiment of the present invention.

As further exemplified in FIGS. 9 and 21, an exemplary system 900 and 2100 includes a controlling module 2101 for controlling a mobile device remotely, wherein the controlling module 2101 may include a parental control module 2102 for controlling a mobile device used by a child, and wherein the parental control module 2102 may include a monitoring module 904 or 2104 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the monitoring module 904 and 2104 includes a web-based monitoring dashboard 2105 for monitoring at least one of a text message, voice data, video data, and online activity of the mobile device.

Figure 22:
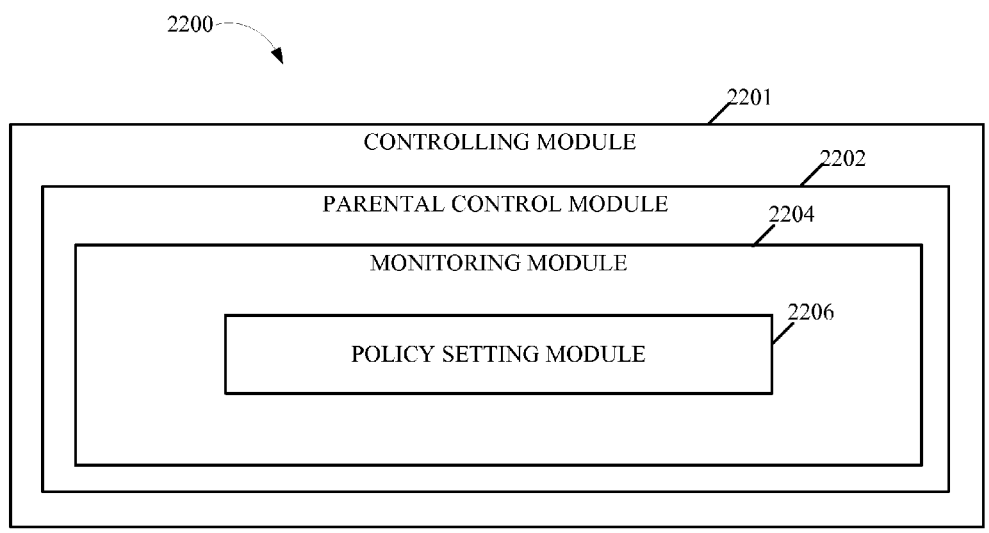
FIG. 22 is an exemplary embodiment of the present invention.
Figure 23:
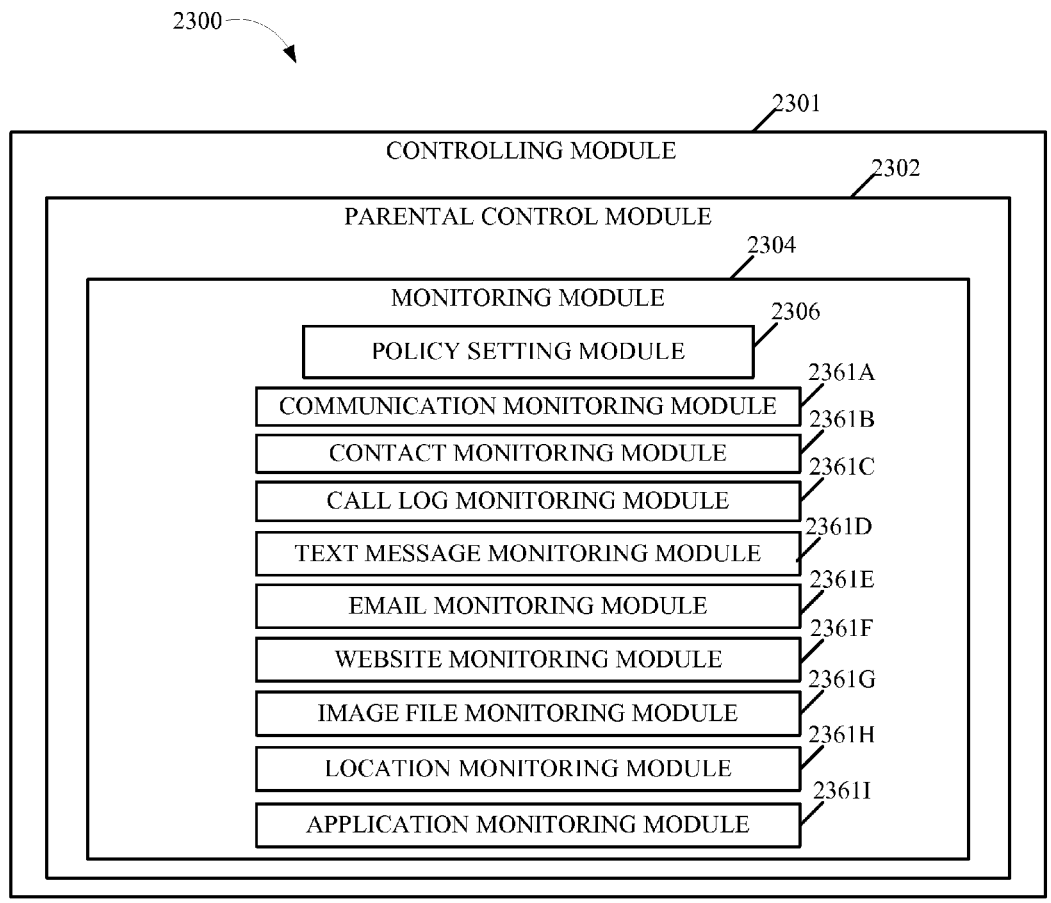
FIG. 23 is an exemplary embodiment of the present invention.
Figure 24:
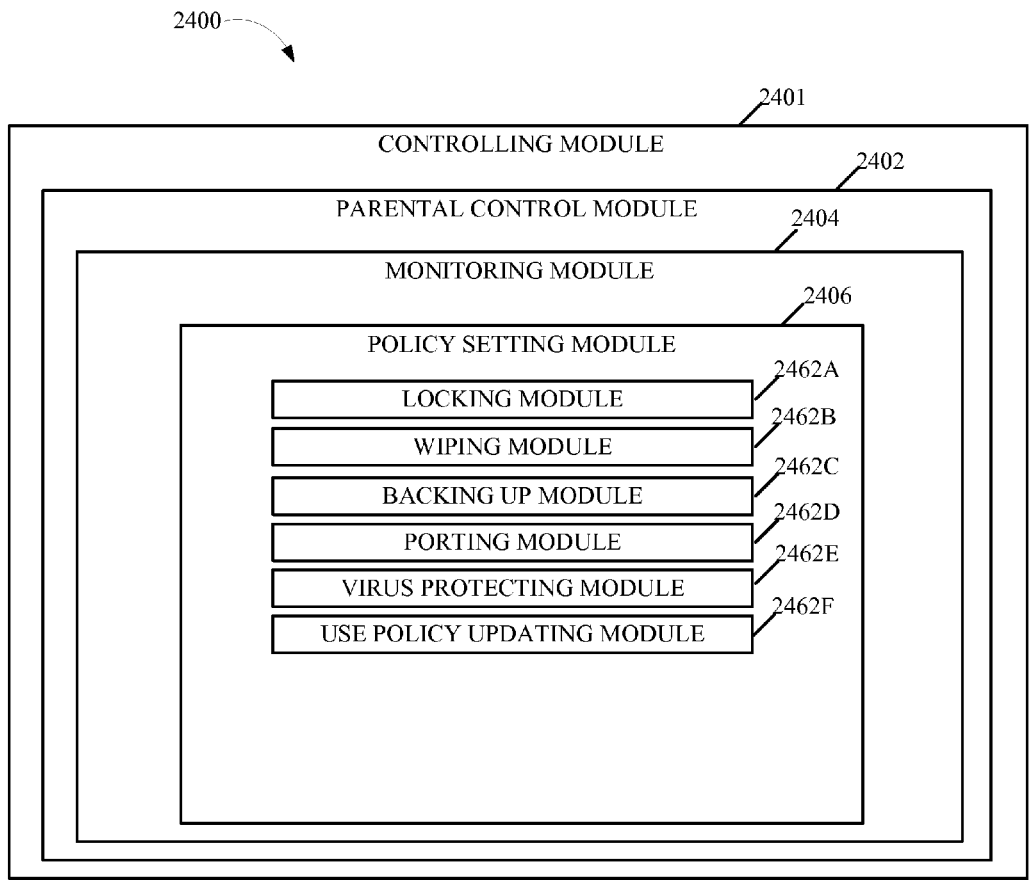
FIG. 24 is an exemplary embodiment of the present invention.

As further exemplified in FIGS. 9, 21 and 22, an exemplary system 900, 2100, and 2200 includes a controlling module 2201 for controlling a mobile device remotely, wherein the controlling module 2201 may include a parental control module 2202 for controlling a mobile device used by a child, and wherein the parental control module 2202 may include a monitoring module 904, 2104 or 2204 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the monitoring module 904 or 2204 includes a web-based monitoring dashboard 2105 for monitoring at least one of a text message, voice data, video data, and online activity of the mobile device, and wherein the monitoring module further includes a policy setting module 2206 for determining a use policy for what use is permitted on the mobile device.

As further exemplified in FIGS. 9, 21, 22, and 23, an exemplary system 900, 2100, 2200, and 2300 includes a controlling module 2301 for controlling a mobile device remotely, wherein the controlling module 2301 may include a parental control module 2302 for controlling a mobile device used by a child, and wherein the parental control module 2302 may include a monitoring module 904, 2104, 2204, or 2304 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the monitoring module 904 or 2304 includes a web-based monitoring dashboard 2105 for monitoring at least one of a text message, voice data, video data, and online activity of the mobile device, wherein the monitoring module further includes a policy setting module for determining a use policy for what use is permitted on the mobile device, and wherein the monitoring module 2304 further may include any combination of the following: a communication monitoring module 2361A for viewing a communication with the mobile device; a contact monitoring module 2361B for viewing information relating to a party communicating with the mobile device; a call log monitoring module 2361C for viewing a log of a call on the mobile device; a text message monitoring module 2361D for viewing at least one of a text message and a text message attachment transferred to and from the mobile device; an email monitoring module 2361E for viewing an email transferred to and from the mobile device; a website monitoring module 2361F for viewing a website visited on the mobile device; an image file monitoring module 2361G for viewing an image transferred to and from the mobile device; a location monitoring module 2361H for viewing a location of the mobile device; and an application monitoring module 2361I for viewing an application on the mobile device.

As further exemplified in FIGS. 9, 21, 22, and 24, an exemplary system 900, 2100, 2200, and 2400 may include a controlling module 2401 for controlling a mobile device remotely, wherein the controlling module 2401 may include a parental control module 2402 for controlling a mobile device used by a child, and wherein the parental control module 2402 may include a monitoring module 904, 2104 or 2404 for monitoring a use of the mobile device and a filtering module 903 for filtering an inappropriate content, and further includes an application control module 930 for controlling an application allowed to run on the mobile device, wherein the application control module 930 includes an application blocking module 931 for blocking an installation of an unauthorized application; and an application authorization policy module 932 for authorizing an installation of an application according to a predetermined policy, wherein the monitoring module 904 or 2204 includes a web-based monitoring dashboard 2105 for monitoring at least one of a text message, voice data, video data, and online activity of the mobile device, and wherein the monitoring module 2404 further includes a policy setting module for determining a use policy for what use is permitted on the mobile device, and wherein the policy setting module further includes any combination of a locking module 2462A for initiating a locking of the mobile device; a wiping module 2462B for initiating a wiping of at least one file on the mobile device; a backing up module 2462C for backing up data of the mobile device; a porting module 2462D for porting a file in the mobile device to another mobile device; a virus protecting module 2462E for initiating an update of a virus protection on the mobile device; and a use policy updating module 2462F for at least one of amending, adding or deleting an existing use policy.

Figure 25:
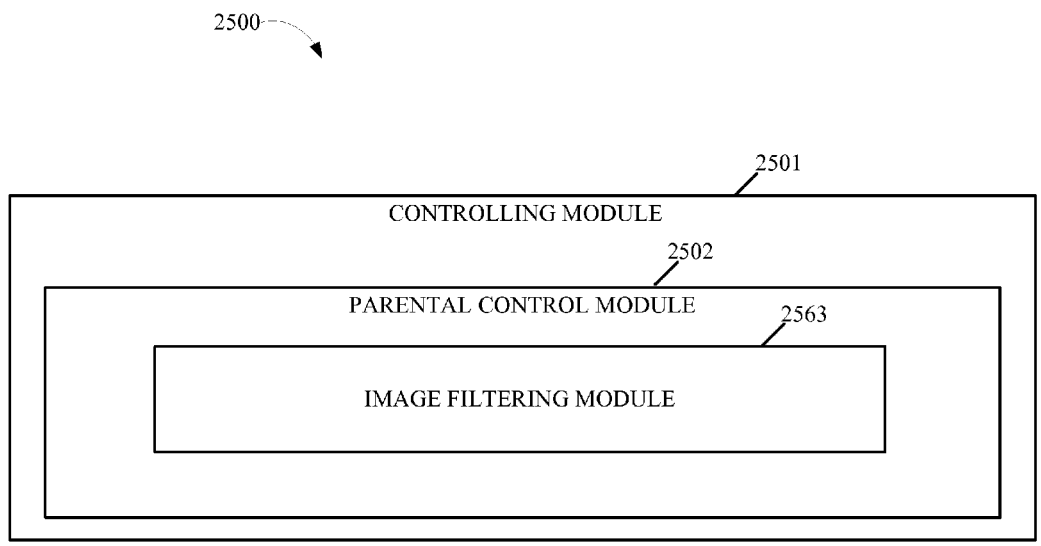
FIG. 25 is an exemplary embodiment of the present invention.

As further exemplified in FIGS. 3 and 25, an exemplary system 300 and 2500 may include a controlling module 2501 for controlling a mobile device remotely, wherein the controlling module 2501 may include a parental control module 2502 for controlling a mobile device used by a child, and wherein the parental control module 2502 may include a monitoring module 304 for monitoring a use of the mobile device and a filtering module 303 for filtering an inappropriate content, and may further include an image filtering module 2563 for filtering an image on the mobile device.

Figure 26:
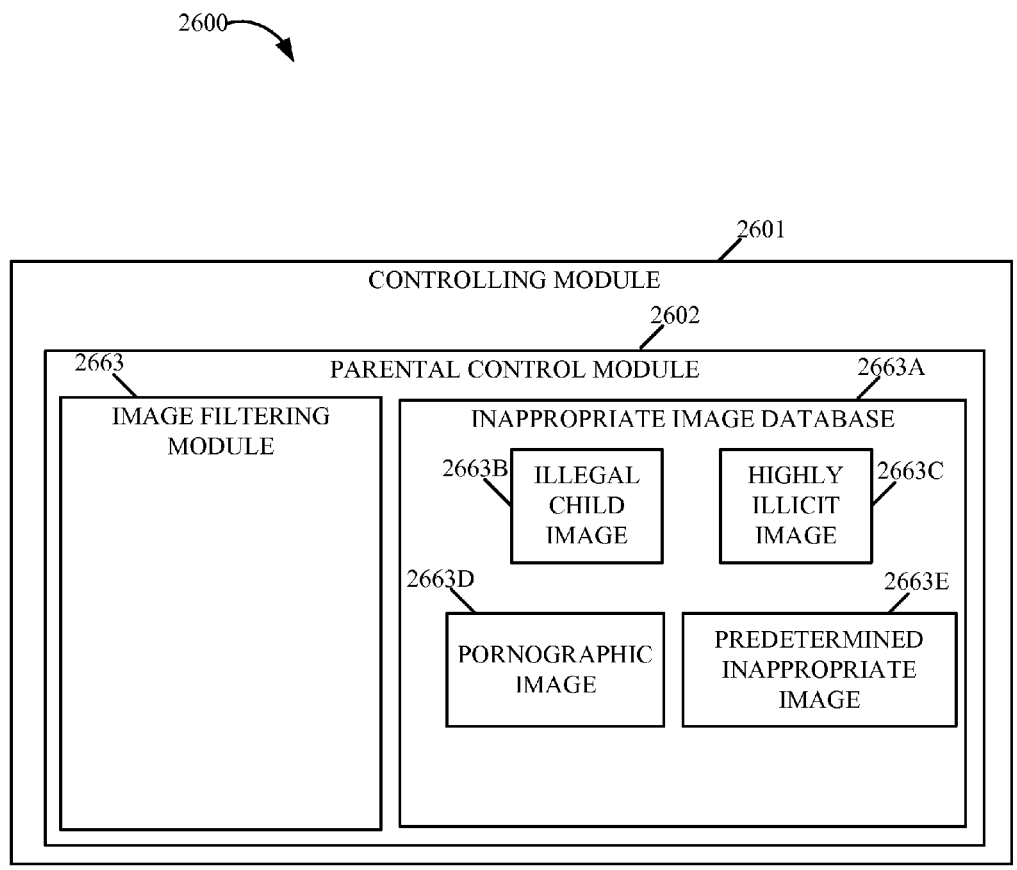
FIG. 26 is an exemplary embodiment of the present invention.
Figure 27:
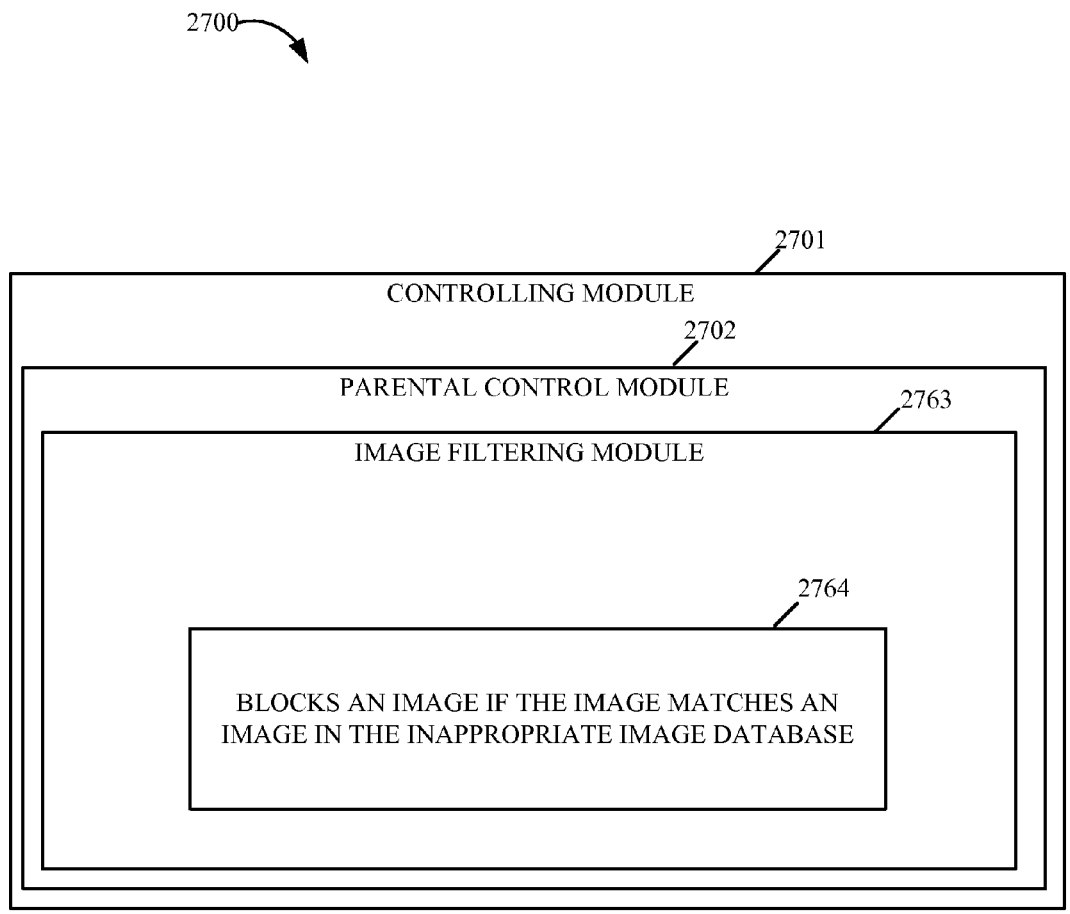
FIG. 27 is an exemplary embodiment of the present invention.
Figure 28:
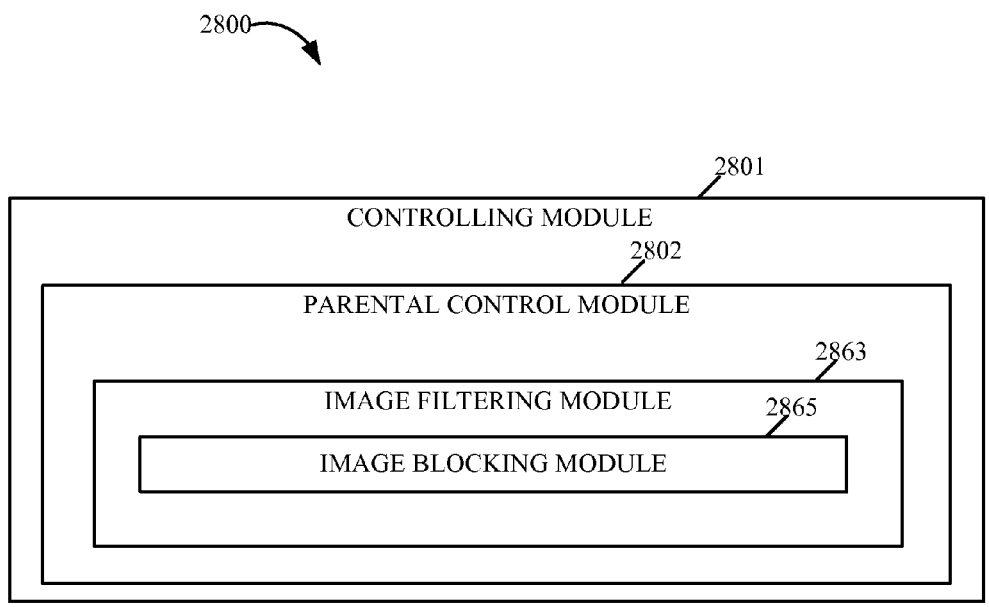
FIG. 28 is an exemplary embodiment of the present invention.
Figure 29:
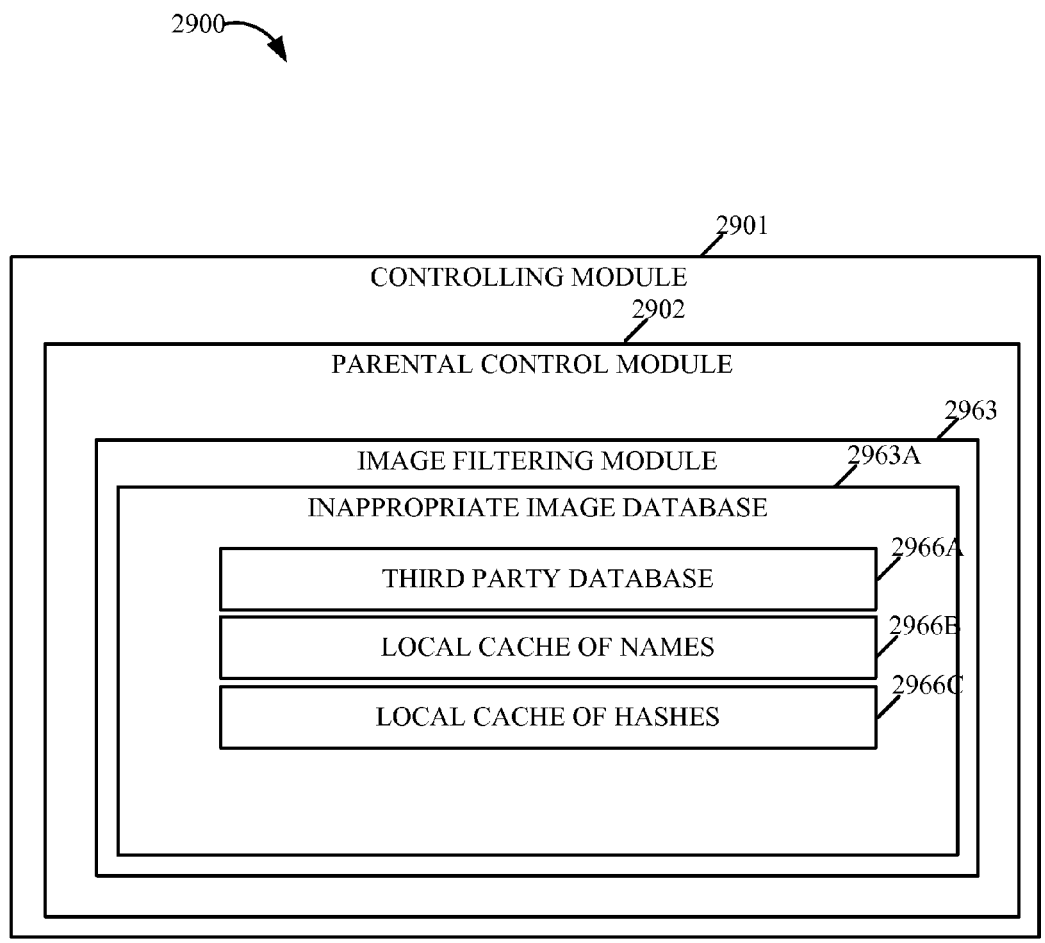
FIG. 29 is an exemplary embodiment of the present invention.
Figure 30:
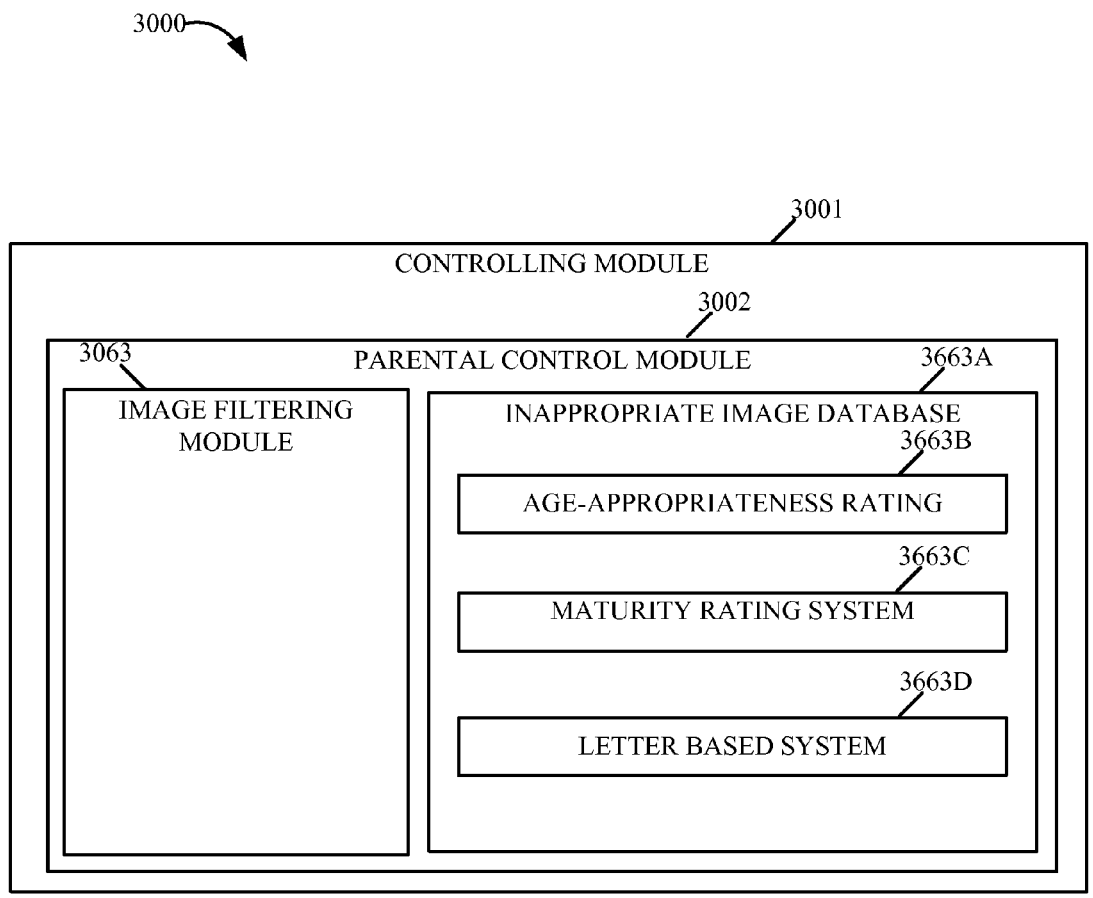
FIG. 30 is an exemplary embodiment of the present invention.
Figure 31:
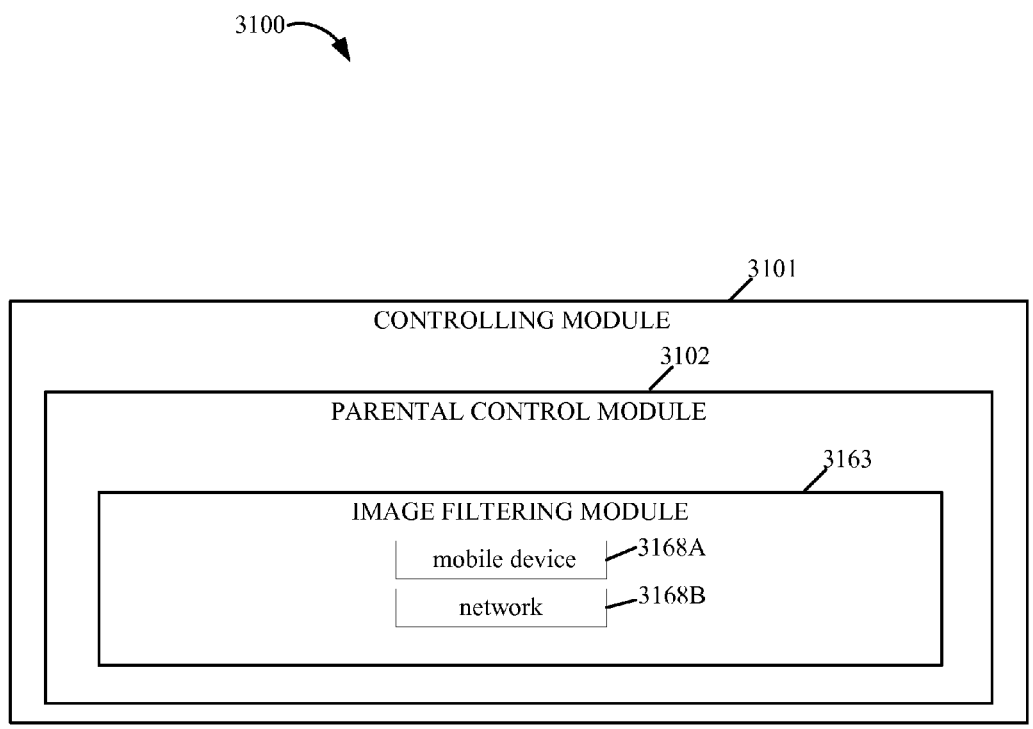
FIG. 31 is an exemplary embodiment of the present invention.
Figure 32:
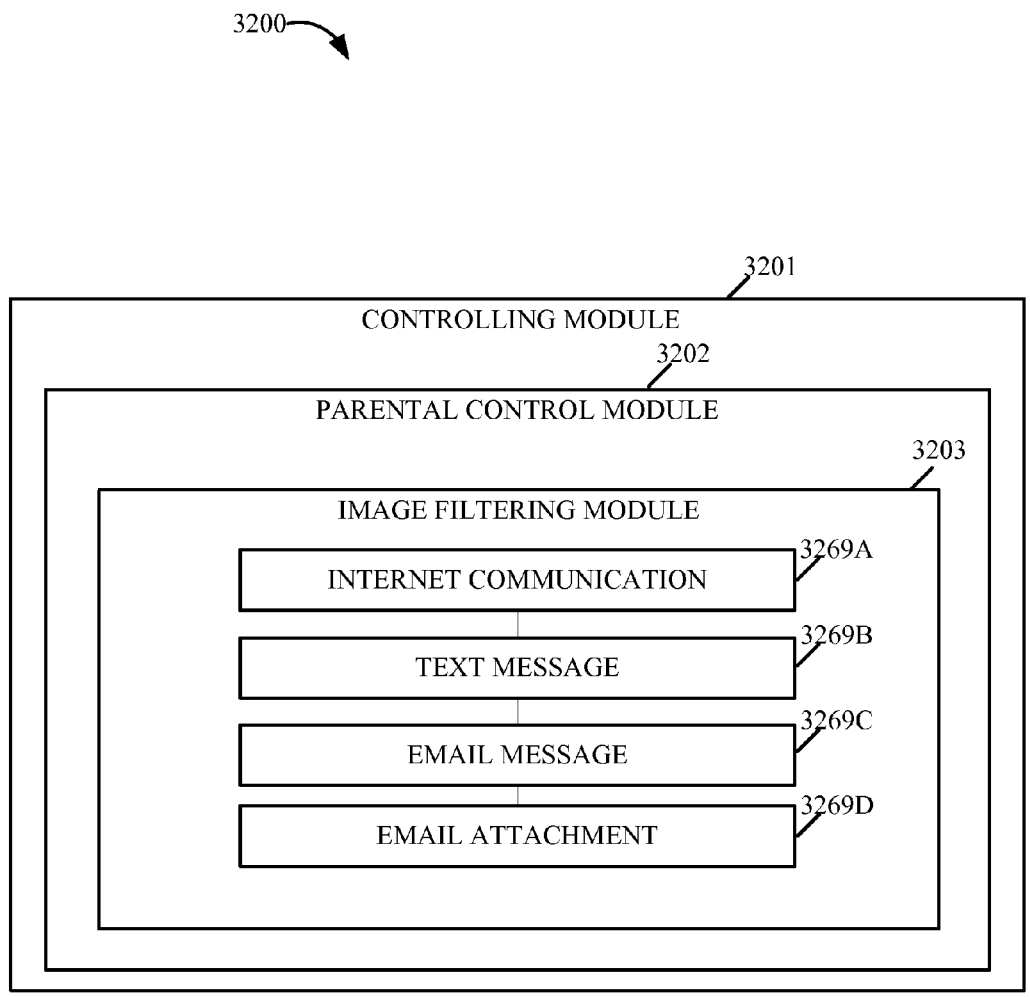
FIG. 32 is an exemplary embodiment of the present invention.
Figure 33:
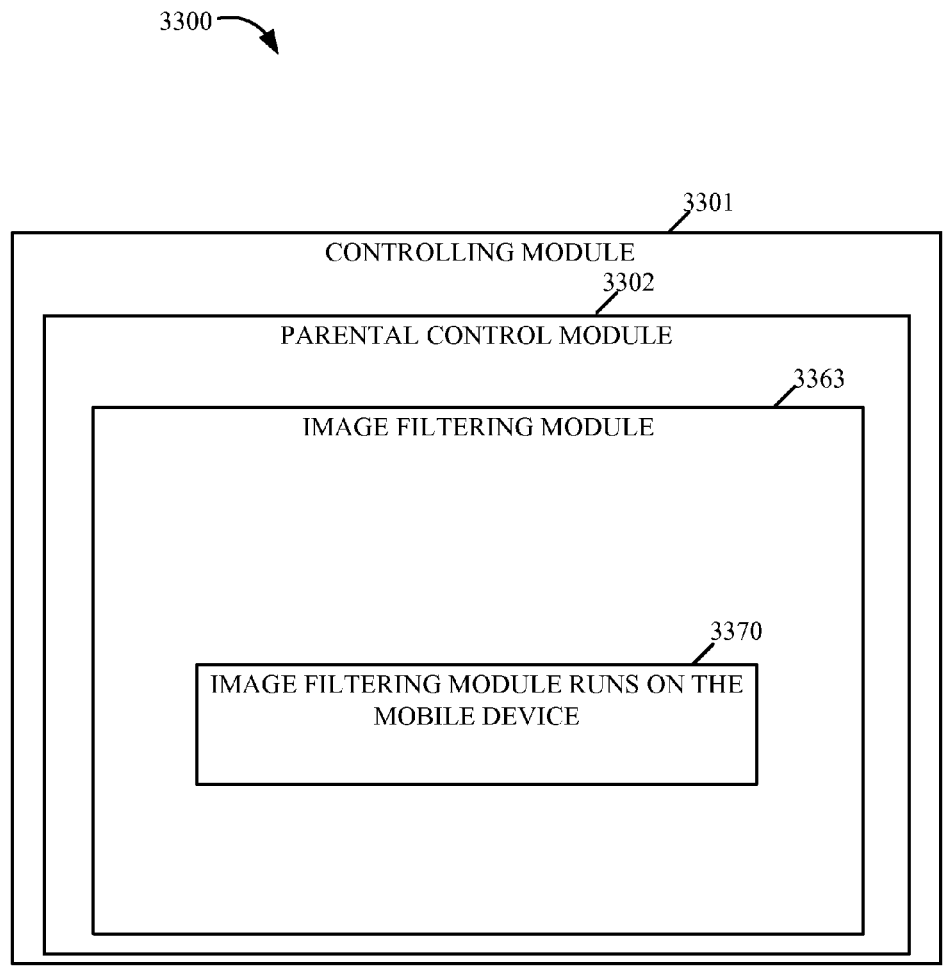
FIG. 33 is an exemplary embodiment of the present invention.
Figure 34:
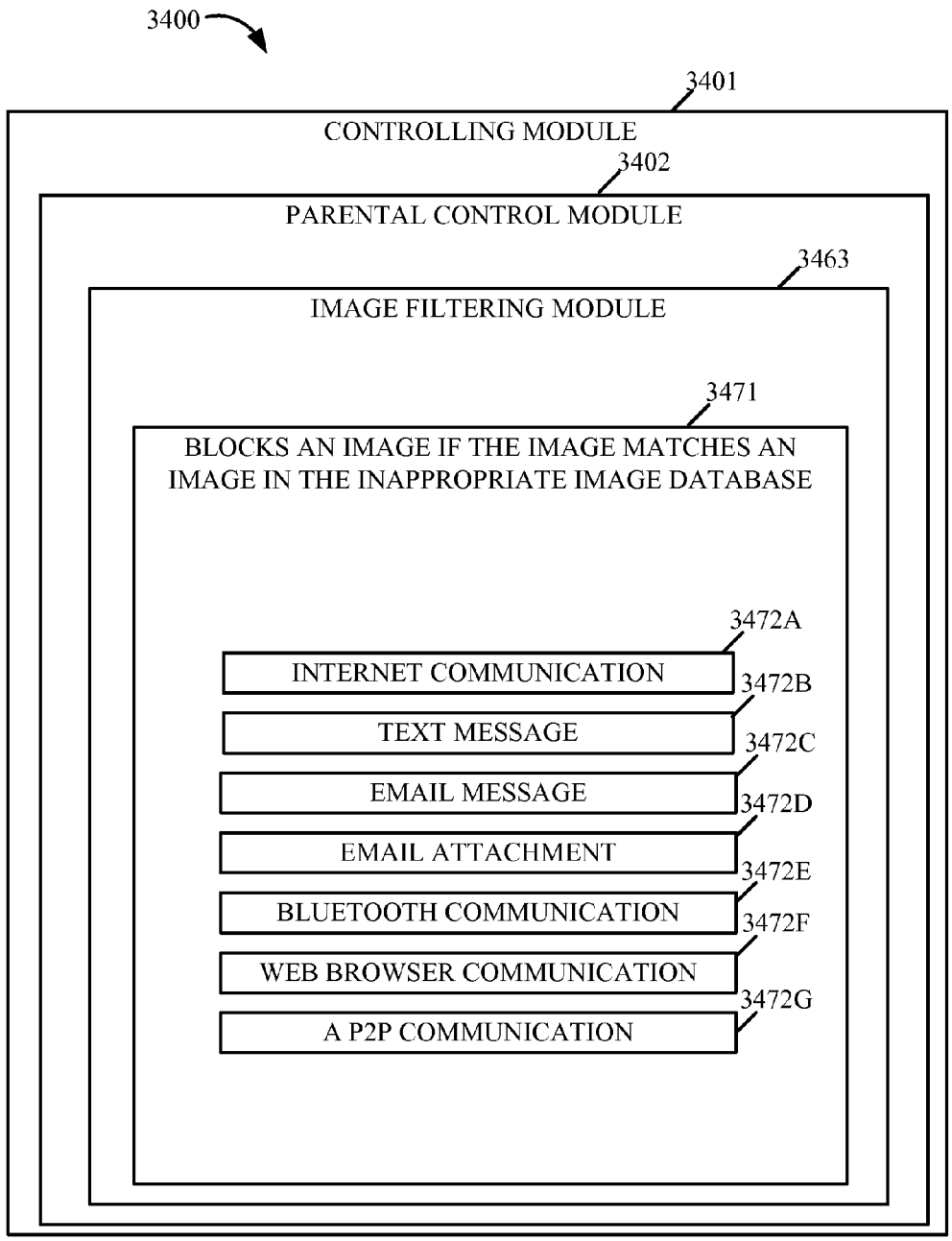
FIG. 34 is an exemplary embodiment of the present invention.
Figure 35:
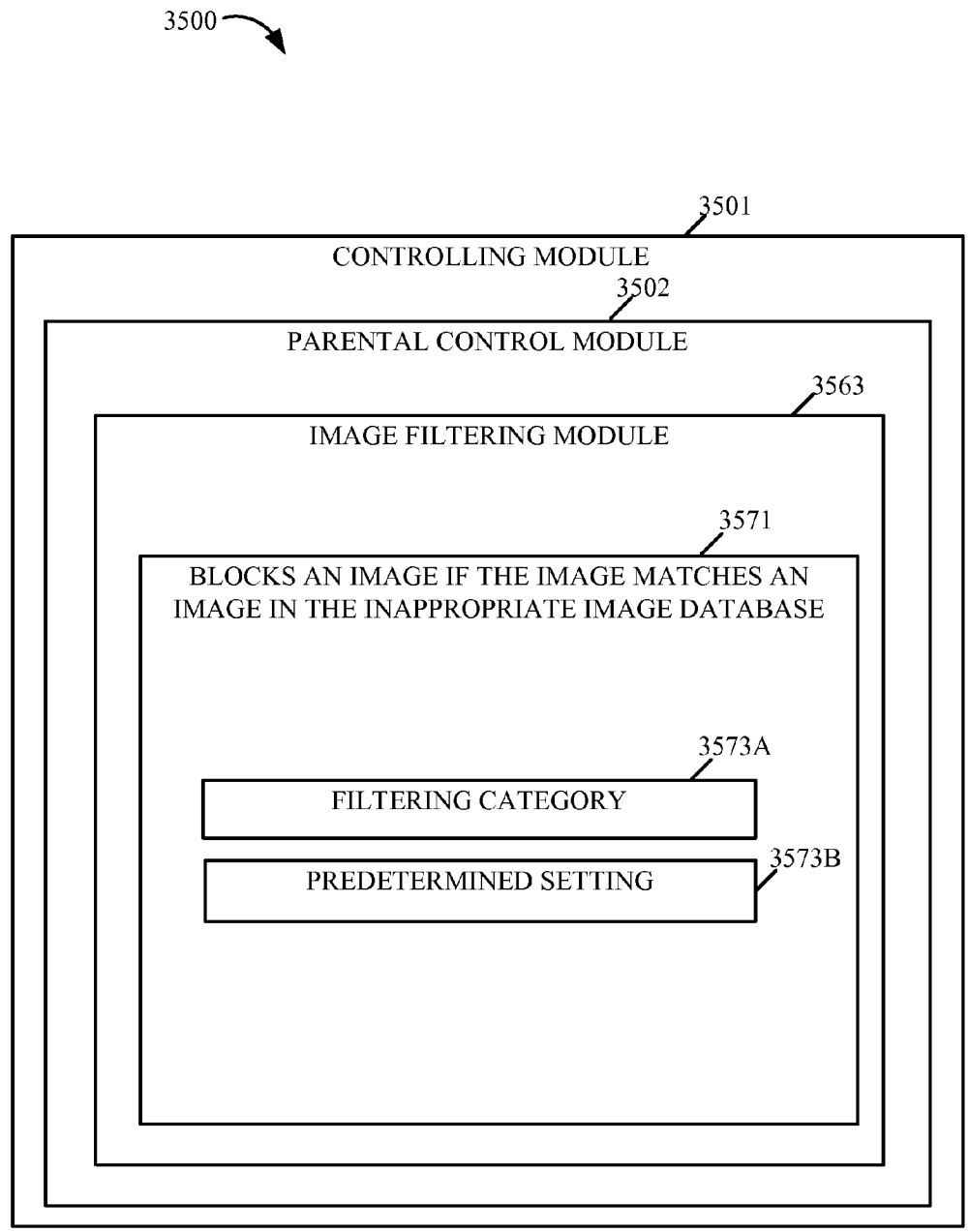
FIG. 35 is an exemplary embodiment of the present invention.
Figure 36:
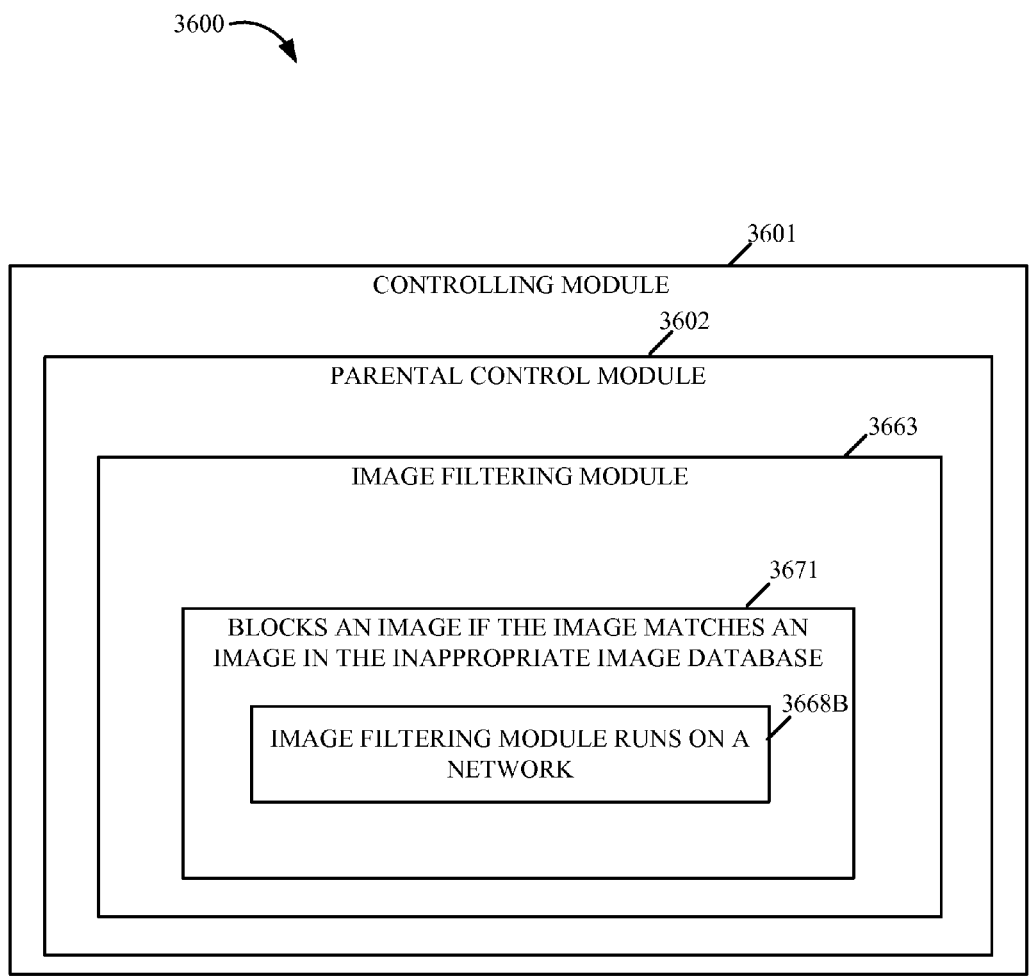
FIG. 36 is an exemplary embodiment of the present invention.
Figure 37:
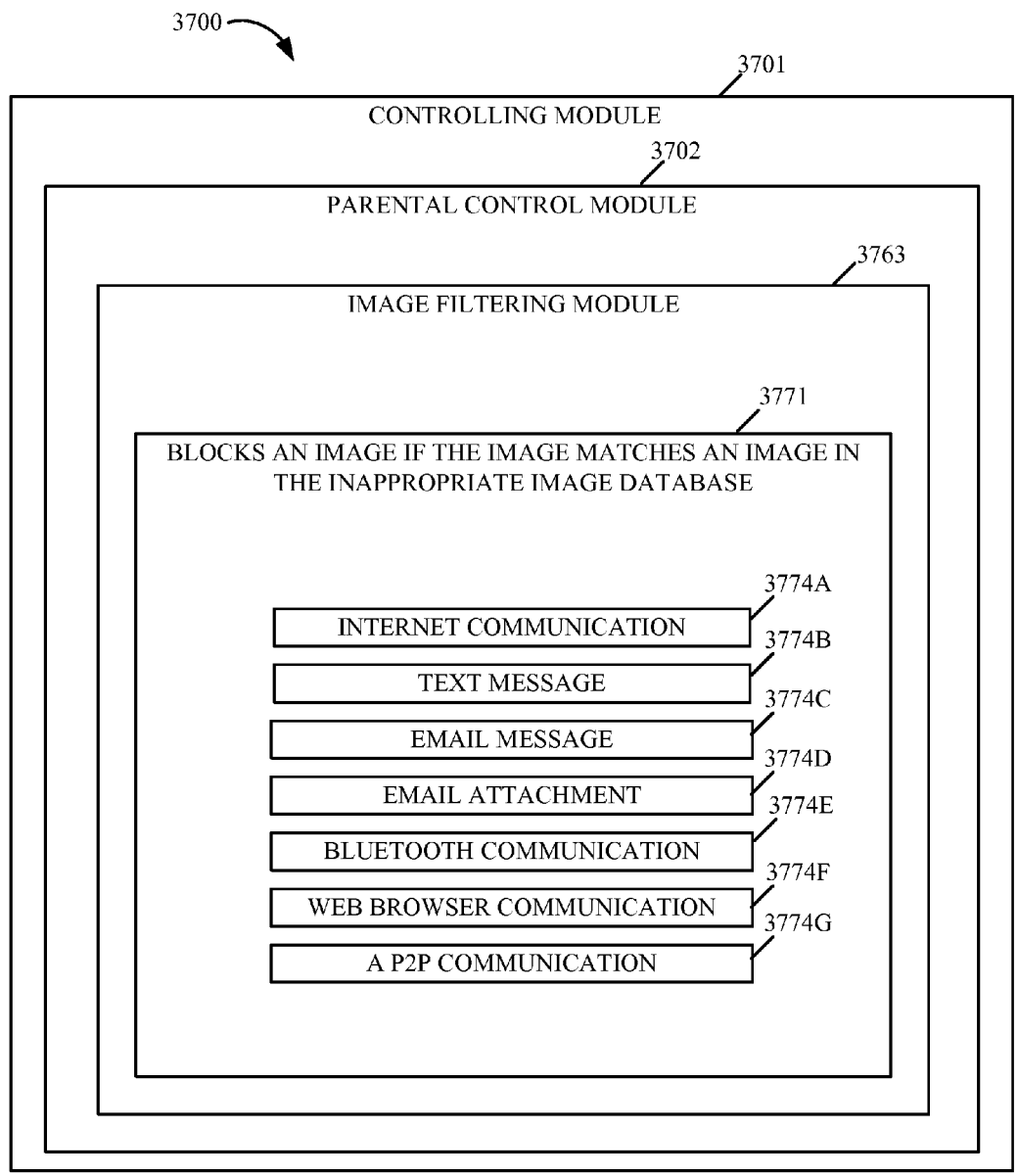
FIG. 37 is an exemplary embodiment of the present invention.
Figure 38:
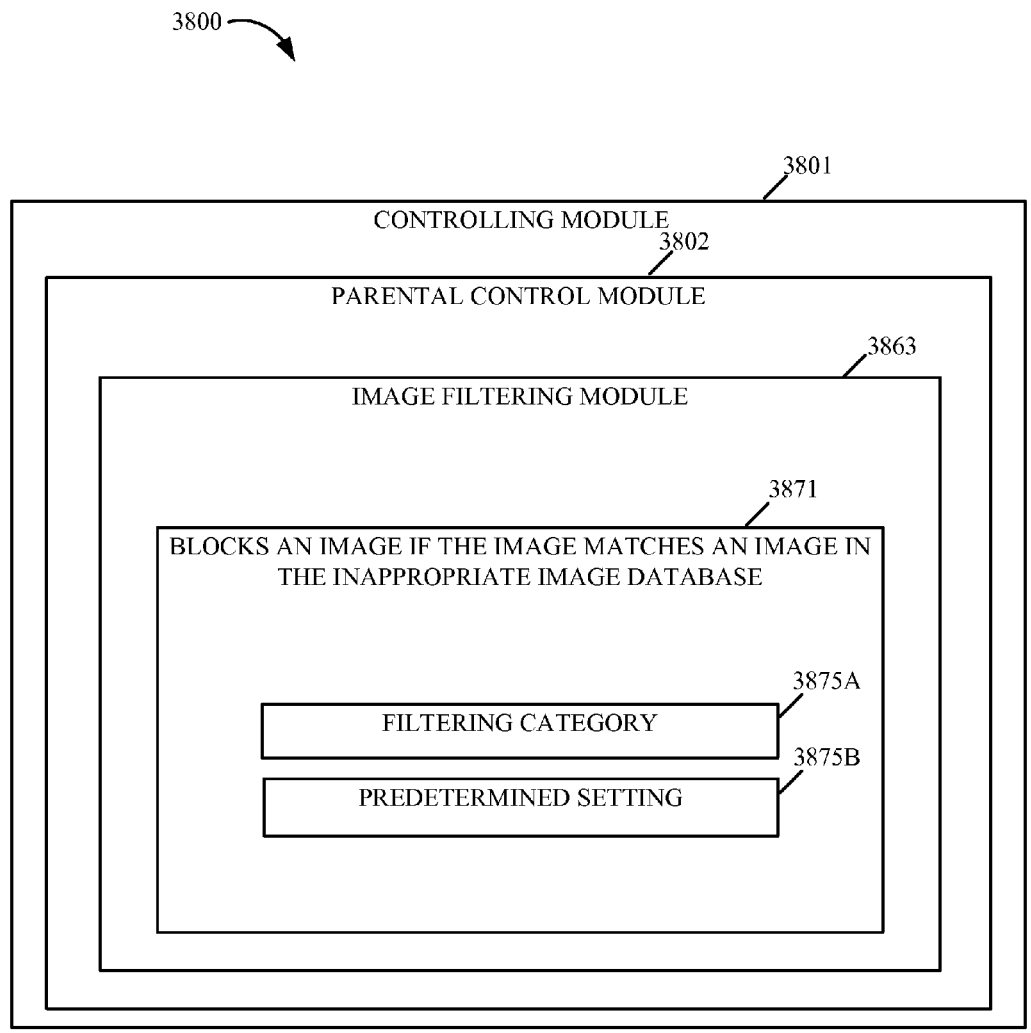
FIG. 38 is an exemplary embodiment of the present invention.
Figure 39:
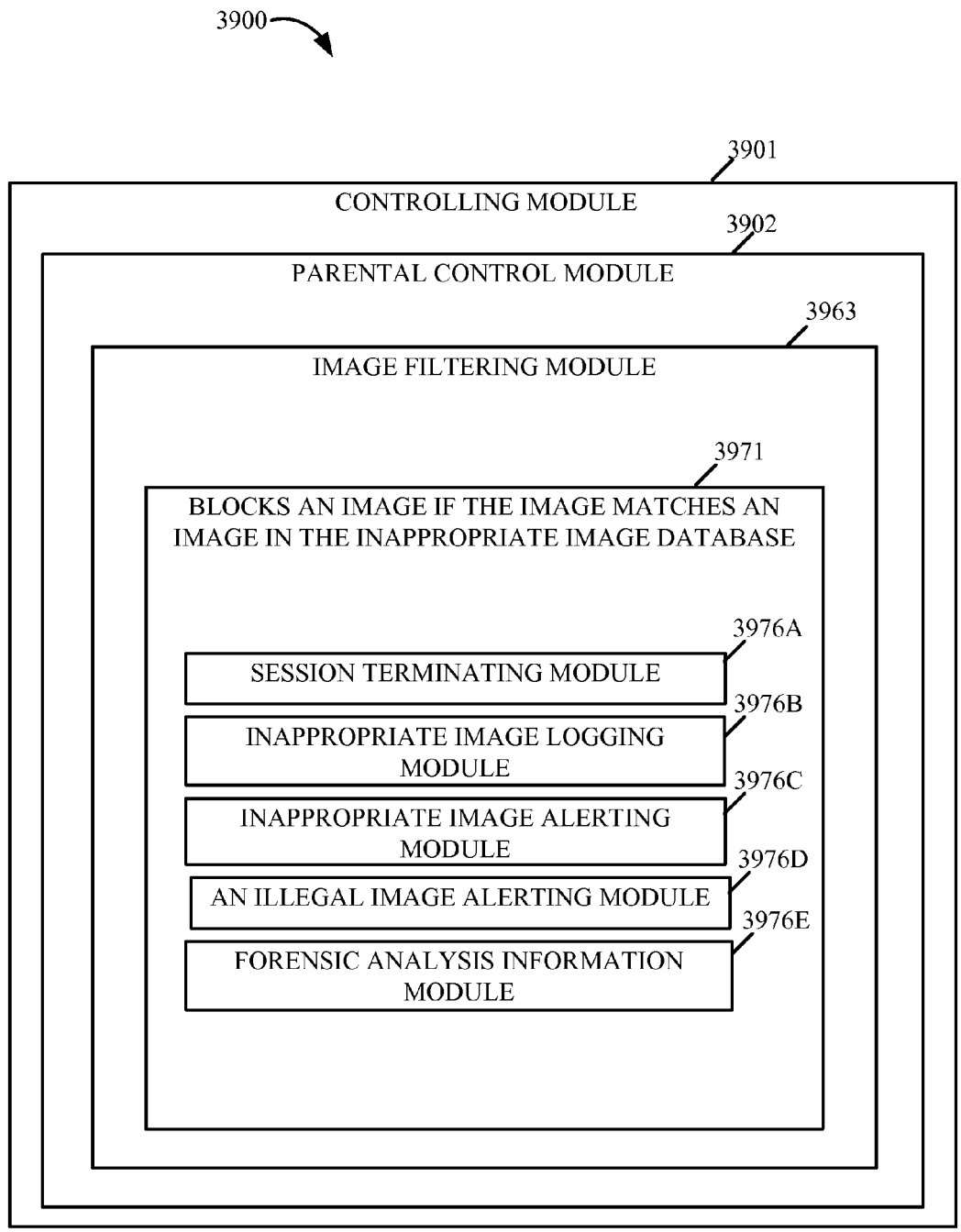
FIG. 39 is an exemplary embodiment of the present invention.

As further exemplified in FIGS. 3, 25, and 26, an exemplary system 300, 2500, and 2600 may include a controlling module 2601 for controlling a mobile device remotely, wherein the controlling module 2601 may include a parental control module 2602 for controlling a mobile device used by a child, and wherein the parental control module 2602 may include a monitoring module 304 for monitoring a use of the mobile device and a filtering module 303 for filtering an inappropriate content, and may further include an image filtering module 2663 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E.

As further exemplified in FIGS. 3, 25, 26, and 27, an exemplary system 300, 2500, 2600, and 2700 may include a controlling module 2701 for controlling a mobile device remotely, wherein the controlling module 2701 may include a parental control module 2702 for controlling a mobile device used by a child, and wherein the parental control module 2702 may include a monitoring module 304 for monitoring a use of the mobile device and a filtering module 303 for filtering an inappropriate content, and may further include an image filtering module 2763 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, and wherein the image filtering module 2763 blocks an image at 2764 if the image matches an image in the inappropriate image database.

As further exemplified in FIGS. 3, 25, 26, and 28, an exemplary system 300, 2500, 2600, and 2800 may include a controlling module 2801 for controlling a mobile device remotely, wherein the controlling module 2801 may include a parental control module 2802 for controlling a mobile device used by a child, and wherein the parental control module 2802 may include a monitoring module 304 for monitoring a use of the mobile device and a filtering module 303 for filtering an inappropriate content, and may further include an image filtering module 2863 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2863 further includes an image blocking module 2865 for blocking an image that matches an image in the inappropriate image database.

As further exemplified in FIGS. 3, 25, 26, 28, and 29, an exemplary system 300, 2500, 2600, 2800, and 2900 may include a controlling module 2901 for controlling a mobile device remotely, wherein the controlling module 2901 may include a parental control module 2902 for controlling a mobile device used by a child, and wherein the parental control module 2902 may include a monitoring module 304 for monitoring a use of the mobile device and a filtering module 303 for filtering an inappropriate content, and may further include an image filtering module 2963 for filtering an image on the mobile device, wherein the image filtering module communicates with an inappropriate image database 2963A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2863 may further include an image blocking module 2865 for blocking an image that matches an image in the inappropriate image database, and wherein the inappropriate image database 2963A may include at least one of a third party database 2966A, a local cache of names 2966E, or a local cache of hashes 2966C.

As further exemplified in FIGS. 3, 25, 26, 28, 29, and 30 an exemplary system 300, 2500, 2600, 2800, 2900, and 3000 may include a controlling module 3001 for controlling a mobile device remotely, wherein the controlling module 3001 may include a parental control module 3002 for controlling a mobile device used by a child, and wherein the parental control module 3002 may include a monitoring module 304 for monitoring a use of the mobile device and a filtering module 303 for filtering an inappropriate content, and may further include an image filtering module 3063 for filtering an image on the mobile device, wherein the image filtering module communicates with an inappropriate image database 3063A, wherein the inappropriate image database may include at least one inappropriate image, wherein the inappropriate image may include at least one of an illegal child image 3063B, a highly illicit image 3063C, a pornographic image 3063D, or a predetermined inappropriate image 3063E, wherein the image filtering module 3063 may further include an image blocking module 2865 for blocking an image that matches an image in the inappropriate image database, wherein the inappropriate image database 3063A may include at least one of a third party database 2966A, a local cache of names 2966E, or a local cache of hashes 2966C, and wherein an image in the inappropriate image database may be associated with at least one of an age-appropriateness rating, a maturity rating system, or a letter based system, wherein the letter based system includes a rating from at least one of G, PG, PG-13, R, NC-17, or X.

As further exemplified in FIGS. 3, 25, 26, 28, and 31, an exemplary system 300, 2500, 2600, 2800, and 3100 may include a controlling module 3101 for controlling a mobile device remotely, wherein the controlling module 3101 may include a parental control module 3102 for controlling a mobile device used by a child, and wherein the parental control module 3102 may include a monitoring module 304 for monitoring a use of the mobile device and a filtering module 303 for filtering an inappropriate content, and may further include an image filtering module 3163 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2863 or 3163 further includes an image blocking module 2865 for blocking an image that matches an image in the inappropriate image database, wherein the image filtering module 3163 runs on at least one of a mobile device 3168A or a network 3168B.

As further exemplified in FIGS. 3, 25, 26, 28, 31, and 32 an exemplary system 300, 2500, 2600, 2800, 3100, and 3200 may include a controlling module 3201 for controlling a mobile device remotely, wherein the controlling module 3201 may include a parental control module 3202 for controlling a mobile device used by a child, and wherein the parental control module 3202 may include a monitoring module 304 for monitoring a use of the mobile device and a filtering module 303 for filtering an inappropriate content, and may further include an image filtering module 3163 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2863 or 3203 further includes an image blocking module 2865 for blocking an image that matches an image in the inappropriate image database, wherein the image filtering module 3203 runs on at least one of a mobile device or a network 3168B, wherein the image filtering module 3263 filters an image associated with at least one of an internet communication 3269A, a text message 3269B, an email message 3269C, or an email attachment 3269D.

As further exemplified in FIGS. 3, 25, 26, 27, and 33, an exemplary system 300, 2500, 2600, 2700 and 3300 may include a controlling module 3301 for controlling a mobile device remotely, wherein the controlling module 3301 may include a parental control module 3302 for controlling a mobile device used by a child, and wherein the parental control module 3302 may include a monitoring module 304 for monitoring a use of the mobile device and a filtering module 303 for filtering an inappropriate content, and may further include an image filtering module 3363 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 blocks an image at 2764 if the image matches an image in the inappropriate image database, and wherein the image filtering module 3363 runs on the mobile device.

As further exemplified in FIGS. 3, 25, 26, 27, 33, and 34, an exemplary system 300, 2500, 2600, 2700, 3300, and 3400 may include a controlling module 3401 for controlling a mobile device remotely, wherein the controlling module 3401 may include a parental control module 3402 for controlling a mobile device used by a child, and wherein the parental control module 3402 may include a monitoring module 304 for monitoring a use of the mobile device and a filtering module 303 for filtering an inappropriate content, and may further include an image filtering module 3463 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 blocks an image at 2764 if the image matches an image in the inappropriate image database, wherein the image filtering module 3463 runs on the mobile device, wherein the image filtering module 3463 filters an image associated with any combination of an internet communication 3472A, a text message 3472B, an email message 3472C, an email attachment 3472D, a Bluetooth communication 3472E, a web browser communication 3472F; or a P2P communication 3472G.

As further exemplified in FIGS. 3, 25, 26, 27, 33, and 35 an exemplary system 300, 2500, 2600, 2700, 3300, and 3500 may include a controlling module 3501 for controlling a mobile device remotely, wherein the controlling module 3501 may include a parental control module 3502 for controlling a mobile device used by a child, and wherein the parental control module 3502 may include a monitoring module 304 for monitoring a use of the mobile device and a filtering module 303 for filtering an inappropriate content, and may further include an image filtering module 3563 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 blocks an image at 2764 or 3571 if the image matches an image in the inappropriate image database, wherein the image filtering module 3563 runs on the mobile device, and wherein the image filtering module 3563 blocks an image based on at least one of a filtering category 3573A or a predetermined setting 3573B.

As further exemplified in FIGS. 3, 25, 26, 27, and 36 an exemplary system 300, 2500, 2600, 2700, and 3600 may include a controlling module 3601 for controlling a mobile device remotely, wherein the controlling module 3601 may include a parental control module 3602 for controlling a mobile device used by a child, and wherein the parental control module 3602 may include a monitoring module 304 for monitoring a use of the mobile device and a filtering module 303 for filtering an inappropriate content, and may further include an image filtering module 2763 or 3663 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 or 3663 blocks an image if the image matches an image in the inappropriate image database, and wherein the image filtering module runs on a network at 3668B.

As further exemplified in FIGS. 3, 25, 26, 27, 36, and 37, an exemplary system 300, 2500, 2600, 2700, 3600, 3700 may include a controlling module 3701 for controlling a mobile device remotely, wherein the controlling module 3701 may include a parental control module 3702 for controlling a mobile device used by a child, and wherein the parental control module 3702 may include a monitoring module 304 for monitoring a use of the mobile device and a filtering module 303 for filtering an inappropriate content, and may further include an image filtering module 2763 or 3763 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 or 3763 blocks an image if the image matches an image in the inappropriate image database, wherein the image filtering module runs on a network at 3668B, wherein the image filtering module 3763 filters an image associated with any combination of an internet communication 3774A, a text message 3774B, an email message 3774C, an email attachment 3774C, a Bluetooth communication 3774D, a web browser communication 3774E, a P2P communication 3774E, or another type of information.

As further exemplified in FIGS. 3, 25, 26, 27, 36, and 38 an exemplary system 300, 2500, 2600, 2700, 3600, and 3800 may include a controlling module 3801 for controlling a mobile device remotely, wherein the controlling module 3801 may include a parental control module 3802 for controlling a mobile device used by a child, and wherein the parental control module 3802 may include a monitoring module 304 for monitoring a use of the mobile device and a filtering module 303 for filtering an inappropriate content, and may further include an image filtering module 2763 or 3863 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 or 3863 blocks an image if the image matches an image in the inappropriate image database, wherein the image filtering module runs on a network at 3668B, and wherein the image filtering module 3863 blocks an image based on at least one of a filtering category 3875A or a predetermined setting 3875B.

As further exemplified in FIGS. 3, 25, 26, 27, 36, 38, 39, an exemplary system 300, 2500, 2600, 2700, 3600, 3800, and 3900 may include a controlling module 3901 for controlling a mobile device remotely, wherein the controlling module 3901 may include a parental control module 3902 for controlling a mobile device used by a child, and wherein the parental control module 3902 may include a monitoring module 304 for monitoring a use of the mobile device and a filtering module 303 for filtering an inappropriate content, and may further include an image filtering module 2763 or 3963 for filtering an image on the mobile device, wherein the image filtering module communicates with an inappropriate image database 2663A, wherein the inappropriate image database may include at least one inappropriate image, wherein the inappropriate image may include at least one of an illegal child image 2663B, a highly illicit image 2663C, a pornographic image 2663D, or a predetermined inappropriate image 2663E, wherein the image filtering module 2763 or 3963 blocks an image if the image matches an image in the inappropriate image database, wherein the image filtering module runs on a network at 3668B, wherein the image filtering module 3863 or 3963 blocks an image based on at least one of a filtering category 3875A or a predetermined setting 3875B, and wherein the image filtering module 3963 further may include any combination of the following: a session terminating module 3976A for terminating a session containing an image filtered by the image filtering module; an inappropriate image logging module 3976B for logging an occurrence of an image being filtered by the image filtering module; an inappropriate image alerting module 3976C for alerting an occurrence of an image being filtered by the image filtering module; an illegal image alerting module 3976D for alerting an occurrence of an image being filtered by the image filtering module which is illegal; and a forensic analysis information module 3976E for providing information relating to an image filtered by the image filtering module, wherein the information may include at least one of an identity of a camera associated with the image; a software associated with the image; a serial number of a camera associated with the image; a serial number of a software associated with the image; an owner name of a camera associated with the image; a creation date of the image; a modification date of the image; a save date of the image; or an attribute of the image.

Figure 40:
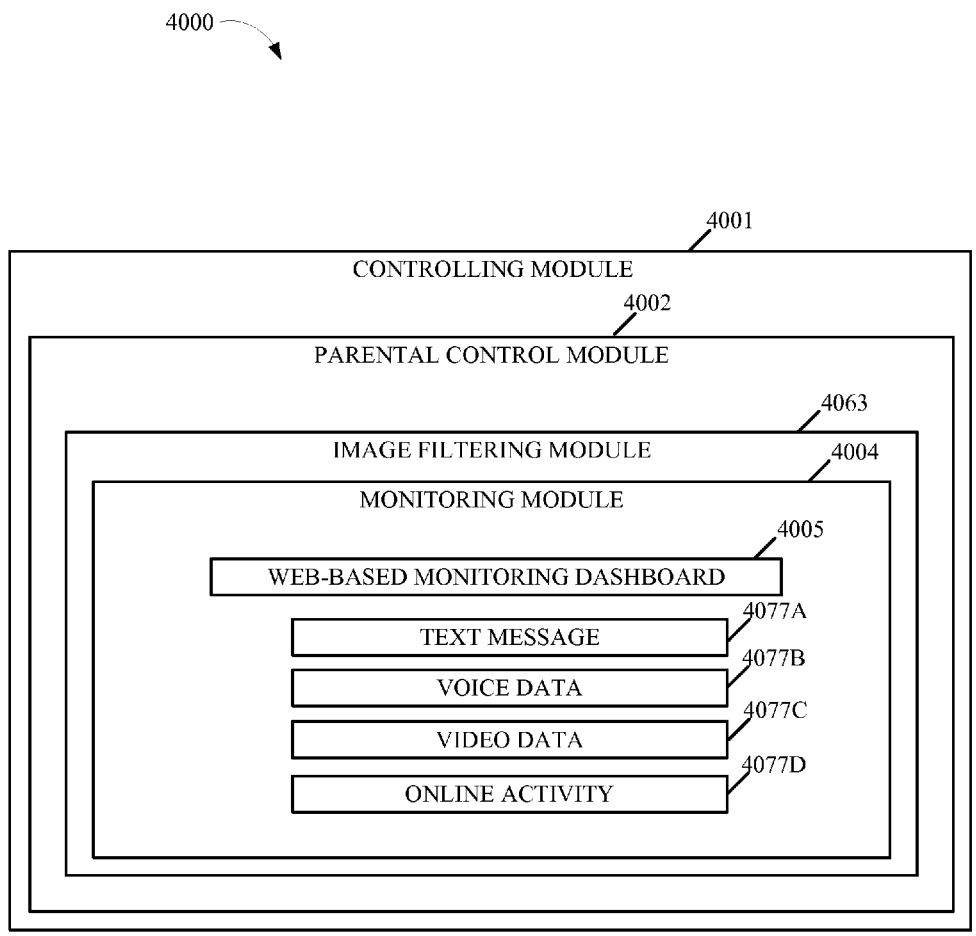
FIG. 40 is an exemplary embodiment of the present invention.
Figure 41:
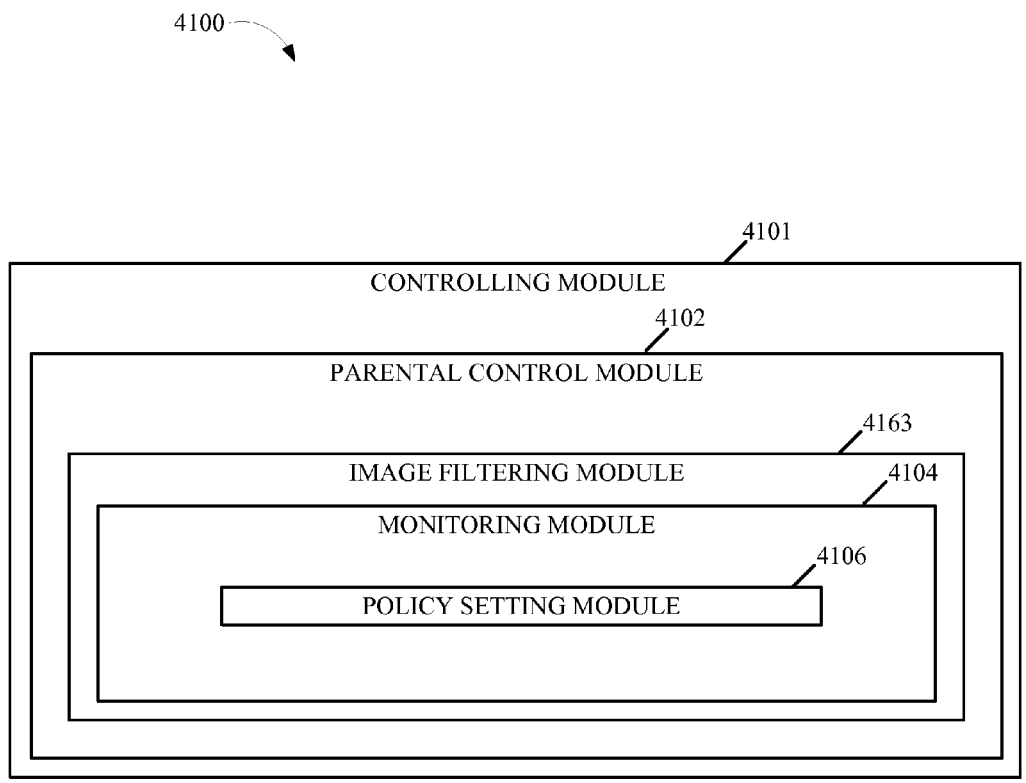
FIG. 41 is an exemplary embodiment of the present invention.
Figure 42:
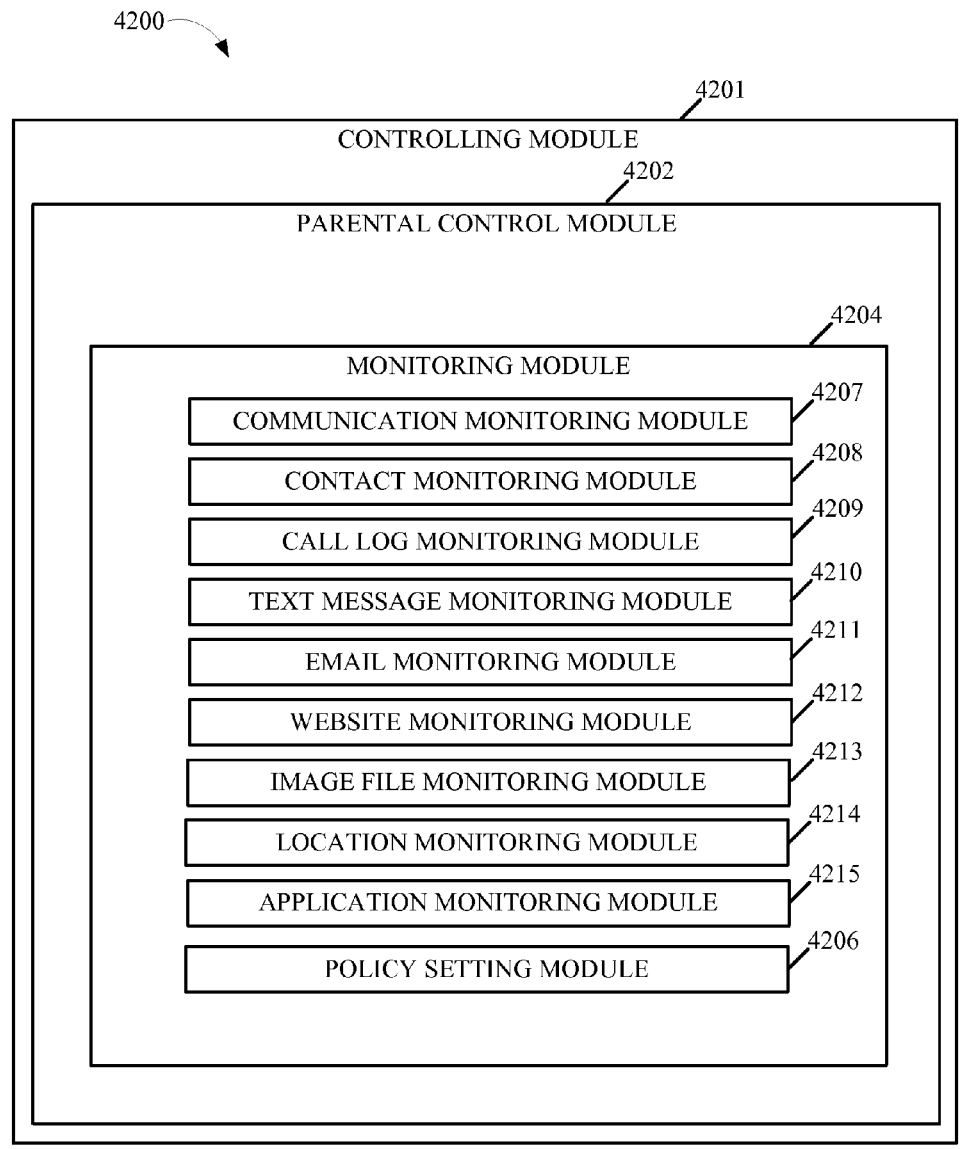
FIG. 42 is an exemplary embodiment of the present invention.
Figure 43:
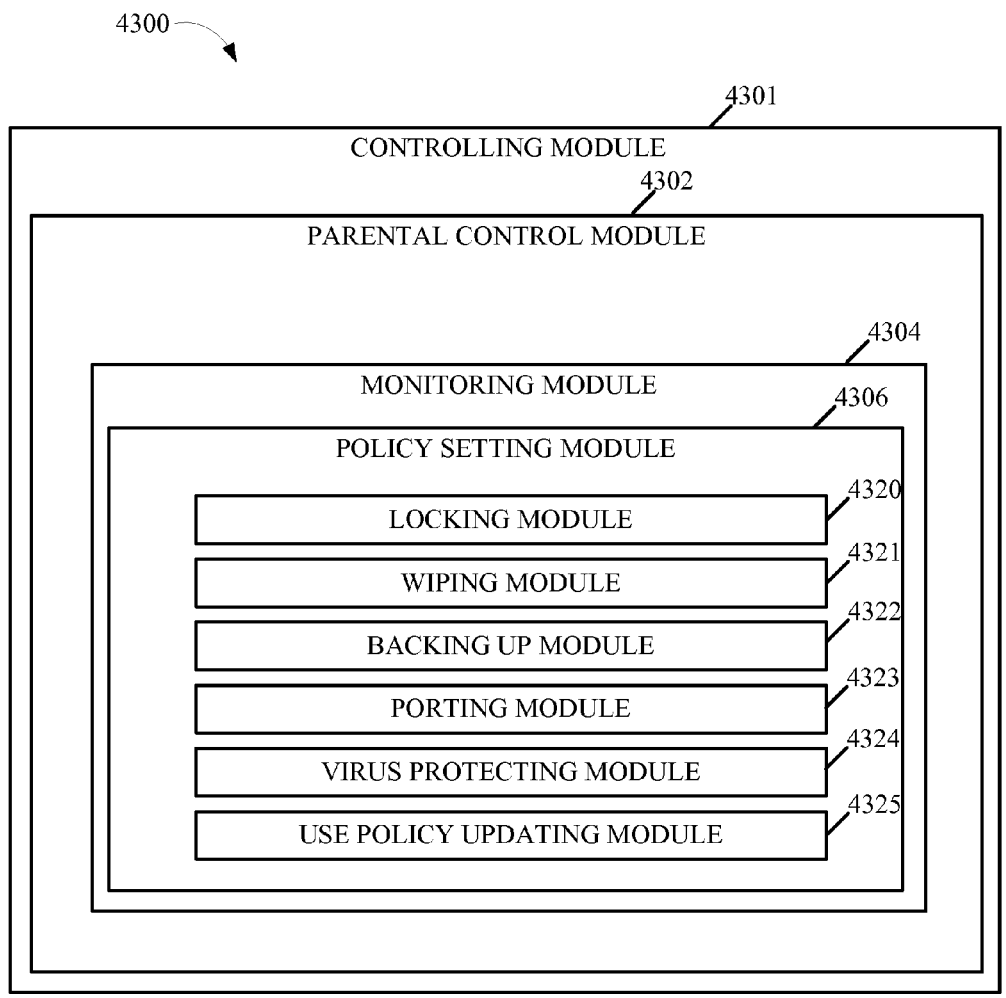
FIG. 43 is an exemplary embodiment of the present invention.

As further exemplified in FIGS. 3, 25, and 40, an exemplary system 300, 2500, and 4000 may include a controlling module 4001 for controlling a mobile device remotely, wherein the controlling module 4001 may include a parental control module 4002 for controlling a mobile device used by a child, and wherein the parental control module 302 or 4002 may include a monitoring module 304 for monitoring a use of the mobile device and a filtering module 303 for filtering an inappropriate content, and may further include an image filtering module 2563 or 4063 for filtering an image on the mobile device, wherein the monitoring module 4004 may include a web-based monitoring dashboard 4005 for monitoring at least one of a text message 4077A, voice data 4077B, video data 4077C, and online activity 4077D of the mobile device.

As further exemplified in FIGS. 3, 25, 40, and 41, an exemplary system 300, 2500, 4000, and 4100 may include a controlling module 4101 for controlling a mobile device remotely, wherein the controlling module 4101 may include a parental control module 4102 for controlling a mobile device used by a child, and wherein the parental control module 302 or 4102 may include a monitoring module 304 for monitoring a use of the mobile device and a filtering module 303 for filtering an inappropriate content, and may further include an image filtering module 2563 or 4163 for filtering an image on the mobile device, wherein the monitoring module may include a web-based monitoring dashboard 4005 for monitoring at least one of a text message 4077A, voice data 4077B, video data 4077C, and online activity 4077D of the mobile device, and wherein the monitoring module 4104 may further include a policy setting module 4106 for determining a use policy for what use is permitted on the mobile device.

As further exemplified in FIGS. 3, 25, 40, 41, and 42, an exemplary system 300, 2500, 4000, 4100, and 4200 may include a controlling module 4201 for controlling a mobile device remotely, wherein the controlling module 4201 may include a parental control module 4202 for controlling a mobile device used by a child, and wherein the parental control module 302 or 4202 may include a monitoring module 304 for monitoring a use of the mobile device and a filtering module 303 for filtering an inappropriate content, and may further include an image filtering module 2563 or 4263 for filtering an image on the mobile device, wherein the monitoring module may include a web-based monitoring dashboard 4005 for monitoring at least one of a text message 4077A, voice data 4077B, video data 4077C, and online activity 4077D of the mobile device, wherein the monitoring module 4104 or 4204 may further include a policy setting module 4106 or 4206 for determining a use policy for what use is permitted on the mobile device, and wherein the monitoring module 4204 may further include any combination of the following: a communication monitoring module 4207 for viewing a communication with the mobile device; a contact monitoring module 4208 for viewing information relating to a party communicating with the mobile device; a call log monitoring module 4209 for viewing a log of a call on the mobile device; a text message monitoring module 4210 for viewing at least one of a text message and a text message attachment transferred to and from the mobile device; an email monitoring module 4211 for viewing an email transferred to and from the mobile device; a website monitoring module 4212 for viewing a website visited on the mobile device; an image file monitoring module 4213 for viewing an image transferred to and from the mobile device; a location monitoring module 4214 for viewing a location of the mobile device; and an application monitoring module 4215 for viewing an application on the mobile device.

As further exemplified in FIGS. 3, 25, 40, 41, and 43, an exemplary system 300, 2500, 4000, 4100, and 4300 may include a controlling module 4301 for controlling a mobile device remotely, wherein the controlling module 4301 may include a parental control module 4302 for controlling a mobile device used by a child, and wherein the parental control module 302 or 4302 may include a monitoring module 304 for monitoring a use of the mobile device and a filtering module 303 for filtering an inappropriate content, and may further include an image filtering module 2563 for filtering an image on the mobile device, wherein the monitoring module may include a web-based monitoring dashboard 4005 for monitoring at least one of a text message 4077A, voice data 4077B, video data 4077C, and online activity 4077D of the mobile device, wherein the monitoring module 4304 may further include a policy setting module 4306 for determining a use policy for what use is permitted on the mobile device, and wherein the policy setting module 4306 may further include any combination of the following: a locking module 4320 for initiating a locking of the mobile device; a wiping module 4321 for initiating a wiping of at least one file on the mobile device; a backing up module 4322 for backing up data of the mobile device; a porting module 4323 for porting a file in the mobile device to another mobile device; a virus protecting module 4324 for initiating an update of a virus protection on the mobile device; and a use policy updating module 4325 for at least one of amending, adding or deleting an existing use policy.

Figure 44:
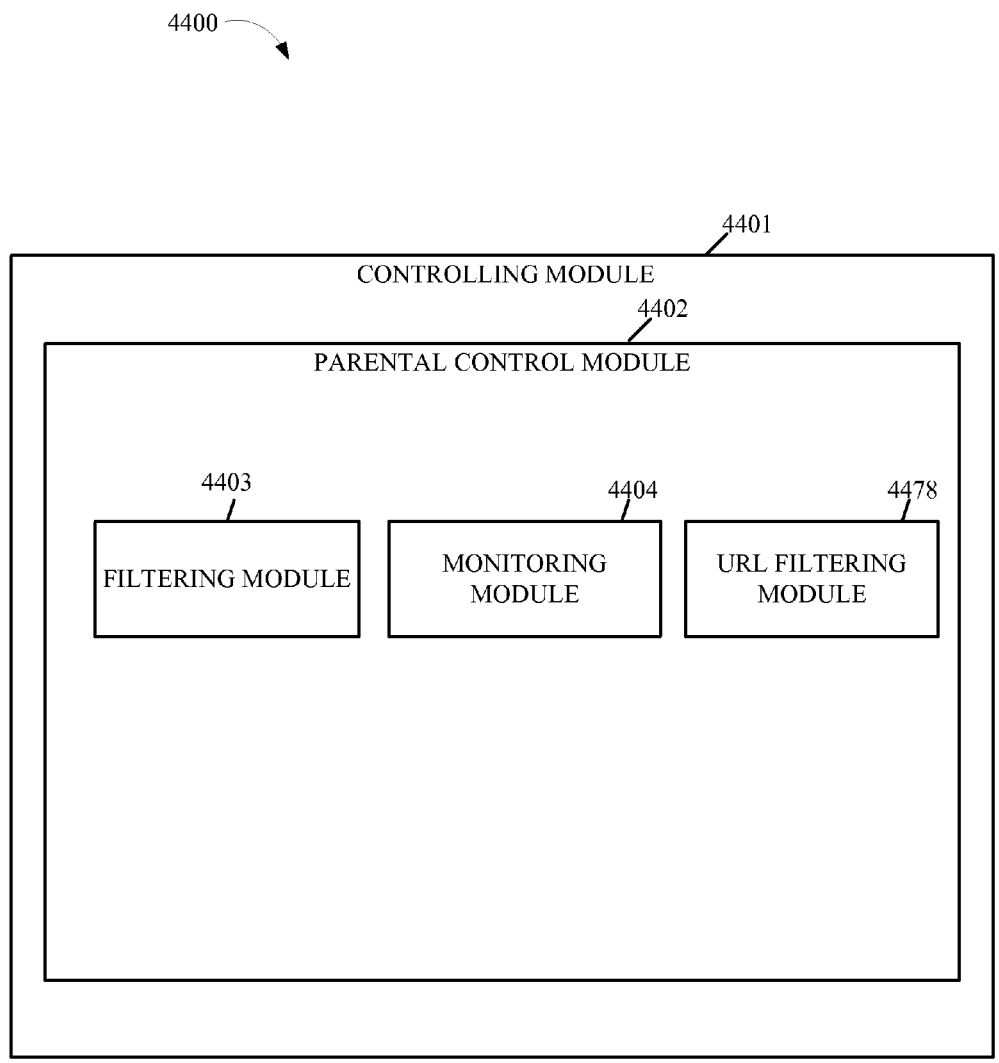
FIG. 44 is an exemplary embodiment of the present invention.

As further exemplified in FIG. 44, an exemplary system 4400 may include a controlling module 4401 for controlling a mobile device remotely, wherein the controlling module 4401 may include a parental control module 4402 for controlling a mobile device used by a child, and wherein the parental control module 4402 may include a monitoring module 4404 for monitoring a use of the mobile device, a filtering module 4403 for filtering an inappropriate content, and a Uniform Resource Locator filtering module 4478 for preventing access to information associated with a Uniform Resource Locator.

Figure 45:
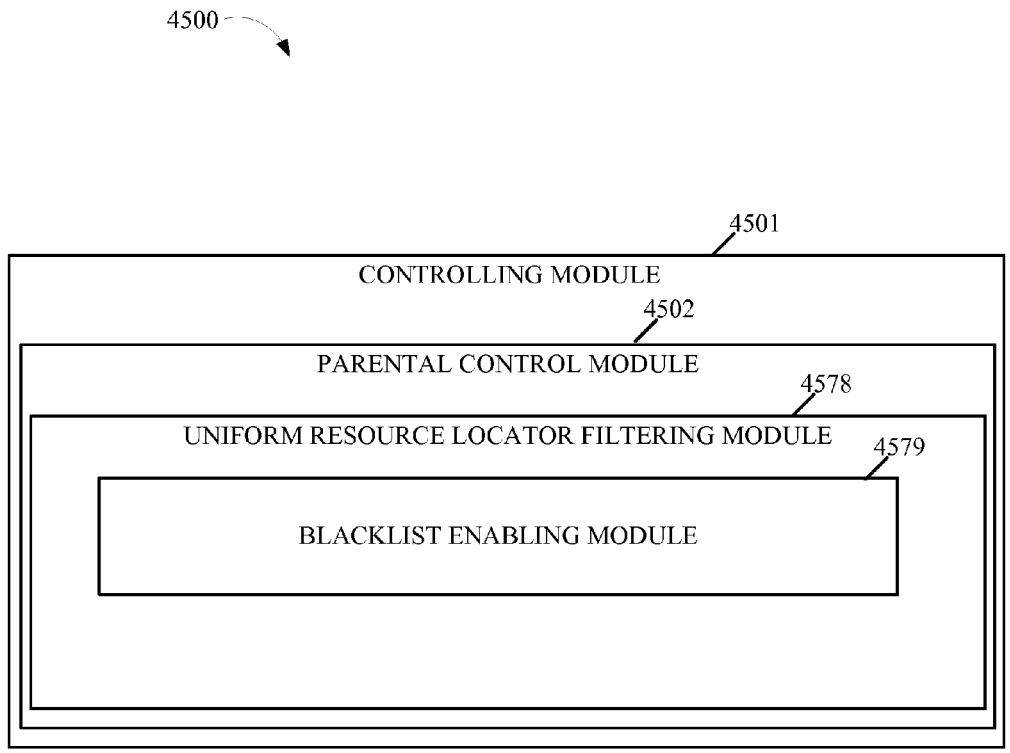
FIG. 45 is an exemplary embodiment of the present invention.

As further exemplified in FIGS. 44 and 45, an exemplary system 4400 or 4500 may include a controlling module 4501 for controlling a mobile device remotely, wherein the controlling module 4401 or 4501 may include a parental control module 4402 or 4502 for controlling a mobile device used by a child, and wherein the parental control module 4402 or 4502 may include a monitoring module 4404 for monitoring a use of the mobile device, a filtering module 4403 for filtering an inappropriate content, and a Uniform Resource Locator filtering module 4478 or 4578 for preventing access to information associated with a Uniform Resource Locator, wherein the Uniform Resource Locator filtering module 4578 may include a blacklist enabling module 4579 for controlling a blacklist of information associated with a list of blacklisted Uniform Resource Locators.

Figure 46:
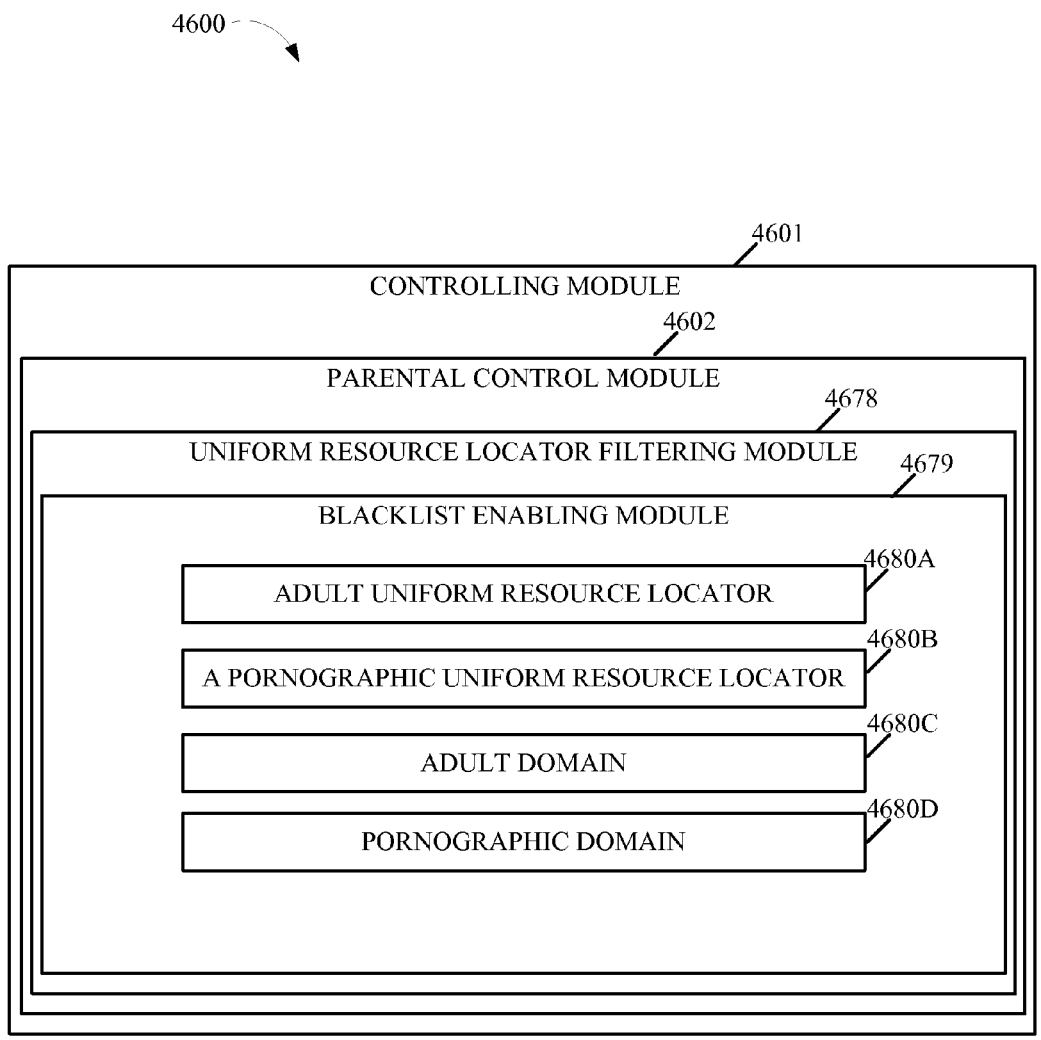
FIG. 46 is an exemplary embodiment of the present invention.

As further exemplified in FIGS. 44, 45, and 46, an exemplary system 4400, 4500, and 4600 may include a controlling module 4601 for controlling a mobile device remotely, wherein the controlling module 4401 or 4601 may include a parental control module 4402 or 4602 for controlling a mobile device used by a child, and wherein the parental control module 4402 or 4602 may include a monitoring module 4404 for monitoring a use of the mobile device, a filtering module 4403 for filtering an inappropriate content, and a Uniform Resource Locator filtering module 4478 or 4678 for preventing access to information associated with a Uniform Resource Locator, wherein the Uniform Resource Locator filtering module 4678 may include a blacklist enabling module 4679 for controlling a blacklist of information associated with a list of blacklisted Uniform Resource Locators, and wherein the blacklist enabling module 4679 prevents the mobile device from accessing at least one of an adult Uniform Resource Locator 4680A, a pornographic Uniform Resource Locator 4680B, an adult domain 4680C, or a pornographic domain 4680D. Other types of information may also be prevented from being accessed, including but not limited to a Uniform Resource Locator for a website containing a link to an illegal image, a Uniform Resource Locator for a website containing a link to a pornographic image, or a Uniform Resource Locator for a website containing content associated with a rating higher than allowed for a user.

Figure 47:
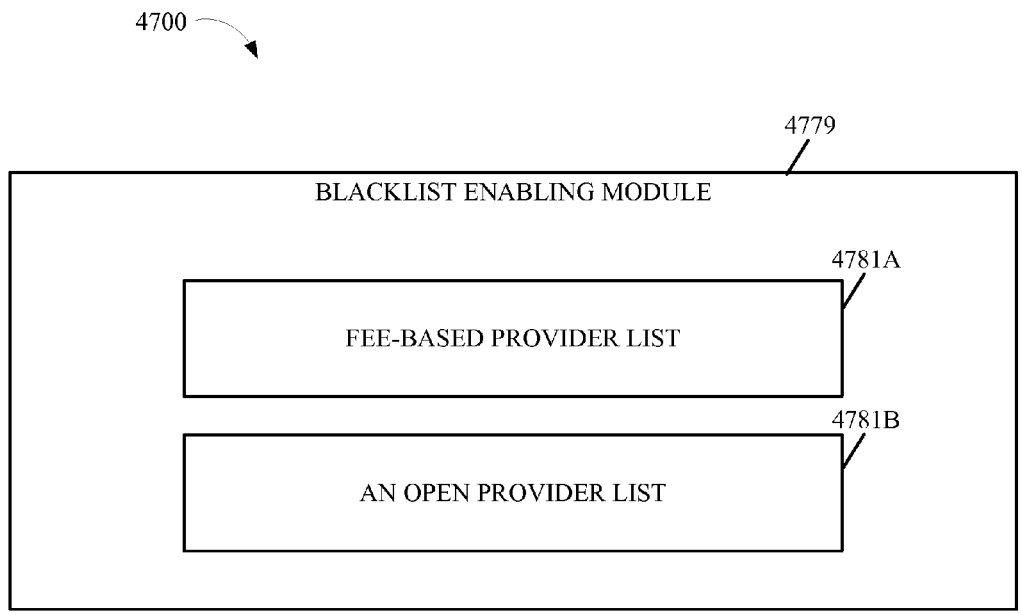
FIG. 47 is an exemplary embodiment of the present invention.
Figure 48:
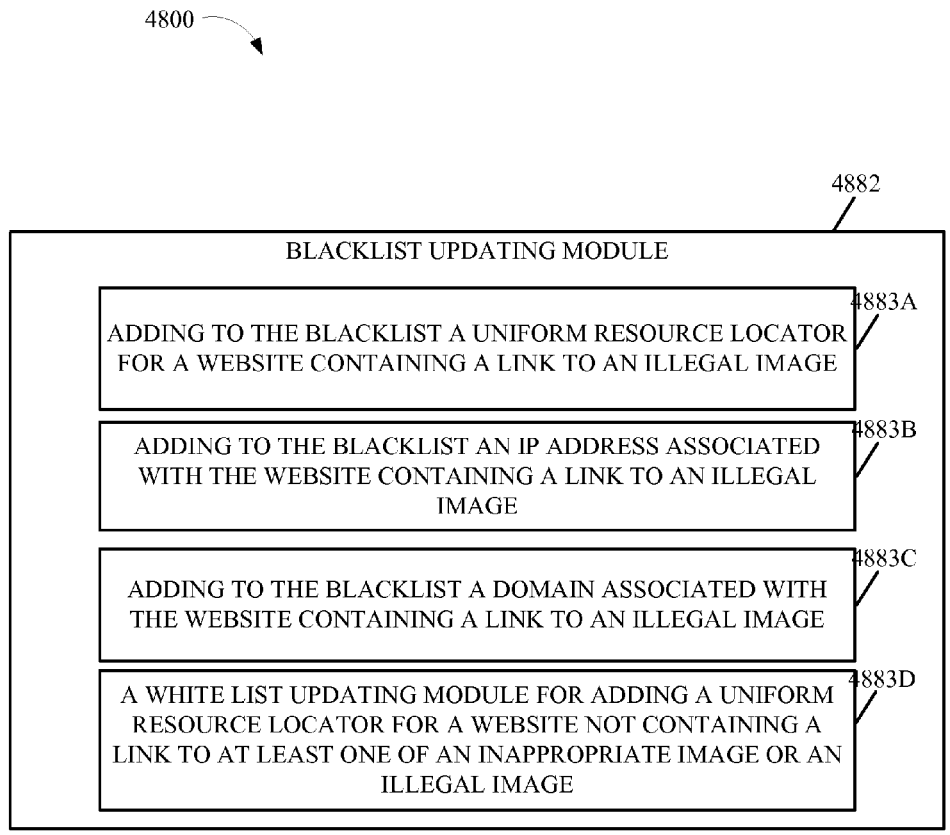
FIG. 48 is an exemplary embodiment of the present invention.
Figure 49:
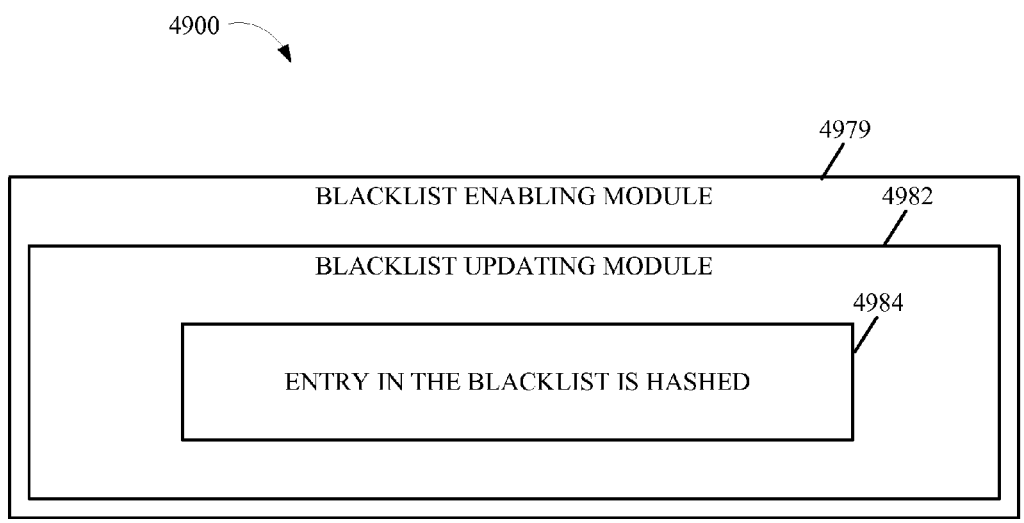
FIG. 49 is an exemplary embodiment of the present invention.

As further exemplified in FIGS. 44, 45, and 47, an exemplary system 4400, 4500, or 4700 may include a controlling module 4501 for controlling a mobile device remotely, wherein the controlling module 4401 or 4501 may include a parental control module 4402 or 4502 for controlling a mobile device used by a child, and wherein the parental control module 4402 or 4502 may include a monitoring module 4404 for monitoring a use of the mobile device, a filtering module 4403 for filtering an inappropriate content, and a Uniform Resource Locator filtering module 4478 or 4578 for preventing access to information associated with a Uniform Resource Locator, wherein the Uniform Resource Locator filtering module 4578 may include a blacklist enabling module 4579 or 4779 for controlling a blacklist of information associated with a list of blacklisted Uniform Resource Locators, and wherein the blacklist of information includes at least one of a fee-based provider list 4781A or an open provider list 4781B.

As further exemplified in FIGS. 44, 45, 47, and 48, an exemplary system 4400, 4500, 4700, or 4800 may include a controlling module 4501 for controlling a mobile device remotely, wherein the controlling module 4401 or 4501 may include a parental control module 4402 or 4502 for controlling a mobile device used by a child, and wherein the parental control module 4402 or 4502 may include a monitoring module 4404 for monitoring a use of the mobile device, a filtering module 4403 for filtering an inappropriate content, and a Uniform Resource Locator filtering module 4478 or 4578 for preventing access to information associated with a Uniform Resource Locator, wherein the Uniform Resource Locator filtering module 4578 may include a blacklist enabling module 4579 or 4779 for controlling a blacklist of information associated with a list of blacklisted Uniform Resource Locators, wherein the blacklist of information includes at least one of a fee-based provider list 4781A or an open provider list 4781B, and may further include a blacklist updating module 4882 for performing at least one of adding to the blacklist a Uniform Resource Locator for a website containing a link to an illegal image at 4883A; adding to the blacklist an IP address associated with the website containing a link to an illegal image at 4883B; adding to the blacklist a domain associated with the website containing a link to an illegal image at 4883C; and a white list updating module for adding a Uniform Resource Locator for a website not containing a link to at least one of an inappropriate image or an illegal image at 4883D.

As further exemplified in FIGS. 44, 45, 47, 48, and 49, an exemplary system 4400, 4500, 4700, 4800, or 4900 may include a controlling module 4501 for controlling a mobile device remotely, wherein the controlling module 4401 or 4501 may include a parental control module 4402 or 4502 for controlling a mobile device used by a child, and wherein the parental control module 4402 or 4502 may include a monitoring module 4404 for monitoring a use of the mobile device, a filtering module 4403 for filtering an inappropriate content, and a Uniform Resource Locator filtering module 4478 or 4578 for preventing access to information associated with a Uniform Resource Locator, wherein the Uniform Resource Locator filtering module 4578 may include a blacklist enabling module 4579, 4779, or 4979 for controlling a blacklist of information associated with a list of blacklisted Uniform Resource Locators, wherein the blacklist of information includes at least one of a fee-based provider list 4781A or an open provider list 4781B, and may further include a blacklist updating module 4882 or 4982 for performing at least one of adding to the blacklist a Uniform Resource Locator for a website containing a link to an illegal image at 4883A; adding to the blacklist an IP address associated with the website containing a link to an illegal image at 4883B; adding to the blacklist a domain associated with the website containing a link to an illegal image at 4883C; and a white list updating module for adding a Uniform Resource Locator for a website not containing a link to at least one of an inappropriate image or an illegal image at 4883D, wherein an entry in the blacklist is hashed at 4984.

Figure 50:
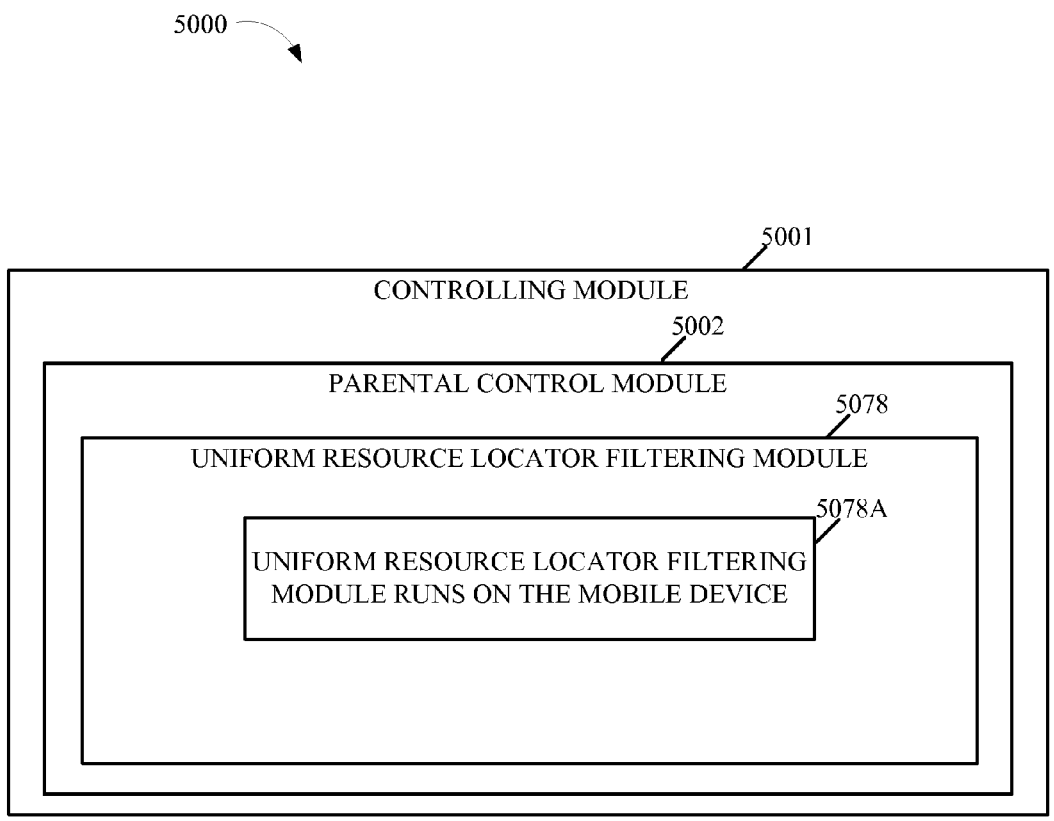
FIG. 50 is an exemplary embodiment of the present invention.

As further exemplified in FIGS. 44 and 50, an exemplary system 4400 or 5000 may include a controlling module 5001 for controlling a mobile device remotely, wherein the controlling module 5001 may include a parental control module 4402 or 5002 for controlling a mobile device used by a child, wherein the parental control module 4402 may include a monitoring module 4404 for monitoring a use of the mobile device, a filtering module 4403 for filtering an inappropriate content, and a Uniform Resource Locator filtering module 4478 or 5078 for preventing access to information associated with a Uniform Resource Locator, and wherein the Uniform Resource Locator filtering module 5078 runs on the mobile device at 5078A.

Figure 51:
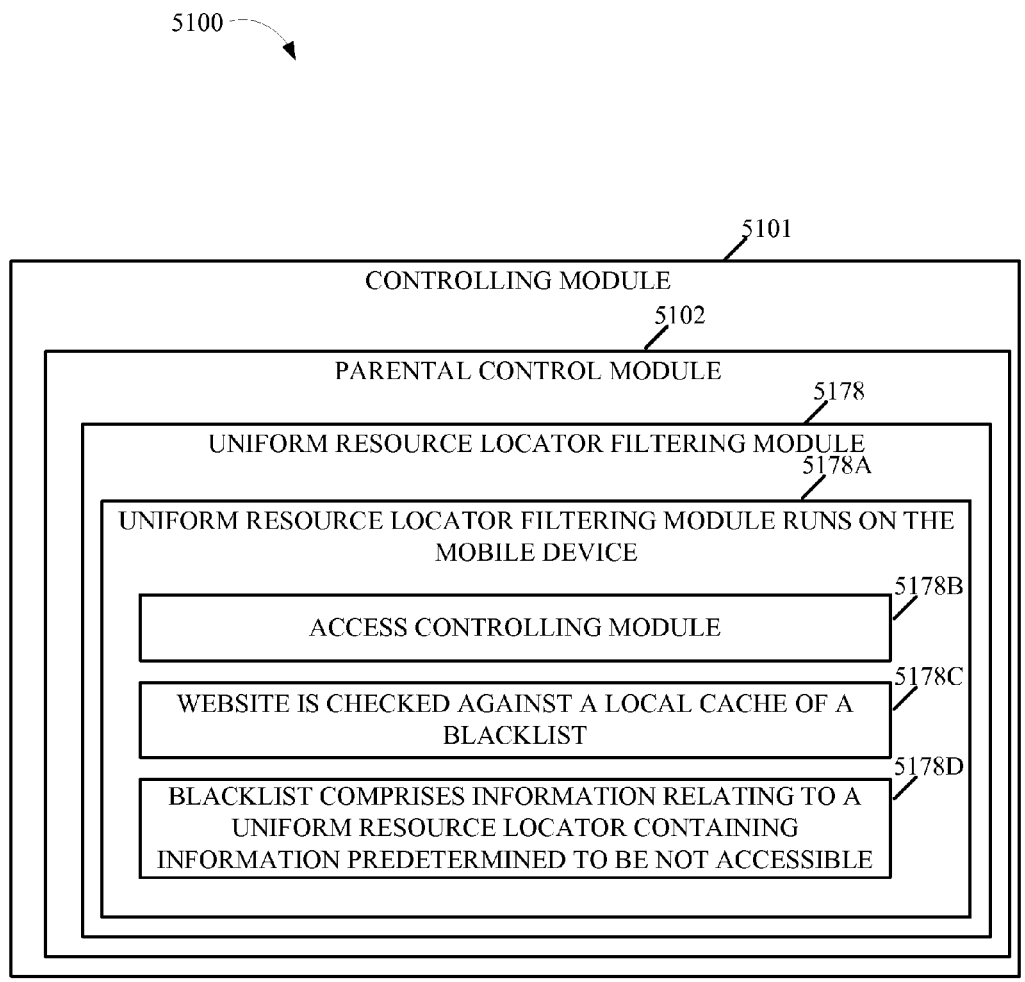
FIG. 51 is an exemplary embodiment of the present invention.

As further exemplified in FIGS. 44, 50, and 51 an exemplary system 4400, 5000, or 5100 may include a controlling module 5101 for controlling a mobile device remotely, wherein the controlling module 5101 may include a parental control module 4402 or 5102 for controlling a mobile device used by a child, wherein the parental control module 4402 may include a monitoring module 4404 for monitoring a use of the mobile device, a filtering module 4403 for filtering an inappropriate content, and a Uniform Resource Locator filtering module 4478 or 5178 for preventing access to information associated with a Uniform Resource Locator, wherein the Uniform Resource Locator filtering module 5078 or 5178 may run on the mobile device at 5078A, and wherein the Uniform Resource Locator filtering module 5178 may further include an access controlling module 5178B for controlling access by the mobile device to a website, wherein the website may be checked against a local cache of a blacklist, and wherein the blacklist may include information relating to a Uniform Resource Locator containing information predetermined to be not accessible.

Figure 52:
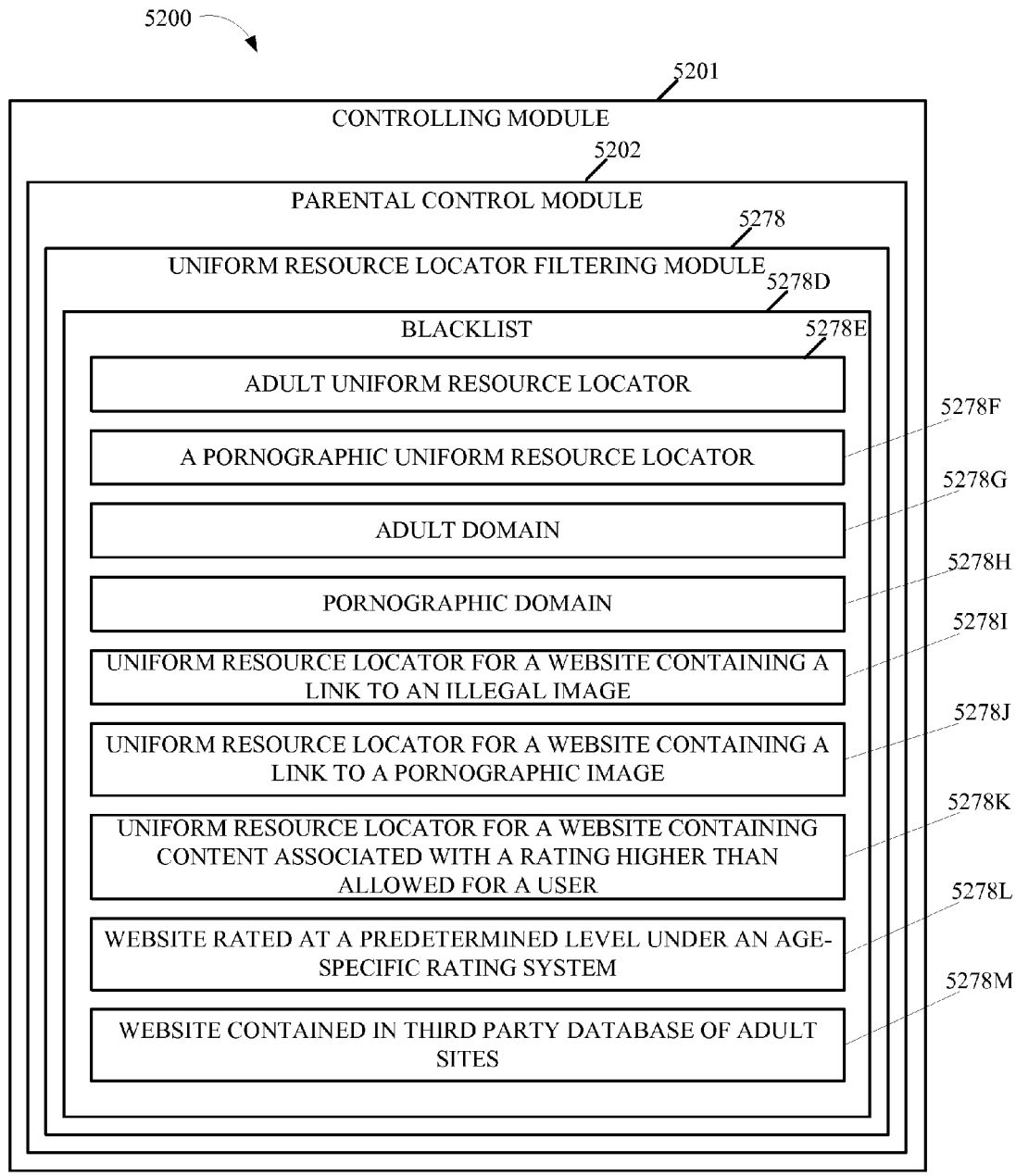
FIG. 52 is an exemplary embodiment of the present invention.

As further exemplified in FIGS. 44, 50, and 52, an exemplary system 4400, 5000, or 5200 may include a controlling module 5201 for controlling a mobile device remotely, wherein the controlling module 5201 may include a parental control module 4402 or 5202 for controlling a mobile device used by a child, wherein the parental control module 4402 may include a monitoring module 4404 for monitoring a use of the mobile device, a filtering module 4403 for filtering an inappropriate content, and a Uniform Resource Locator filtering module 4478 or 5278 for preventing access to information associated with a Uniform Resource Locator, wherein the Uniform Resource Locator filtering module 5078 or 5278 runs on the mobile device at 5078A, and wherein the blacklist may include at least one of an adult Uniform Resource Locator 5278E, a pornographic Uniform Resource Locator 5278F, an adult domain 5278G, a pornographic domain 5278H, a Uniform Resource Locator 5278I for a website containing a link to an illegal image, a Uniform Resource Locator for a website containing a link to a pornographic image 5278J, a Uniform Resource Locator for a website containing content associated with a rating higher than allowed for a user 5278K, a website rated at a predetermined level under an age-specific rating system 5278L, or a website contained in third party database of adult sites 5278M.

Figure 53:
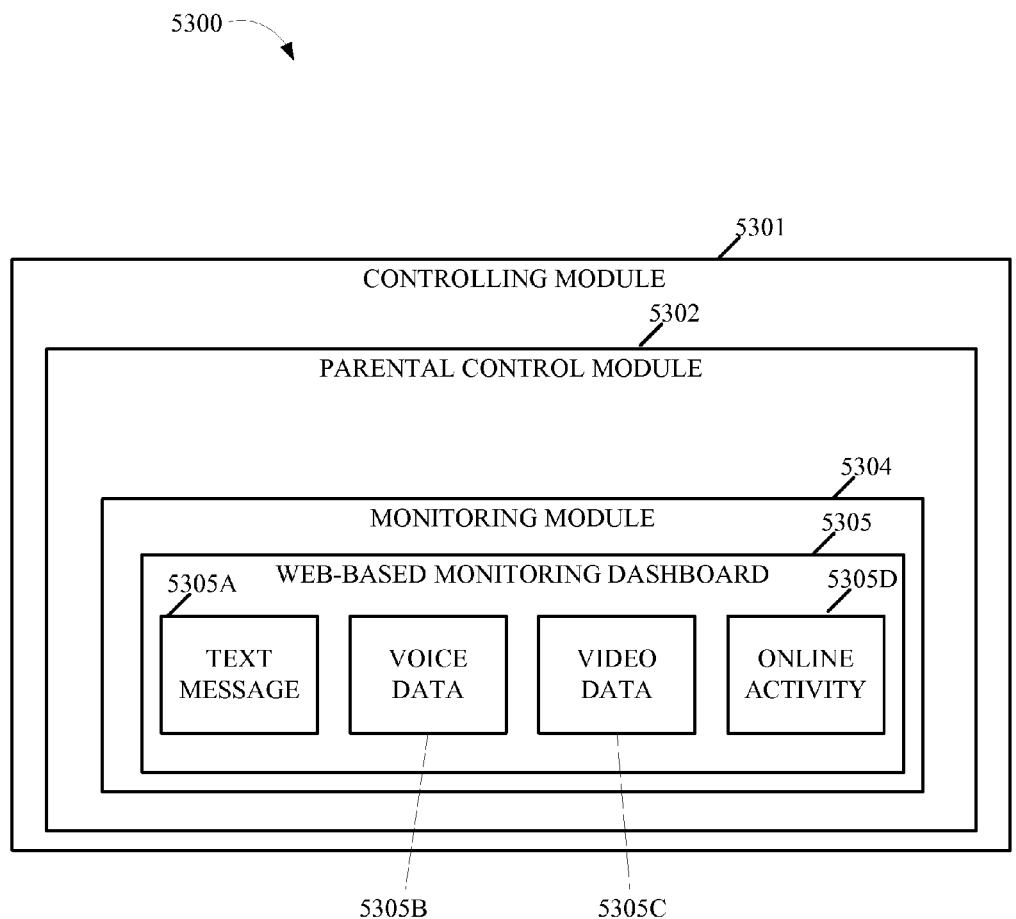
FIG. 53 is an exemplary embodiment of the present invention.

As further exemplified in FIGS. 44 and 53, an exemplary system 4400 or 5300 may include a controlling module 5301 for controlling a mobile device remotely, wherein the controlling module 5301 may include a parental control module 4402 or 5302 for controlling a mobile device used by a child, and wherein the parental control module 4402 or 5302 may include a monitoring module 4404 or 5304 for monitoring a use of the mobile device, a filtering module 4403 for filtering an inappropriate content, and a Uniform Resource Locator filtering module 4478 for preventing access to information associated with a Uniform Resource Locator, wherein the monitoring module 5304 may include a web-based monitoring dashboard 5305 for monitoring at least one of a text message 5305A, voice data 5305B, video data 5305C, and online activity 5305D of the mobile device.

Figure 54:
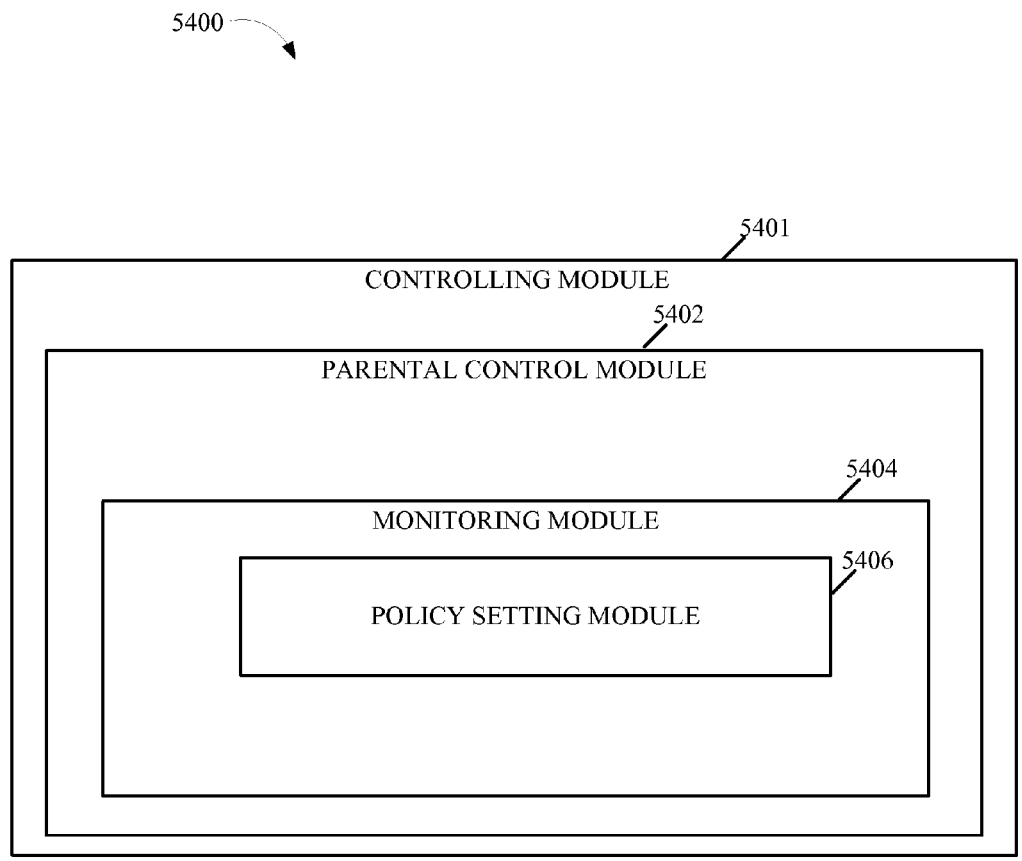
FIG. 54 is an exemplary embodiment of the present invention.
Figure 55:
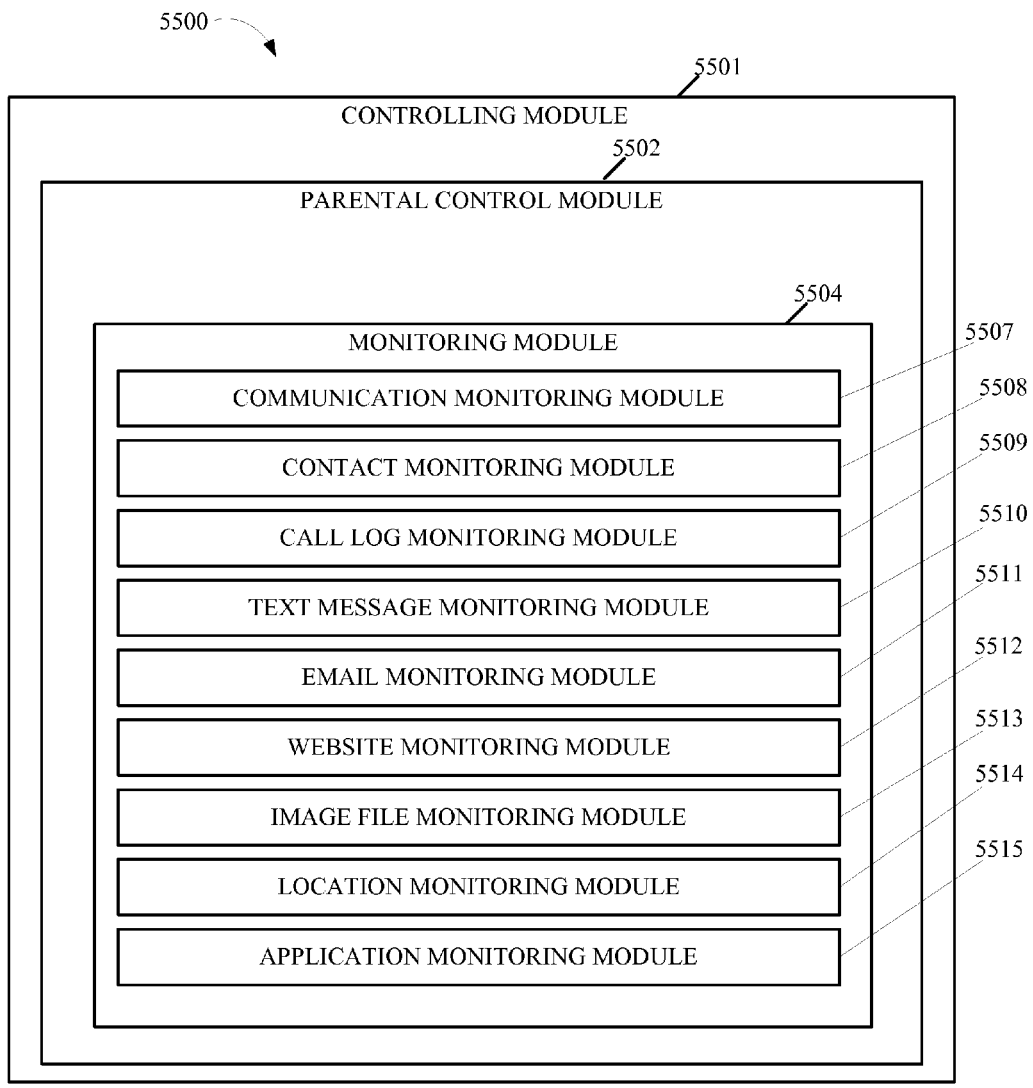
FIG. 55 is an exemplary embodiment of the present invention.
Figure 56:
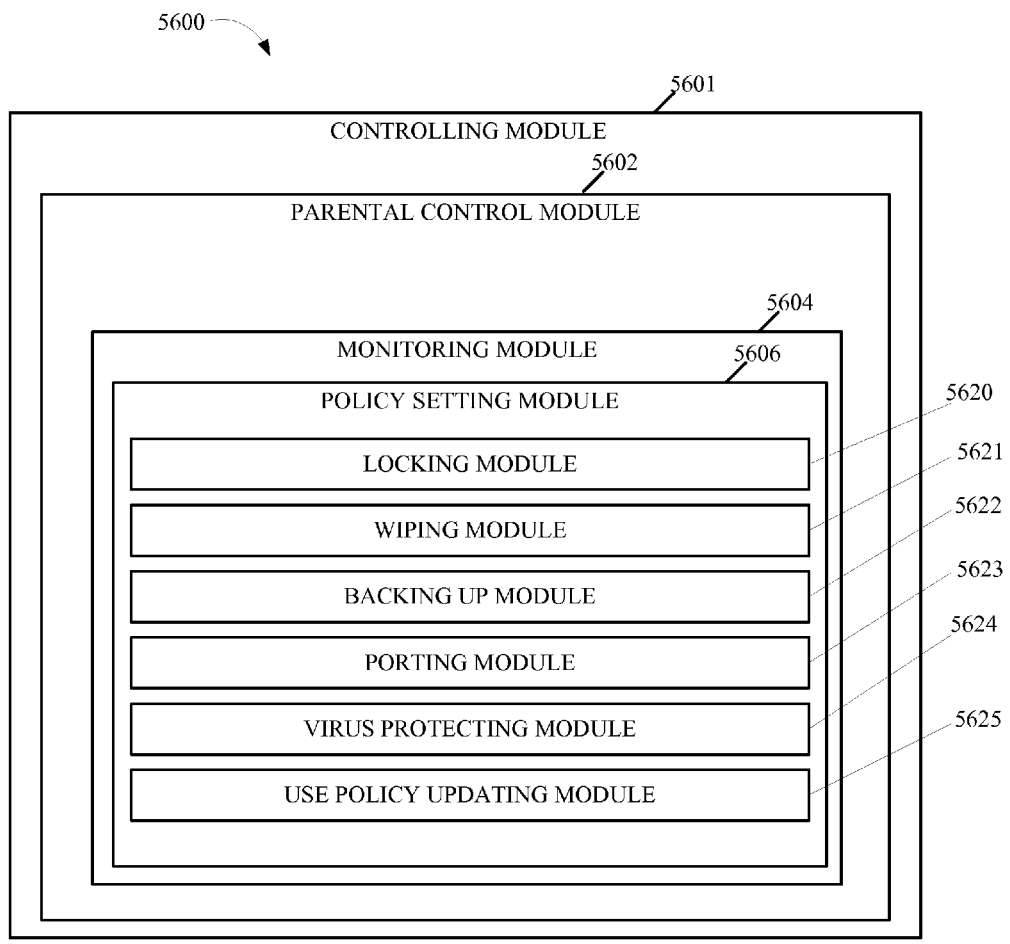
FIG. 56 is an exemplary embodiment of the present invention.

As further exemplified in FIGS. 44, 53, and 54, an exemplary system 4400, 5300, or 5400 may include a controlling module 5401 for controlling a mobile device remotely, wherein the controlling module 5401 may include a parental control module 4402 or 5402 for controlling a mobile device used by a child, and wherein the parental control module 4402 or 5402 may include a monitoring module 4404 or 5404 for monitoring a use of the mobile device, a filtering module 4403 for filtering an inappropriate content, and a Uniform Resource Locator filtering module 4478 for preventing access to information associated with a Uniform Resource Locator, wherein the monitoring module 5304 or 5404 may include a web-based monitoring dashboard 5305 for monitoring at least one of a text message 5305A, voice data 5305B, video data 5305C, and online activity 5305D of the mobile device, and wherein the monitoring module 5404 may further include a policy setting module 5406 for determining a use policy for what use is permitted on the mobile device.

As further exemplified in FIGS. 44, 53, 54, and 55, an exemplary system 4400, 5300, 5400, or 5500 may include a controlling module 5501 for controlling a mobile device remotely, wherein the controlling module 5501 may include a parental control module 4402 or 5502 for controlling a mobile device used by a child, and wherein the parental control module 4402 or 5502 may include a monitoring module 4404 or 5504 for monitoring a use of the mobile device, a filtering module 4403 for filtering an inappropriate content, and a Uniform Resource Locator filtering module 4478 for preventing access to information associated with a Uniform Resource Locator, wherein the monitoring module 5304 or 5504 may include a web-based monitoring dashboard 5305 for monitoring at least one of a text message 5305A, voice data 5305B, video data 5305C, and online activity 5305D of the mobile device, wherein the monitoring module 5404 or 5504 may further include a policy setting module 5406 for determining a use policy for what use is permitted on the mobile device, and wherein the monitoring module may further include any combination of the following: a communication monitoring module 5507 for viewing a communication with the mobile device; a contact monitoring module 5508 for viewing information relating to a party communicating with the mobile device; a call log monitoring module 5509 for viewing a log of a call on the mobile device; a text message monitoring module 5510 for viewing at least one of a text message and a text message attachment transferred to and from the mobile device; an email monitoring module 5511 for viewing an email transferred to and from the mobile device; a website monitoring module 5512 for viewing a website visited on the mobile device; an image file monitoring module 5513 for viewing an image transferred to and from the mobile device; a location monitoring module 5514 for viewing a location of the mobile device; and an application monitoring module 5515 for viewing an application on the mobile device.

As further exemplified in FIGS. 44, 53, 54, and 56, an exemplary system 4400, 5300, 5400, or 5600 may include a controlling module 5601 for controlling a mobile device remotely, wherein the controlling module 5601 may include a parental control module 4402 or 5602 for controlling a mobile device used by a child, and wherein the parental control module 4402 or 5602 may include a monitoring module 4404 or 5604 for monitoring a use of the mobile device, a filtering module 4403 for filtering an inappropriate content, and a Uniform Resource Locator filtering module 4478 for preventing access to information associated with a Uniform Resource Locator, wherein the monitoring module 5304 or 5604 may include a web-based monitoring dashboard 5305 for monitoring at least one of a text message 5305A, voice data 5305B, video data 5305C, and online activity 5305D of the mobile device, and wherein the monitoring module 5604 may further include a policy setting module 5606 for determining a use policy for what use is permitted on the mobile device, wherein the policy setting module may further include any combination of the following: a locking module 5620 for initiating a locking of the mobile device; a wiping module 5621 for initiating a wiping of at least one file on the mobile device; a backing up module 5622 for backing up data of the mobile device; a porting module 5623 for porting a file in the mobile device to another mobile device; a virus protecting module 5624 for initiating an update of a virus protection on the mobile device; and a use policy updating module 5625 for at least one of amending, adding or deleting an existing use policy.

Figure 57:
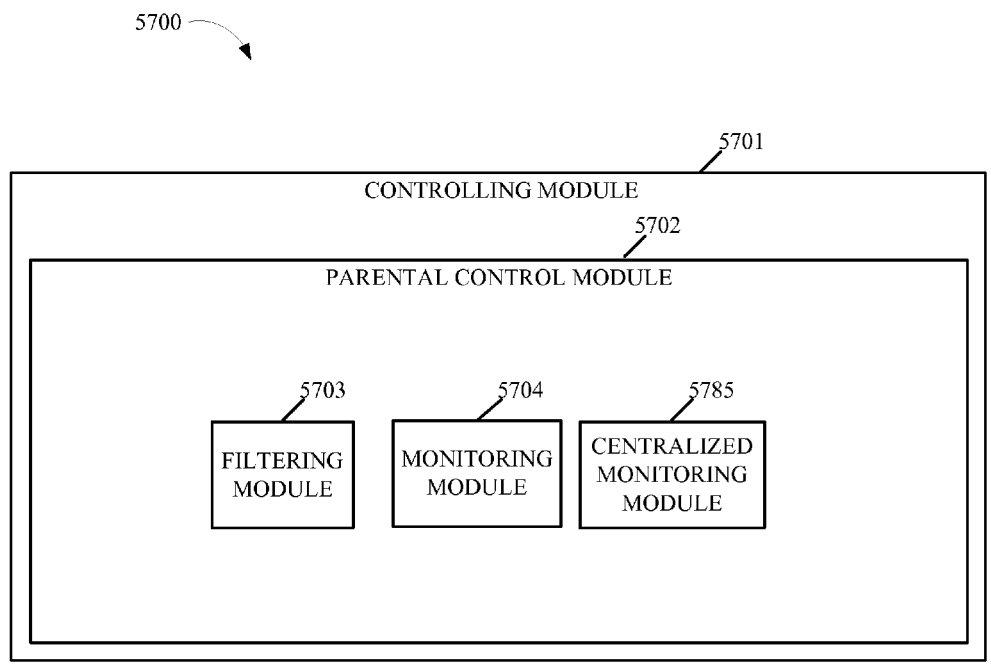
FIG. 57 is an exemplary embodiment of the present invention.

As further exemplified in FIG. 57, an exemplary system 5700 includes a controlling module 5701 for controlling a mobile device remotely, wherein the controlling module 5701 may include a parental control module 5702 for controlling a mobile device used by a child, and wherein the parental control module 5702 may include a monitoring module 5704 for monitoring a use of the mobile device, a filtering module 5703 for filtering an inappropriate content, and a centralized monitoring module 5785 for monitoring information from at least one of a mobile device or a network.

Figure 58:
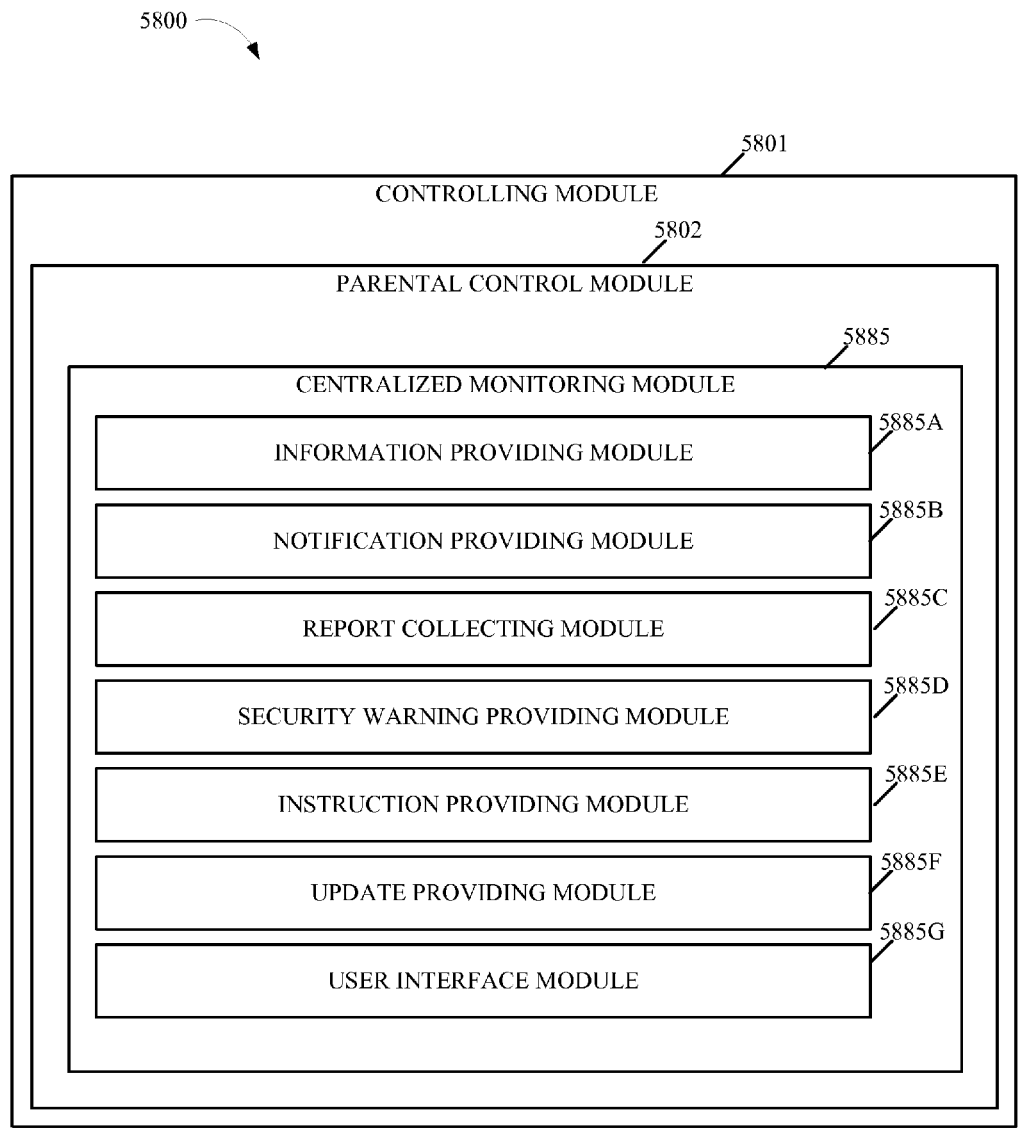
FIG. 58 is an exemplary embodiment of the present invention.

As further exemplified in FIGS. 57 and 58, an exemplary system 5700 or 5800 includes a controlling module 5801 for controlling a mobile device remotely, wherein the controlling module 5801 may include a parental control module 5802 for controlling a mobile device used by a child, and wherein the parental control module 5702 or 5802 may include a monitoring module 5704 for monitoring a use of the mobile device, a filtering module 5703 for filtering an inappropriate content, and a centralized monitoring module 5785 or 5885 for monitoring information from at least one of a mobile device or a network, wherein the centralized monitoring module 5885 may include any combination of the following: an information providing module 5885A for providing information related to the mobile device to a user of the controlling module; a notification providing module 5885B for providing a notification to a user of the controlling module; a report collecting module 5885C for collecting a report from a mobile device; a security warning providing module 5885D for providing a security warning; an instruction providing module 5885E for providing an instruction; a update providing module 5885F for providing an update; and a user interface module 5885G for allowing at least one of monitoring network activity or analyzing a report associated with at least one of a mobile device or a network.

Figure 59:
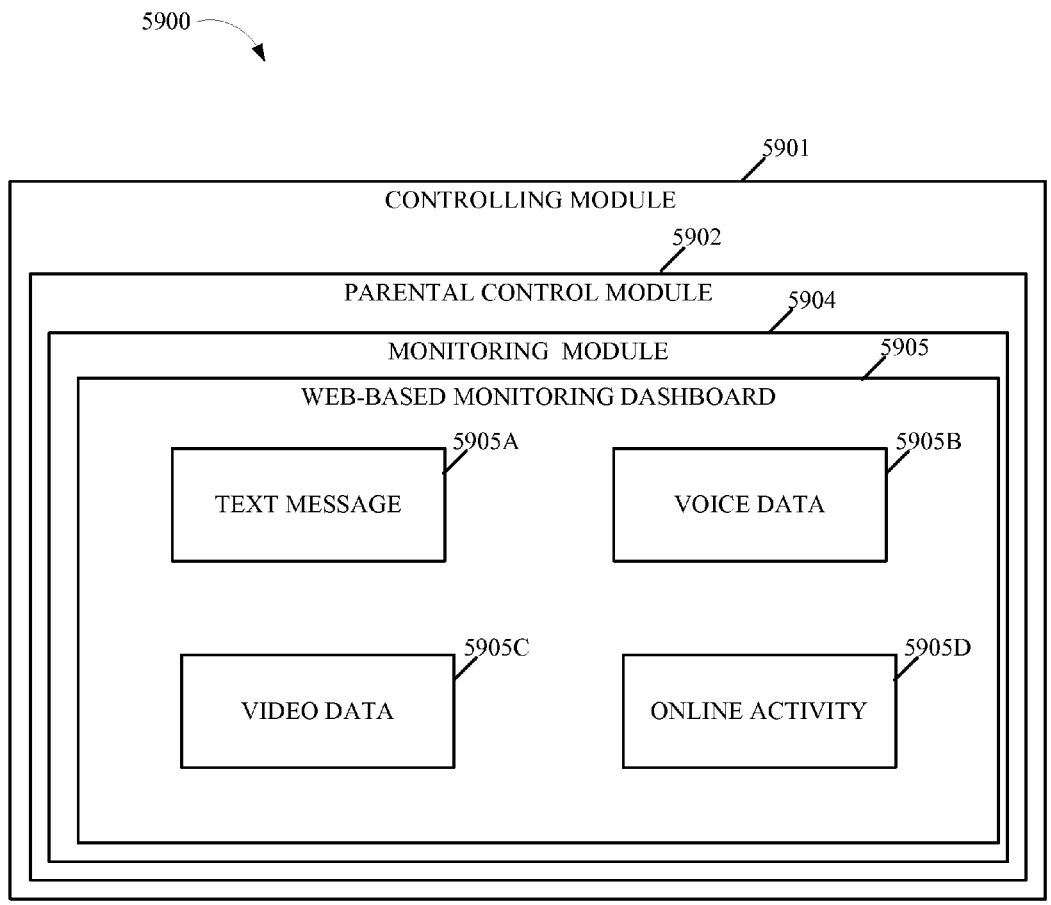
FIG. 59 is an exemplary embodiment of the present invention.

As further exemplified in FIGS. 57 and 59, an exemplary system 5700 or 5900 includes a controlling module 5901 for controlling a mobile device remotely, wherein the controlling module 5901 may include a parental control module 5902 for controlling a mobile device used by a child, and wherein the parental control module 5702 or 5902 may include a monitoring module 5904 for monitoring a use of the mobile device, a filtering module 5703 for filtering an inappropriate content, and a centralized monitoring module 5785 for monitoring information from at least one of a mobile device or a network, wherein the monitoring module may include a web-based monitoring dashboard 5905 for monitoring at least one of a text message 5905A, voice data 5905B, video data 5905C, and online activity 5905D of the mobile device.

Figure 60:
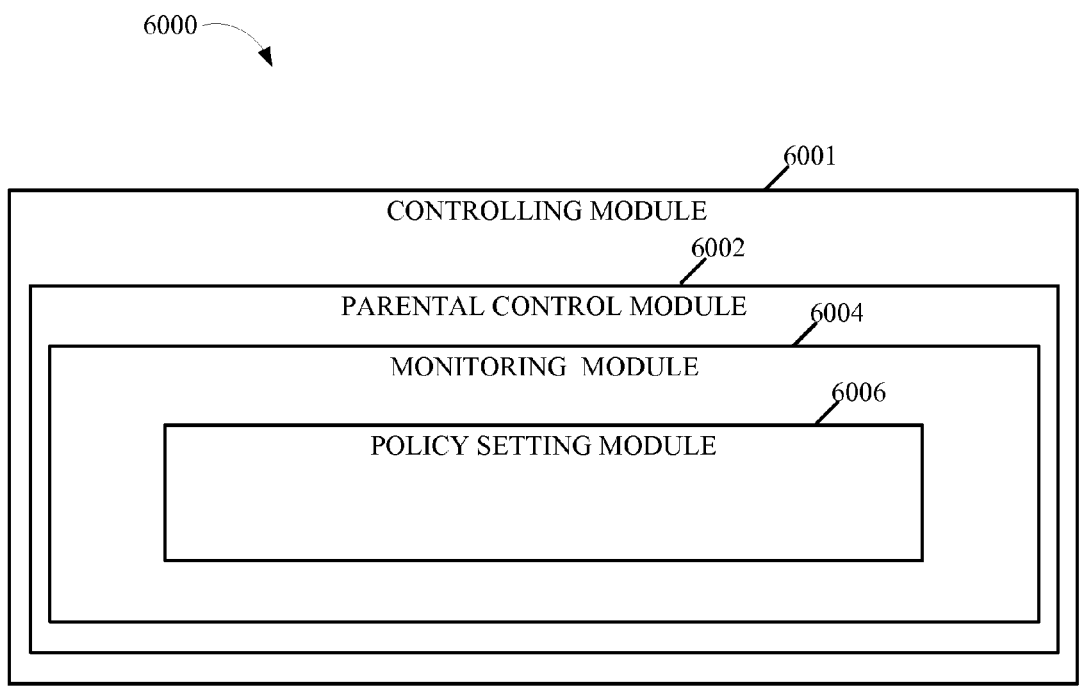
FIG. 60 is an exemplary embodiment of the present invention.
Figure 61:
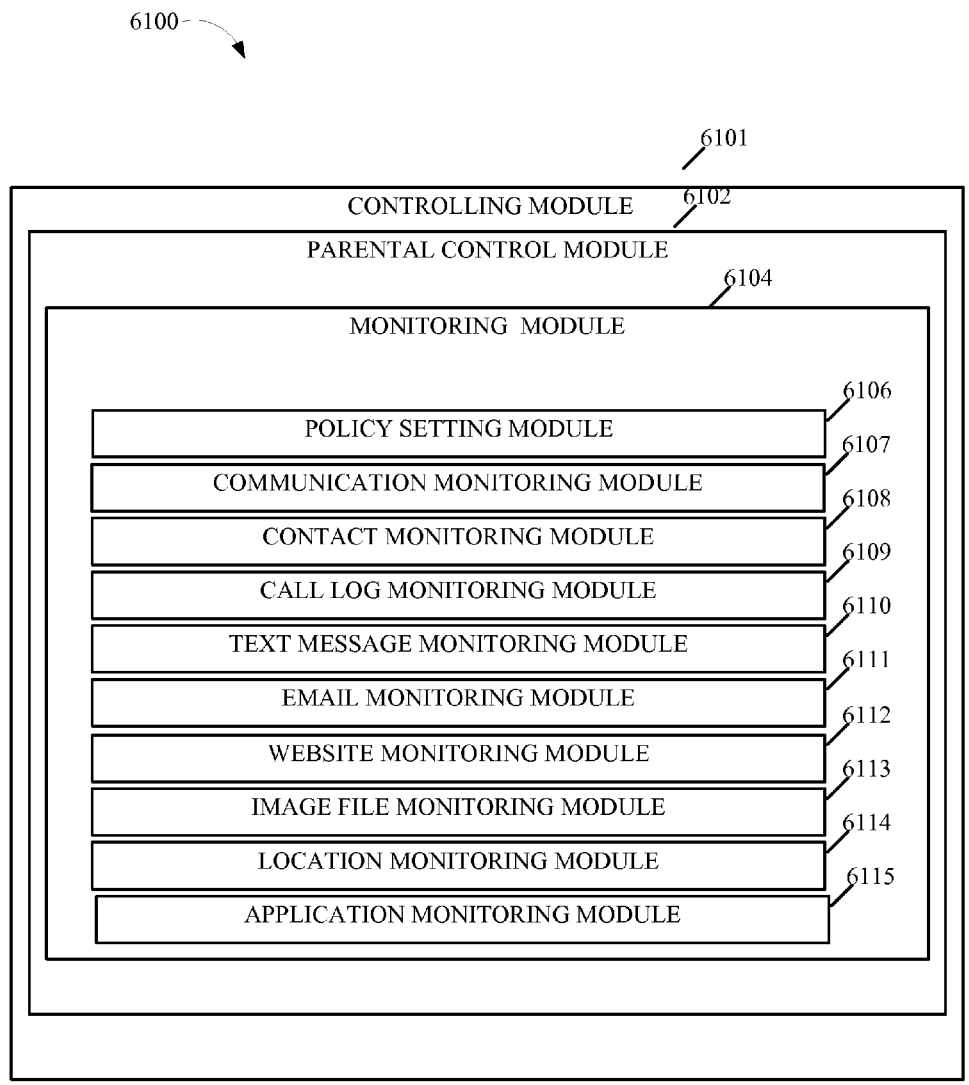
FIG. 61 is an exemplary embodiment of the present invention.
Figure 62:
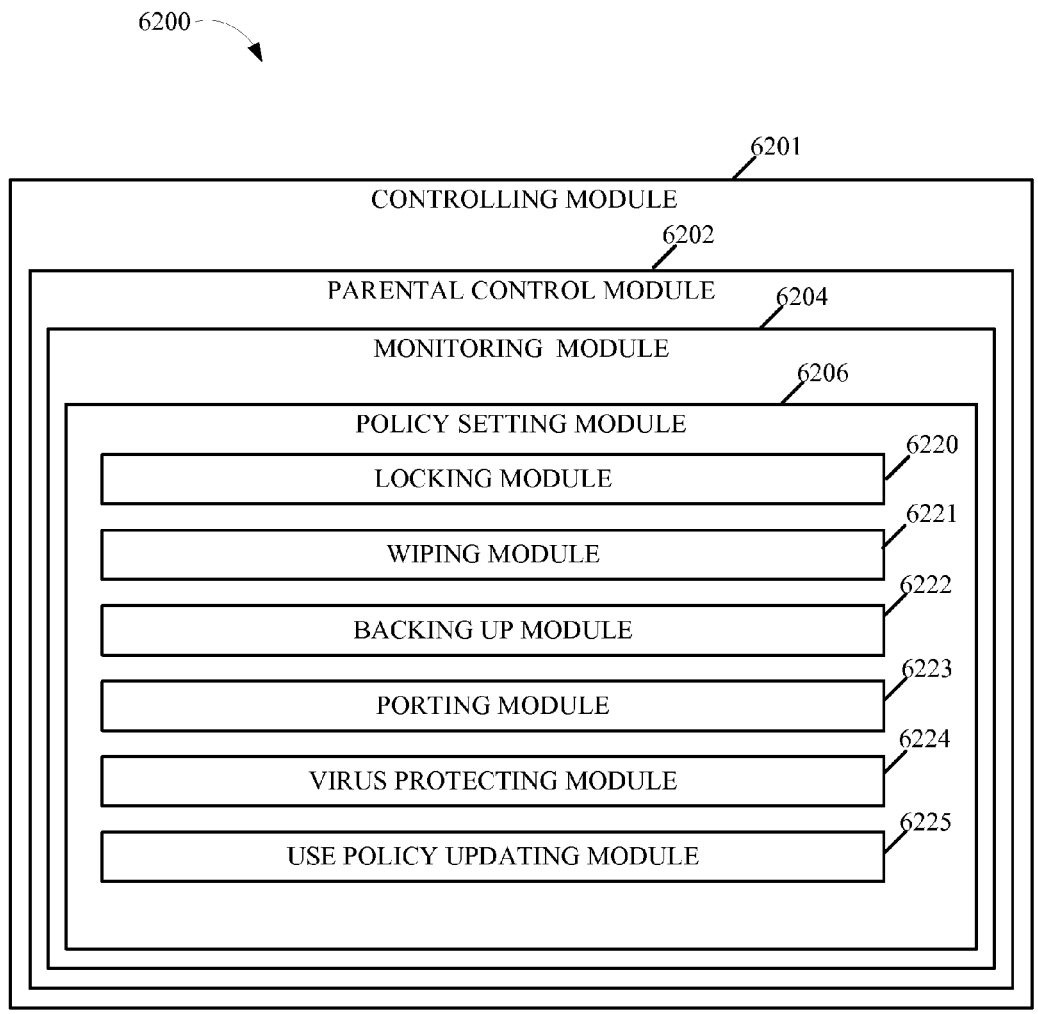
FIG. 62 is an exemplary embodiment of the present invention.

As further exemplified in FIGS. 57, 59, and 60, an exemplary system 5700, 5900, or 6000 may include a controlling module 6001 for controlling a mobile device remotely, wherein the controlling module 6001 may include a parental control module 6002 for controlling a mobile device used by a child, and wherein the parental control module 5702 or 6002 may include a monitoring module 6004 for monitoring a use of the mobile device, a filtering module 5703 for filtering an inappropriate content, and a centralized monitoring module 5785 for monitoring information from at least one of a mobile device or a network, wherein the monitoring module may include a web-based monitoring dashboard 5905 for monitoring at least one of a text message 5905A, voice data 5905B, video data 5905C, and online activity 5905D of the mobile device, and wherein the monitoring module 6004 may further include a policy setting module 6006 for determining a use policy for what use is permitted on the mobile device.

As further exemplified in FIGS. 57, 59, 60, and 61 an exemplary system 5700, 5900, 6000, or 6100 may include a controlling module 6101 for controlling a mobile device remotely, wherein the controlling module 6101 may include a parental control module 6102 for controlling a mobile device used by a child, and wherein the parental control module 5702 or 6102 may include a monitoring module 6104 for monitoring a use of the mobile device, a filtering module 5703 for filtering an inappropriate content, and a centralized monitoring module 5785 for monitoring information from at least one of a mobile device or a network, wherein the monitoring module may include a web-based monitoring dashboard 5905 for monitoring at least one of a text message 5905A, voice data 5905B, video data 5905C, and online activity 5905D of the mobile device, wherein the monitoring module may further include a policy setting module 6106 for determining a use policy for what use is permitted on the mobile device, and wherein the monitoring module 6104 may further include any combination of the following: a communication monitoring module 6107 for viewing a communication with the mobile device; a contact monitoring module 6108 for viewing information relating to a party communicating with the mobile device; a call log monitoring module 6109 for viewing a log of a call on the mobile device; a text message monitoring module 6110 for viewing at least one of a text message and a text message attachment transferred to and from the mobile device; an email monitoring module 6111 for viewing an email transferred to and from the mobile device; a website monitoring module 6112 for viewing a website visited on the mobile device; an image file monitoring module 6113 for viewing an image transferred to and from the mobile device; a location monitoring module 6114 for viewing a location of the mobile device; and an application monitoring module 6115 for viewing an application on the mobile device.

As further exemplified in FIGS. 57, 59, 60, and 62, an exemplary system 5700, 5900, 6000 or 6200 may include a controlling module 6201 for controlling a mobile device remotely, wherein the controlling module 6201 may include a parental control module 6202 for controlling a mobile device used by a child, and wherein the parental control module 5702 or 6202 may include a monitoring module 6204 for monitoring a use of the mobile device, a filtering module 5703 for filtering an inappropriate content, and a centralized monitoring module 5785 for monitoring information from at least one of a mobile device or a network, wherein the monitoring module may include a web-based monitoring dashboard 5905 for monitoring at least one of a text message 5905A, voice data 5905B, video data 5905C, and online activity 5905D of the mobile device, wherein the monitoring module may further include a policy setting module 6206 for determining a use policy for what use is permitted on the mobile device, and wherein the policy setting module may further include any combination of the following: a locking module 6220 for initiating a locking of the mobile device; a wiping module 6221 for initiating a wiping of at least one file on the mobile device; a backing up module 6222 for backing up data of the mobile device; a porting module 6223 for porting a file in the mobile device to another mobile device; a virus protecting module 6224 for initiating an update of a virus protection on the mobile device; and a use policy updating module 6225 for at least one of amending, adding or deleting an existing use policy.

Figure 63:
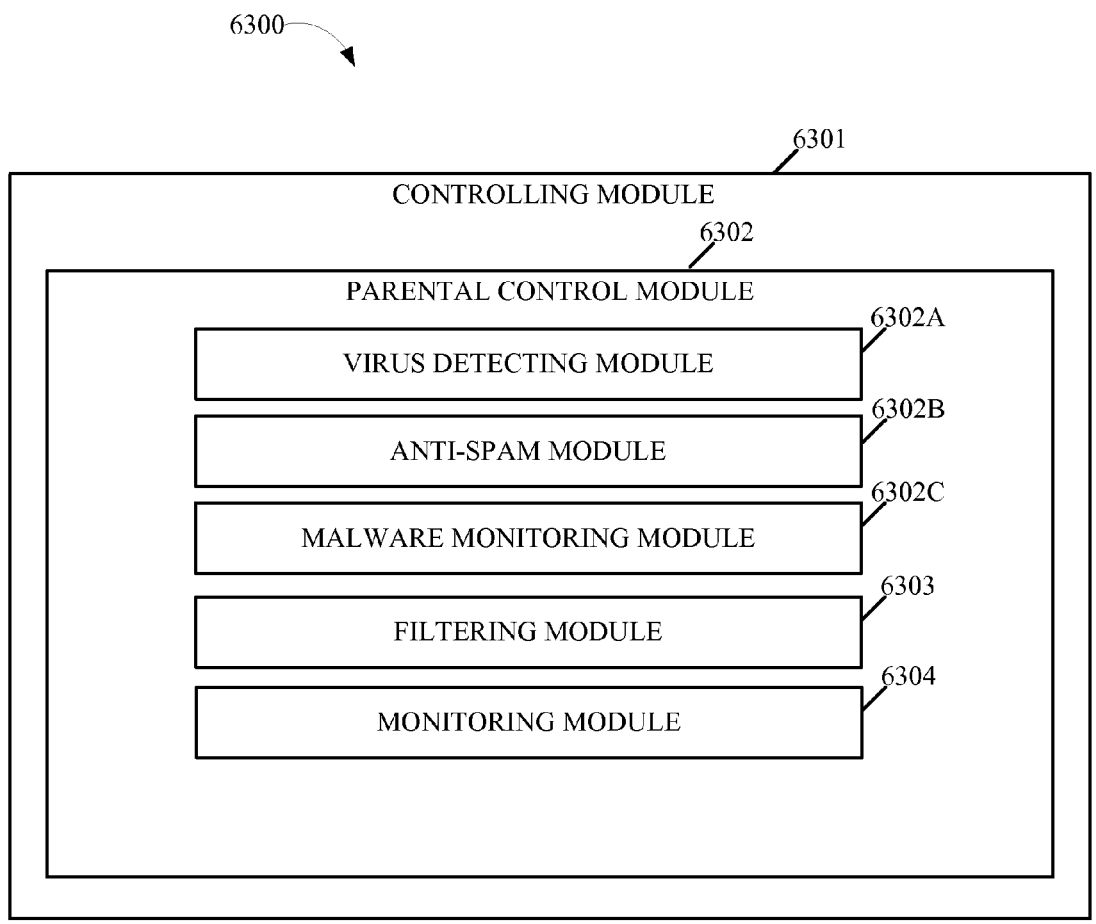
FIG. 63 is an exemplary embodiment of the present invention.

As further exemplified in FIG. 63, an exemplary system 6300 may include a controlling module 6301 for controlling a mobile device remotely, wherein the controlling module 6302 may include a parental control module 6302 for controlling a mobile device used by a child, and wherein the parental control module 6302 may include any combination of the following: a monitoring module 6304 for monitoring a use of the mobile device, a filtering module 6303 for filtering an inappropriate content, a virus detecting module 6302A for detecting a virus; an anti-spam module 6302B for protecting against spam; and a malware monitoring module 6302C for protecting against malware.

As noted earlier, the exemplary embodiments described in FIGS. 1-63 need not be implemented in a parental control setting. It can be implemented in other settings such as, business use and governmental use. Thus, the descriptions and the drawing figures corresponding to the parental control module, for example, can be deleted in such other types of implementations. Another set of descriptions and drawings directed to such other types of implementations are being omitted for brevity sake.

Figure 64:
FIG. 64 is an exemplary embodiment of the present invention.

As further exemplified in FIG. 64, an exemplary method 6400 may include controlling a mobile device remotely at 6401. In this exemplary method, a mobile device such as a cell phone or a smartphone may be used. However, any other types of the mobile devices may also be used. The controlling method itself may reside on a computing device or on the mobile device itself. When the controlling method resides on a computing device, it communicates with the mobile device so as to control the mobile device remotely.

Figure 65:
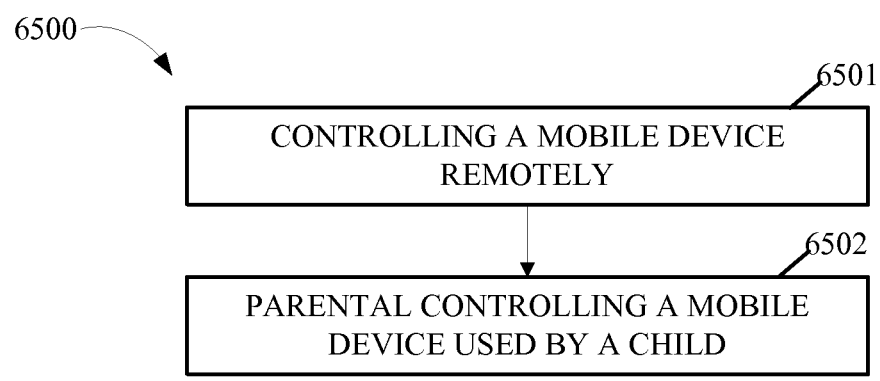
FIG. 65 is an exemplary embodiment of the present invention.

As further exemplified in FIG. 65, an exemplary method 6500 may include controlling a mobile device remotely at 6401, wherein the controlling step includes parental controlling a mobile device used by a child at 6502. As noted above, the present invention may be implemented in settings other than the parent-child setting, such as for example, for business or governmental use.

Figure 66:
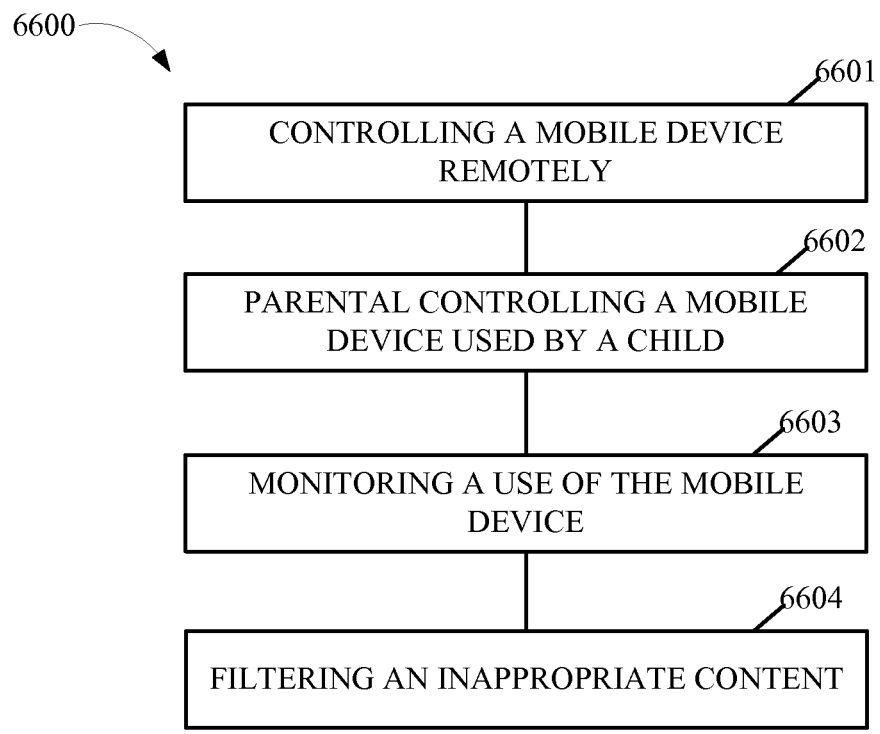
FIG. 66 is an exemplary embodiment of the present invention.

As further exemplified in FIG. 66, an exemplary method 6600 may include controlling a mobile device remotely at 6601, wherein the controlling step includes parental controlling a mobile device used by a child at 6602, and wherein the parental controlling step may include monitoring a use of the mobile device at 6603 and filtering an inappropriate content at 6604.

Figure 67:
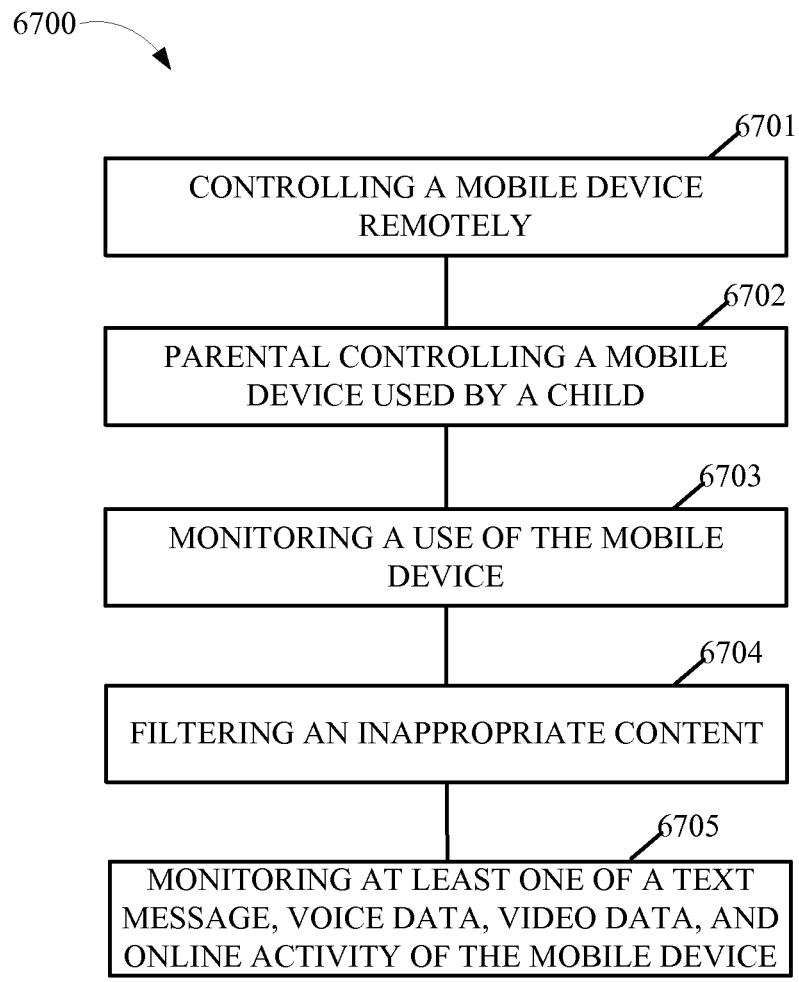
FIG. 67 is an exemplary embodiment of the present invention.

As further exemplified in FIG. 67, an exemplary method 6700 may include controlling a mobile device remotely at 6701, wherein the controlling step includes parental controlling a mobile device used by a child at 6702, and wherein the parental controlling step may include monitoring a use of the mobile device at 6703 and filtering an inappropriate content at 6704, wherein the monitoring step may include monitoring at least one of a text message, voice data, video data, and online activity of the mobile device at 6705.

Figure 68:
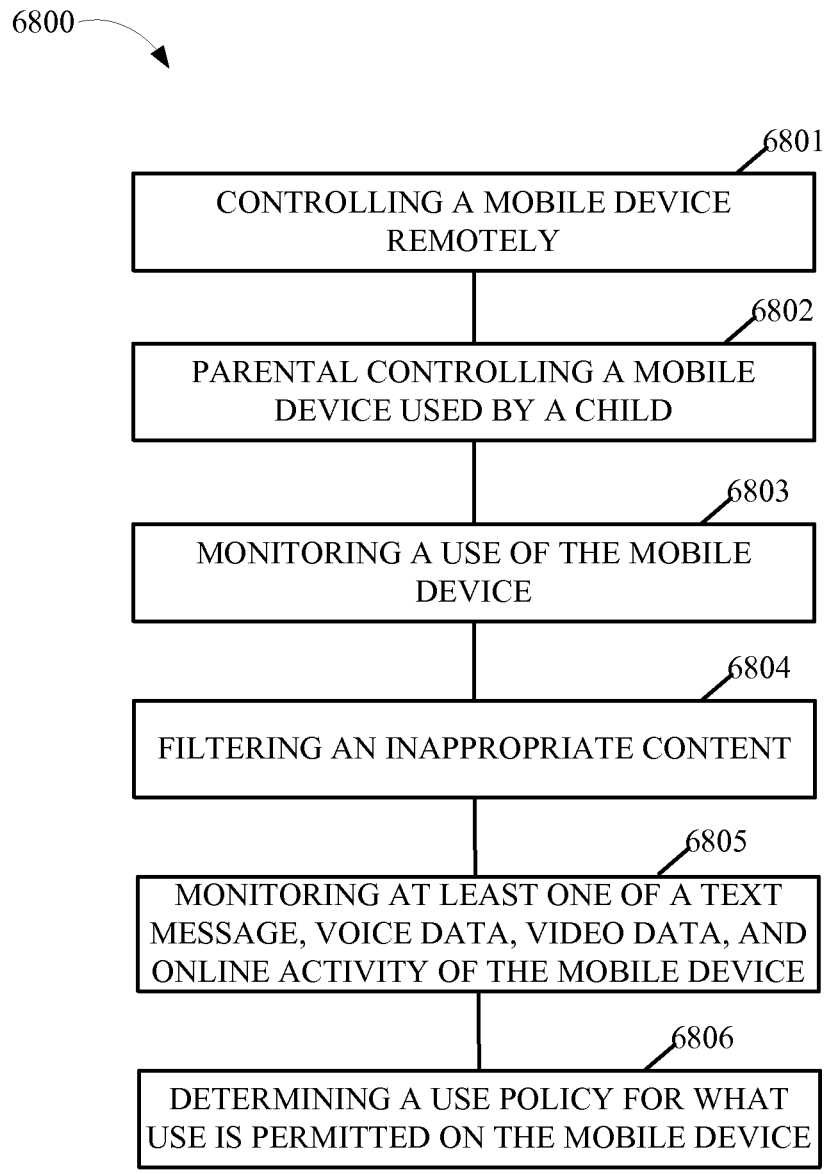
FIG. 68 is an exemplary embodiment of the present invention.

As further exemplified in FIG. 68, an exemplary method 6800 may include controlling a mobile device remotely at 6801, wherein the controlling step includes parental controlling a mobile device used by a child at 6802, and wherein the parental controlling step may include monitoring a use of the mobile device at 6803 and filtering an inappropriate content at 6804, wherein the monitoring step may include monitoring at least one of a text message, voice data, video data, and online activity of the mobile device at 6805, and wherein the monitoring step may further include determining a use policy for what use is permitted on the mobile device at 6806.

Figure 69:
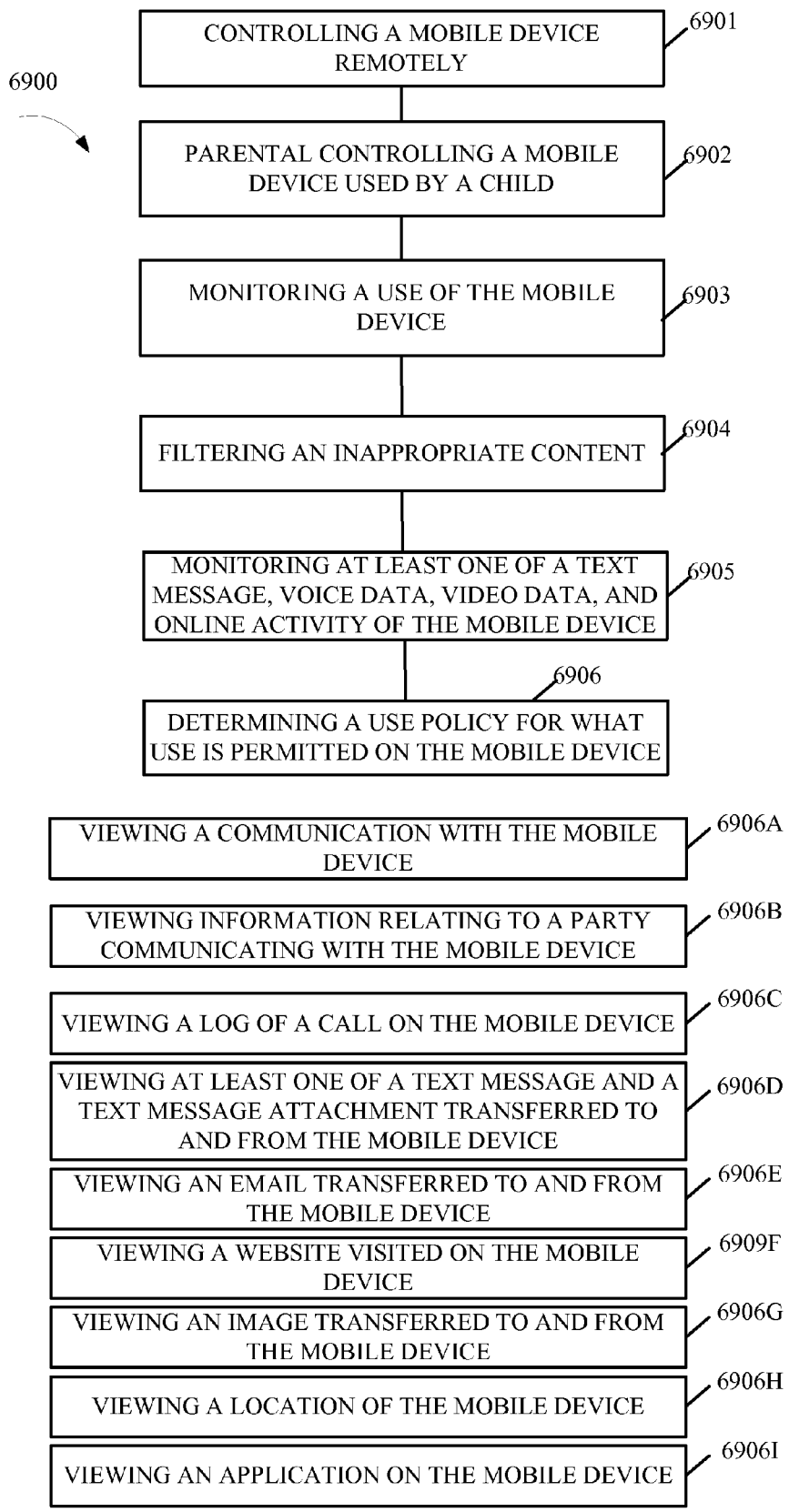
FIG. 69 is an exemplary embodiment of the present invention.

As further exemplified in FIG. 69, an exemplary method 6900 may include controlling a mobile device remotely at 6901, wherein the controlling step includes parental controlling a mobile device used by a child at 6902, and wherein the parental controlling step may include monitoring a use of the mobile device at 6903 and filtering an inappropriate content at 6904, wherein the monitoring step may include monitoring at least one of a text message, voice data, video data, and online activity of the mobile device at 6905, wherein the monitoring step 6903 may further include determining a use policy for what use is permitted on the mobile device at 6906, wherein the monitoring step 6903 may further include determining a use policy for what use is permitted on the mobile device at 6906, and wherein the monitoring step may further include any combination of the following: viewing a communication with the mobile device at 6906A; viewing information relating to a party communicating with the mobile device; viewing a log of a call on the mobile device at 6906B; viewing at least one of a text message and a text message attachment transferred to and from the mobile device; viewing an email transferred to and from the mobile device at 6906C; viewing a website visited on the mobile device at 6906D; viewing an image transferred to and from the mobile device at 6906D; viewing a location of the mobile device at 6906E; and viewing an application on the mobile device at 6906F.

Figure 70:
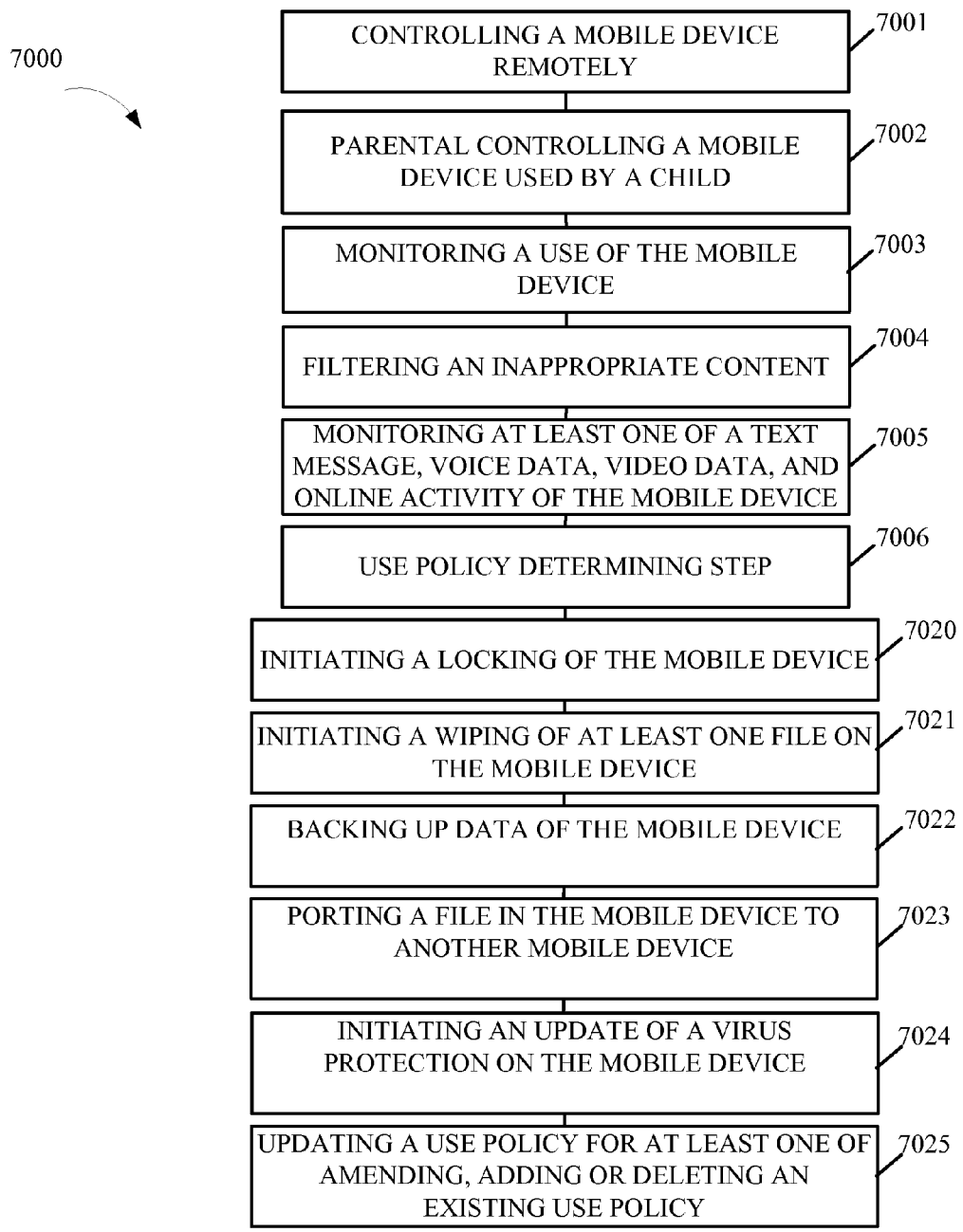
FIG. 70 is an exemplary embodiment of the present invention.

As further exemplified in FIG. 70, an exemplary method 7000 may include controlling a mobile device remotely at 7001, wherein the controlling step includes parental controlling a mobile device used by a child at 7002, and wherein the parental controlling step may include monitoring a use of the mobile device at 7003 and filtering an inappropriate content at 7004, wherein the monitoring step may include monitoring at least one of a text message, voice data, video data, and online activity of the mobile device at 7005, wherein the monitoring step may further include determining a use policy for what use is permitted on the mobile device at 7006, and wherein the use policy determining step may further include any combination of the following: initiating a locking of the mobile device at 7020; initiating a wiping of at least one file on the mobile device at 7021; backing up data of the mobile device at 7022; porting a file in the mobile device to another mobile device at 7023; initiating an update of a virus protection on the mobile device at 7024; and updating a use policy for at least one of amending, adding or deleting an existing use policy at 7025.

Figure 71:
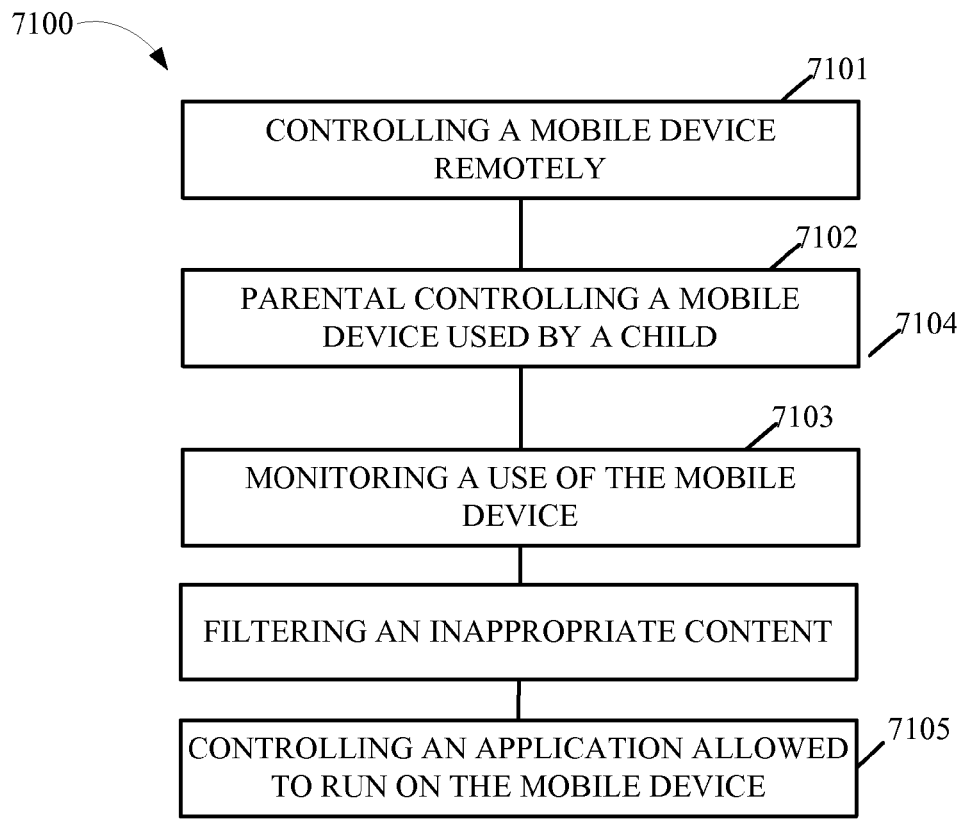
FIG. 71 is an exemplary embodiment of the present invention.

As further exemplified in FIG. 71, an exemplary method 7100 may include controlling a mobile device remotely at 7101, wherein the controlling step includes parental controlling a mobile device used by a child at 7102, wherein the parental controlling step may include monitoring a use of the mobile device at 7103 and filtering an inappropriate content at 7104, and the method may further include controlling an application allowed to run on the mobile device at 7105.

Figure 72:
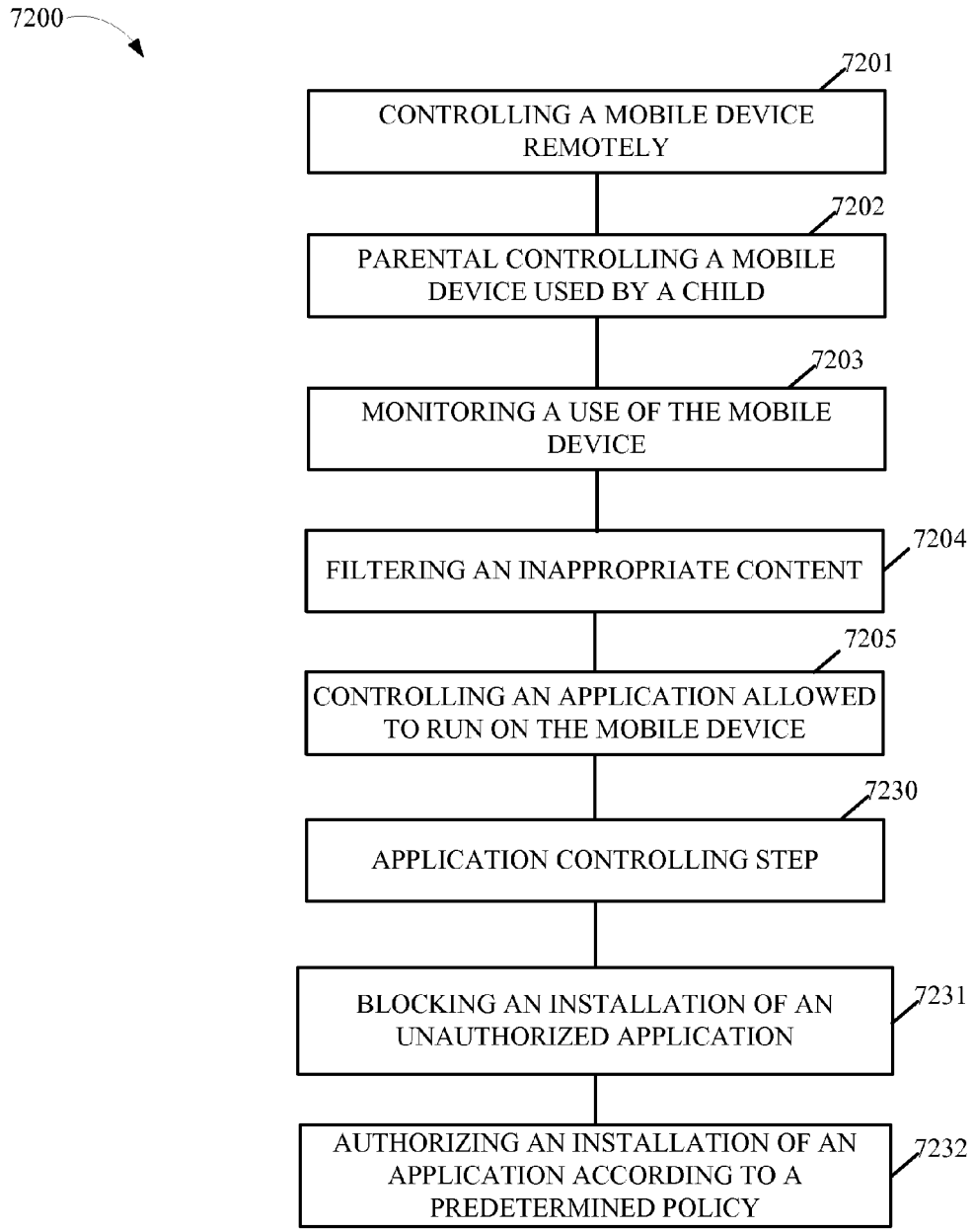
FIG. 72 is an exemplary embodiment of the present invention.

As further exemplified in FIG. 72, an exemplary method 7200 may include controlling a mobile device remotely at 7201, wherein the controlling step includes parental controlling a mobile device used by a child at 7202, wherein the parental controlling step may include monitoring a use of the mobile device at 7203 and filtering an inappropriate content at 7204, and the method may further include controlling an application allowed to run on the mobile device at 7205, wherein the application controlling step 7230 may further include blocking an installation of an unauthorized application at 7231 and authorizing an installation of an application according to a predetermined policy at 7232.

Figure 73:
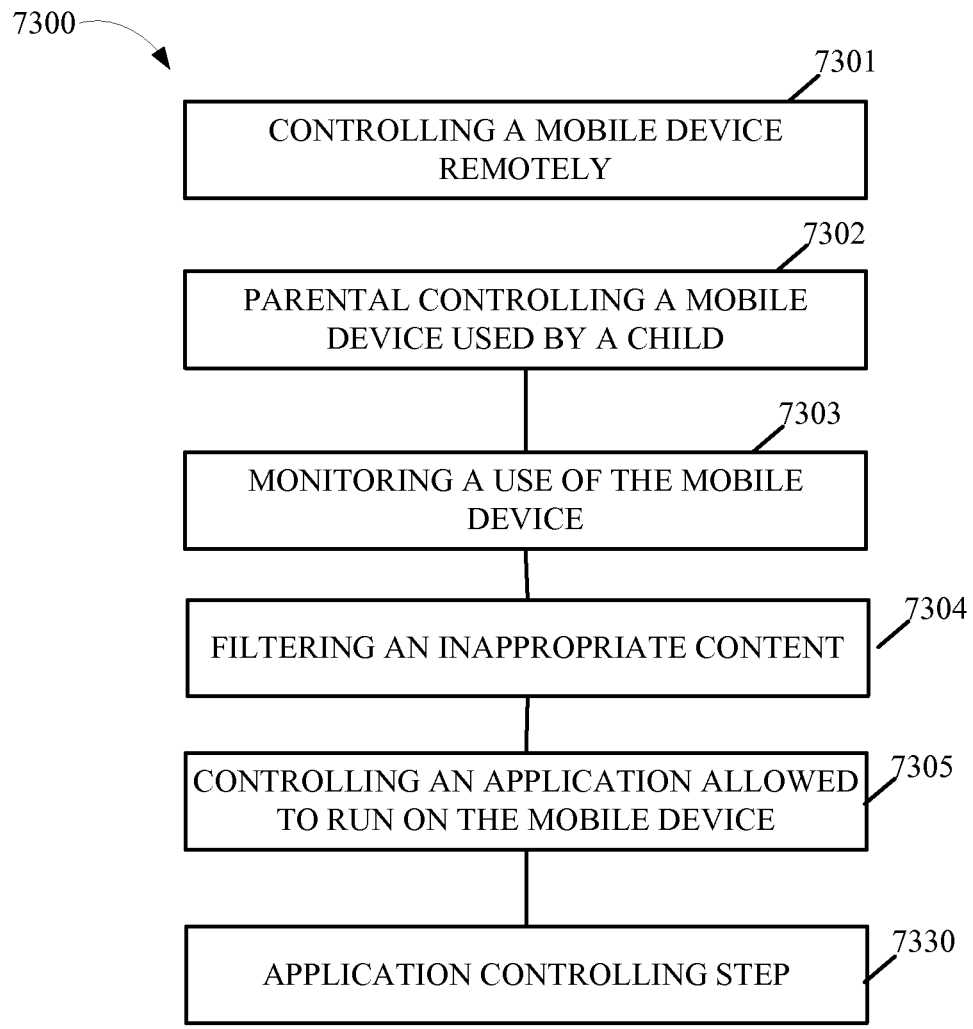
FIG. 73 is an exemplary embodiment of the present invention.

As further exemplified in FIGS. 72 and 73, an exemplary method 7200 and 7300 may include controlling a mobile device remotely at 7301, wherein the controlling step includes parental controlling a mobile device used by a child at 7302, wherein the parental controlling step may include monitoring a use of the mobile device at 7303 and filtering an inappropriate content at 7304, and the method may further include controlling an application allowed to run on the mobile device at 7305, wherein the application controlling step may further include blocking an installation of an unauthorized application at 7231 and authorizing an installation of an application according to a predetermined policy at 7232 and wherein the application controlling step 7330 runs on the mobile device at 7305. Here and elsewhere in the description of the various embodiments of the present invention, the order or arrangements of the various steps and module depicted herein may be varied as needed.

Figure 74:
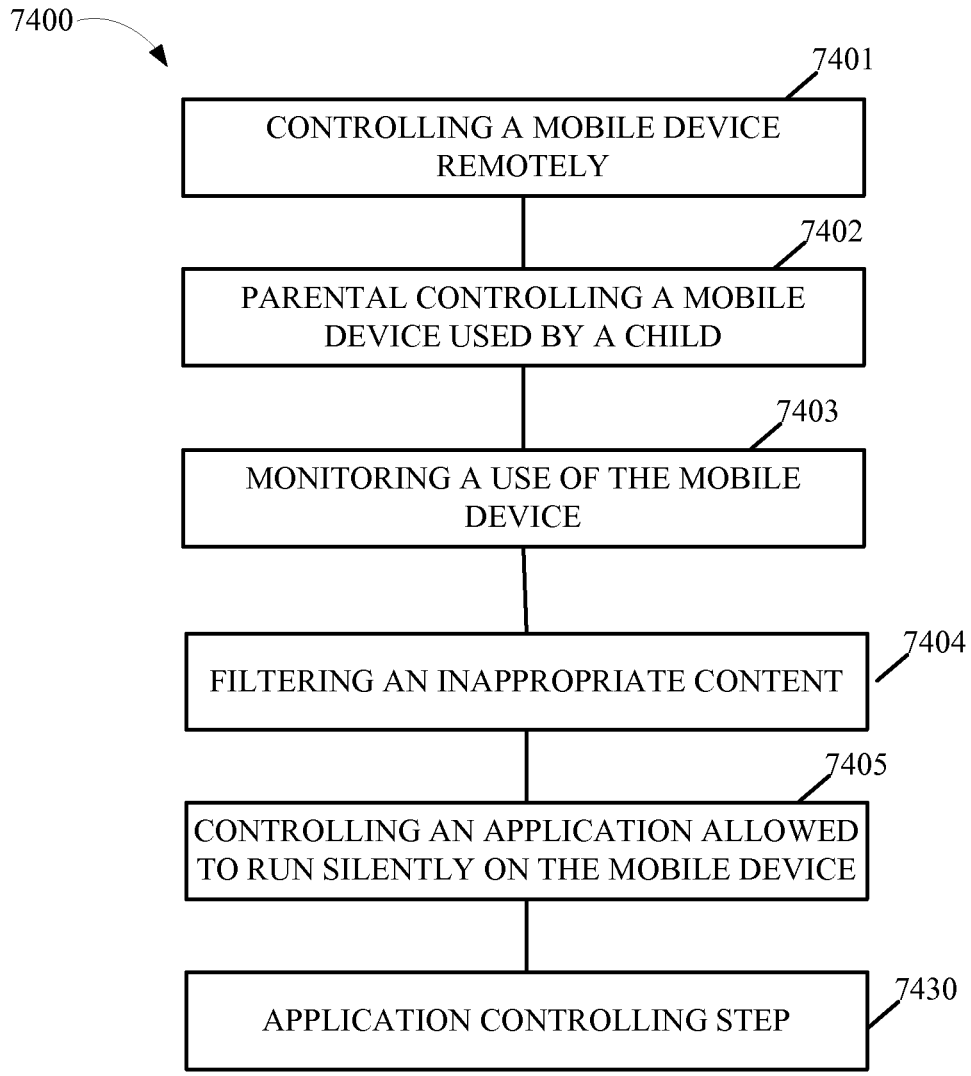
FIG. 74 is an exemplary embodiment of the present invention.

As further exemplified in FIGS. 72 and 74, an exemplary method 7200 or 7400 may include controlling a mobile device remotely at 7401, wherein the controlling step includes parental controlling a mobile device used by a child at 7402, wherein the parental controlling step may include monitoring a use of the mobile device at 7403 and filtering an inappropriate content at 7404, and the method may further include controlling an application allowed to run on the mobile device at 7405, wherein the application controlling step may further include blocking an installation of an unauthorized application at 7231 and authorizing an installation of an application according to a predetermined policy at 7232, wherein the application controlling step 7430 runs on the mobile device at 7405, and wherein the application controlling step runs silently on the mobile device and cannot be disabled.

Figure 75:
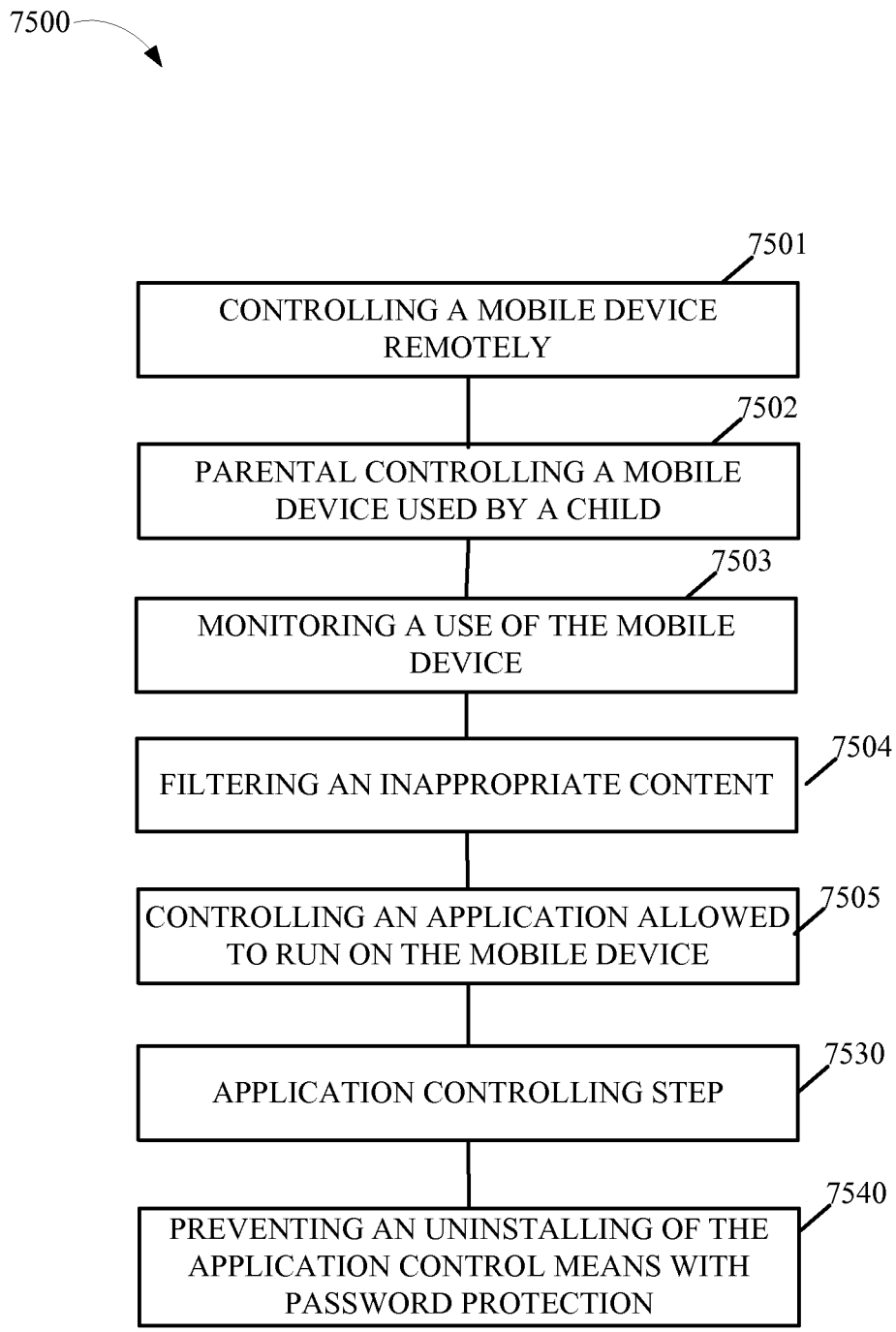
FIG. 75 is an exemplary embodiment of the present invention.

As further exemplified in FIGS. 72 and 75, an exemplary method 7200 or 7500 may include controlling a mobile device remotely at 7501, wherein the controlling step includes parental controlling a mobile device used by a child at 7502, wherein the parental controlling step may include monitoring a use of the mobile device at 7503 and filtering an inappropriate content at 7504, and the method may further include controlling an application allowed to run on the mobile device at 7505, wherein the application controlling step may further include blocking an installation of an unauthorized application at 7231 and authorizing an installation of an application according to a predetermined policy at 7232, wherein the application controlling step 7530 runs on the mobile device at 7505, wherein the application controlling step runs silently on the mobile device and cannot be disabled, and the method may further include preventing an uninstalling of the application control means with password protection at 7540.

Figure 76:
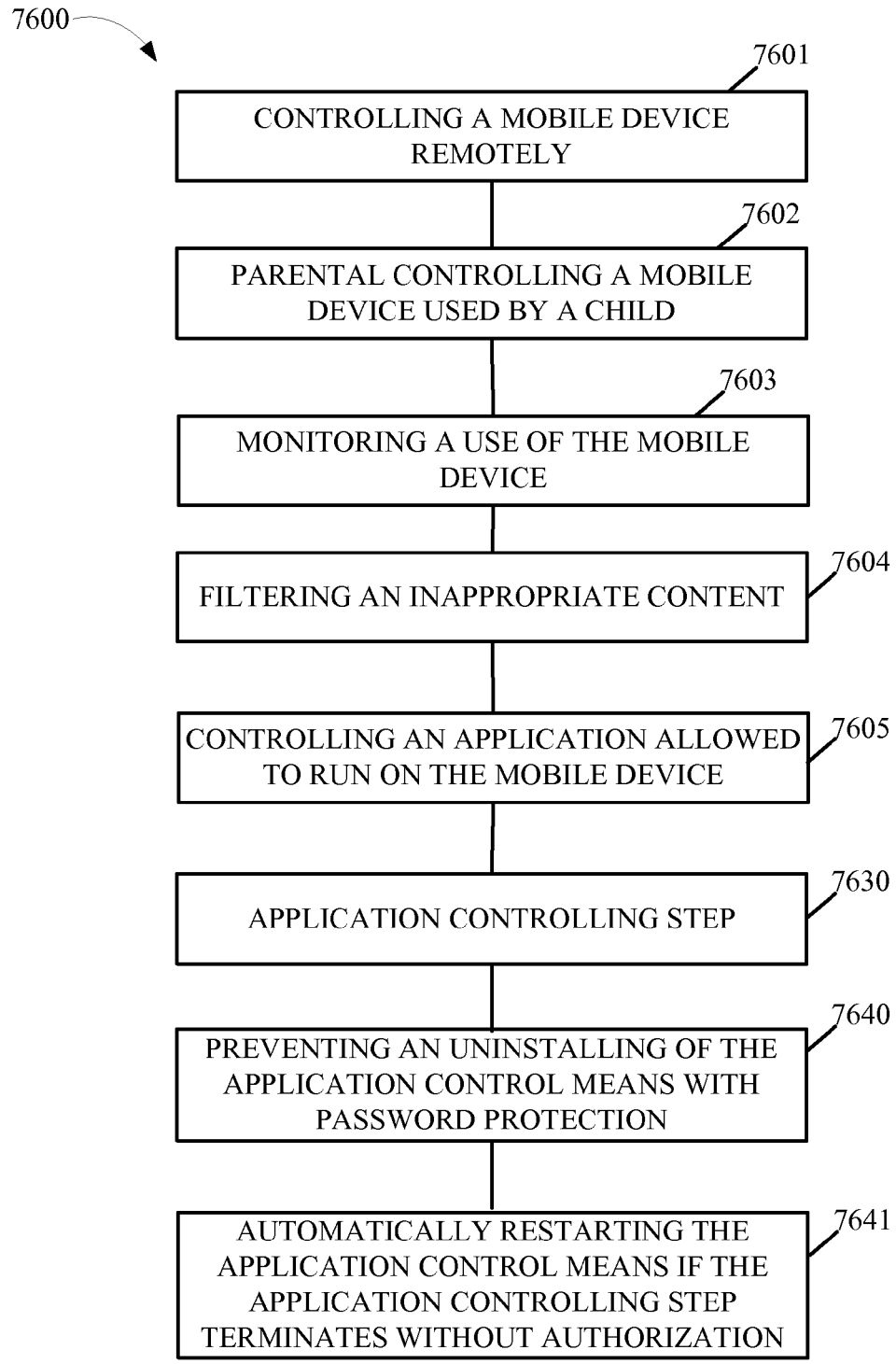
FIG. 76 is an exemplary embodiment of the present invention.

As further exemplified in FIGS. 72 and 76, an exemplary method 7200 or 7600 may include controlling a mobile device remotely at 7601, wherein the controlling step includes parental controlling a mobile device used by a child at 7602, wherein the parental controlling step may include monitoring a use of the mobile device at 7603 and filtering an inappropriate content at 7604, and the method may further include controlling an application allowed to run on the mobile device at 7605, wherein the application controlling step may further include blocking an installation of an unauthorized application at 7231 and authorizing an installation of an application according to a predetermined policy at 7232, wherein the application controlling step 7630 runs on the mobile device at 7605, wherein the application controlling step runs silently on the mobile device and cannot be disabled, and the method may further include preventing an uninstalling of the application control means with password protection at 7640 and may further include automatically restarting the application control means if the application controlling step terminates without authorization at 7641.

Figure 77:
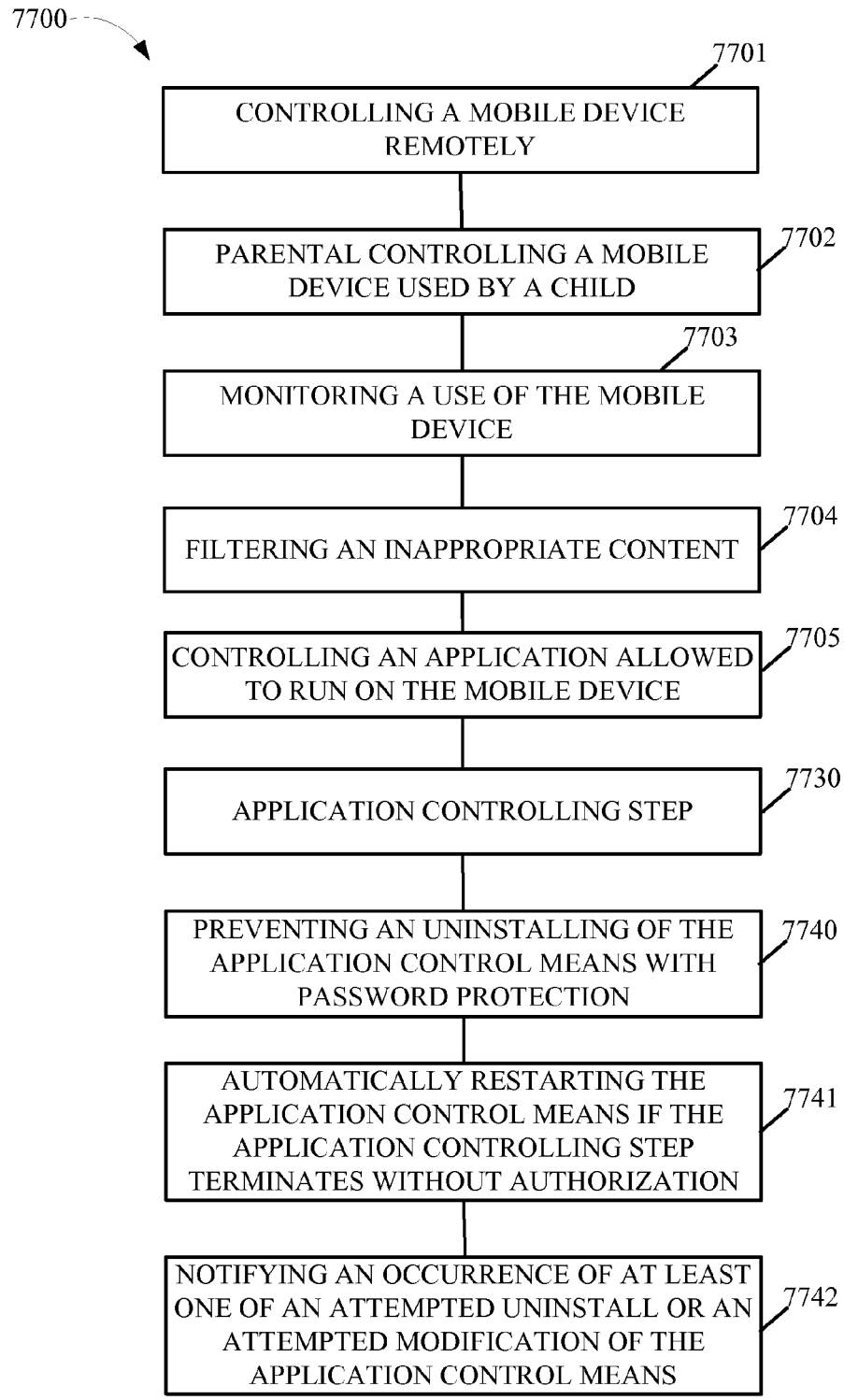
FIG. 77 is an exemplary embodiment of the present invention.

As further exemplified in FIGS. 72 and 77, an exemplary method 7200 or 7700 may include controlling a mobile device remotely at 7701, wherein the controlling step includes parental controlling a mobile device used by a child at 7702, wherein the parental controlling step may include monitoring a use of the mobile device at 7703 and filtering an inappropriate content at 7704, and the method may further include controlling an application allowed to run on the mobile device at 7705, wherein the application controlling step may further include blocking an installation of an unauthorized application at 7231 and authorizing an installation of an application according to a predetermined policy at 7232, wherein the application controlling step 7730 runs on the mobile device at 7705, wherein the application controlling step runs silently on the mobile device and cannot be disabled, and the method may further include preventing an uninstalling of the application control means with password protection at 7640, may further include automatically restarting the application control means if the application controlling step terminates without authorization at 7741, and may further include notifying an occurrence of at least one of an attempted uninstall or an attempted modification of the application control means at 7742.

Figure 78:
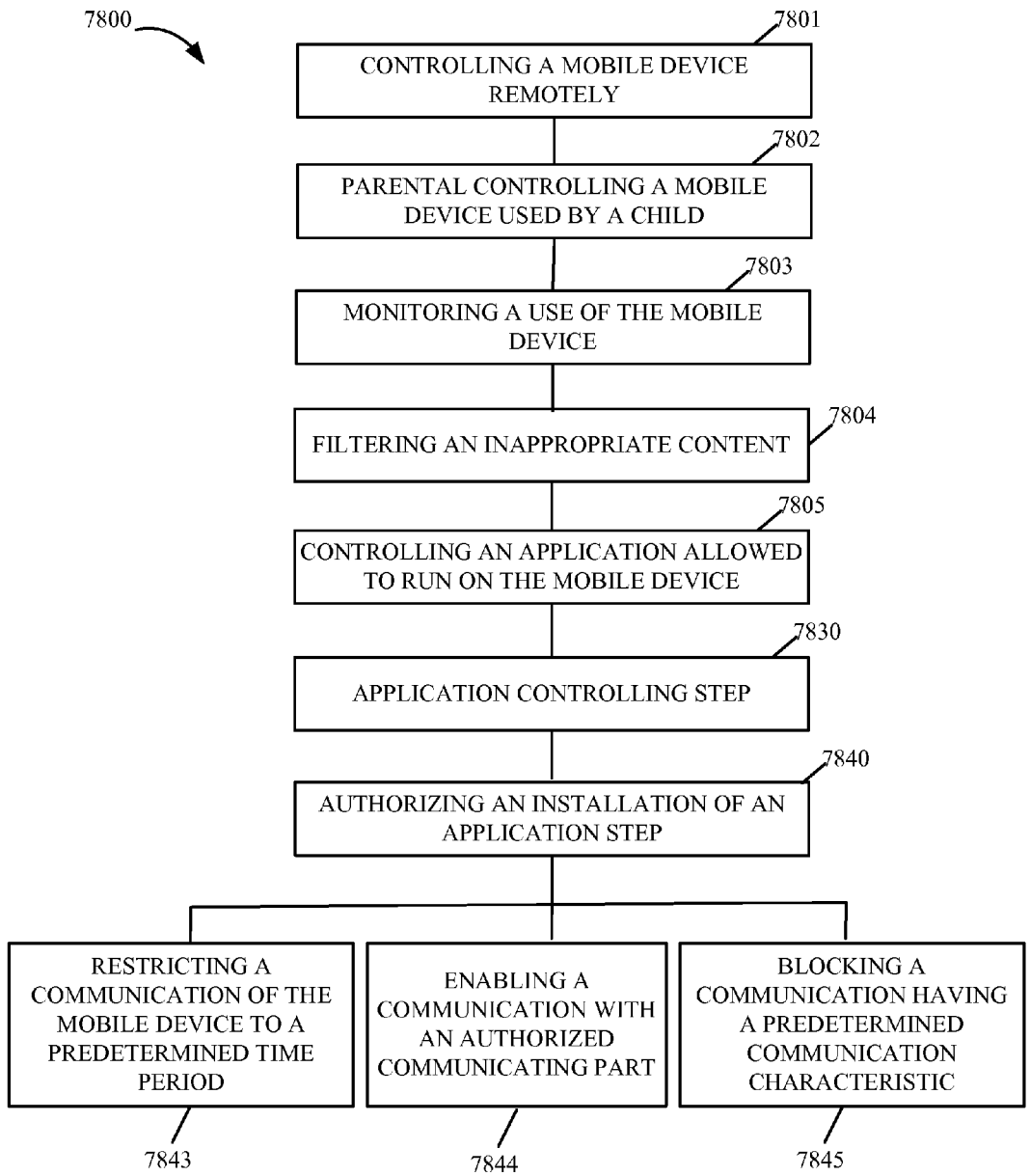
FIG. 78 is an exemplary embodiment of the present invention.

As further exemplified in FIGS. 72 and 78, an exemplary method 7200 or 7800 may include controlling a mobile device remotely at 7801, wherein the controlling step includes parental controlling a mobile device used by a child at 7802, wherein the parental controlling step may include monitoring a use of the mobile device at 7803 and filtering an inappropriate content at 7804, and the method may further include controlling an application allowed to run on the mobile device at 7805, wherein the application controlling step may further include blocking an installation of an unauthorized application at 7231 and authorizing an installation of an application according to a predetermined policy at 7232, wherein the authorizing an installation of an application step may include any combination of the following: restricting a communication of the mobile device to a predetermined time period at 7843; enabling a communication with an authorized communicating party at 7844; and blocking a communication having a predetermined communication characteristic at 7845.

Figure 79:
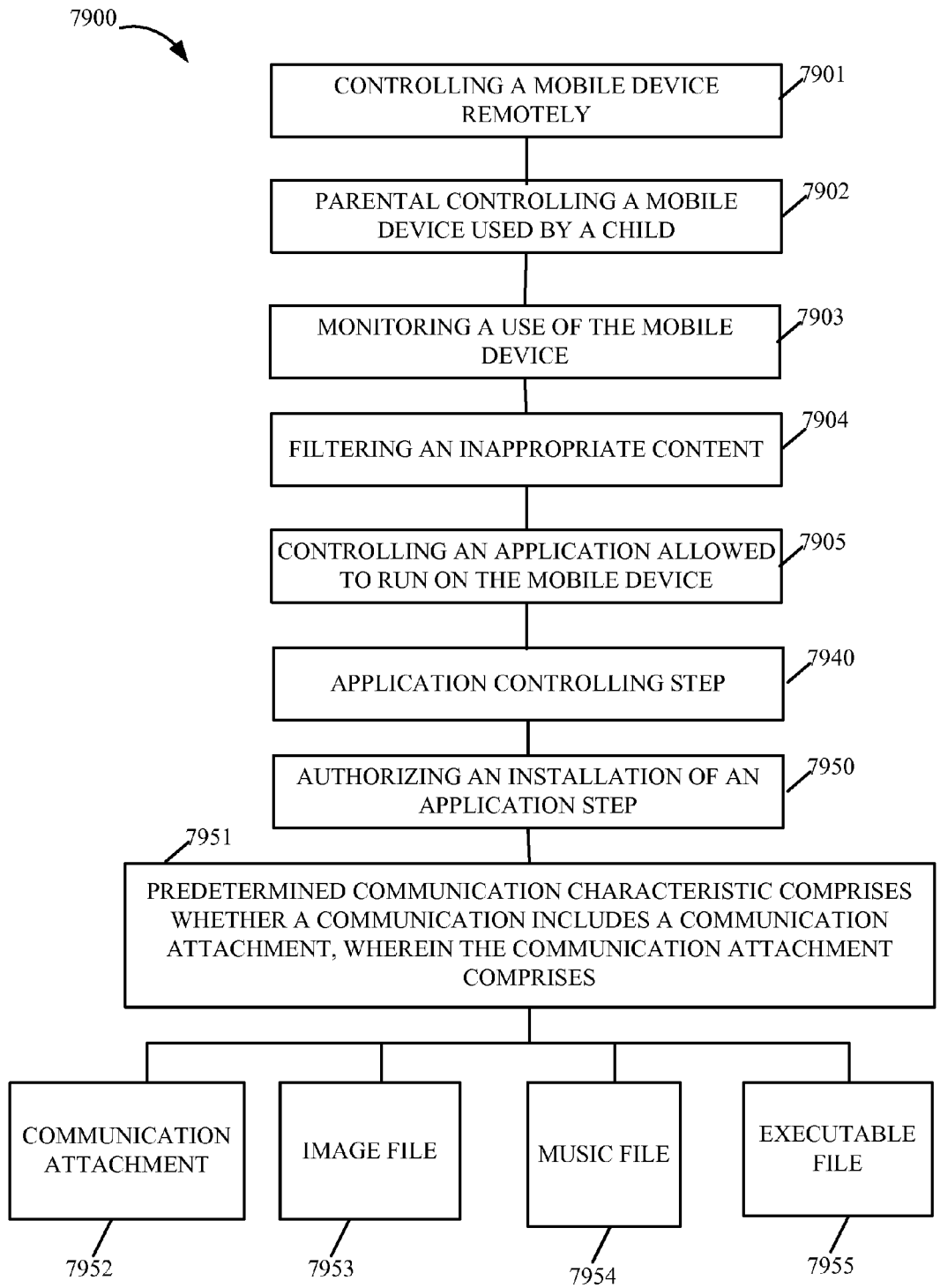
FIG. 79 is an exemplary embodiment of the present invention.

As further exemplified in FIGS. 72, 78, and 79, an exemplary method 7200, 7800, or 7900 may include controlling a mobile device remotely at 7901, wherein the controlling step includes parental controlling a mobile device used by a child at 7902, wherein the parental controlling step may include monitoring a use of the mobile device at 7903 and filtering an inappropriate content at 7904, and the method may further include controlling an application allowed to run on the mobile device at 7905, wherein the application controlling step may further include blocking an installation of an unauthorized application at 7231 and authorizing an installation of an application according to a predetermined policy at 7232, wherein the authorizing an installation of an application step 7840 may include any combination of the following: restricting a communication of the mobile device to a predetermined time period at 7843; enabling a communication with an authorized communicating party at 7844; and blocking a communication having a predetermined communication characteristic at 7945, wherein the predetermined communication characteristic may include whether a communication includes a communication attachment 7942, wherein the communication attachment includes at least one of an image file 7953, a music file 7954, or an executable file 7955.

Figure 80:
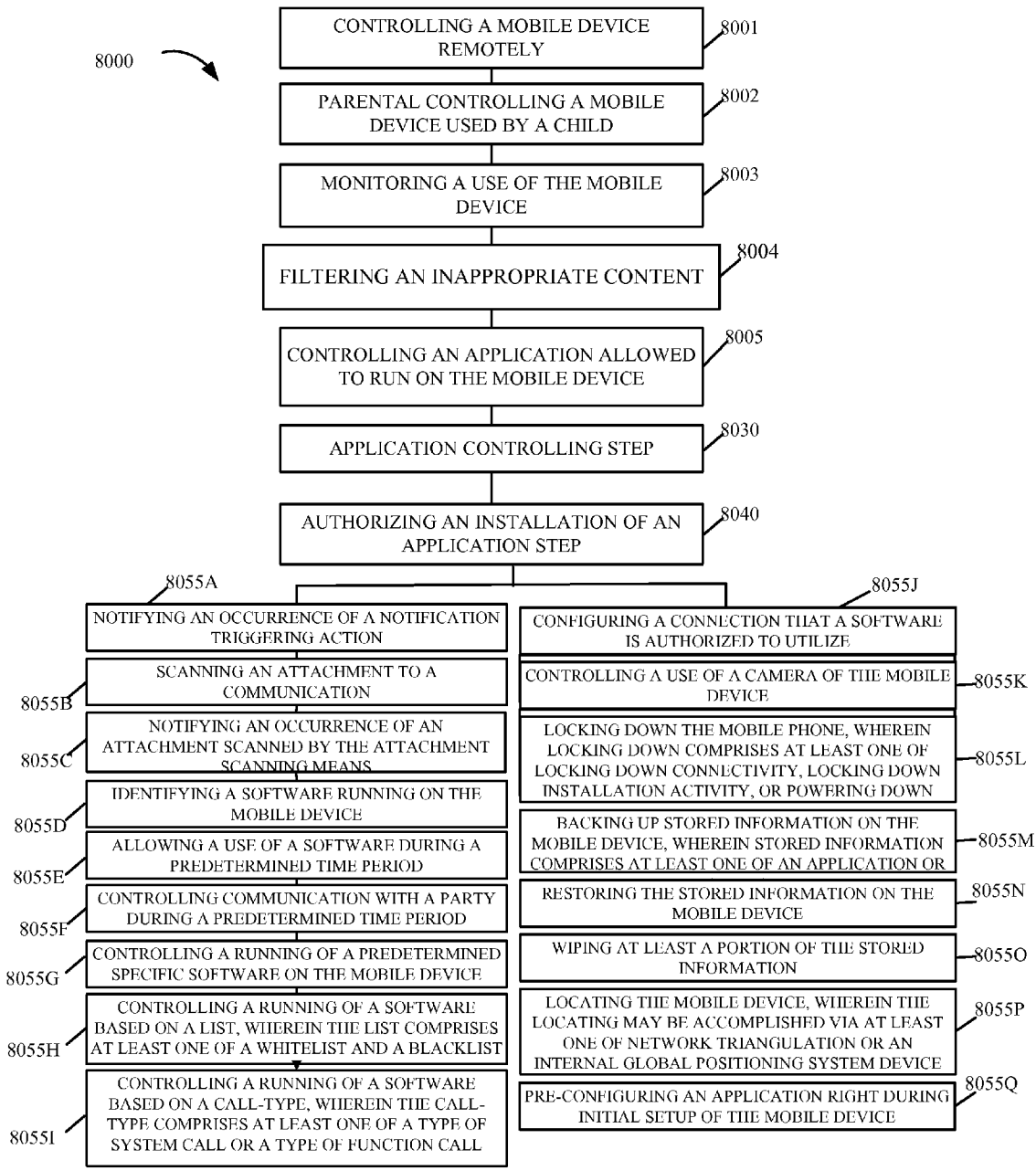
FIG. 80 is an exemplary embodiment of the present invention.

As further exemplified in FIGS. 72 and 80, an exemplary method 7200 or 8000 may include controlling a mobile device remotely at 8001, wherein the controlling step includes parental controlling a mobile device used by a child at 8002, wherein the parental controlling step may include monitoring a use of the mobile device at 8003 and filtering an inappropriate content at 8004, and the method may further include controlling an application allowed to run on the mobile device at 8005, wherein the application controlling step may further include blocking an installation of an unauthorized application at 7231 and authorizing an installation of an application according to a predetermined policy at 7232, and wherein the authorizing an installation of an application step 7232 or 8040 may include any combination of the following: notifying an occurrence of a notification triggering action at 8055A; scanning an attachment to a communication at 8055B; notifying an occurrence of an attachment scanned by the attachment scanning means at 8055C; identifying a software running on the mobile device at 8055D; allowing a use of a software during a predetermined time period at 8055E; controlling communication with a party during a predetermined time period at 8055F; controlling a running of a predetermined specific software on the mobile device at 8055G; controlling a running of a software based on a list, wherein the list includes at least one of a whitelist and a blacklist at 8055H; controlling a running of a software based on a call-type, wherein the call-type includes at least one of a type of system call or a type of function call at 8055I; configuring a connection that a software is authorized to utilize at 8055J; controlling a use of a camera of the mobile device 8055K; locking down the mobile phone, wherein locking down includes at least one of locking down connectivity, locking down installation activity, or powering down at 8055L; backing up stored information on the mobile device, wherein stored information includes at least one of an application or a data at 8055M; restoring the stored information on the mobile device 8055N; wiping at least a portion of the stored information 8055O; locating the mobile device, wherein the locating may be accomplished via at least one of network triangulation or an internal Global Positioning System device at 8055P; and pre-configuring an application right during initial setup of the mobile device at 8055Q.

Figure 81:
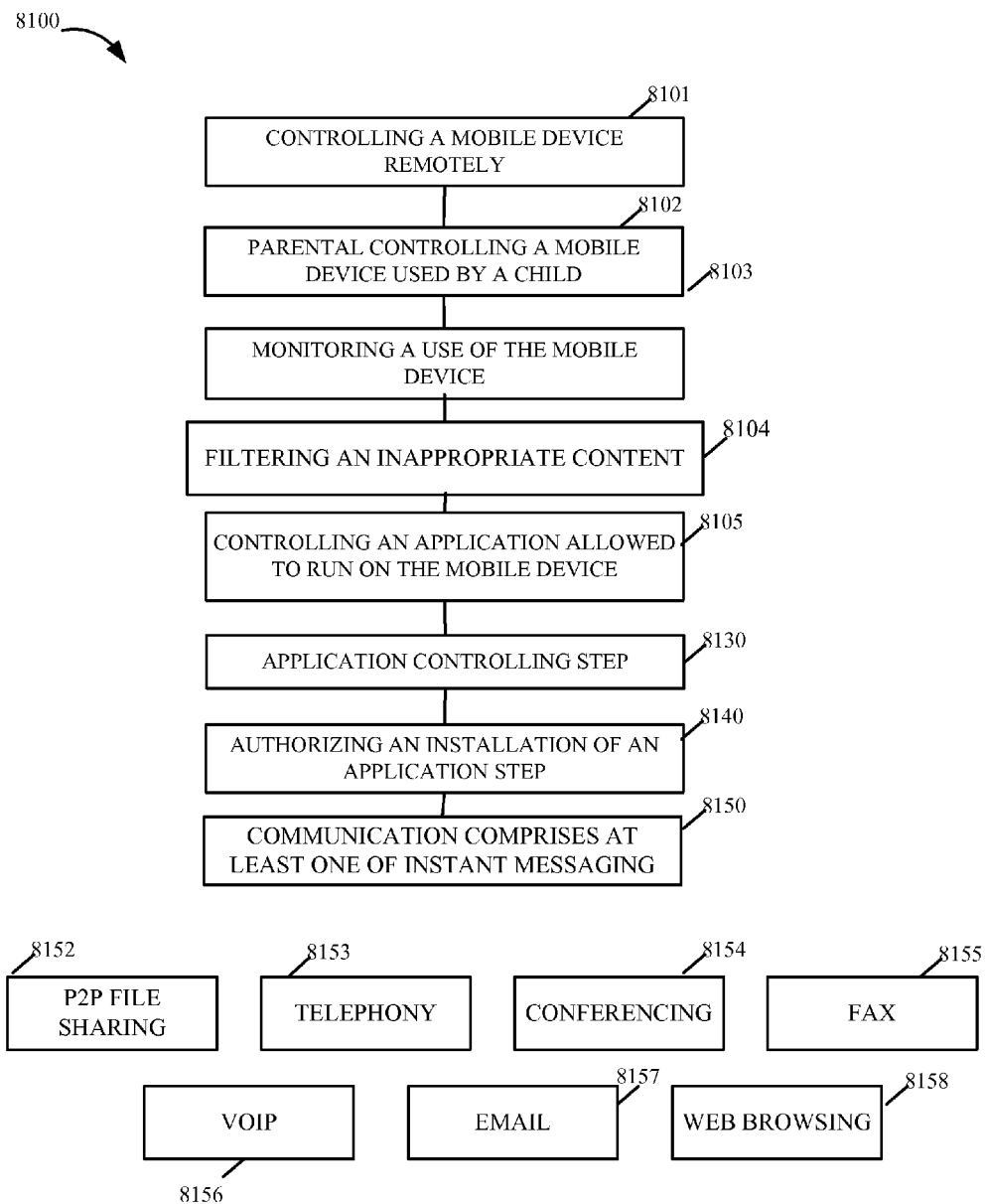
FIG. 81 is an exemplary embodiment of the present invention.

As further exemplified in FIGS. 72, 80 and 81, an exemplary method 7200, 8000 or 8100 may include controlling a mobile device remotely at 8101, wherein the controlling step includes parental controlling a mobile device used by a child at 8102, wherein the parental controlling step may include monitoring a use of the mobile device at 8103 and filtering an inappropriate content at 8004 or 8104, and the method may further include controlling an application allowed to run on the mobile device at 8005 or 8105, wherein the application controlling step may further include blocking an installation of an unauthorized application at 7231 and authorizing an installation of an application according to a predetermined policy at 7232, and wherein the authorizing an installation of an application step 7232 or 8140 may include any combination of the following: notifying an occurrence of a notification triggering action at 8055A; scanning an attachment to a communication at 8055B; notifying an occurrence of an attachment scanned by the attachment scanning means at 8055C; identifying a software running on the mobile device at 8055D; allowing a use of a software during a predetermined time period at 8055E; controlling communication with a party during a predetermined time period at 8055F; controlling a running of a predetermined specific software on the mobile device at 8055G; controlling a running of a software based on a list, wherein the list includes at least one of a whitelist and a blacklist at 8055H; controlling a running of a software based on a call-type, wherein the call-type includes at least one of a type of system call or a type of function call at 8055I; configuring a connection that a software is authorized to utilize at 8055J; controlling a use of a camera of the mobile device 8055K; locking down the mobile phone, wherein locking down includes at least one of locking down connectivity, locking down installation activity, or powering down at 8055L; backing up stored information on the mobile device, wherein stored information includes at least one of an application or a data at 8055M; restoring the stored information on the mobile device 8055N; wiping at least a portion of the stored information 8055O; locating the mobile device, wherein the locating may be accomplished via at least one of network triangulation or an internal Global Positioning System device at 8055P; and pre-configuring an application right during initial setup of the mobile device at 8055Q, wherein a communication may include at least one of instant messaging 8150. Other types of information may be including, such as, just as an example, P2P file sharing 8152, telephony 8153, conferencing 8154, fax 8155, VoIP 8156, email 8157, or web browsing 8158.

Figure 82:
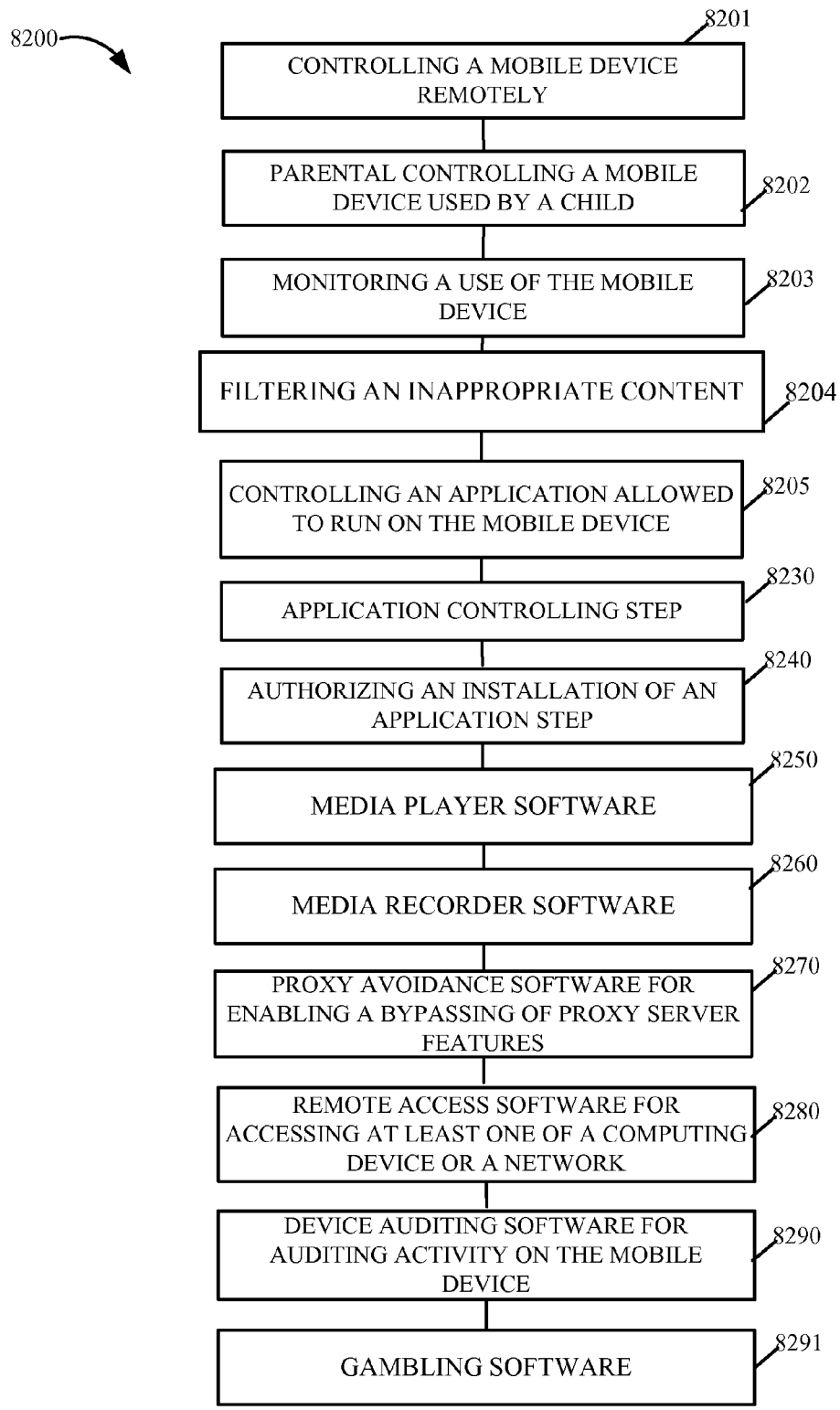
FIG. 82 is an exemplary embodiment of the present invention.
Figure 83:
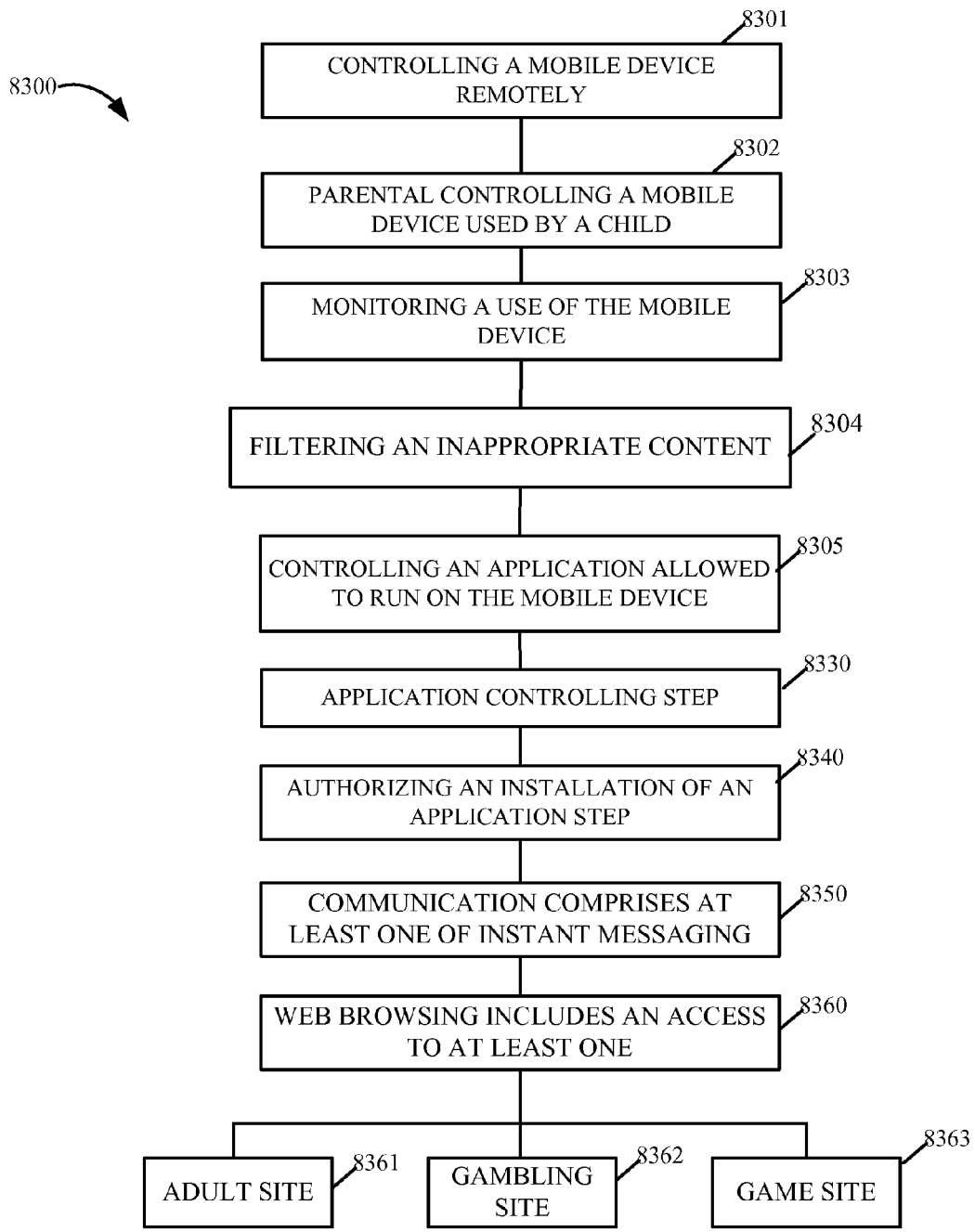
FIG. 83 is an exemplary embodiment of the present invention.

As further exemplified in FIGS. 72, 80 and 82, an exemplary method 7200, 8000 or 8200 may include controlling a mobile device remotely at 8201, wherein the controlling step includes parental controlling a mobile device used by a child at 8202, wherein the parental controlling step may include monitoring a use of the mobile device at 8203 and filtering an inappropriate content at 8204, and the method may further include controlling an application allowed to run on the mobile device at 8005 or 8205, wherein the application controlling step may further include blocking an installation of an unauthorized application at 7231 and authorizing an installation of an application according to a predetermined policy at 7232, and wherein the authorizing an installation of an application step 7232 and 8240 may include any combination of the following: notifying an occurrence of a notification triggering action at 8055A; scanning an attachment to a communication at 8055B; notifying an occurrence of an attachment scanned by the attachment scanning means at 8055C; identifying a software running on the mobile device at 8055D; allowing a use of a software during a predetermined time period at 8055E; controlling communication with a party during a predetermined time period at 8055F; controlling a running of a predetermined specific software on the mobile device at 8055G; controlling a running of a software based on a list, wherein the list includes at least one of a whitelist and a blacklist at 8055H; controlling a running of a software based on a call-type, wherein the call-type includes at least one of a type of system call or a type of function call at 8055I; configuring a connection that a software is authorized to utilize at 8055J; controlling a use of a camera of the mobile device 8055K; locking down the mobile phone, wherein locking down includes at least one of locking down connectivity, locking down installation activity, or powering down at 8055L; backing up stored information on the mobile device, wherein stored information includes at least one of an application or a data at 8055M; restoring the stored information on the mobile device 8055N; wiping at least a portion of the stored information 8055O; locating the mobile device, wherein the locating may be accomplished via at least one of network triangulation or an internal Global Positioning System device at 8055P; and pre-configuring an application right during initial setup of the mobile device at 8055Q, and wherein a software may include at least one of media player software 8250, media recorder software 8260, proxy avoidance software for enabling a bypassing of proxy server features 8270, remote access software for accessing at least one of a computing device or a network 8280, device auditing software for auditing activity on the mobile device 8290, or gambling software 8291.

As further exemplified in FIGS. 72, 80, 81, and 83, an exemplary method 7200, 8000, 8100, or 8300 may include controlling a mobile device remotely at 8301, wherein the controlling step includes parental controlling a mobile device used by a child at 8302, wherein the parental controlling step may include monitoring a use of the mobile device at 8303 and filtering an inappropriate content at 8004 or 8304, and the method may further include controlling an application allowed to run on the mobile device at 8005 or 8305, wherein the application controlling step may further include blocking an installation of an unauthorized application at 7231 and authorizing an installation of an application according to a predetermined policy, and wherein the authorizing an installation of an application step 7232 may include any combination of the following: notifying an occurrence of a notification triggering action at 8055A; scanning an attachment to a communication at 8055B; notifying an occurrence of an attachment scanned by the attachment scanning means at 8055C;

identifying a software running on the mobile device at 8055D; allowing a use of a software during a predetermined time period at 8055E; controlling communication with a party during a predetermined time period at 8055F; controlling a running of a predetermined specific software on the mobile device at 8055G; controlling a running of a software based on a list, wherein the list includes at least one of a whitelist and a blacklist at 8055H; controlling a running of a software based on a call-type, wherein the call-type includes at least one of a type of system call or a type of function call at 8055I; configuring a connection that a software is authorized to utilize at 8055J; controlling a use of a camera of the mobile device 8055K; locking down the mobile phone, wherein locking down includes at least one of locking down connectivity, locking down installation activity, or powering down at 8055L; backing up stored information on the mobile device, wherein stored information includes at least one of an application or a data at 8055M; restoring the stored information on the mobile device 8055N; wiping at least a portion of the stored information 8055O; locating the mobile device, wherein the locating may be accomplished via at least one of network triangulation or an internal Global Positioning System device at 8055P; and pre-configuring an application right during initial setup of the mobile device at 8055Q, wherein a communication may include at least one of instant messaging 8150. Other types of information may be including, such as, just as an example, P2P file sharing 8152, telephony 8153, conferencing 8154, fax 8155, VoIP 8156, email 8157, or web browsing 8158, wherein the web browsing may include at 8360 an access to at least one of an adult site 8361, a gambling site 8362, or a game site 8363.

Figure 84:
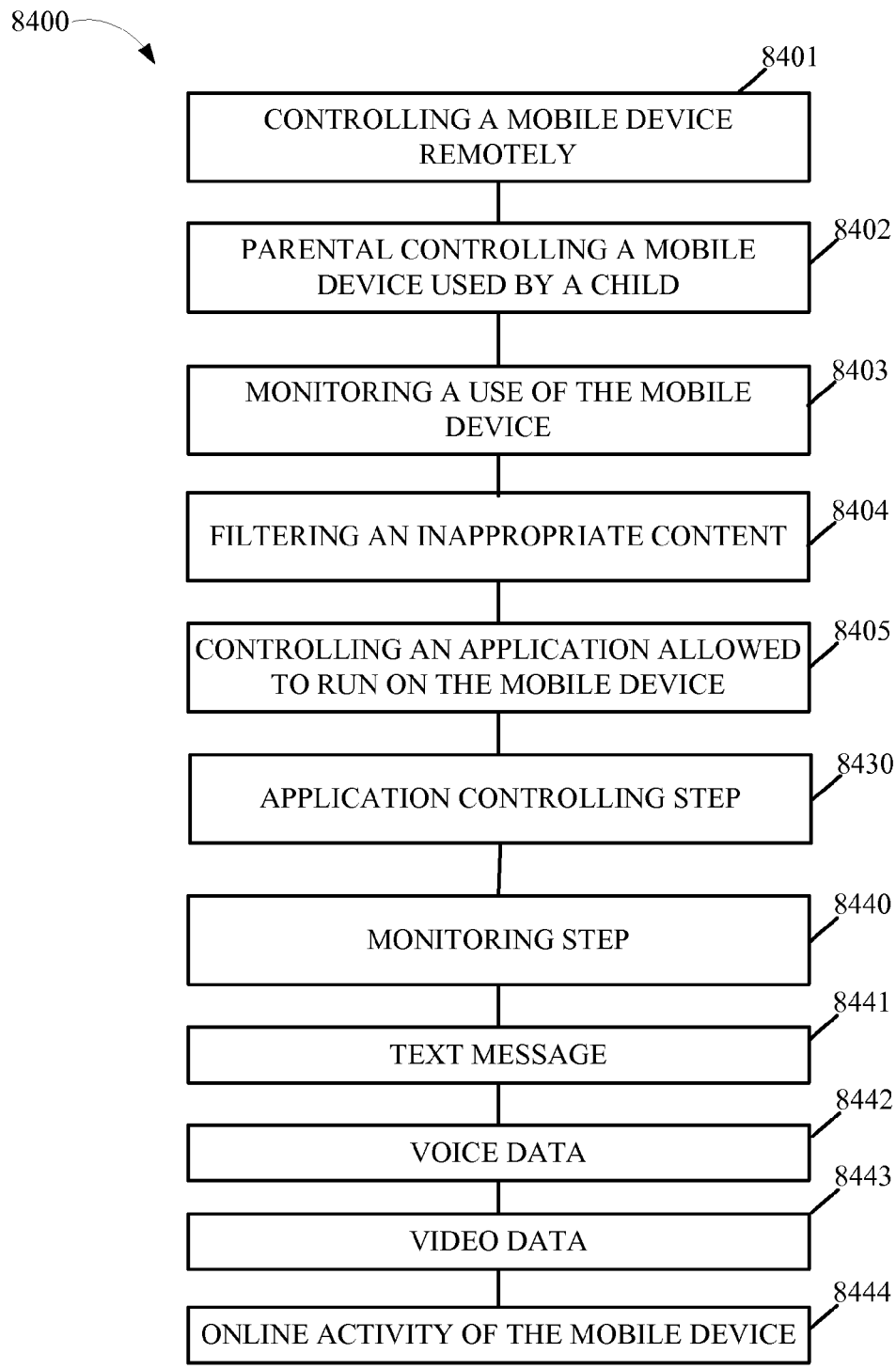
FIG. 84 is an exemplary embodiment of the present invention.

As further exemplified in FIG. 84, an exemplary method 8400 may include controlling a mobile device remotely at 8401, wherein the controlling step includes parental controlling a mobile device used by a child at 8402, wherein the parental controlling step may include monitoring a use of the mobile device at 8403 and filtering an inappropriate content at 8404, and the method may further include controlling an application allowed to run on the mobile device at 8405, and wherein the monitoring step 8440 may further include at least one of a text message 8441, voice data 8442, video data 8443, and online activity 8444 of the mobile device.

Figure 85:
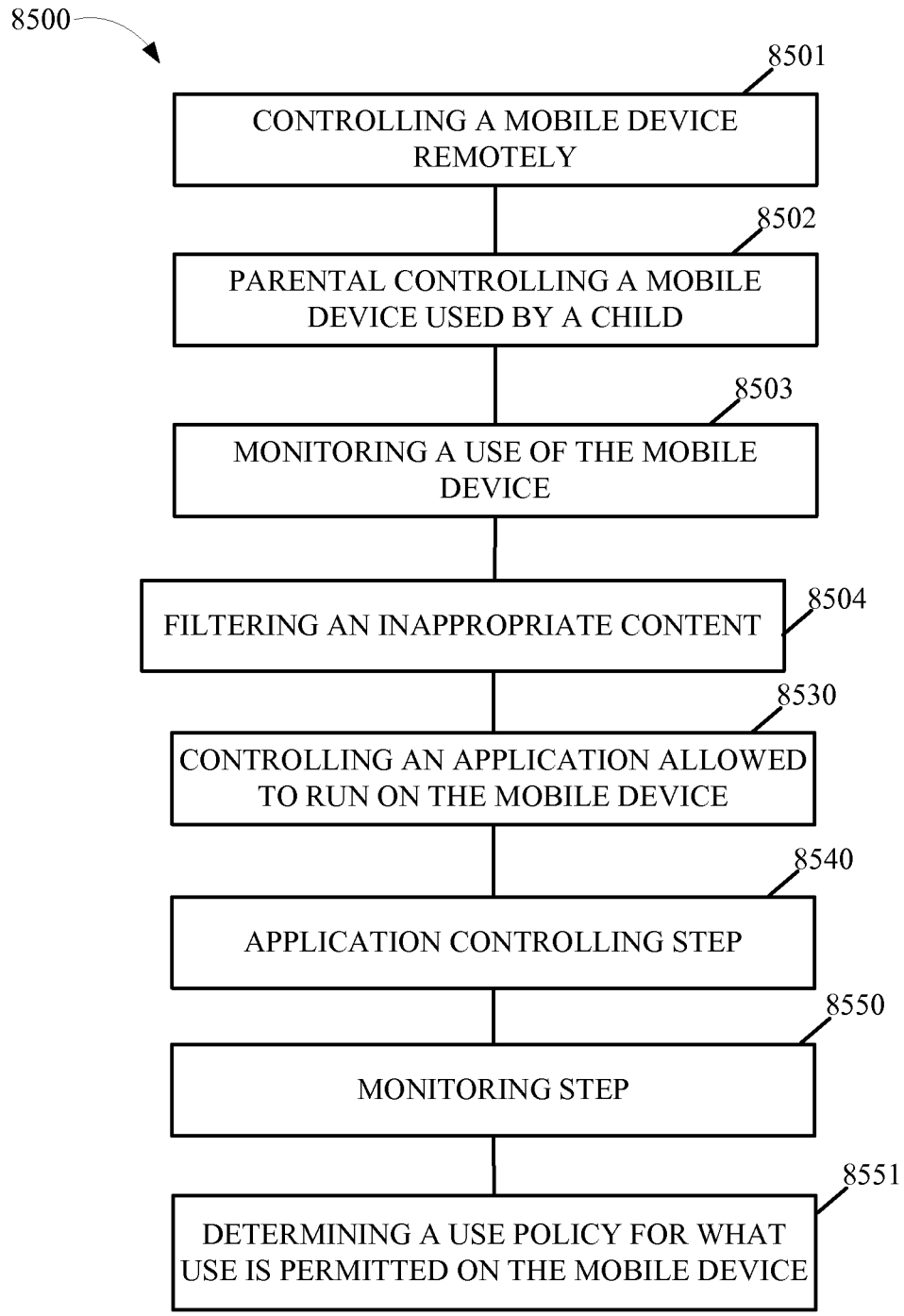
FIG. 85 is an exemplary embodiment of the present invention.

As further exemplified in FIG. 85, an exemplary method 8500 may include controlling a mobile device remotely at 8501, wherein the controlling step includes parental controlling a mobile device used by a child at 8502, wherein the parental controlling step may include monitoring a use of the mobile device at 8503 and filtering an inappropriate content at 8504, and the method may further include controlling an application allowed to run on the mobile device at 8505, and wherein the monitoring step 8550 may further include determining a use policy for what use is permitted on the mobile device at 8551.

Figure 86:
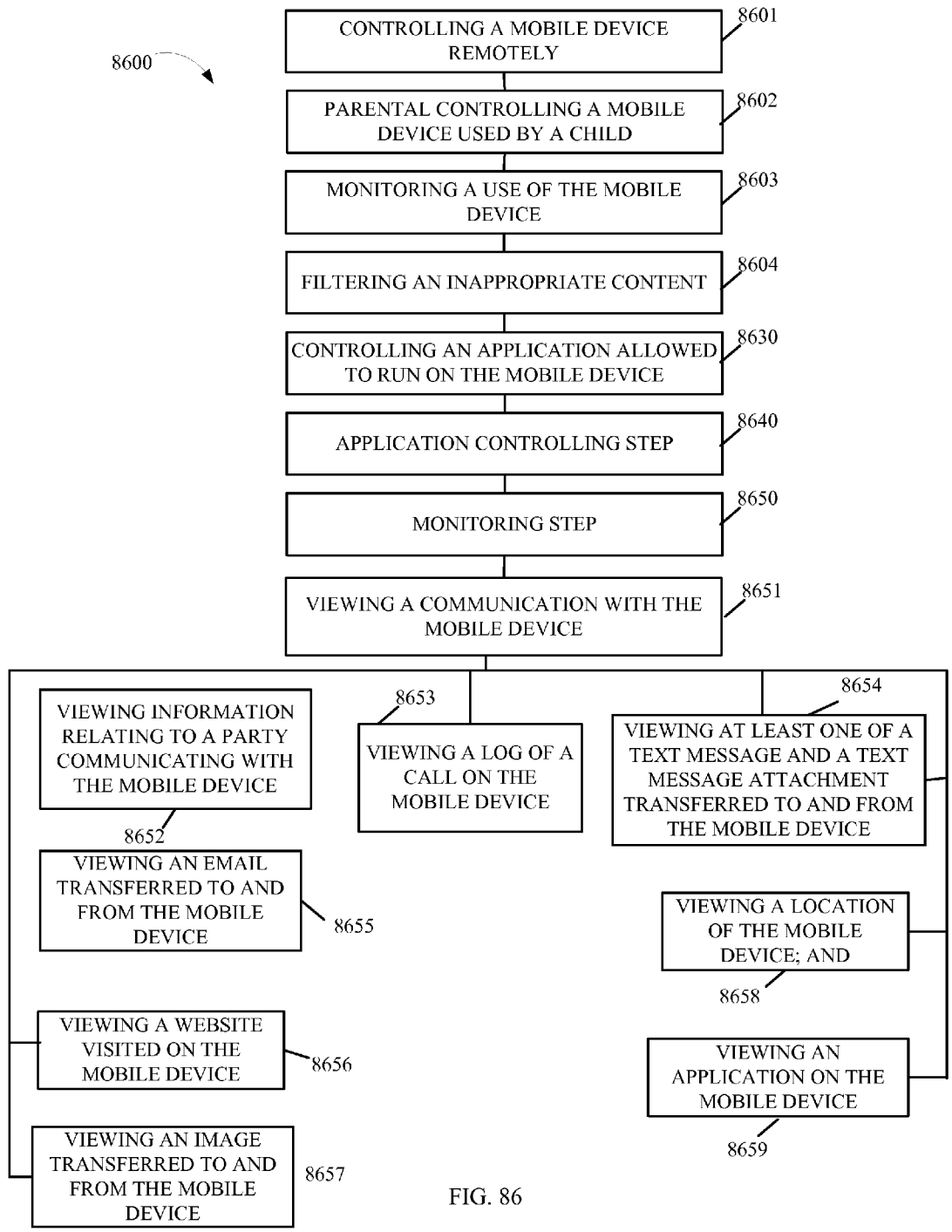
FIG. 86 is an exemplary embodiment of the present invention.

As further exemplified in FIG. 86, an exemplary method 8600 may include controlling a mobile device remotely at 8601, wherein the controlling step includes parental controlling a mobile device used by a child at 8602, wherein the parental controlling step may include monitoring a use of the mobile device at 8603 and filtering an inappropriate content at 8604, and the method may further include controlling an application allowed to run on the mobile device at 8630, and wherein the monitoring step 8650 may further include determining a use policy for what use is permitted on the mobile device and may further include any combination of the following: viewing a communication with the mobile device at 8651; viewing information relating to a party communicating with the mobile device at 8652; viewing a log of a call on the mobile device 8653; viewing at least one of a text message and a text message attachment transferred to and from the mobile device at 8654; viewing an email transferred to and from the mobile device at 8655; viewing a website visited on the mobile device at 8656; viewing an image transferred to and from the mobile device at 8657; viewing a location of the mobile device 8658; and viewing an application on the mobile device 8659.

Figure 87:
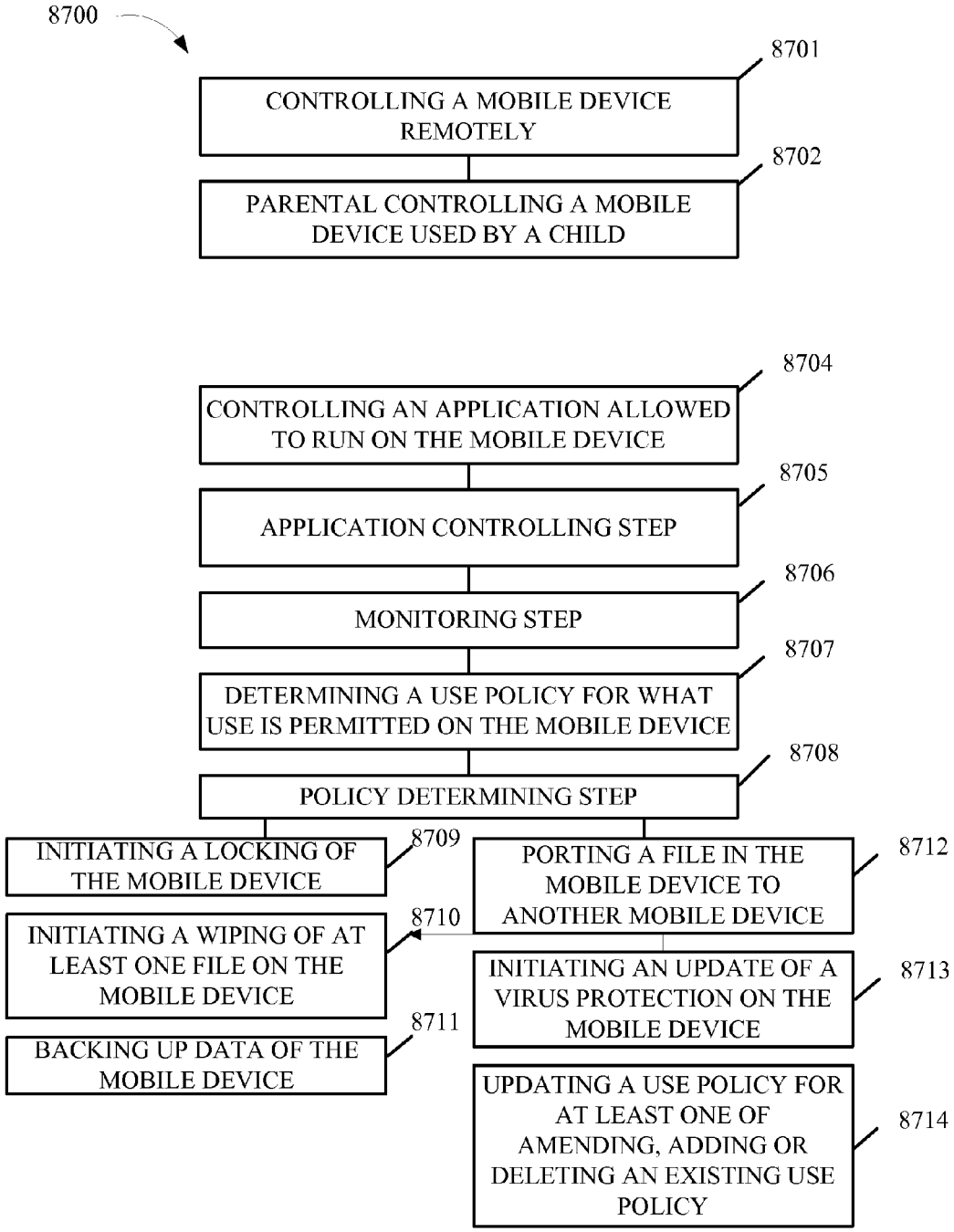
FIG. 87 is an exemplary embodiment of the present invention.

As further exemplified in FIG. 87, an exemplary method 8700 may include controlling a mobile device remotely at 8701, wherein the controlling step includes parental controlling a mobile device used by a child at 8702, wherein the parental controlling step may include monitoring a use of the mobile device at 8703 and filtering an inappropriate content at 8704, and the method may further include controlling an application allowed to run on the mobile device at 8705, wherein the monitoring step 8706 may further include determining a use policy for what use is permitted on the mobile device at 8708, and wherein the use policy determining step may further include any combination of the following: initiating a locking of the mobile device at 8709; initiating a wiping of at least one file on the mobile device at 8710; backing up data of the mobile device at 8711; porting a file in the mobile device to another mobile device at 8712; initiating an update of a virus protection on the mobile device at 8713; and updating a use policy for at least one of amending, adding or deleting an existing use policy at 8714.

Figure 88:
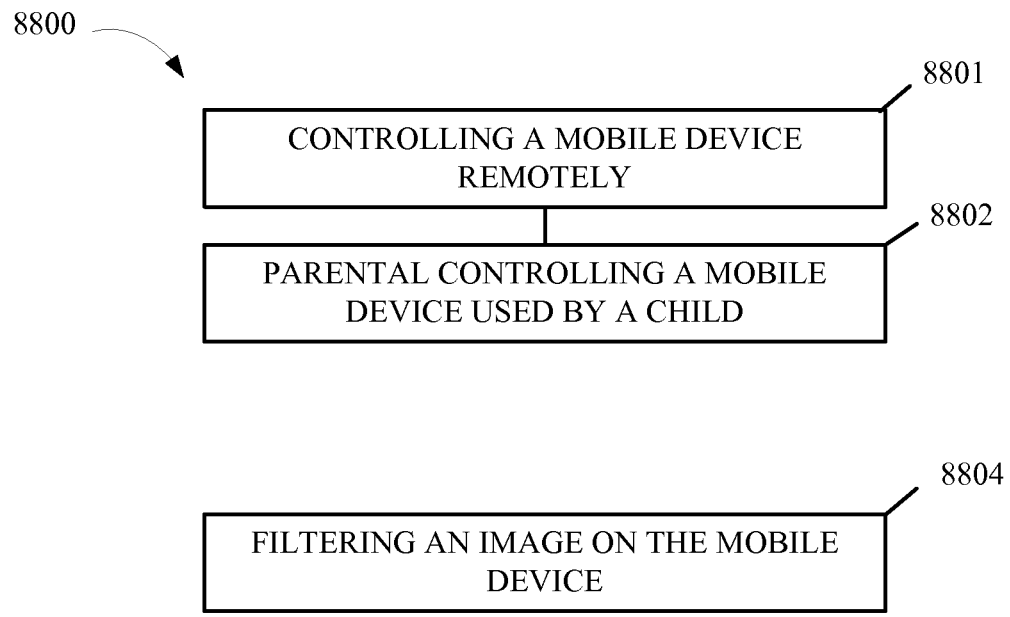
FIG. 88 is an exemplary embodiment of the present invention.

As further exemplified in FIG. 88 an exemplary method 8800 may include controlling a mobile device remotely at 8801, wherein the controlling step includes parental controlling a mobile device used by a child at 8802, and wherein the parental controlling step may include monitoring a use of the mobile device at 8803 and filtering an image on the mobile device at 6604.

Figure 89:
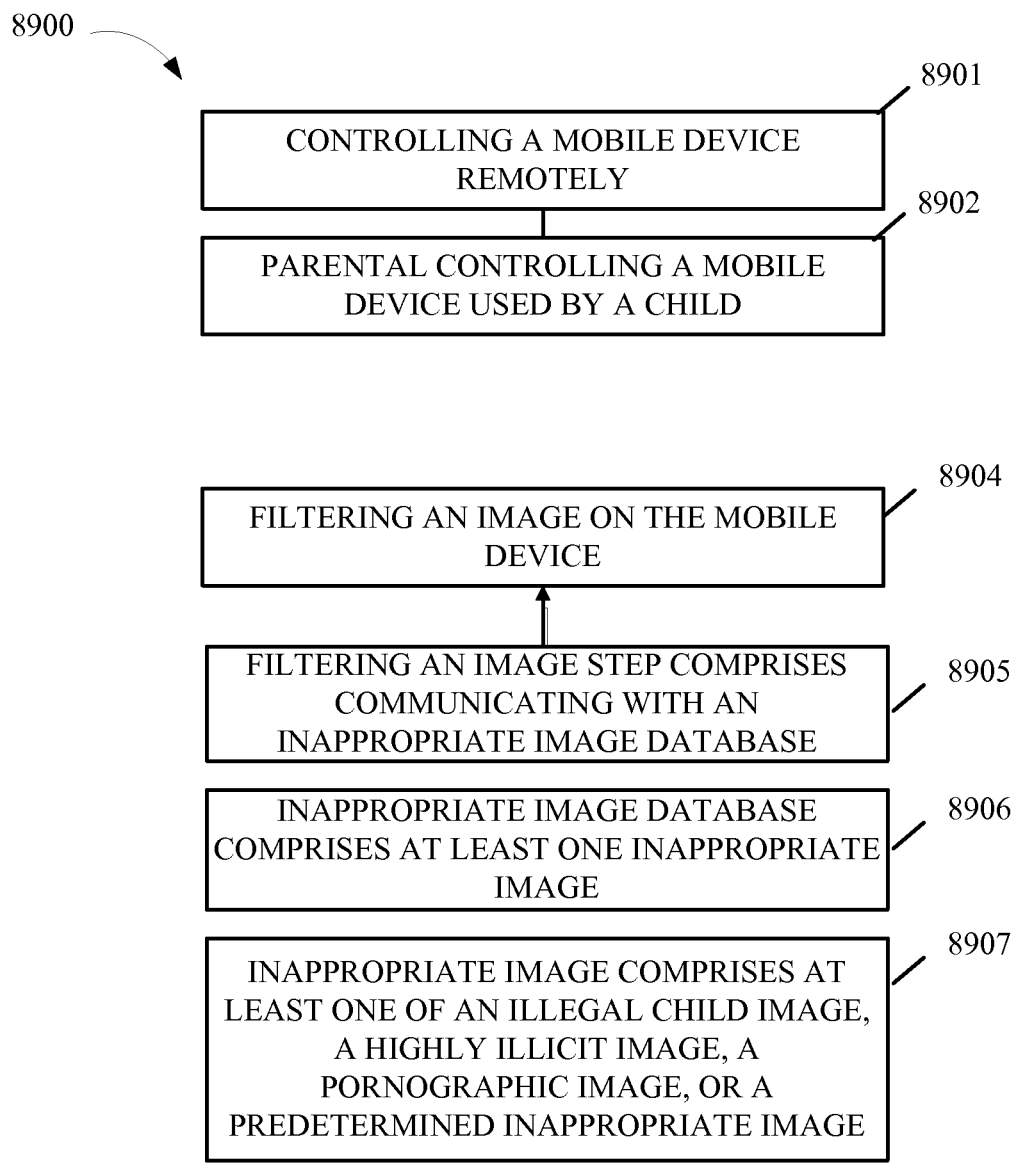
FIG. 89 is an exemplary embodiment of the present invention.

As further exemplified in FIG. 89 an exemplary method 8900 may include controlling a mobile device remotely at 8901, wherein the controlling step includes parental controlling a mobile device used by a child at 8902, and wherein the parental controlling step may include monitoring a use of the mobile device at 8903 and filtering an image on the mobile device at 8904, wherein the filtering an image step may include communicating with an inappropriate image database at 8905, wherein the inappropriate image database may include at least one inappropriate image, wherein the inappropriate image may include at 8907 at least one of an illegal child image, a highly illicit image, a pornographic image, or a predetermined inappropriate image.

Figure 90:
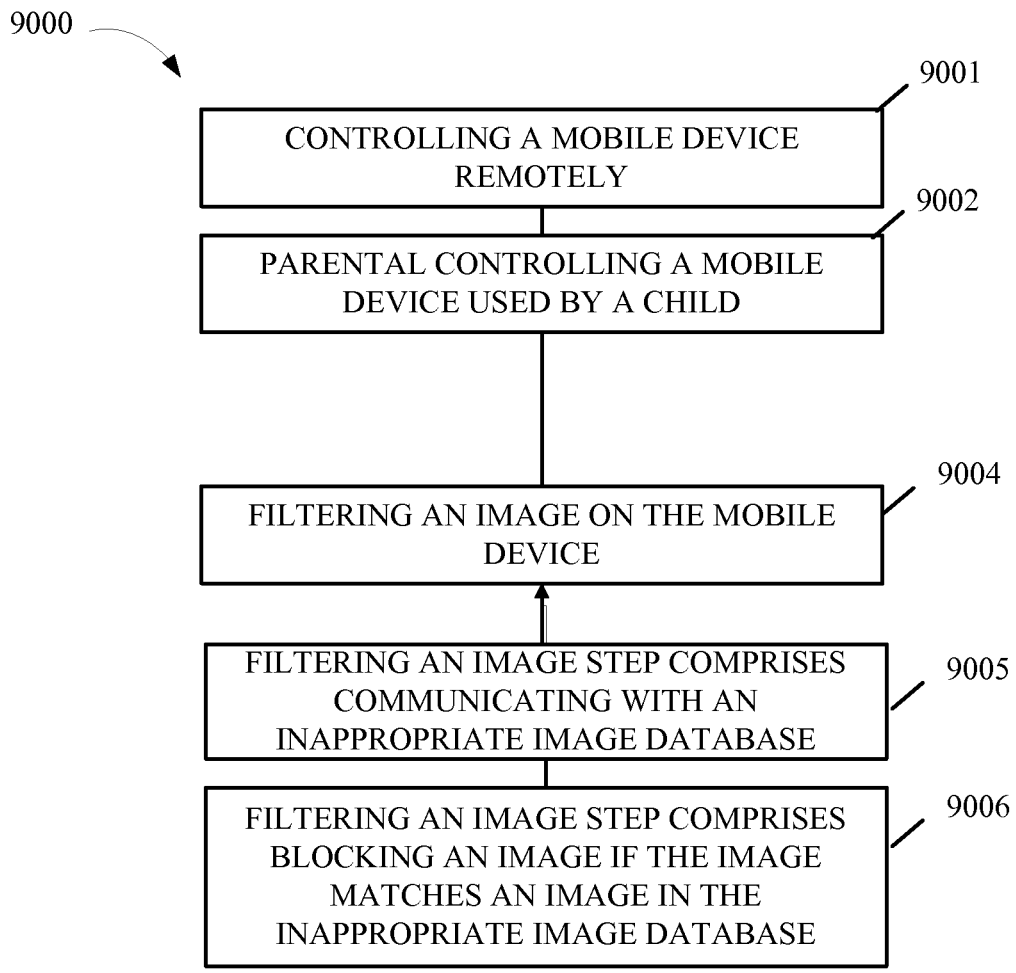
FIG. 90 is an exemplary embodiment of the present invention.

As further exemplified in FIGS. 89 and 90, an exemplary method 8900 and 9000 may include controlling a mobile device remotely at 9001, wherein the controlling step includes parental controlling a mobile device used by a child at 9002, and wherein the parental controlling step may include monitoring a use of the mobile device at 8903 and filtering an image on the mobile device at 8904 or 9002, wherein the filtering an image step may include communicating with an inappropriate image database at 8905, wherein the inappropriate image database may include at least one inappropriate image, wherein the inappropriate image may include at 8907 at least one of an illegal child image, a highly illicit image, a pornographic image, or a predetermined inappropriate image, and wherein the filtering an image step may further include blocking an image that matches an image in the inappropriate image database at 9006.

Figure 91:
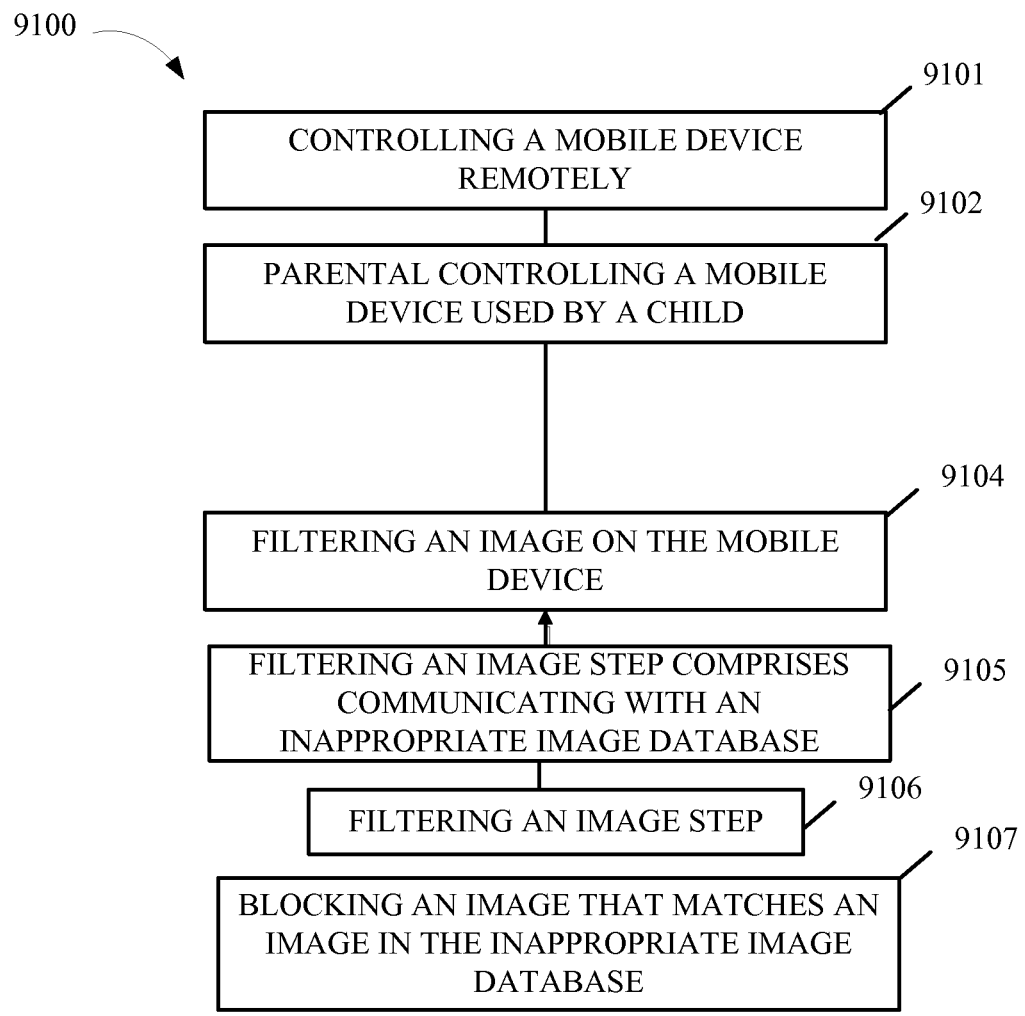
FIG. 91 is an exemplary embodiment of the present invention.

As further exemplified in FIGS. 89 and 91, an exemplary method 8900 and 9100 may include controlling a mobile device remotely at 9101, wherein the controlling step includes parental controlling a mobile device used by a child at 9102, and wherein the parental controlling step may include monitoring a use of the mobile device at 8903 and filtering an image on the mobile device at 8904 or 9102, wherein the filtering an image step may include communicating with an inappropriate image database at 8905, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database at 9107.

Figure 92:
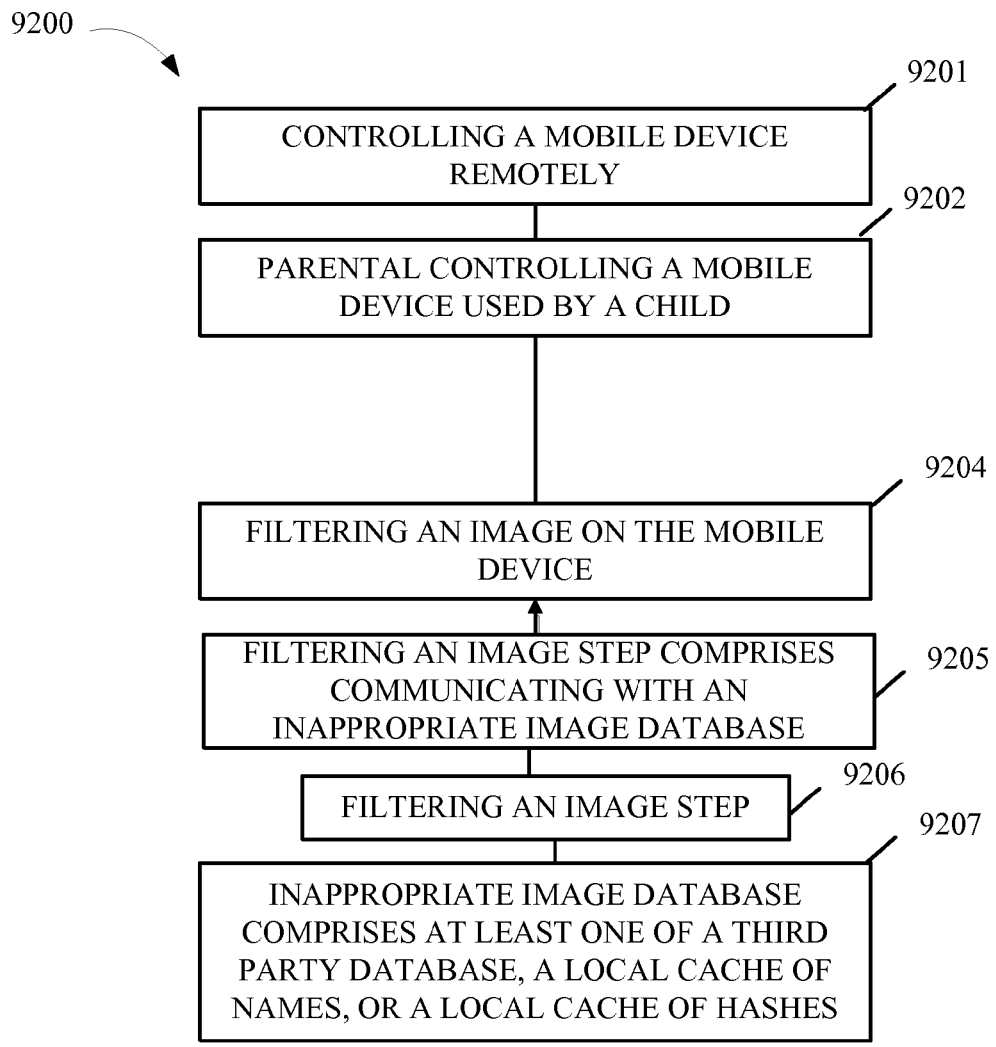
FIG. 92 is an exemplary embodiment of the present invention.
Figure 93:
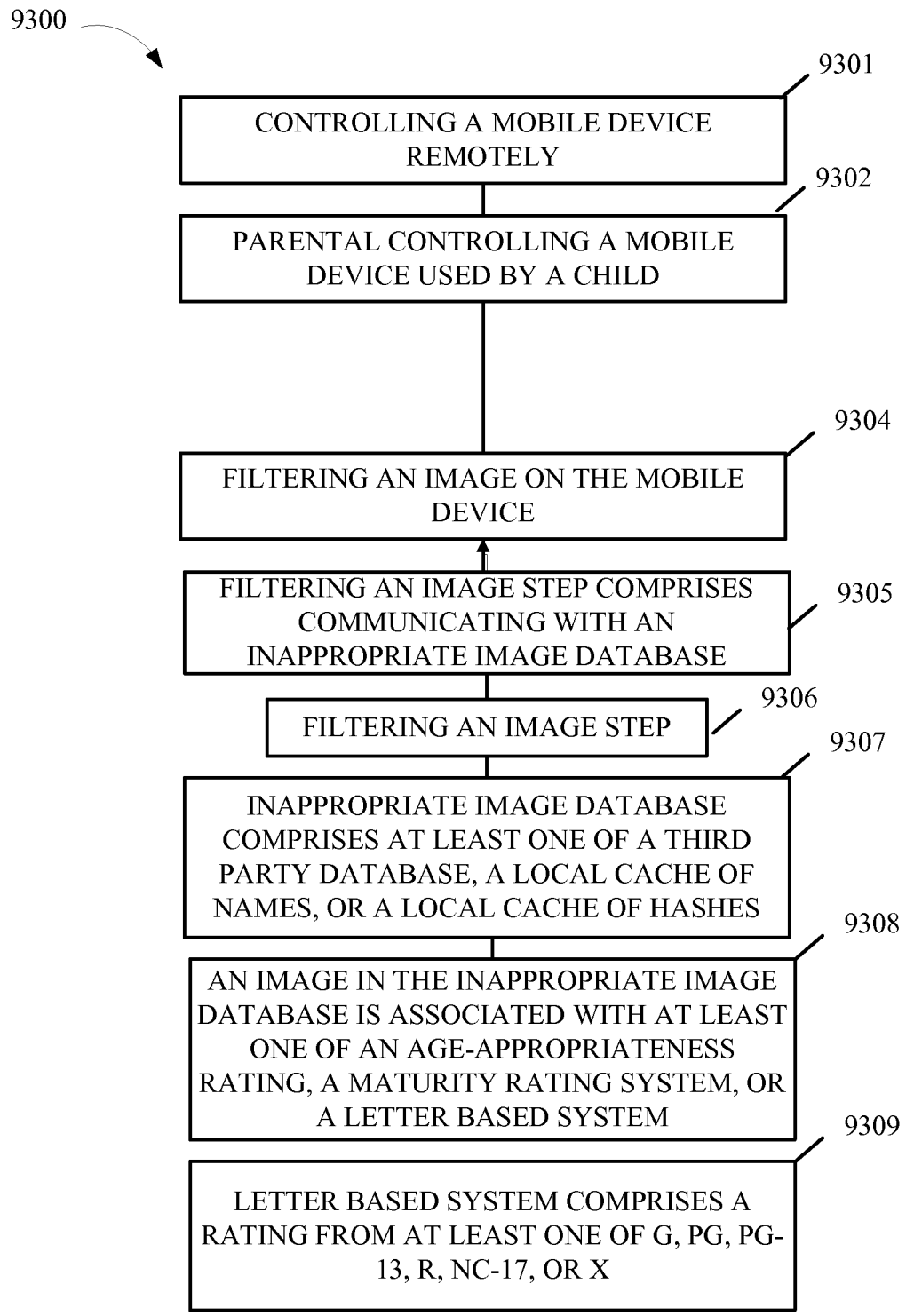
FIG. 93 is an exemplary embodiment of the present invention.

As further exemplified in FIGS. 89, 91, and 92, an exemplary method 8900, 9100 or 9200 may include controlling a mobile device remotely at 9201, wherein the controlling step includes parental controlling a mobile device used by a child at 9202, and wherein the parental controlling step may include monitoring a use of the mobile device at 8903 and filtering an image on the mobile device at 8904 or 9204, wherein the filtering an image step may include communicating with an inappropriate image database at 8905 or 9205, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database, wherein the filtering an image step further includes blocking an image that matches an image in the inappropriate image database, and wherein the inappropriate image database includes at least one of a third party database, a local cache of names, or a local cache of hashes at 9207.

As further exemplified in FIGS. 89, 91, 92, and 93 an exemplary method 8900, 9100, 9200, or 9300 may include controlling a mobile device remotely at 9301, wherein the controlling step includes parental controlling a mobile device used by a child at 9302, and wherein the parental controlling step may include monitoring a use of the mobile device at 8903 and filtering an image on the mobile device at 8904 or 9304, wherein the filtering an image step may include communicating with an inappropriate image database at 8905 or 9305, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database, wherein the filtering an image step further includes blocking an image that matches an image in the inappropriate image database, and wherein the inappropriate image database includes at least one of a third party database, a local cache of names, or a local cache of hashes at 9207, and wherein an image in the inappropriate image database is associated with at least one of an age-appropriateness rating, a maturity rating system, or a letter based system, wherein the letter based system includes a rating from at least one of G, PG, PG-13, R, NC-17, or X at 9309.

Figure 94:
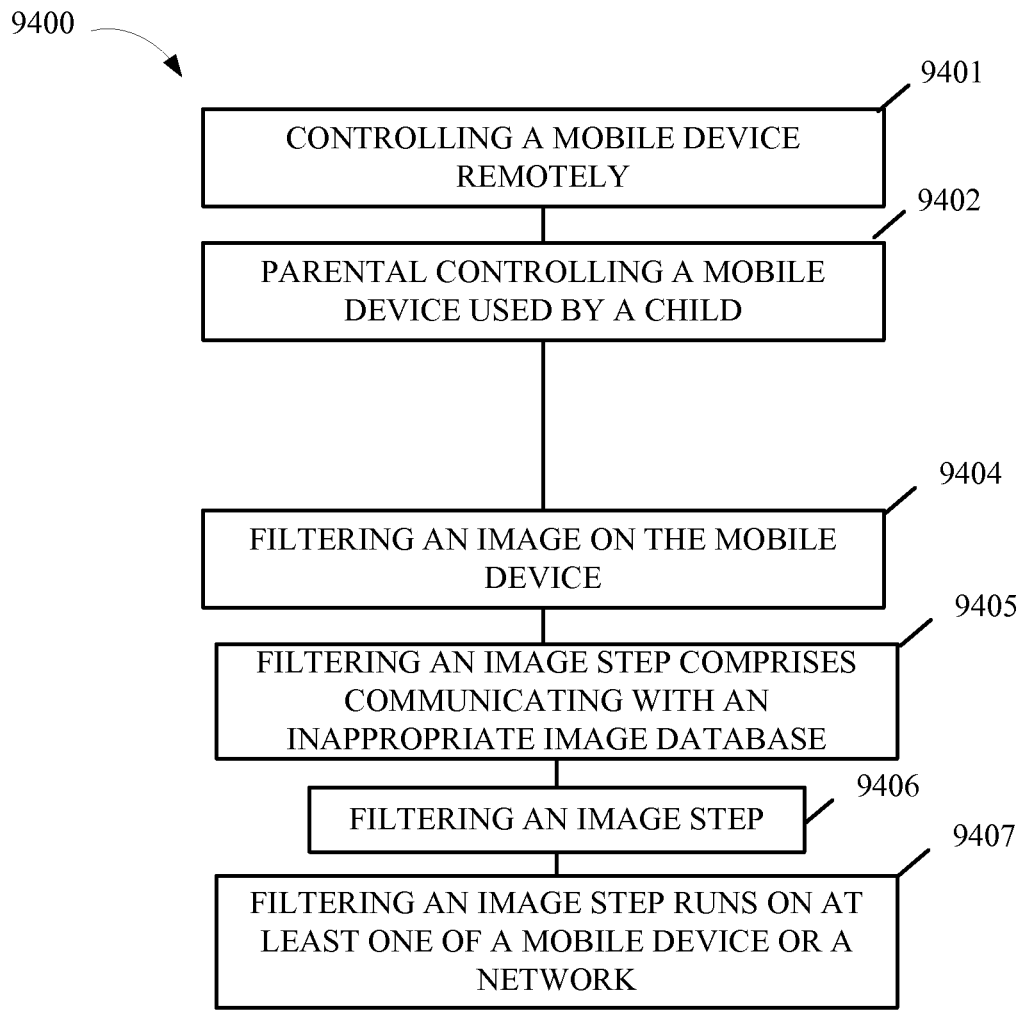
FIG. 94 is an exemplary embodiment of the present invention.
Figure 95:
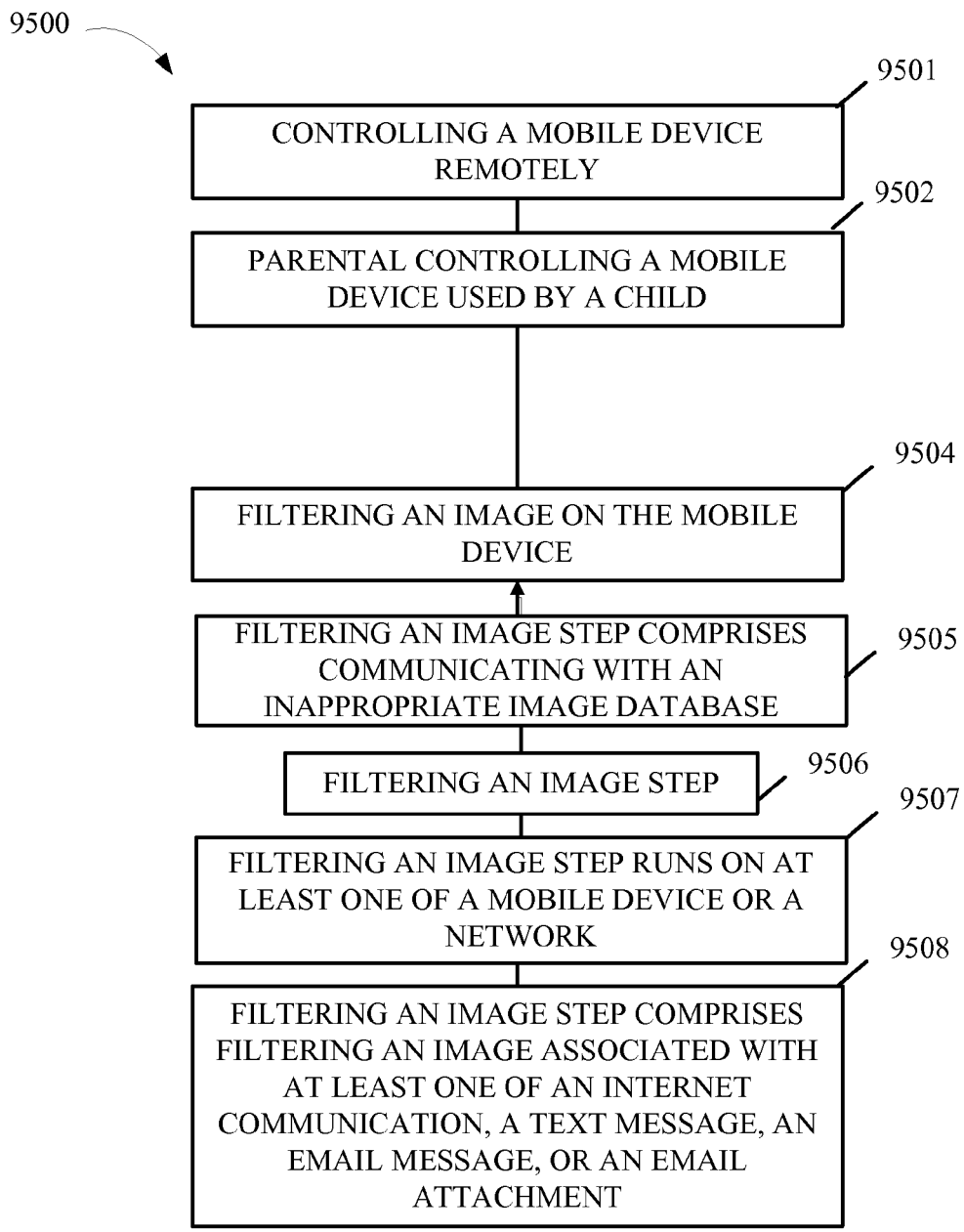
FIG. 95 is an exemplary embodiment of the present invention.

As further exemplified in FIGS. 89, 91, and 94, an exemplary method 8900, 9100, or 9400 may include controlling a mobile device remotely at 9401, wherein the controlling step includes parental controlling a mobile device used by a child at 9402, and wherein the parental controlling step may include monitoring a use of the mobile device at 8903 and filtering an image on the mobile device at 8904 or 9402, wherein the filtering an image step may include communicating with an inappropriate image database at 8905 or 9405, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database, wherein the filtering an image step further includes blocking an image that matches an image in the inappropriate image database, and wherein the filtering an image step runs on at least one of a mobile device or a network at 9407.

As further exemplified in FIGS. 89, 91, 94, and 95, an exemplary method 8900, 9100, 9400, or 9500 may include controlling a mobile device remotely at 9501, wherein the controlling step includes parental controlling a mobile device used by a child at 9502, and wherein the parental controlling step may include monitoring a use of the mobile device at 8903 and filtering an image on the mobile device at 8904 or 9502, wherein the filtering an image step may include communicating with an inappropriate image database at 8905 or 9505, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database, wherein the filtering an image step further includes blocking an image that matches an image in the inappropriate image database, wherein the filtering an image step runs on at least one of a mobile device or a network at 9407 or 9507, and wherein the filtering an image step includes filtering an image associated with at least one of an internet communication, a text message, an email message, or an email attachment at 9508.

Figure 96:
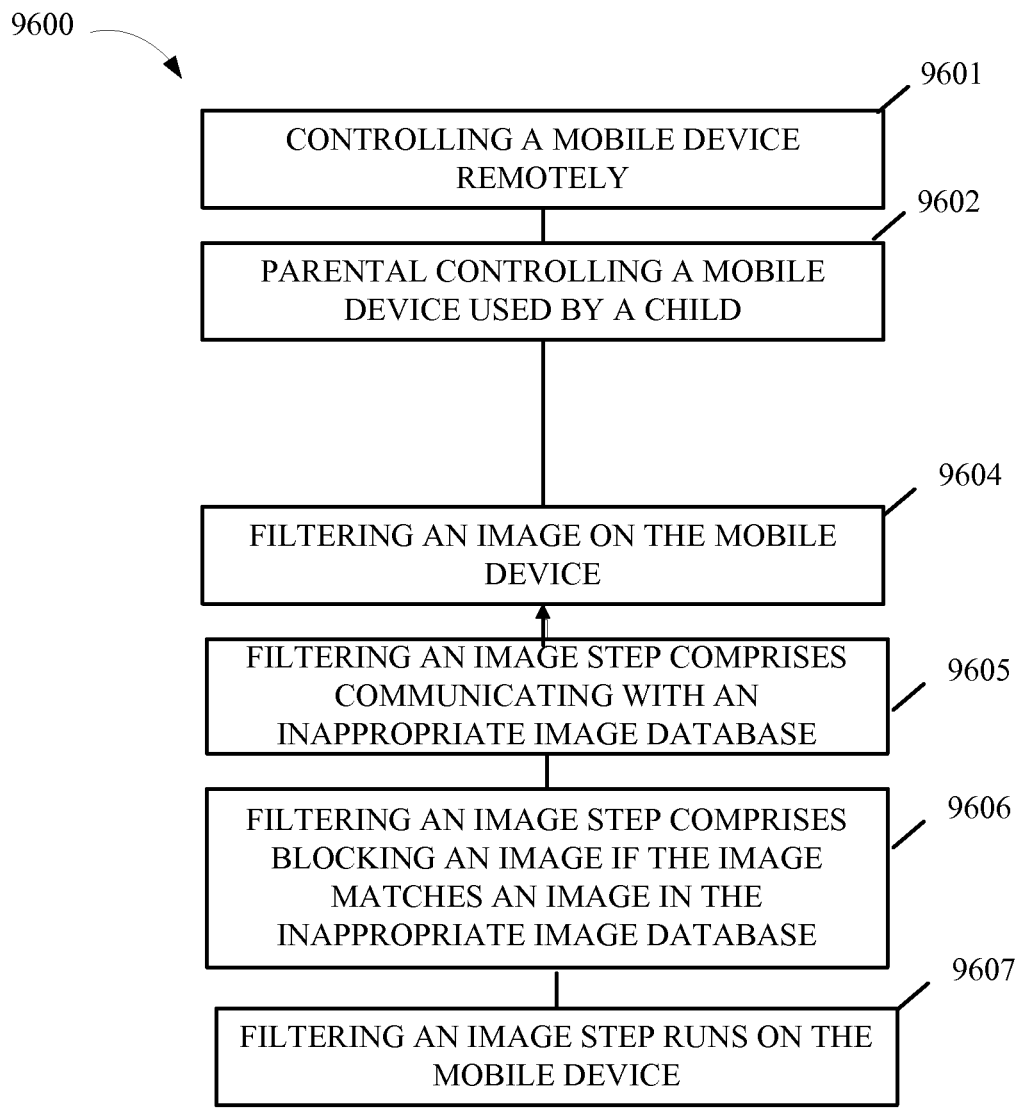
FIG. 96 is an exemplary embodiment of the present invention.
Figure 97:
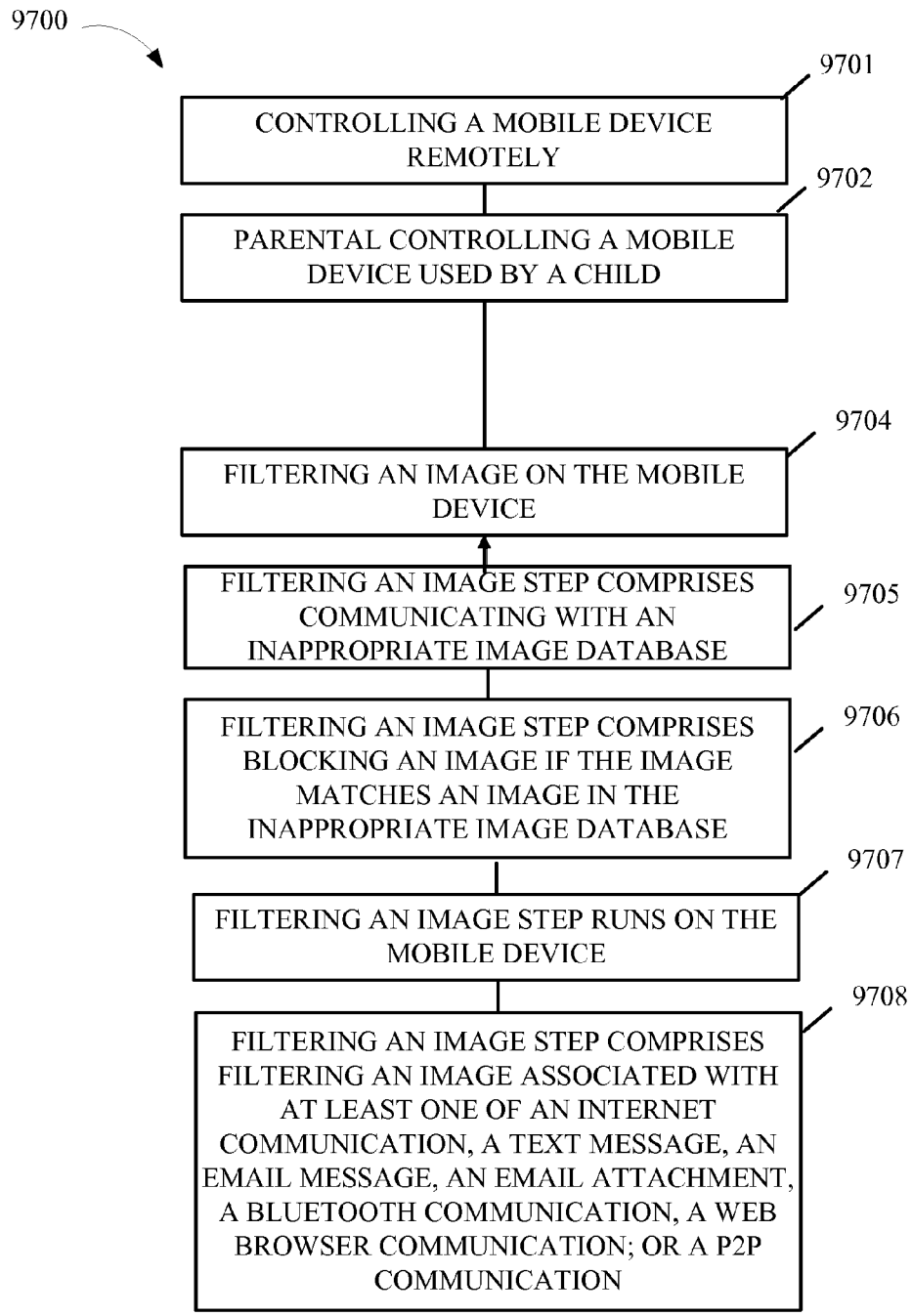
FIG. 97 is an exemplary embodiment of the present invention.
Figure 98:
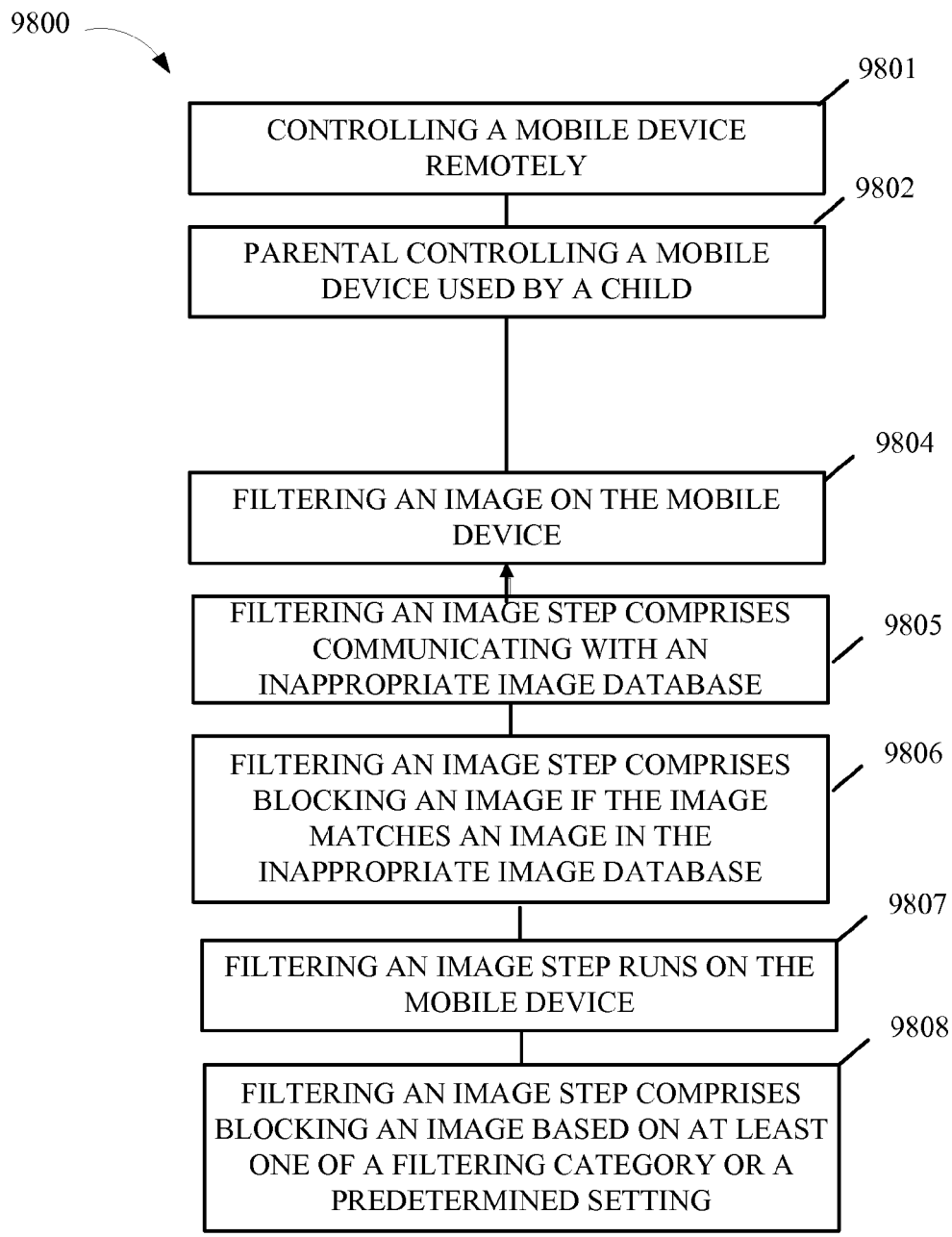
FIG. 98 is an exemplary embodiment of the present invention.

As further exemplified in FIGS. 89, 90, and 96, an exemplary method 8900, 9000, or 9600 may include controlling a mobile device remotely at 9601, wherein the controlling step includes parental controlling a mobile device used by a child at 9602, and wherein the parental controlling step may include monitoring a use of the mobile device at 8903 and filtering an image on the mobile device at 8904 or 9602, wherein the filtering an image step may include communicating with an inappropriate image database at 8905 or 9605, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database at 9006 or 9606, and wherein the filtering an image step runs on the mobile device at 9607.

As further exemplified in FIGS. 89, 90, 96, and 97, an exemplary method 8900, 9000, 9600, or 9700 may include controlling a mobile device remotely at 9701, wherein the controlling step includes parental controlling a mobile device used by a child at 9702, and wherein the parental controlling step may include monitoring a use of the mobile device at 8903 and filtering an image on the mobile device at 8904 or 9704, wherein the filtering an image step may include communicating with an inappropriate image database at 8905 or 9705, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database at 9006 or 9706, wherein the filtering an image step runs on the mobile device at 9707, and wherein the filtering an image step includes filtering an image associated with at least one of an internet communication, a text message, an email message, an email attachment, a Bluetooth communication, a web browser communication; or a P2P communication at 9708.

As further exemplified in FIGS. 89, 90, 96, and 98, an exemplary method 8900, 9000, 9600, or 9800 may include controlling a mobile device remotely at 9801, wherein the controlling step includes parental controlling a mobile device used by a child at 9802, and wherein the parental controlling step may include monitoring a use of the mobile device at 8904 and filtering an image on the mobile device at 8904 or 9802, wherein the filtering an image step may include communicating with an inappropriate image database at 8905 or 9805, wherein the inappropriate image database may include at least one inappropriate image, wherein the inappropriate image may include at 8907 at least one of an illegal child image, a highly illicit image, a pornographic image, or a predetermined inappropriate image, wherein the filtering an image step may further include blocking an image that matches an image in the inappropriate image database at 9006 or 9806, wherein the filtering an image step runs on the mobile device at 9807, and wherein the filtering an image step includes blocking an image based on at least one of a filtering category or a predetermined setting at 9808.

Figure 99:
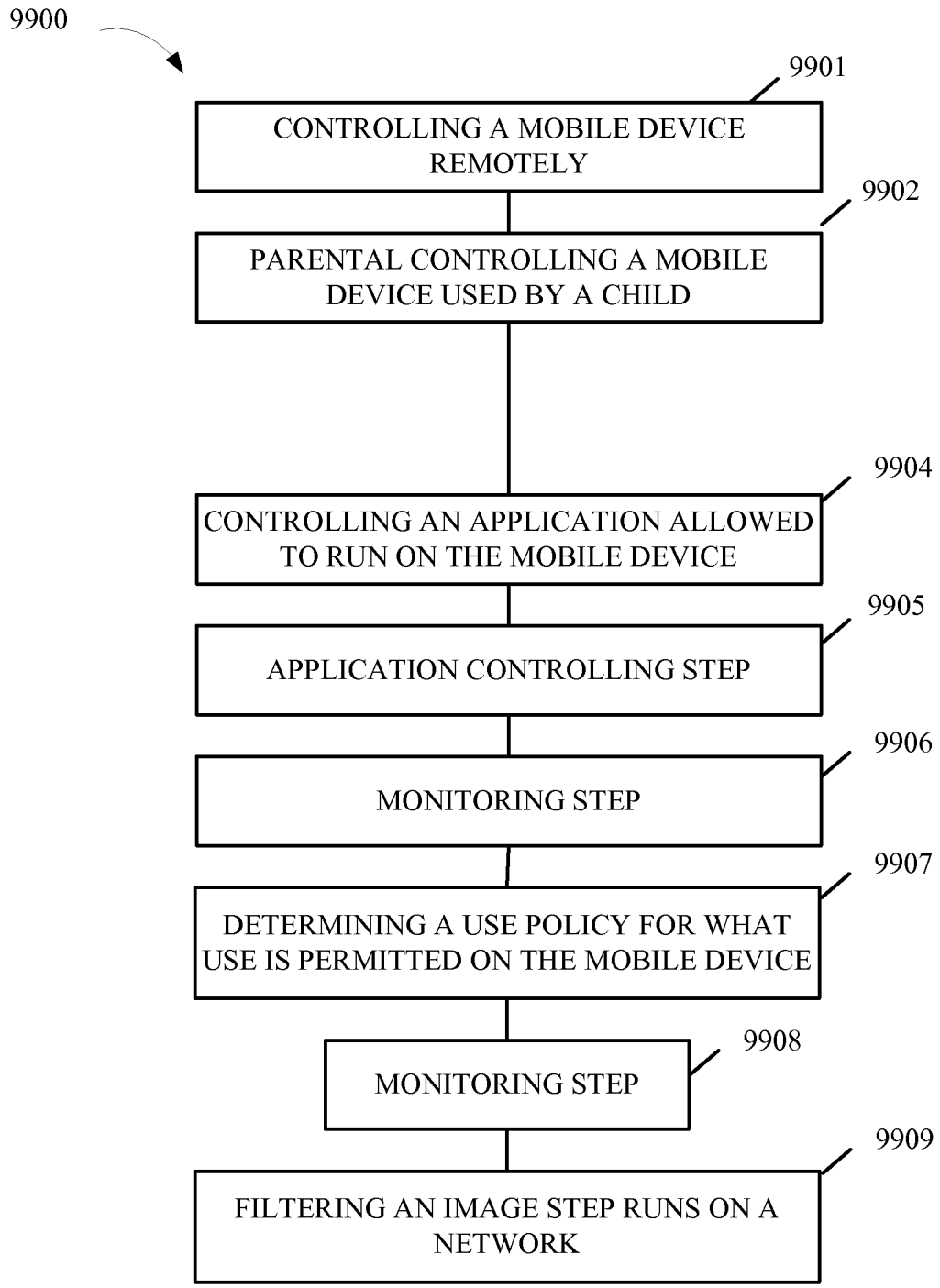
FIG. 99 is an exemplary embodiment of the present invention.

As further exemplified in FIGS. 86 and 99, an exemplary method 8600 or 9900 may include controlling a mobile device remotely at 9901, wherein the controlling step includes parental controlling a mobile device used by a child at 9902, wherein the parental controlling step may include monitoring a use of the mobile device at 9904 and filtering an inappropriate content at 8604, and the method may further include controlling an application allowed to run on the mobile device at 8630 or 9904, and wherein the monitoring step 8650 or 9906 may further include determining a use policy for what use is permitted on the mobile device and may further include any combination of the following: viewing a communication with the mobile device at 8651; viewing information relating to a party communicating with the mobile device at 8652; viewing a log of a call on the mobile device 8653; viewing at least one of a text message and a text message attachment transferred to and from the mobile device at 8654; viewing an email transferred to and from the mobile device at 8655; viewing a website visited on the mobile device at 8656; viewing an image transferred to and from the mobile device at 8657; viewing a location of the mobile device 8658; and viewing an application on the mobile device 8659, and wherein the filtering an image step runs on a network at 9909.

Figure 100:
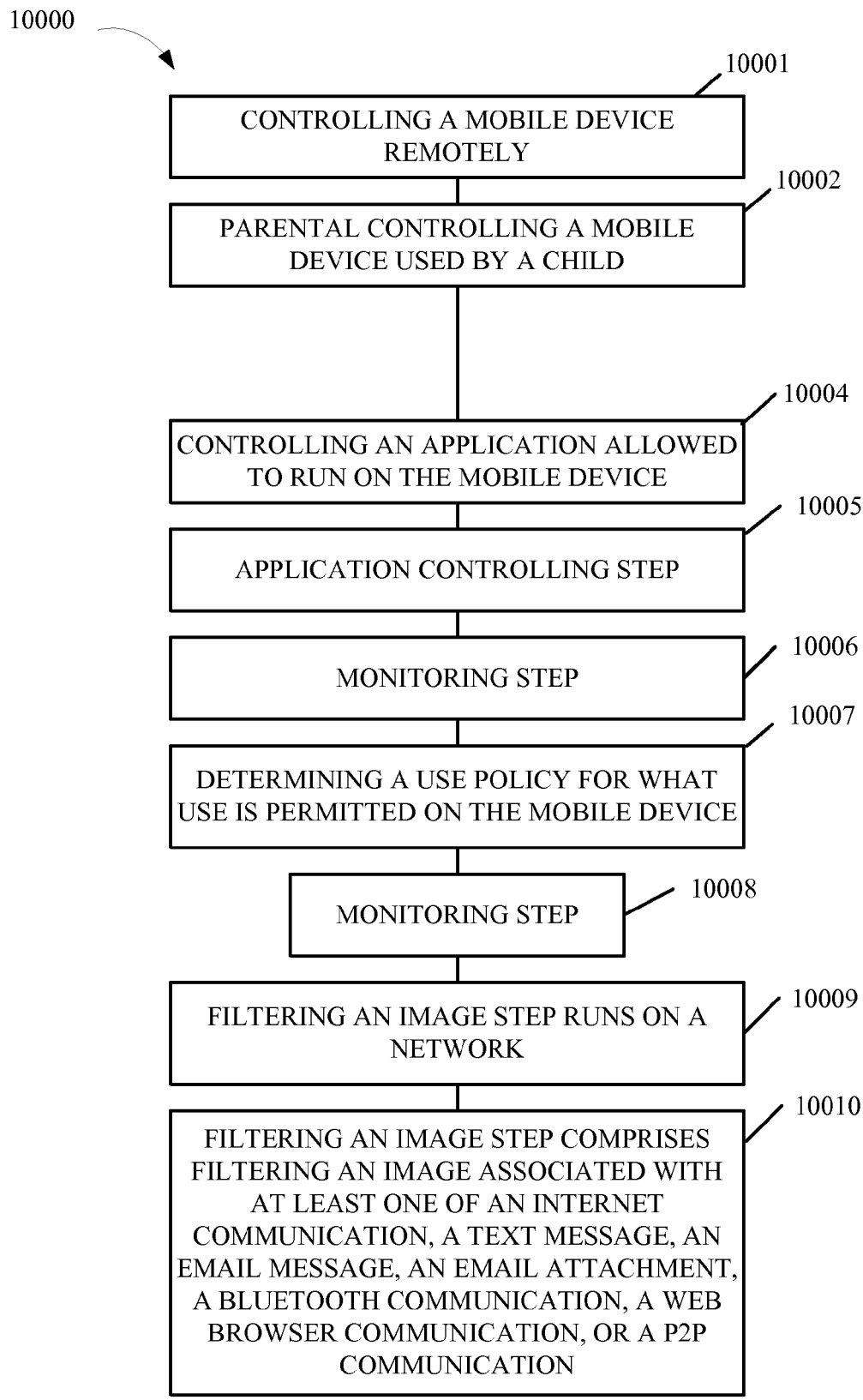
FIG. 100 is an exemplary embodiment of the present invention.

As further exemplified in FIGS. 86, 99, and 100, an exemplary method 8600, 9900, or 10000 may include controlling a mobile device remotely at 10001, wherein the controlling step includes parental controlling a mobile device used by a child at 10002, wherein the parental controlling step may include monitoring a use of the mobile device at 9904 and filtering an inappropriate content at 8604, and the method may further include controlling an application allowed to run on the mobile device at 8630 or 10004, and wherein the monitoring step 8650 or 10006 may further include determining a use policy for what use is permitted on the mobile device and may further include any combination of the following: viewing a communication with the mobile device at 8651; viewing information relating to a party communicating with the mobile device at 8652; viewing a log of a call on the mobile device 8653; viewing at least one of a text message and a text message attachment transferred to and from the mobile device at 8654; viewing an email transferred to and from the mobile device at 8655; viewing a website visited on the mobile device at 8656; viewing an image transferred to and from the mobile device at 8657; viewing a location of the mobile device 8658; and viewing an application on the mobile device 8659, wherein the filtering an image step runs on a network at 10009, and wherein the filtering an image step includes filtering an image associated with at least one of an internet communication, a text message, an email message, an email attachment, a Bluetooth communication, a web browser communication, or a P2P communication at 10010.

Figure 101:
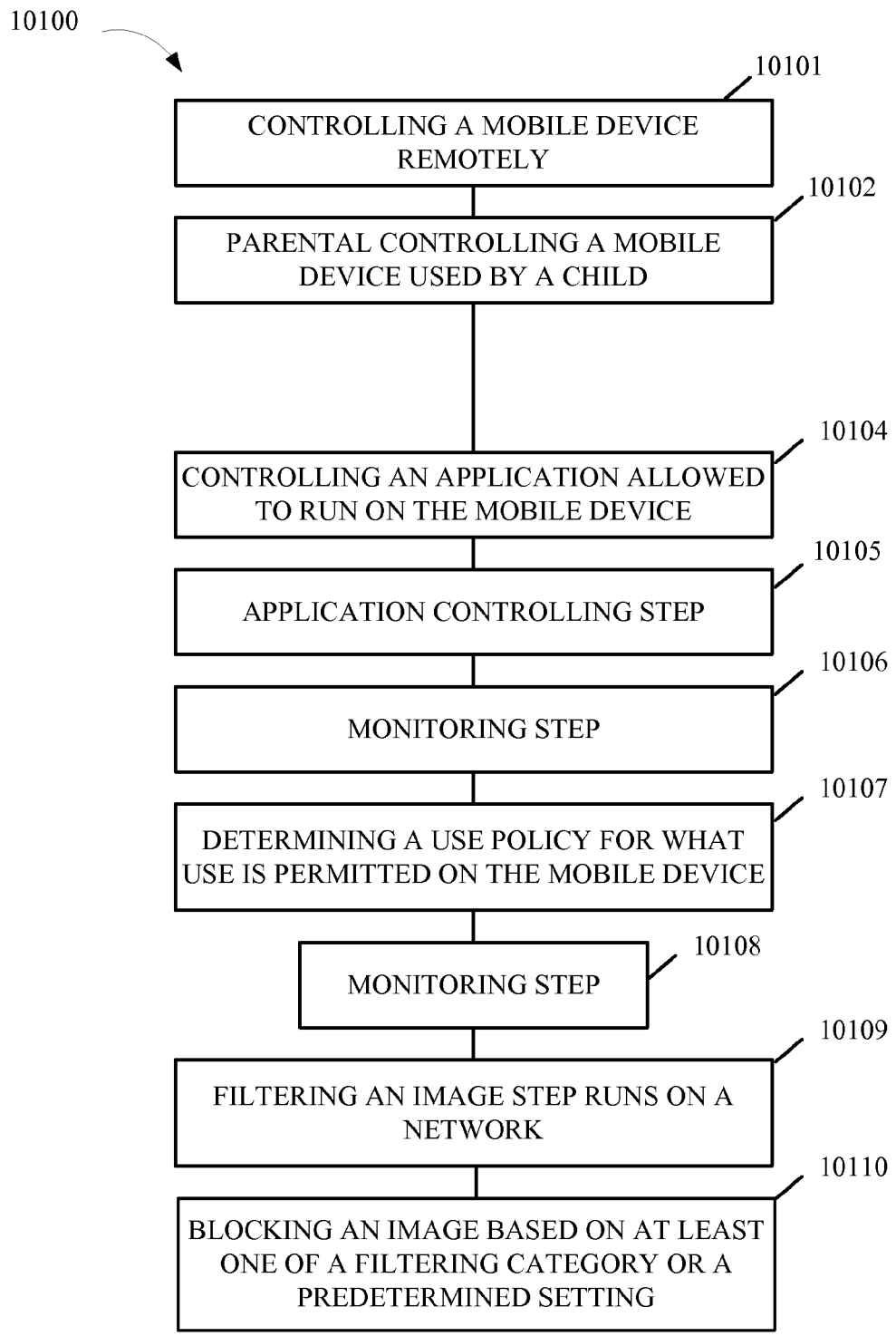
FIG. 101 is an exemplary embodiment of the present invention.
Figure 102:
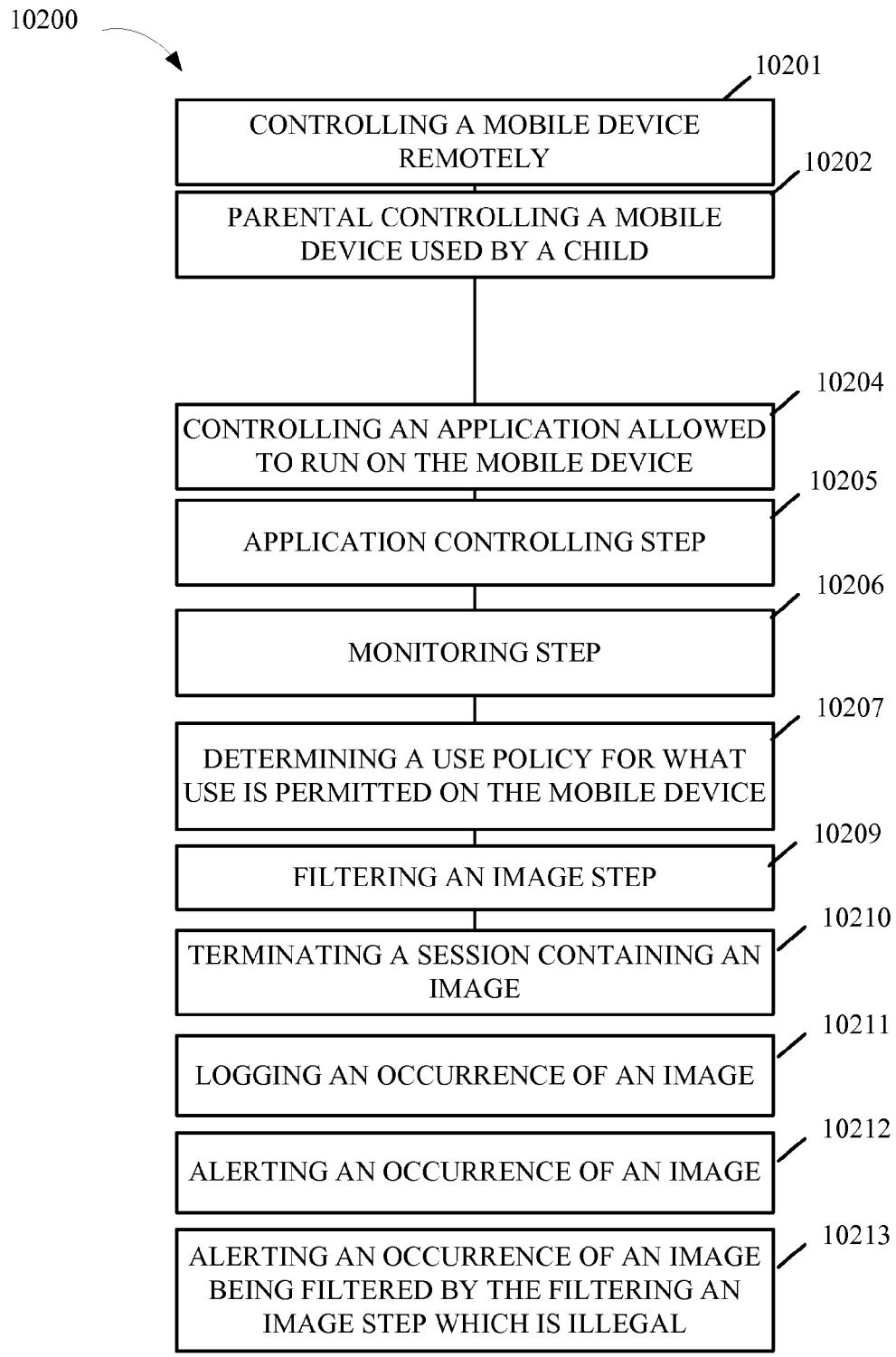
FIG. 102 is an exemplary embodiment of the present invention.

As further exemplified in FIGS. 86, 99, and 101 an exemplary method 8600 or 10100 may include controlling a mobile device remotely at 10101, wherein the controlling step includes parental controlling a mobile device used by a child at 10102, wherein the parental controlling step may include monitoring a use of the mobile device at 9904 and filtering an inappropriate content at 8604, and the method may further include controlling an application allowed to run on the mobile device at 8630 or 10104, and wherein the monitoring step 8650 or 10106 may further include determining a use policy for what use is permitted on the mobile device and may further include any combination of the following: viewing a communication with the mobile device at 8651; viewing information relating to a party communicating with the mobile device at 8652; viewing a log of a call on the mobile device 8653; viewing at least one of a text message and a text message attachment transferred to and from the mobile device at 8654; viewing an email transferred to and from the mobile device at 8655; viewing a website visited on the mobile device at 8656; viewing an image transferred to and from the mobile device at 8657; viewing a location of the mobile device 8658; and viewing an application on the mobile device 8659, wherein the filtering an image step runs on a network at 10109, wherein the filtering an image step includes blocking an image based on at least one of a filtering category or a predetermined setting at 10110.

As further exemplified in FIGS. 86, 99, 101, and 102, an exemplary method 8600 or 10200 may include controlling a mobile device remotely at 10201, wherein the controlling step includes parental controlling a mobile device used by a child at 10202, wherein the parental controlling step may include monitoring a use of the mobile device at 9904 and filtering an inappropriate content at 8604, and the method may further include controlling an application allowed to run on the mobile device at 8630 or 10204, and wherein the monitoring step 8650 or 10206 may further include determining a use policy for what use is permitted on the mobile device and may further include any combination of the following: viewing a communication with the mobile device at 8651; viewing information relating to a party communicating with the mobile device at 8652; viewing a log of a call on the mobile device 8653; viewing at least one of a text message and a text message attachment transferred to and from the mobile device at 8654; viewing an email transferred to and from the mobile device at 8655; viewing a website visited on the mobile device at 8656; viewing an image transferred to and from the mobile device at 8657; viewing a location of the mobile device 8658; and viewing an application on the mobile device 8659, wherein the filtering an image step runs on a network at 10109, wherein the filtering an image step includes blocking an image based on at least one of a filtering category or a predetermined setting, and wherein the filtering an image step may further include any combination of the following: terminating a session containing an image filtered by the filtering an image step at 10210; logging an occurrence of an image being filtered by the filtering an image step at 10211; alerting an occurrence of an image being filtered by the filtering an image step at 10212; alerting an occurrence of an image being filtered by the filtering an image step which is illegal at 10213; providing information relating to an image filtered by the filtering an image step, wherein the information includes at least one of an identity of a camera associated with the image; a software associated with the image; a serial number of a camera associated with the image; a serial number of a software associated with the image; an owner name of a camera associated with the image; a creation date of the image; a modification date of the image; a save date of the image; or an attribute of the image.

Figure 103:
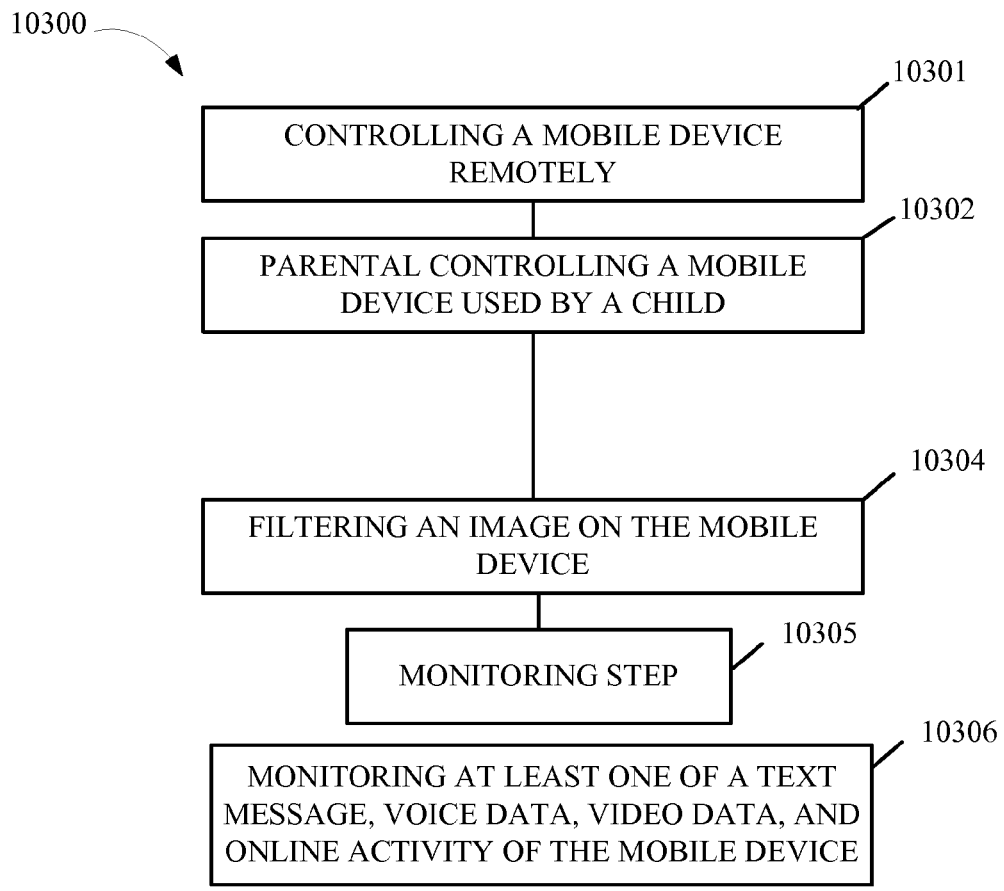
FIG. 103 is an exemplary embodiment of the present invention.

As further exemplified in FIG. 103 an exemplary method 10300 may include controlling a mobile device remotely at 10301, wherein the controlling step includes parental controlling a mobile device used by a child at 10302, wherein the parental controlling step may include monitoring a use of the mobile device at 10305 and filtering an image on the mobile device at 10304, and wherein the monitoring step may include monitoring at least one of a text message, voice data, video data, and online activity of the mobile device at 10306.

Figure 104:
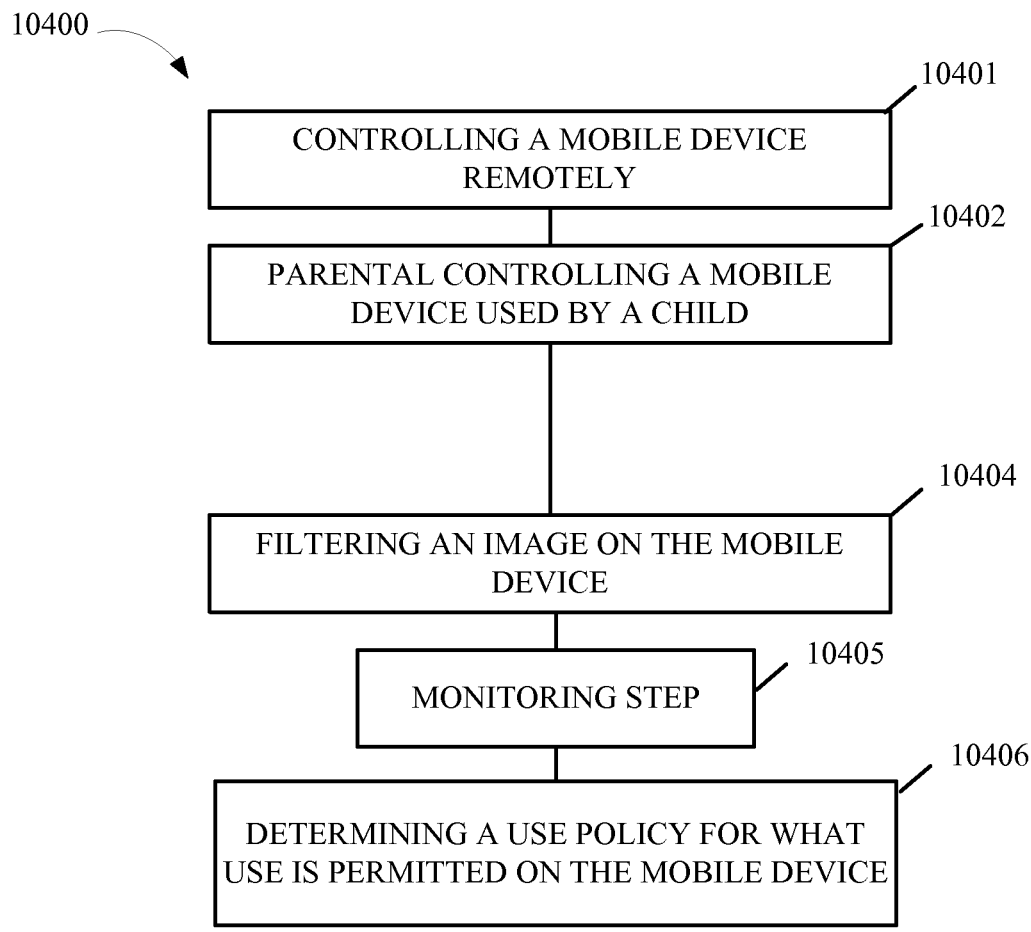
FIG. 104 is an exemplary embodiment of the present invention.

As further exemplified in FIGS. 103 and 104 an exemplary method 10300 or 10400 may include controlling a mobile device remotely at 10401, wherein the controlling step includes parental controlling a mobile device used by a child at 10402, wherein the parental controlling step may include monitoring a use of the mobile device at 10405 and filtering an image on the mobile device at 10404, wherein the monitoring step may include monitoring at least one of a text message, voice data, video data, and online activity of the mobile device at 10306, and wherein the monitoring step may further include determining a use policy for what use is permitted on the mobile device at 10406.

Figure 105:
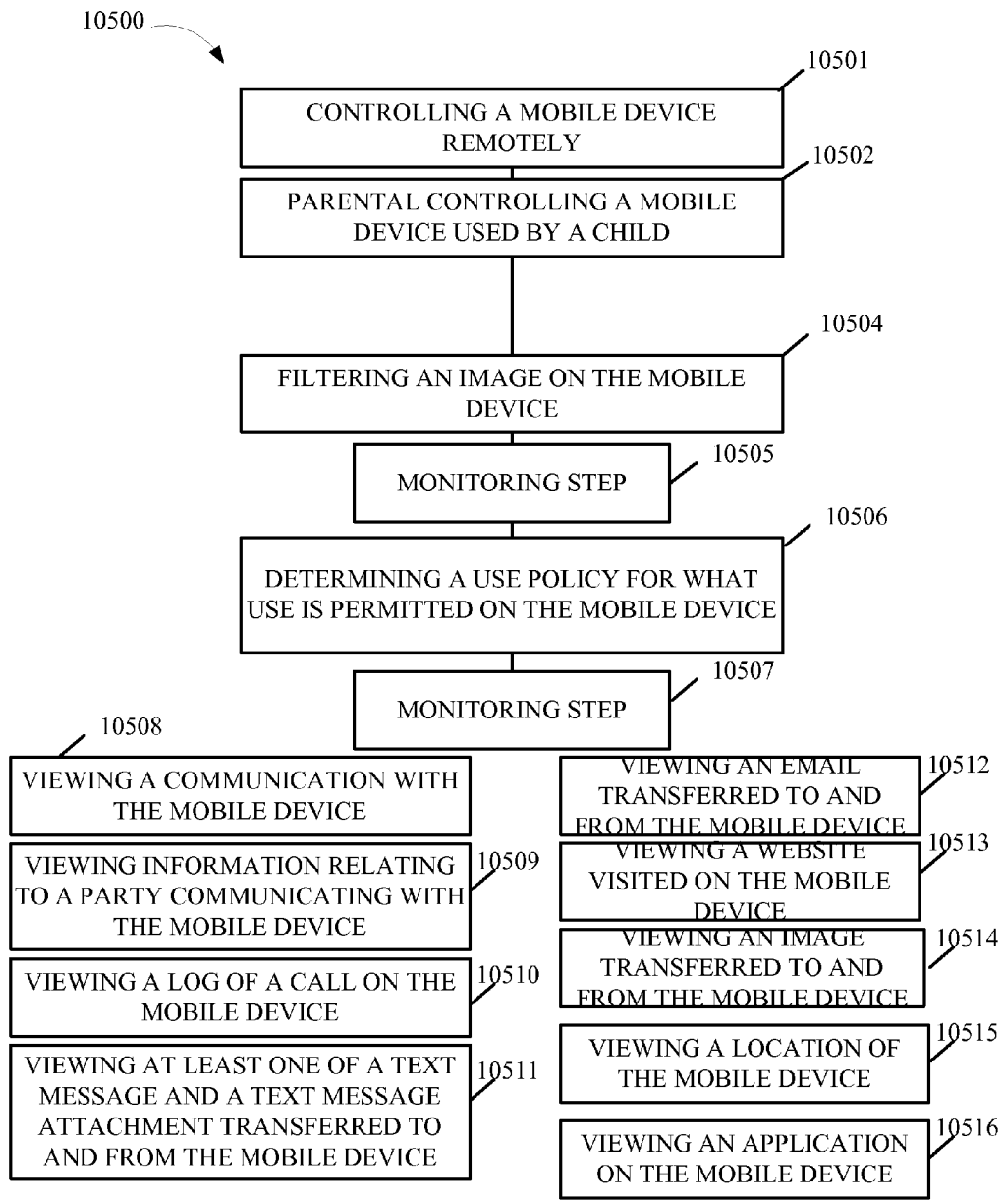
FIG. 105 is an exemplary embodiment of the present invention.

As further exemplified in FIGS. 103, 104, and 105 an exemplary method 10300 or 10500 may include controlling a mobile device remotely at 10501, wherein the controlling step includes parental controlling a mobile device used by a child at 10502, wherein the parental controlling step may include monitoring a use of the mobile device at 10505 and filtering an image on the mobile device at 10504, wherein the monitoring step may include monitoring at least one of a text message, voice data, video data, and online activity of the mobile device at 10306, wherein the monitoring step may further include determining a use policy for what use is permitted on the mobile device at 10506 and may further include any combination of the following: viewing a communication with the mobile device at 10508; viewing information relating to a party communicating with the mobile device at 10509; viewing a log of a call on the mobile device at 10510; viewing at least one of a text message and a text message attachment transferred to and from the mobile device at 10511; viewing an email transferred to and from the mobile device at 10512; viewing a website visited on the mobile device at 10513; viewing an image transferred to and from the mobile device at 10514; viewing a location of the mobile device at 10515; and viewing an application on the mobile device at 10516.

Figure 106:
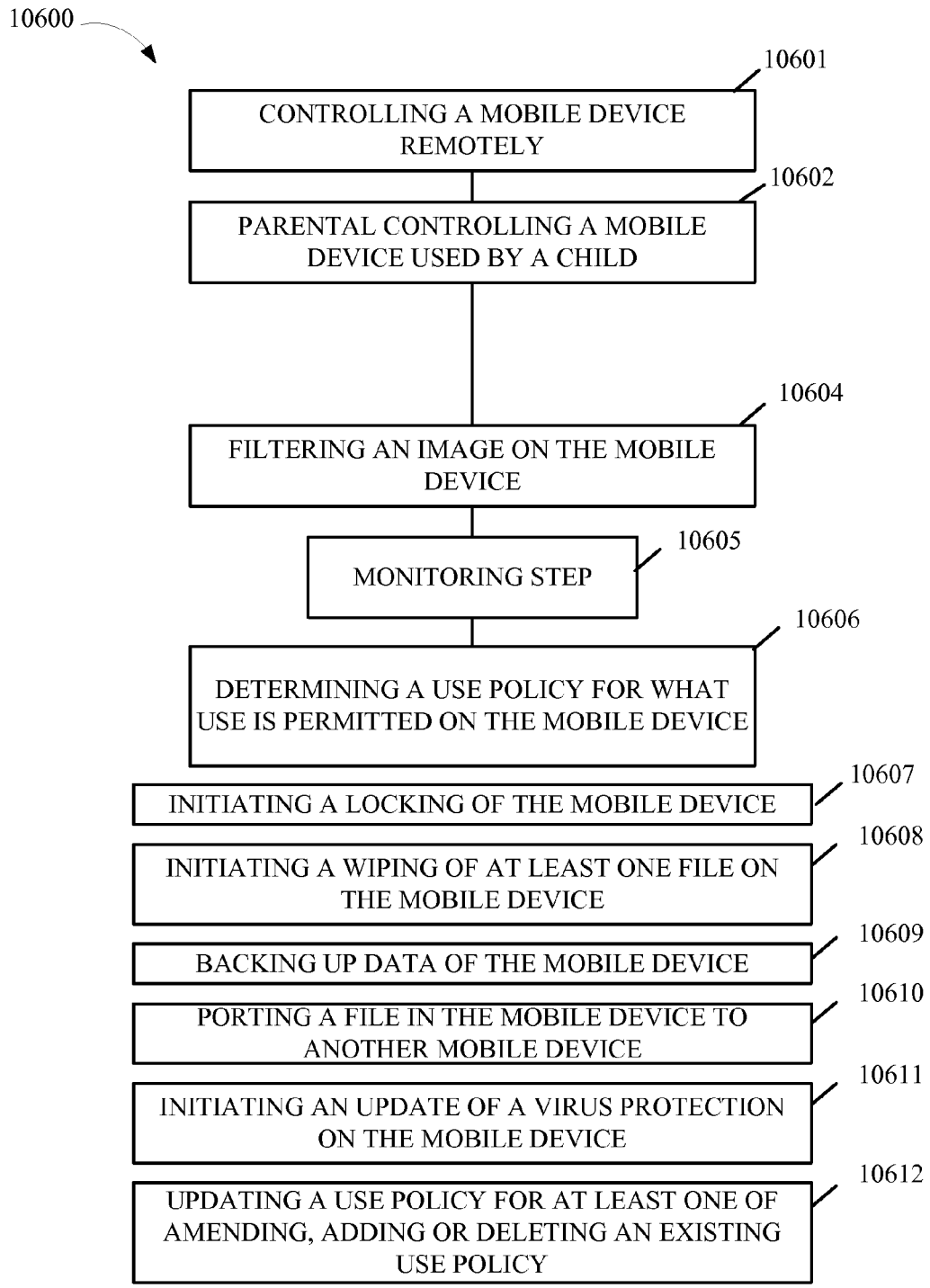
FIG. 106 is an exemplary embodiment of the present invention.

As further exemplified in FIGS. 103, 104, and 106, an exemplary method 10300, 10400, or 10600 may include controlling a mobile device remotely at 10601, wherein the controlling step includes parental controlling a mobile device used by a child at 10602, wherein the parental controlling step may include monitoring a use of the mobile device at 10605 and filtering an image on the mobile device at 10604, wherein the monitoring step may include monitoring at least one of a text message, voice data, video data, and online activity of the mobile device at 10306, wherein the monitoring step may further include determining a use policy for what use is permitted on the mobile device at 10606, and wherein the use policy determining step may further include any combination of the following: initiating a locking of the mobile device at 10607; initiating a wiping of at least one file on the mobile device at 10608; backing up data of the mobile device at 10609; porting a file in the mobile device to another mobile device at 10610; initiating an update of a virus protection on the mobile device at 10611; and updating a use policy for at least one of amending, adding or deleting an existing use policy at 10612.

Figure 107:
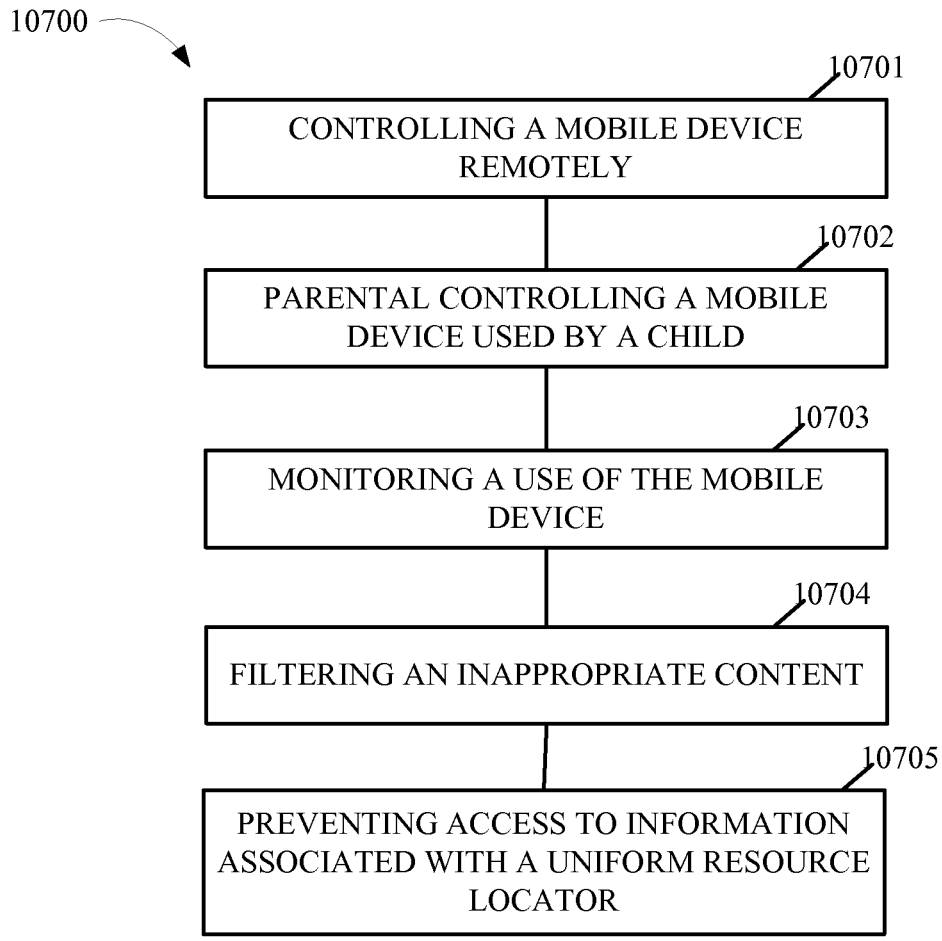
FIG. 107 is an exemplary embodiment of the present invention.

As further exemplified in FIG. 107, an exemplary method 10700 may include controlling a mobile device remotely at 10701, wherein the controlling step includes parental controlling a mobile device used by a child at 10702, and wherein the parental controlling step may include monitoring a use of the mobile device at 10703, filtering an inappropriate content at 10704, and preventing access to information associated with a Uniform Resource Locator at 10705.

Figure 108:
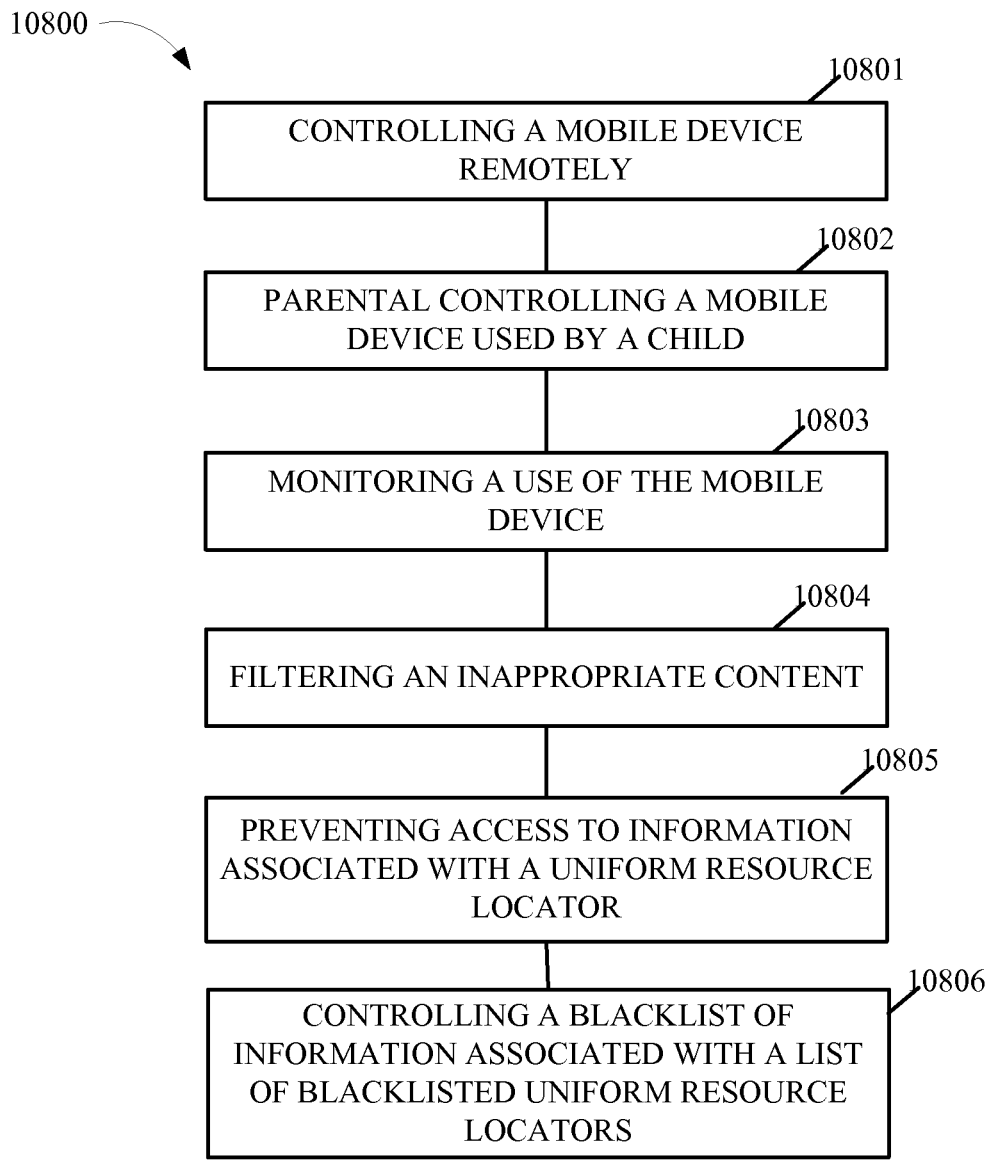
FIG. 108 is an exemplary embodiment of the present invention.

As further exemplified in FIG. 108, an exemplary method 10800 may include controlling a mobile device remotely at 10801, wherein the controlling step includes parental controlling a mobile device used by a child at 10802, and wherein the parental controlling step may include monitoring a use of the mobile device at 10803, filtering an inappropriate content at 10804, and preventing access to information associated with a Uniform Resource Locator at 10805, wherein the Uniform Resource Locator preventing access step may include controlling a blacklist of information associated with a list of blacklisted Uniform Resource Locators at 10806.

Figure 109:
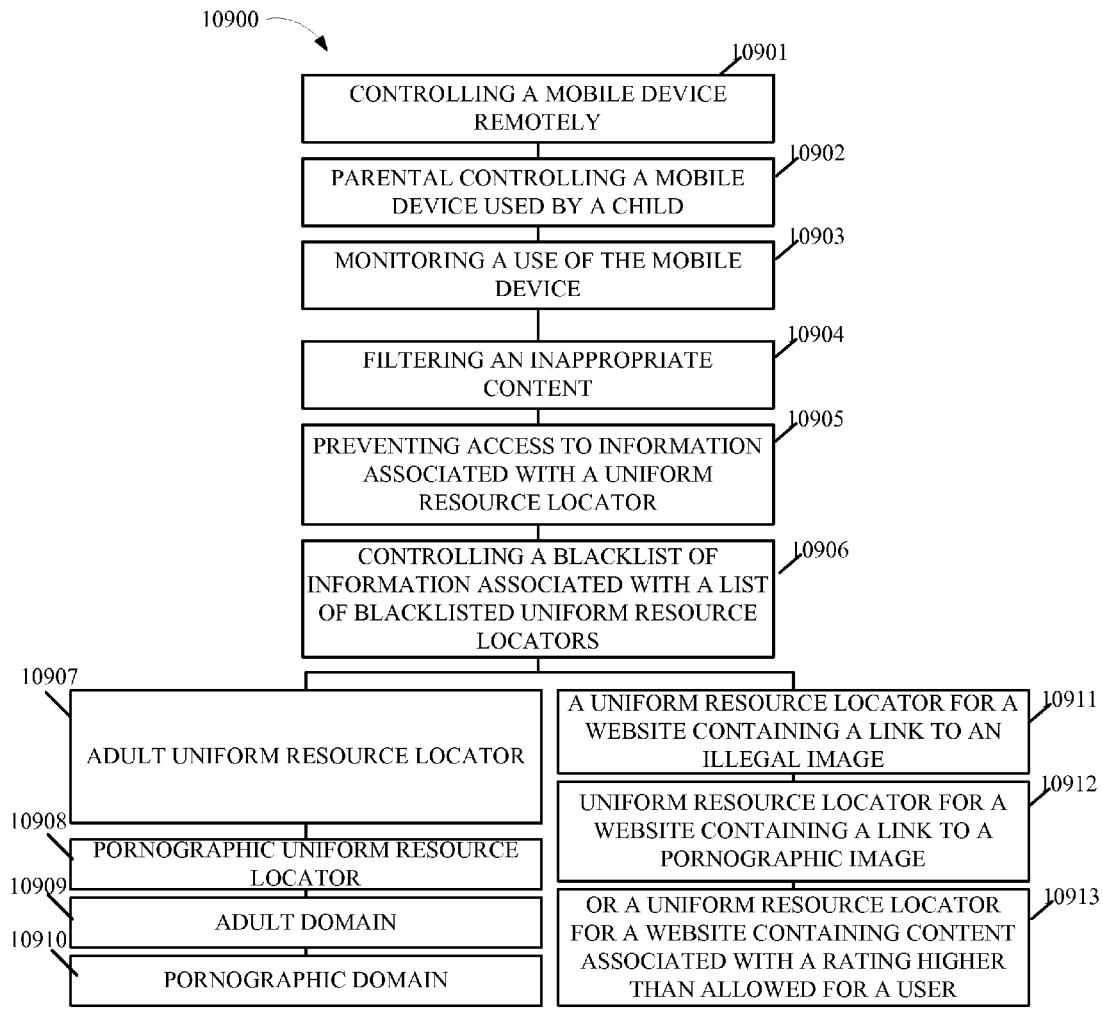
FIG. 109 is an exemplary embodiment of the present invention.

As further exemplified in FIG. 109, an exemplary method 10900 may include controlling a mobile device remotely at 10901, wherein the controlling step includes parental controlling a mobile device used by a child at 10902, wherein the parental controlling step may include monitoring a use of the mobile device at 10903, filtering an inappropriate content at 10904, and preventing access to information associated with a Uniform Resource Locator, and wherein the Uniform Resource Locator preventing access step may include controlling a blacklist of information associated with a list of blacklisted Uniform Resource Locators, and wherein the controlling a blacklist step includes preventing the mobile device from accessing at least one of an adult Uniform Resource Locator at 10907, a pornographic Uniform Resource Locator at 10908, an adult domain at 10909, a pornographic domain at 10910, a Uniform Resource Locator for a website containing a link to an illegal image 10911, a Uniform Resource Locator for a website containing a link to a pornographic image 10912, or a Uniform Resource Locator for a website containing content associated with a rating higher than allowed for a user 10913.

Figure 110:
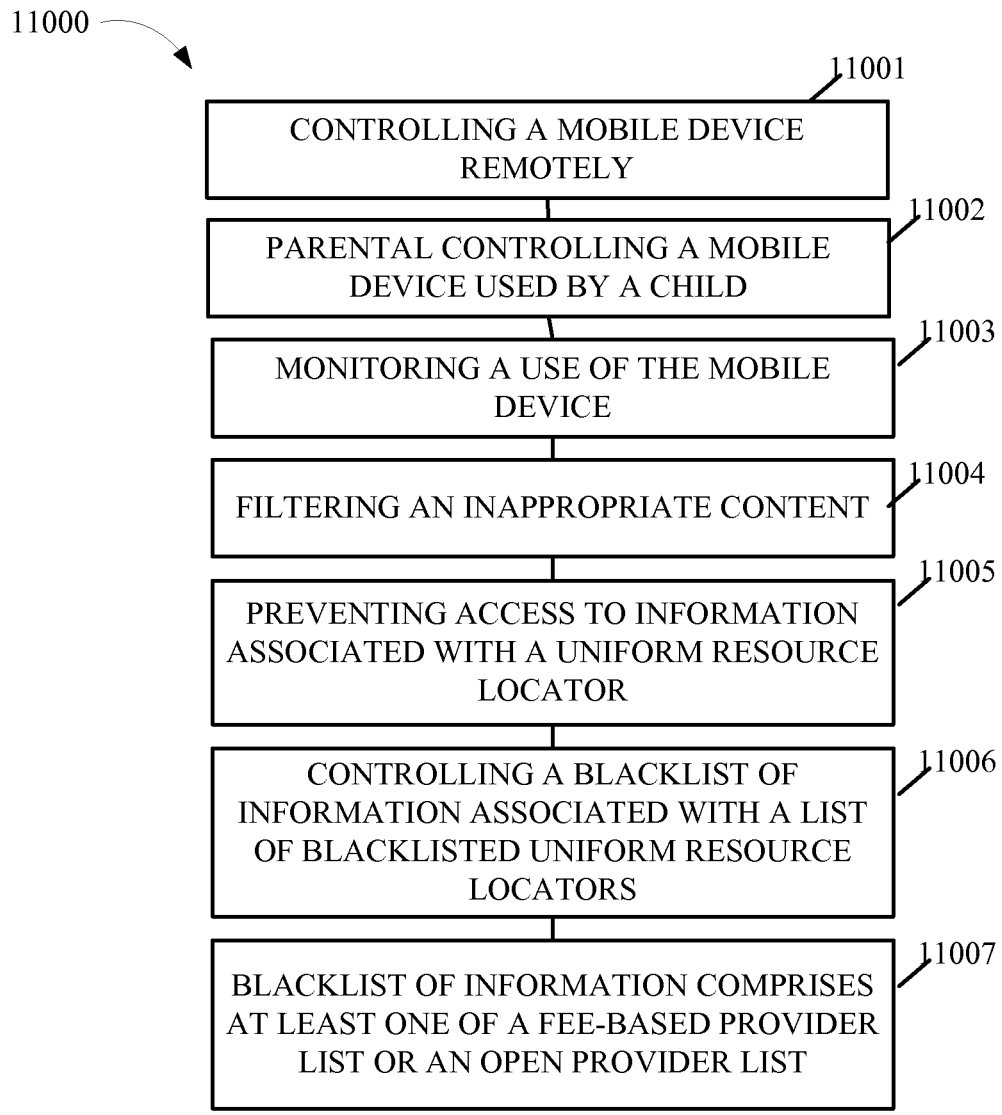
FIG. 110 is an exemplary embodiment of the present invention.

As further exemplified in FIGS. 109 and 110, an exemplary method 10900 or 11000 may include controlling a mobile device remotely at 11001, wherein the controlling step includes parental controlling a mobile device used by a child at 11002, wherein the parental controlling step may include monitoring a use of the mobile device at 11003, filtering an inappropriate content at 10904 or 11004, and preventing access to information associated with a Uniform Resource Locator, and wherein the Uniform Resource Locator preventing access step may include controlling a blacklist of information associated with a list of blacklisted Uniform Resource Locators, and wherein the controlling a blacklist step includes preventing the mobile device from accessing at least one of an adult Uniform Resource Locator at 10907, a pornographic Uniform Resource Locator at 10908, an adult domain at 10909, a pornographic domain at 10910, a Uniform Resource Locator for a website containing a link to an illegal image 10911, a Uniform Resource Locator for a website containing a link to a pornographic image 10912, or a Uniform Resource Locator for a website containing content associated with a rating higher than allowed for a user 10913, wherein the blacklist of information may include at least one of a fee-based provider list or an open provider list at 11007.

Figure 111:
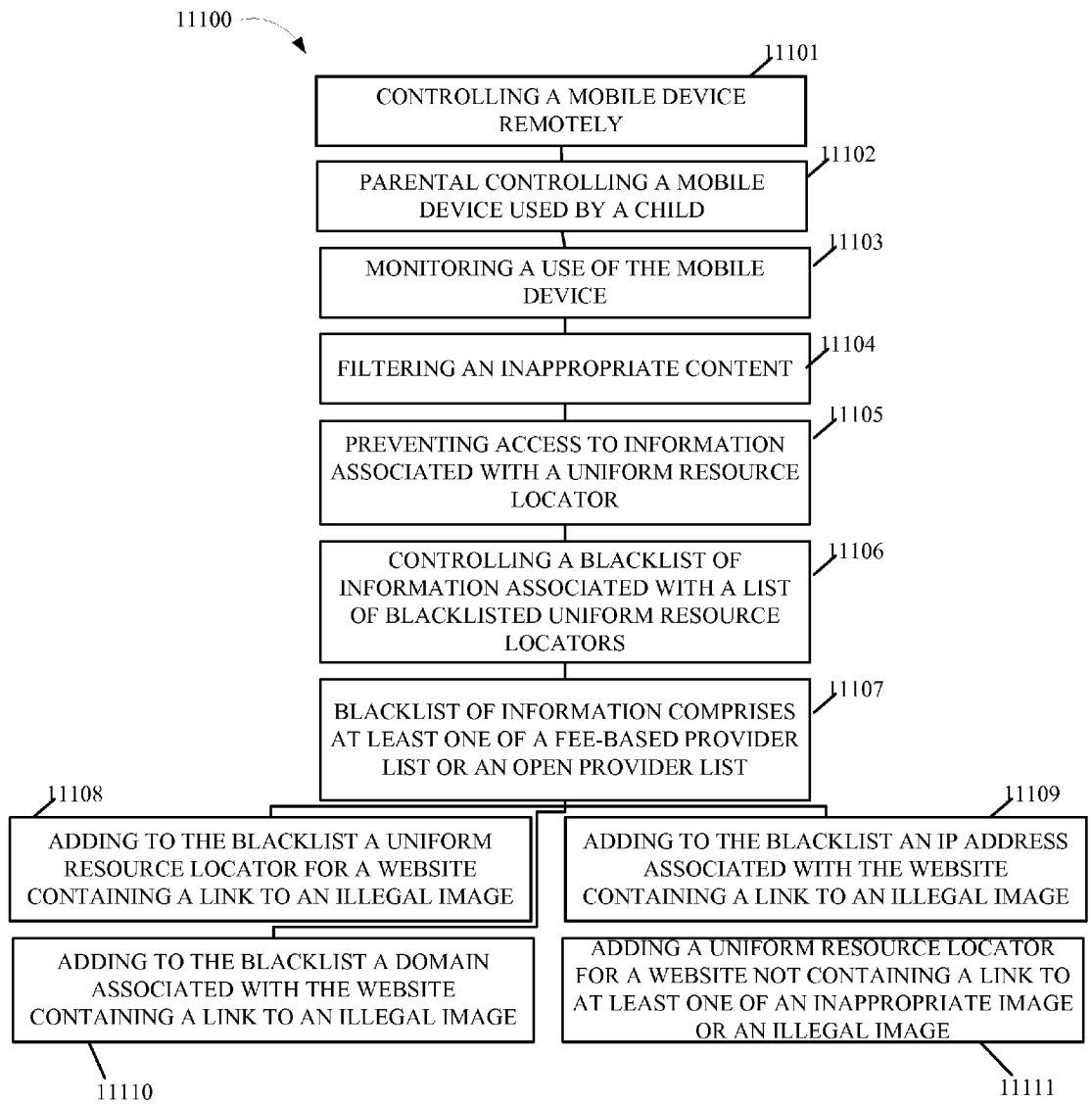
FIG. 111 is an exemplary embodiment of the present invention.
Figure 112:
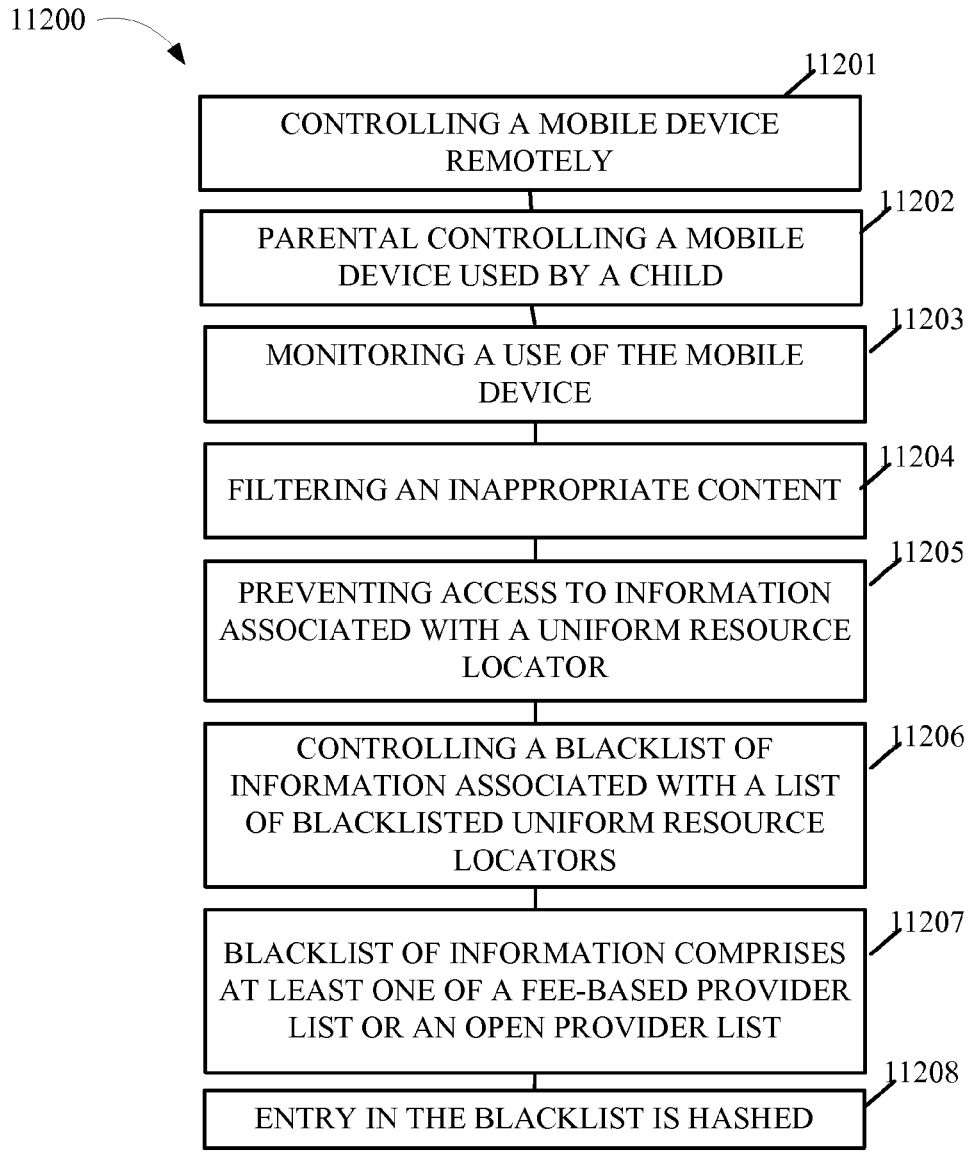
FIG. 112 is an exemplary embodiment of the present invention.

As further exemplified in FIGS. 109, 110, and 111, an exemplary method 10900, 11000, or 11100 may include controlling a mobile device remotely at 11101, wherein the controlling step includes parental controlling a mobile device used by a child at 11102, wherein the parental controlling step may include monitoring a use of the mobile device at 11103, filtering an inappropriate content at 10904 or 11104, and preventing access to information associated with a Uniform Resource Locator, and wherein the Uniform Resource Locator preventing access step may include controlling a blacklist of information associated with a list of blacklisted Uniform Resource Locators, and wherein the controlling a blacklist step includes preventing the mobile device from accessing at least one of an adult Uniform Resource Locator at 10907, a pornographic Uniform Resource Locator at 10908, an adult domain at 10909, a pornographic domain at 10910, a Uniform Resource Locator for a website containing a link to an illegal image 10911, a Uniform Resource Locator for a website containing a link to a pornographic image 10912, or a Uniform Resource Locator for a website containing content associated with a rating higher than allowed for a user 10913, wherein the blacklist of information may include at least one of a fee-based provider list or an open provider list at 11107, wherein the method further may include performing at least one of adding to the blacklist a Uniform Resource Locator for a website containing a link to an illegal image at 11108; adding to the blacklist an IP address associated with the website containing a link to an illegal image at 11110; adding to the blacklist a domain associated with the website containing a link to an illegal image at 11109; and adding a Uniform Resource Locator for a website not containing a link to at least one of an inappropriate image or an illegal image at 11111.

As further exemplified in FIGS. 109, 110, 111, and 112, an exemplary method 10900, 11000, 11100, or 11200 may include controlling a mobile device remotely at 11201, wherein the controlling step includes parental controlling a mobile device used by a child at 11202, wherein the parental controlling step may include monitoring a use of the mobile device at 11203, filtering an inappropriate content at 10904 or 11204, and preventing access to information associated with a Uniform Resource Locator, and wherein the Uniform Resource Locator preventing access step may include controlling a blacklist of information associated with a list of blacklisted Uniform Resource Locators, and wherein the controlling a blacklist step includes preventing the mobile device from accessing at least one of an adult Uniform Resource Locator at 10907, a pornographic Uniform Resource Locator at 10908, an adult domain at 10909, a pornographic domain at 10910, a Uniform Resource Locator for a website containing a link to an illegal image 10911, a Uniform Resource Locator for a website containing a link to a pornographic image 10912, or a Uniform Resource Locator for a website containing content associated with a rating higher than allowed for a user 10913, wherein the blacklist of information may include at least one of a fee-based provider list or an open provider list at 11107, wherein the method further may include performing at least one of adding to the blacklist a Uniform Resource Locator for a website containing a link to an illegal image at 11108; adding to the blacklist an IP address associated with the website containing a link to an illegal image at 11110; adding to the blacklist a domain associated with the website containing a link to an illegal image at 11109; and adding a Uniform Resource Locator for a website not containing a link to at least one of an inappropriate image or an illegal image at 11111, wherein an entry in the blacklist is hashed at 11208.

Figure 113:
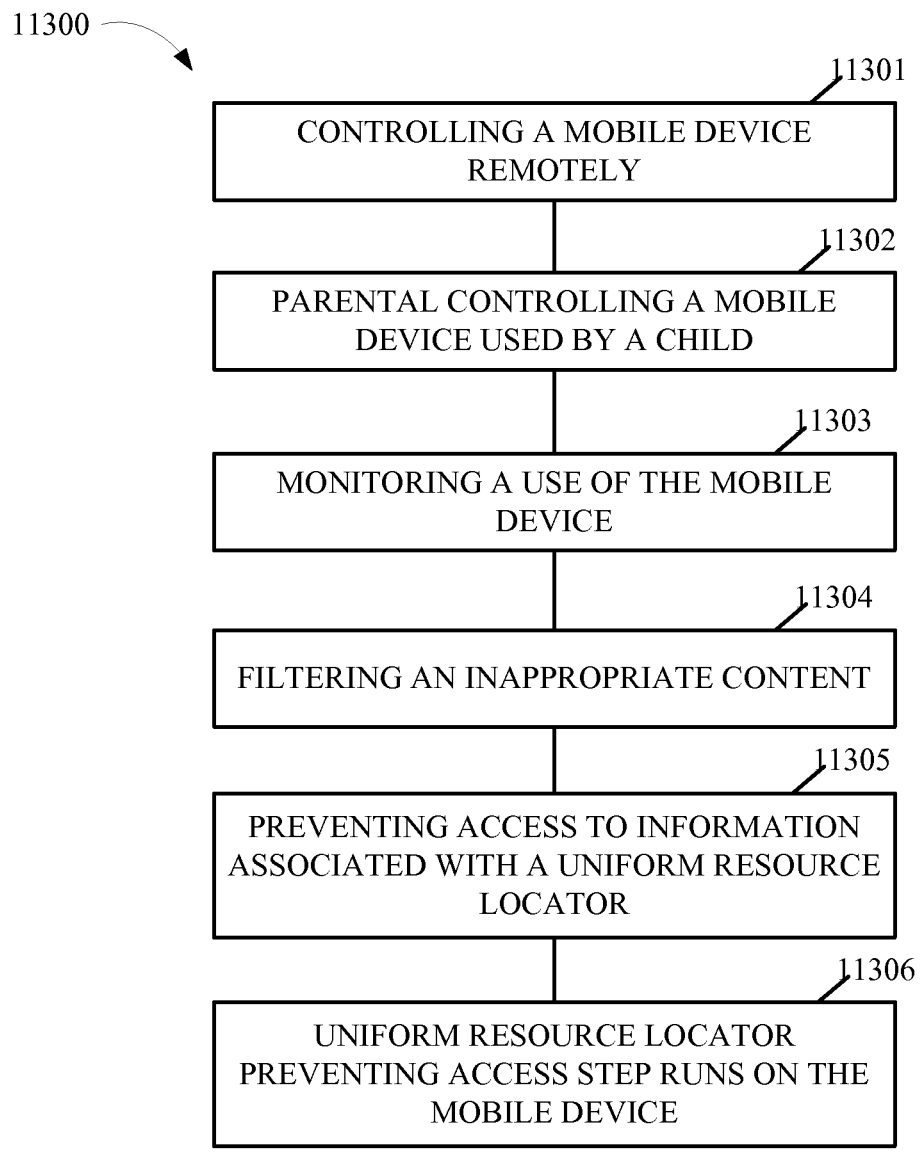
FIG. 113 is an exemplary embodiment of the present invention.

As further exemplified in FIG. 113, an exemplary method 11300 may include controlling a mobile device remotely at 11301, wherein the controlling step includes parental controlling a mobile device used by a child at 11302, and wherein the parental controlling step may include monitoring a use of the mobile device at 11303, filtering an inappropriate content at 11304, and preventing access to information associated with a Uniform Resource Locator at 11305, wherein the Uniform Resource Locator preventing access step runs on the mobile device at 11306.

Figure 114:
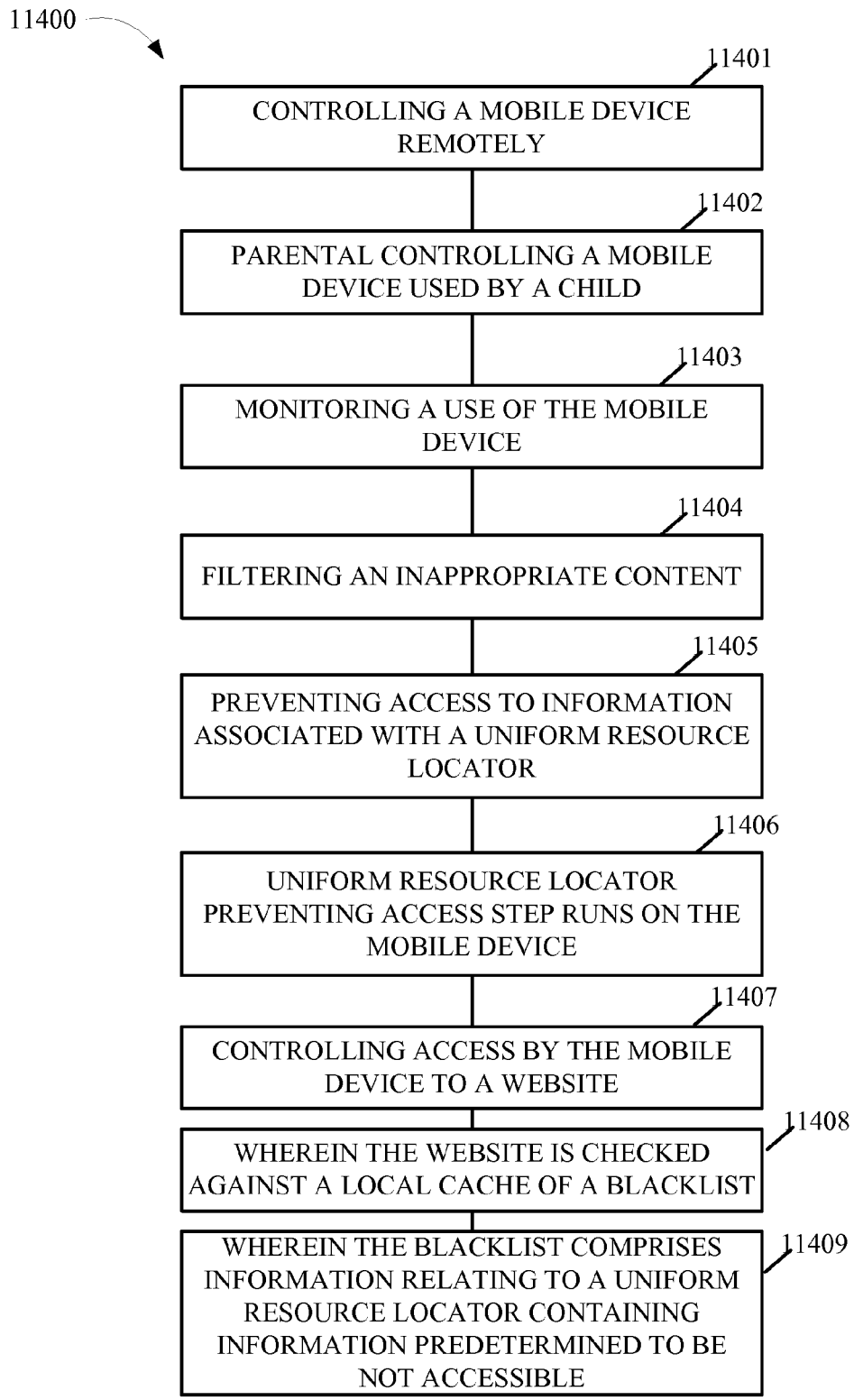
FIG. 114 is an exemplary embodiment of the present invention.

As further exemplified in FIG. 114, an exemplary method 11400 may include controlling a mobile device remotely at 11401, wherein the controlling step includes parental controlling a mobile device used by a child at 11402, and wherein the parental controlling step may include monitoring a use of the mobile device at 11403, filtering an inappropriate content at 11404, and preventing access to information associated with a Uniform Resource Locator at 11405, wherein the Uniform Resource Locator preventing access step runs on the mobile device at 11406, and wherein the Uniform Resource Locator preventing access step may further include controlling access by the mobile device to a website at 11407, wherein the website is checked against a local cache of a blacklist at 11408, wherein the blacklist includes information relating to a Uniform Resource Locator containing information predetermined to be not accessible at 11409.

Figure 115:
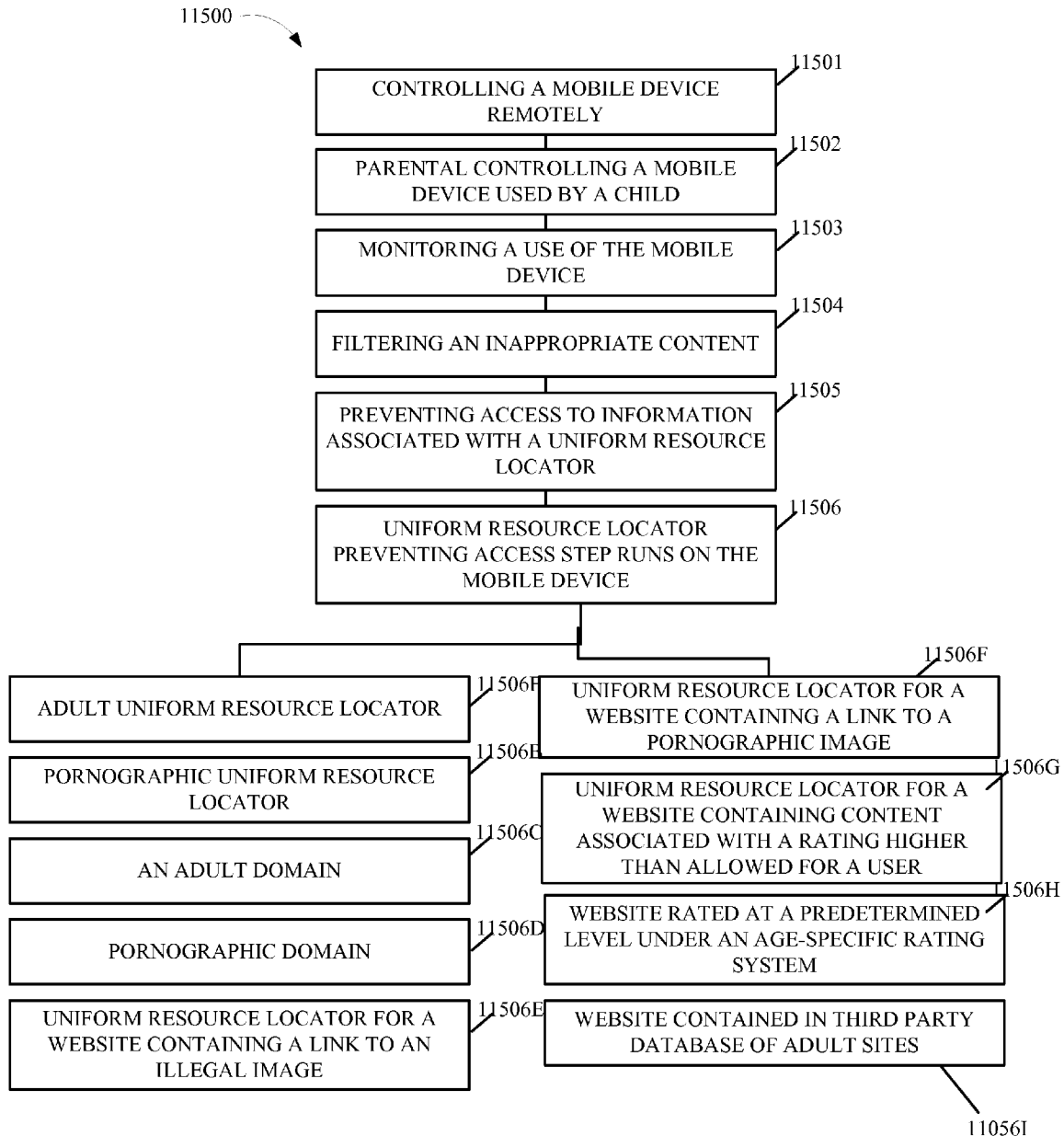
FIG. 115 is an exemplary embodiment of the present invention.

As further exemplified in FIG. 115, an exemplary method 11500 may include controlling a mobile device remotely at 11501, wherein the controlling step includes parental controlling a mobile device used by a child at 11502, and wherein the parental controlling step may include monitoring a use of the mobile device at 11503, filtering an inappropriate content at 11504, and preventing access to information associated with a Uniform Resource Locator at 11505, wherein the Uniform Resource Locator preventing access step runs on the mobile device at 11506, and wherein the blacklist includes at least one of an adult Uniform Resource Locator 11506A, a pornographic Uniform Resource Locator 11506B, an adult domain 11506C, a pornographic domain 11506D, a Uniform Resource Locator for a website containing a link to an illegal image 11506E, a Uniform Resource Locator for a website containing a link to a pornographic image 11506F, a Uniform Resource Locator for a website containing content associated with a rating higher than allowed for a user 11506G, a website rated at a predetermined level under an age-specific rating system 11506H, or a website contained in third party database of adult sites 11506I.

Figure 116:
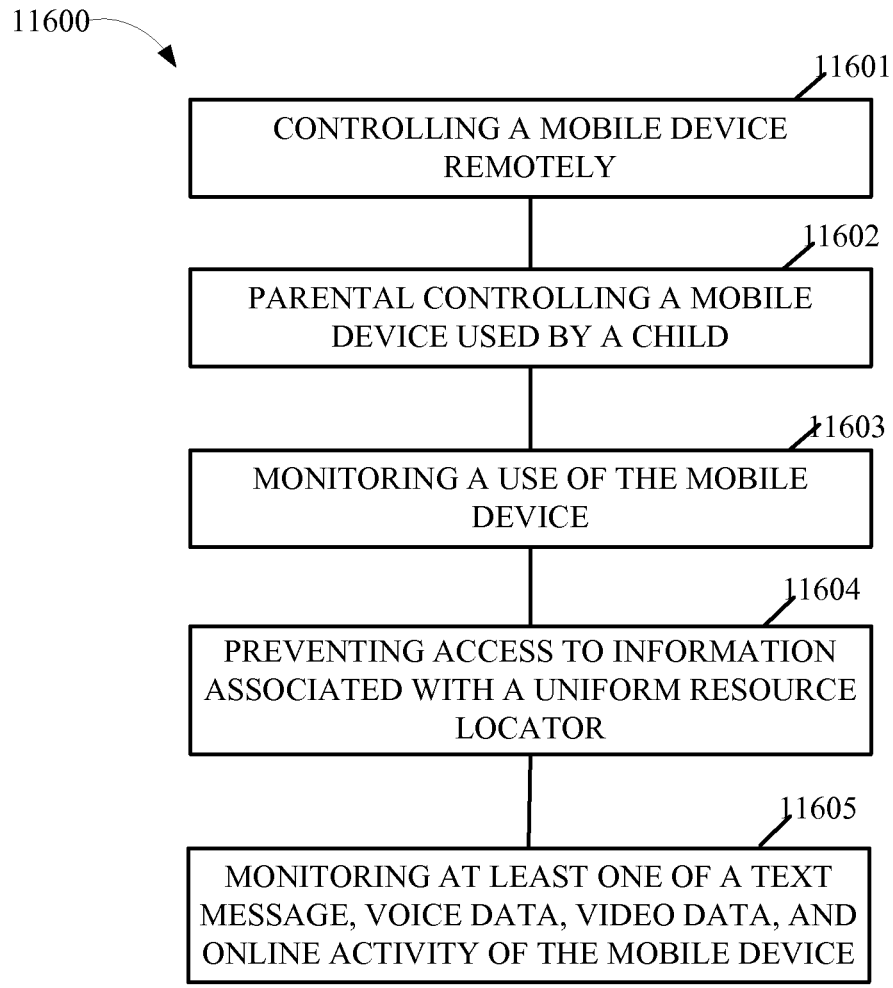
FIG. 116 is an exemplary embodiment of the present invention.

As further exemplified in FIGS. 107 and 116, an exemplary method 10700 or 11600 may include controlling a mobile device remotely at 11601, wherein the controlling step includes parental controlling a mobile device used by a child at 11602, wherein the parental controlling step may include monitoring a use of the mobile device at 11603, filtering an inappropriate content at 10704, and preventing access to information associated with a Uniform Resource Locator at 10705, and wherein the monitoring step 11603 may include monitoring at least one of a text message, voice data, video data, and online activity of the mobile device at 11605.

Figure 117:
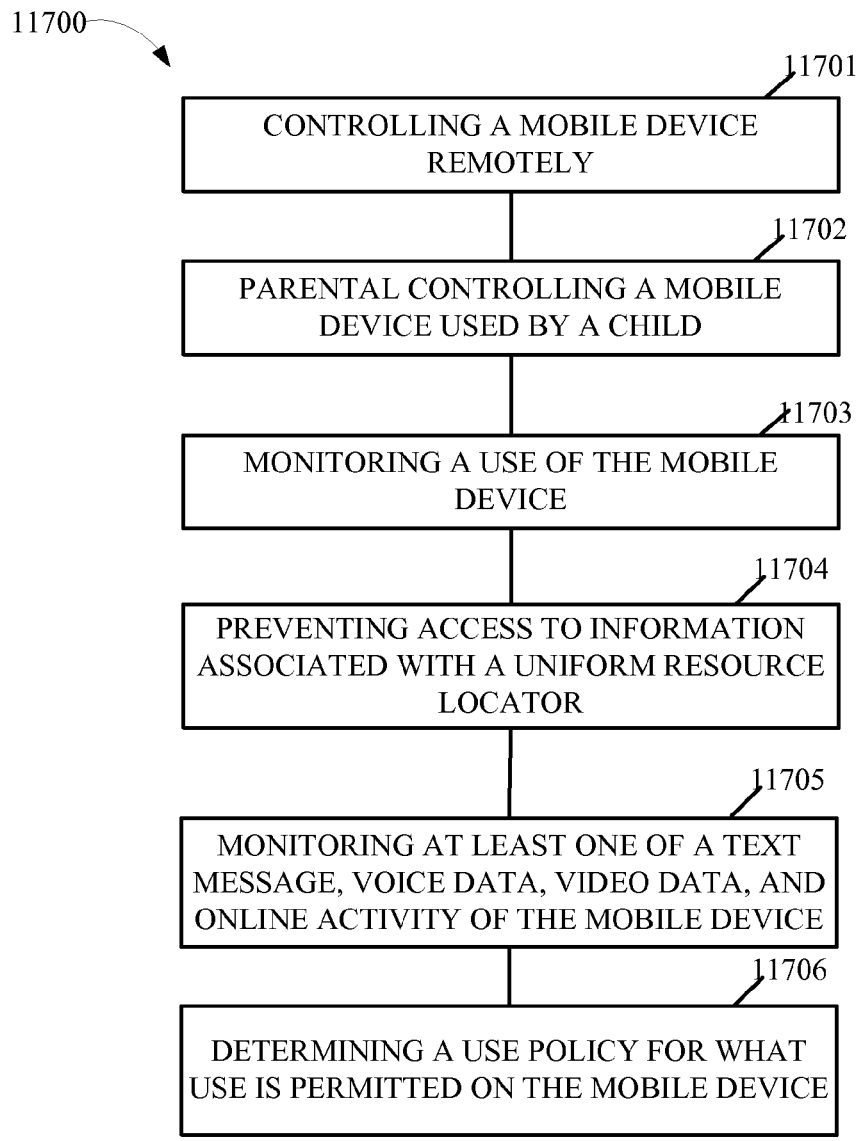
FIG. 117 is an exemplary embodiment of the present invention.

As further exemplified in FIGS. 107, 116, and 117, an exemplary method 10700, 11600, or 11700 may include controlling a mobile device remotely at 11701, wherein the controlling step includes parental controlling a mobile device used by a child at 11702, wherein the parental controlling step may include monitoring a use of the mobile device at 11703, filtering an inappropriate content at 10704, and preventing access to information associated with a Uniform Resource Locator at 10705, wherein the monitoring step 11703 may include monitoring at least one of a text message, voice data, video data, and online activity of the mobile device at 11705, and may further include determining a use policy for what use is permitted on the mobile device at 11706.

As further exemplified in FIGS. 107, 116, 117, and 118, an exemplary method 10700, 11600, 11700 or 11800 may include controlling a mobile device remotely at 11801, wherein the controlling step includes parental controlling a mobile device used by a child at 11802, wherein the parental controlling step may include monitoring a use of the mobile device at 11803, filtering an inappropriate content at 10704, and preventing access to information associated with a Uniform Resource Locator at 10804, wherein the monitoring step 11803 may include monitoring at least one of a text message, voice data, video data, and online activity of the mobile device at 11805, and may further include determining a use policy for what use is permitted on the mobile device at 11806, and wherein the monitoring step may further include any combination of the following: viewing a communication with the mobile device at 11807A; viewing information relating to a party communicating with the mobile device at 11807B; viewing a log of a call on the mobile device at 11807C; viewing at least one of a text message and a text message attachment transferred to and from the mobile device at 11807D; viewing an email transferred to and from the mobile device at 11807E; viewing a website visited on the mobile device at 11807F; viewing an image transferred to and from the mobile device at 11807G; viewing a location of the mobile device at 11807H; and viewing an application on the mobile device at 11807I.

As further exemplified in FIGS. 107, 116, 117, 118, and 119, an exemplary method 10700, 11600, 11700, 11800, or 11900 may include controlling a mobile device remotely at 11901, wherein the controlling step includes parental controlling a mobile device used by a child at 11902, wherein the parental controlling step may include monitoring a use of the mobile device at 11903, filtering an inappropriate content at 10704, and preventing access to information associated with a Uniform Resource Locator at 10904, wherein the monitoring step 11903 may include monitoring at least one of a text message, voice data, video data, and online activity of the mobile device at 11905, and may further include determining a use policy for what use is permitted on the mobile device at 11906, and wherein the monitoring step may further include any combination of the following: viewing a communication with the mobile device at 11807A; viewing information relating to a party communicating with the mobile device at 11807B; viewing a log of a call on the mobile device at 11807C; viewing at least one of a text message and a text message attachment transferred to and from the mobile device at 11807D; viewing an email transferred to and from the mobile device at 11807E; viewing a website visited on the mobile device at 11807F; viewing an image transferred to and from the mobile device at 11807G; viewing a location of the mobile device at 11807H; and viewing an application on the mobile device at 11807I, and wherein the monitoring step may further include any combination of the following: initiating a locking of the mobile device at 11907A; initiating a wiping of at least one file on the mobile device at 11907B; backing up data of the mobile device at 11907C; porting a file in the mobile device to another mobile device at 11907D; initiating an update of a virus protection on the mobile device at 11907E; and updating a use policy for at least one of amending, adding or deleting an existing use policy at 11907F.

Figure 120:
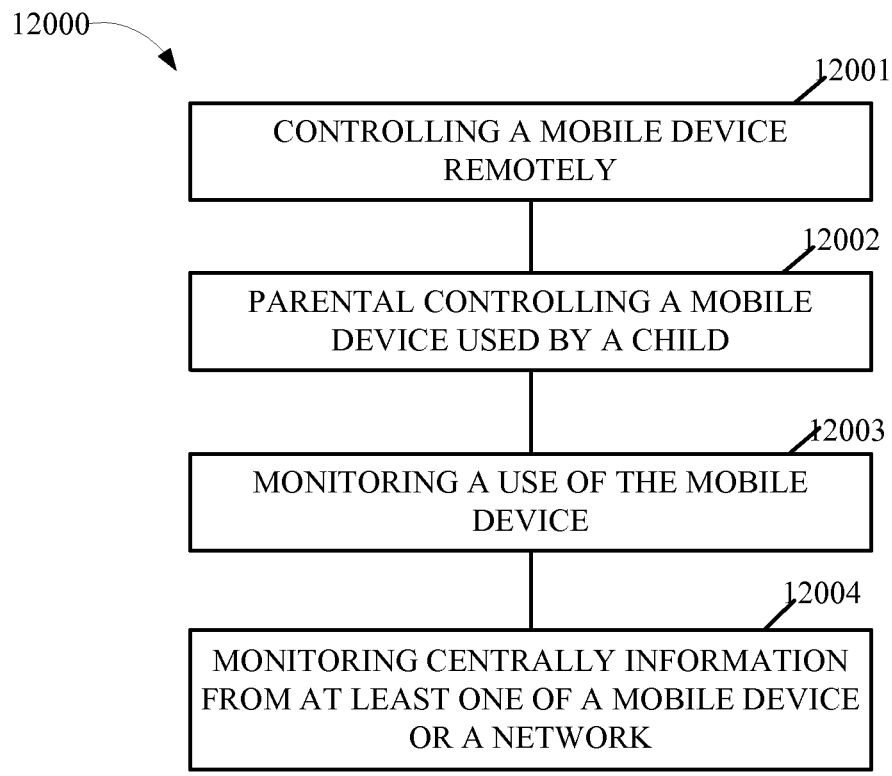
FIG. 120 is an exemplary embodiment of the present invention.

As further exemplified in FIGS. 66 and 120, an exemplary method 6600 and 12000 may include controlling a mobile device remotely at 12001, wherein the controlling step includes parental controlling a mobile device used by a child at 12002, and wherein the parental controlling step may include monitoring a use of the mobile device at 12003 and filtering an inappropriate content at 6604, and the method further may include monitoring centrally information from at least one of a mobile device or a network.

Figure 121:
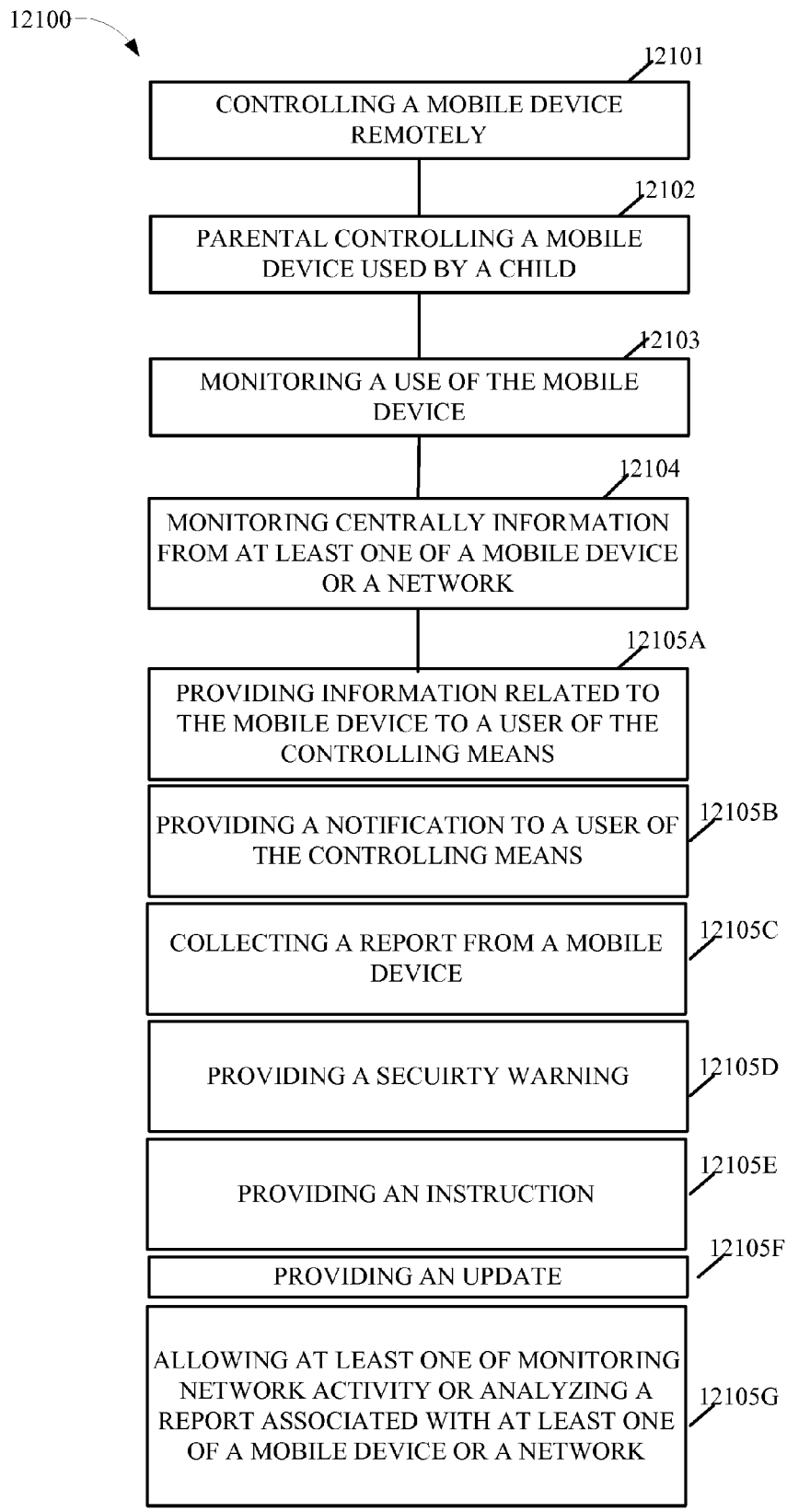
FIG. 121 is an exemplary embodiment of the present invention.

As further exemplified in FIGS. 66, 120, and 121, an exemplary method 6600 and 12100 may include controlling a mobile device remotely at 12101, wherein the controlling step includes parental controlling a mobile device used by a child at 12102, and wherein the parental controlling step may include monitoring a use of the mobile device at 12103 and filtering an inappropriate content at 6604, and the method further may include monitoring centrally information from at least one of a mobile device or a network, and wherein the monitoring centrally step 12104 may include any combination of the following: providing information related to the mobile device to a user of the controlling means at 12105A; providing a notification to a user of the controlling means at 12105B; collecting a report from a mobile device at 12105C; providing a security warning at 12105D; providing an instruction at 12105E; providing an update at 12105F; and allowing at least one of monitoring network activity or analyzing a report associated with at least one of a mobile device or a network at 12105G.

Figure 122:
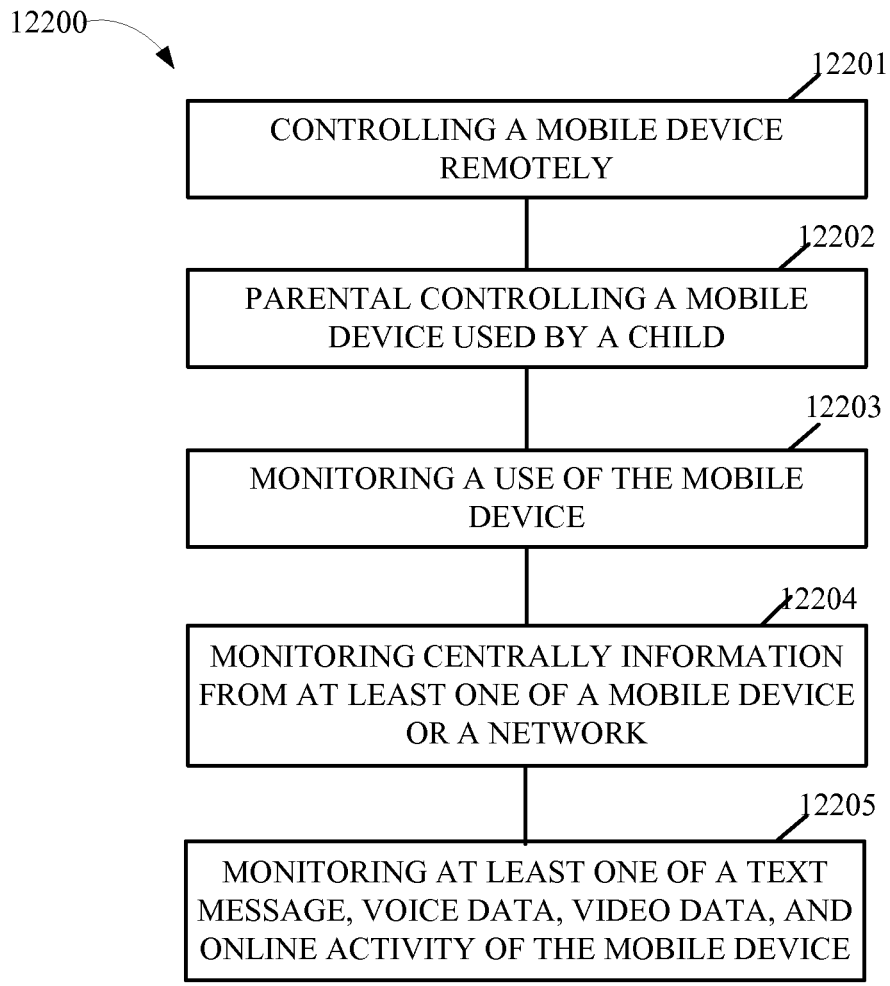
FIG. 122 is an exemplary embodiment of the present invention.
Figure 123:
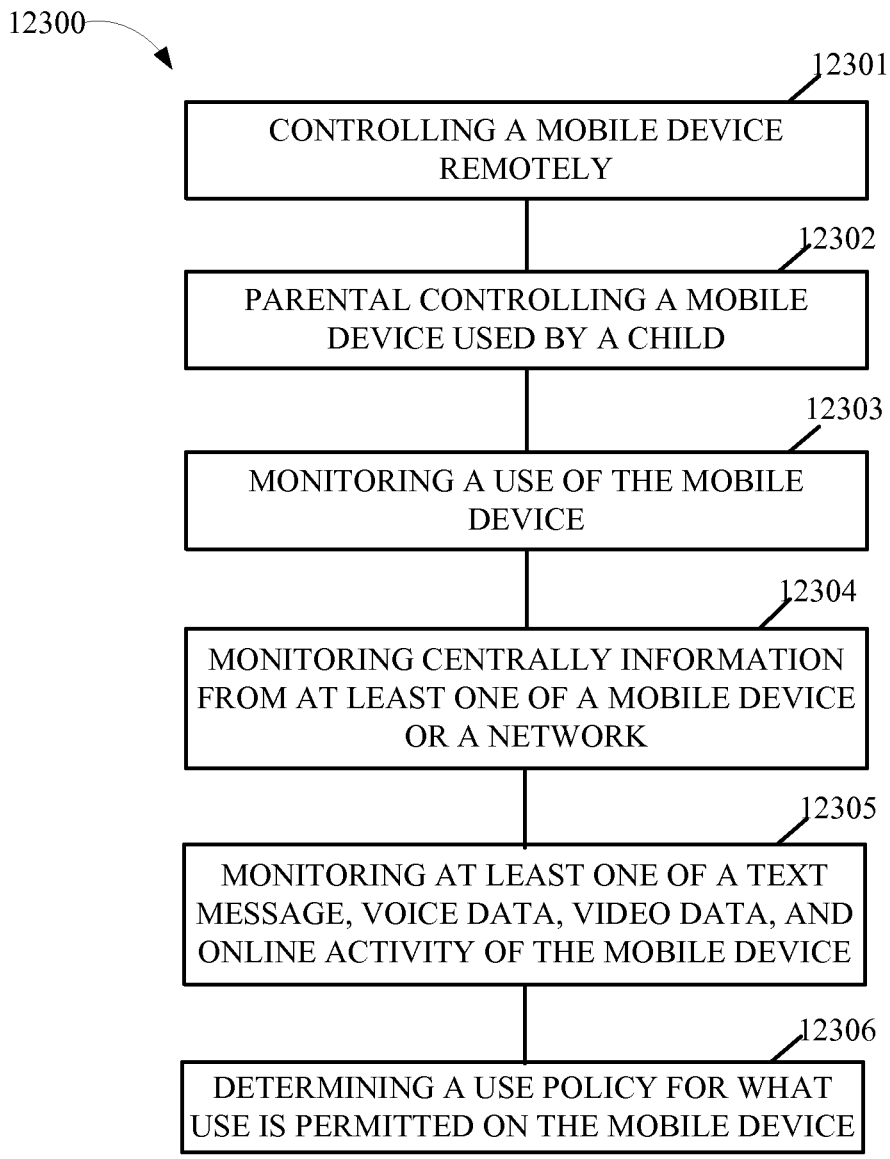
FIG. 123 is an exemplary embodiment of the present invention.
Figure 124:
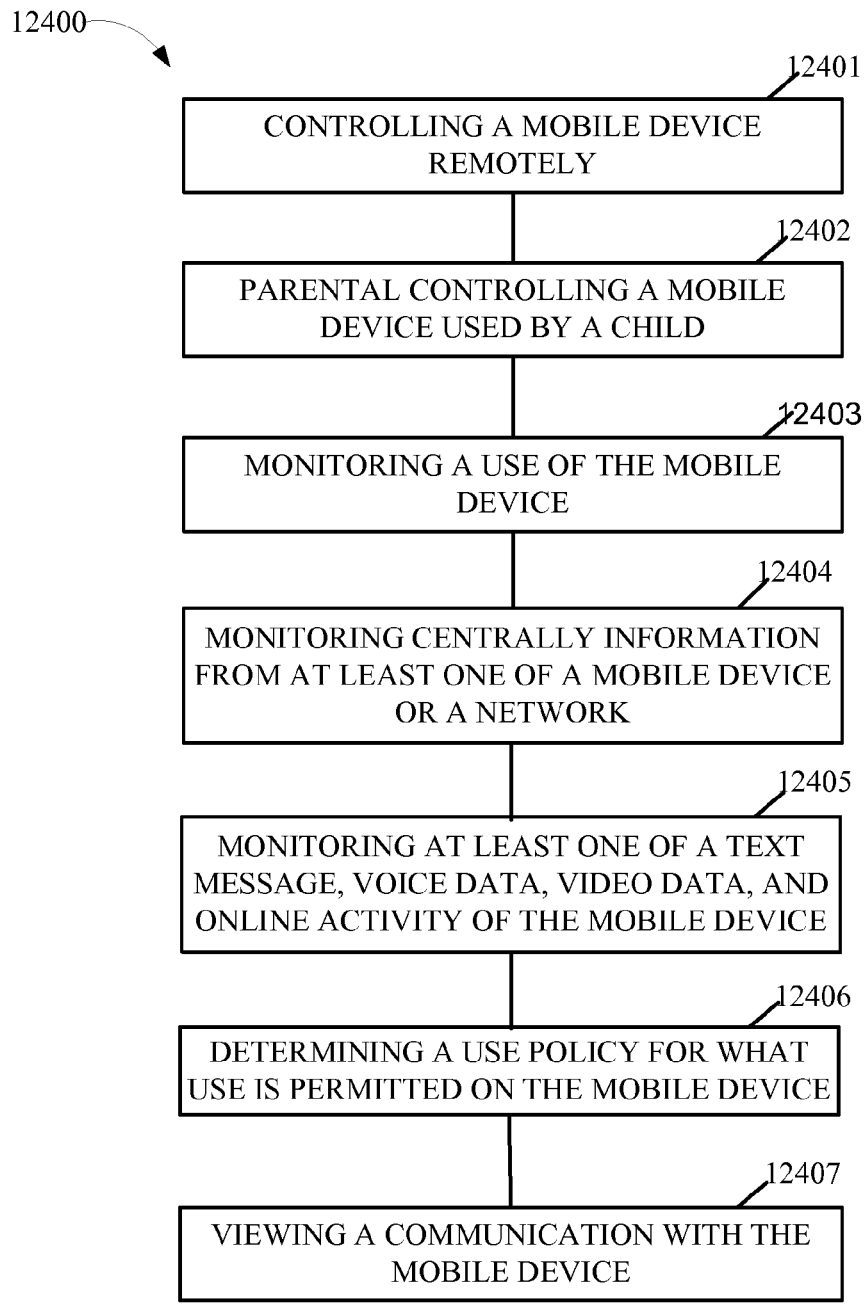
FIG. 124 is an exemplary embodiment of the present invention.
Figure 125:
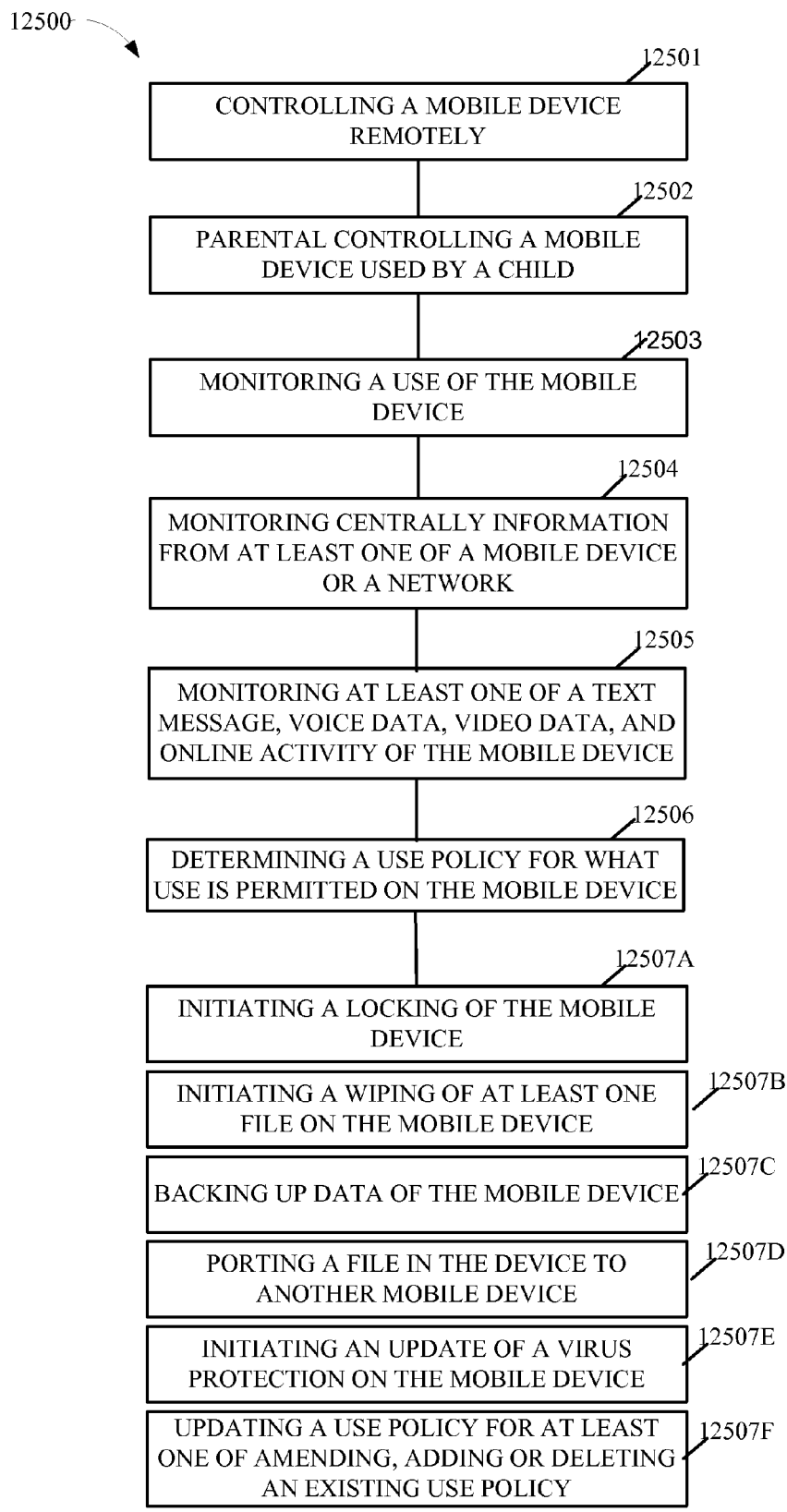
FIG. 125 is an exemplary embodiment of the present invention.

As further exemplified in FIGS. 66, 120, and 122, an exemplary method 6600, 12000, and 12200 may include controlling a mobile device remotely at 12201, wherein the controlling step includes parental controlling a mobile device used by a child at 12202, and wherein the parental controlling step may include monitoring a use of the mobile device at 12203 and filtering an inappropriate content at 6604, and the method further may include monitoring centrally information from at least one of a mobile device or a network, and wherein the monitoring step may include monitoring at least one of a text message, voice data, video data, and online activity of the mobile device at 12205.

As further exemplified in FIGS. 66, 120, 122, and 123, an exemplary method 6600, 12000, 12200, or 12300 may include controlling a mobile device remotely at 12301, wherein the controlling step includes parental controlling a mobile device used by a child at 12302, and wherein the parental controlling step may include monitoring a use of the mobile device at 12303 and filtering an inappropriate content at 6604, and the method further may include monitoring centrally information from at least one of a mobile device or a network, and wherein the monitoring step may include monitoring at least one of a text message, voice data, video data, and online activity of the mobile device at 12305, and wherein the monitoring step further may include determining a use policy for what use is permitted on the mobile device.

Figure 118:
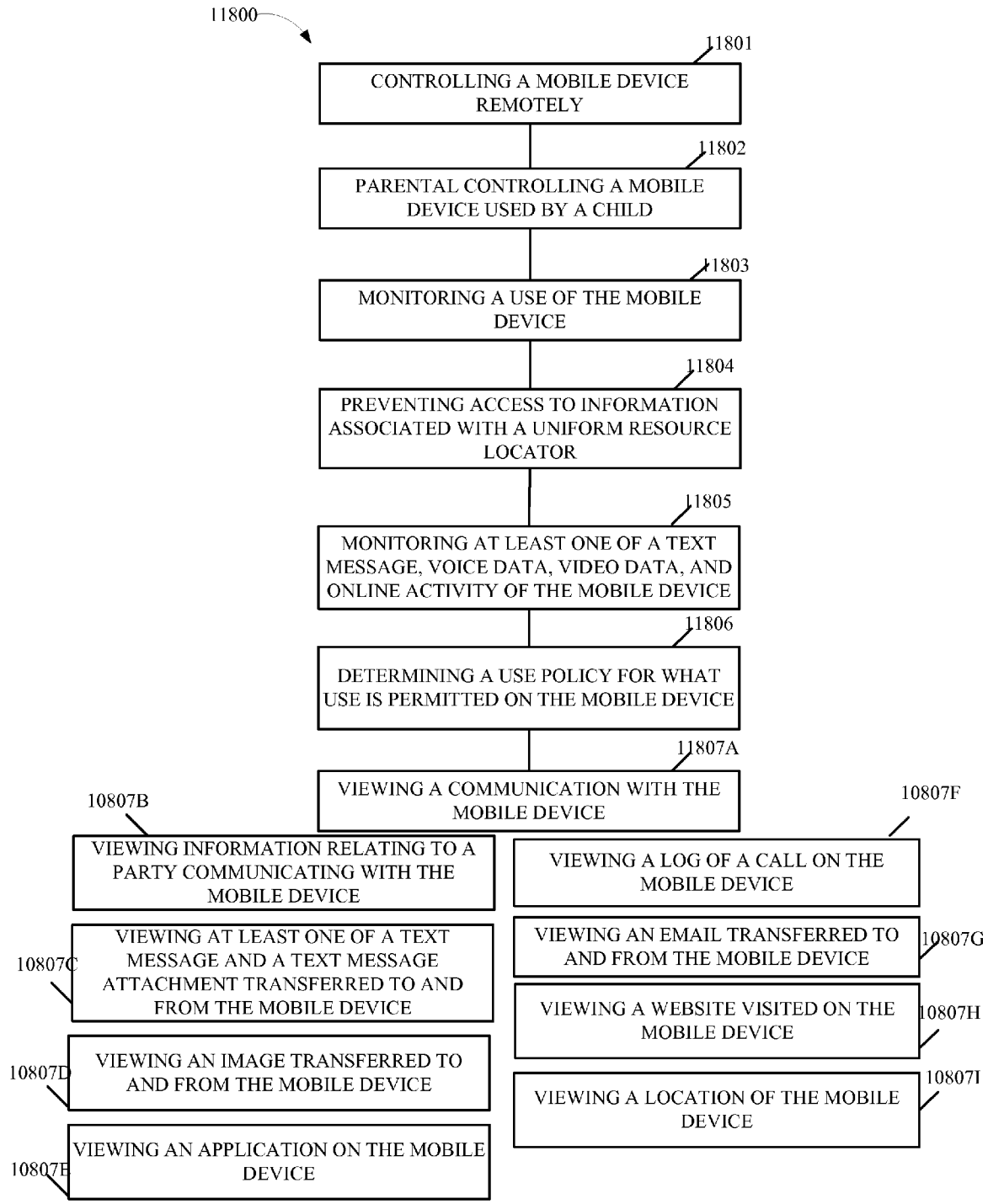
FIG. 118 is an exemplary embodiment of the present invention.
Figure 119:
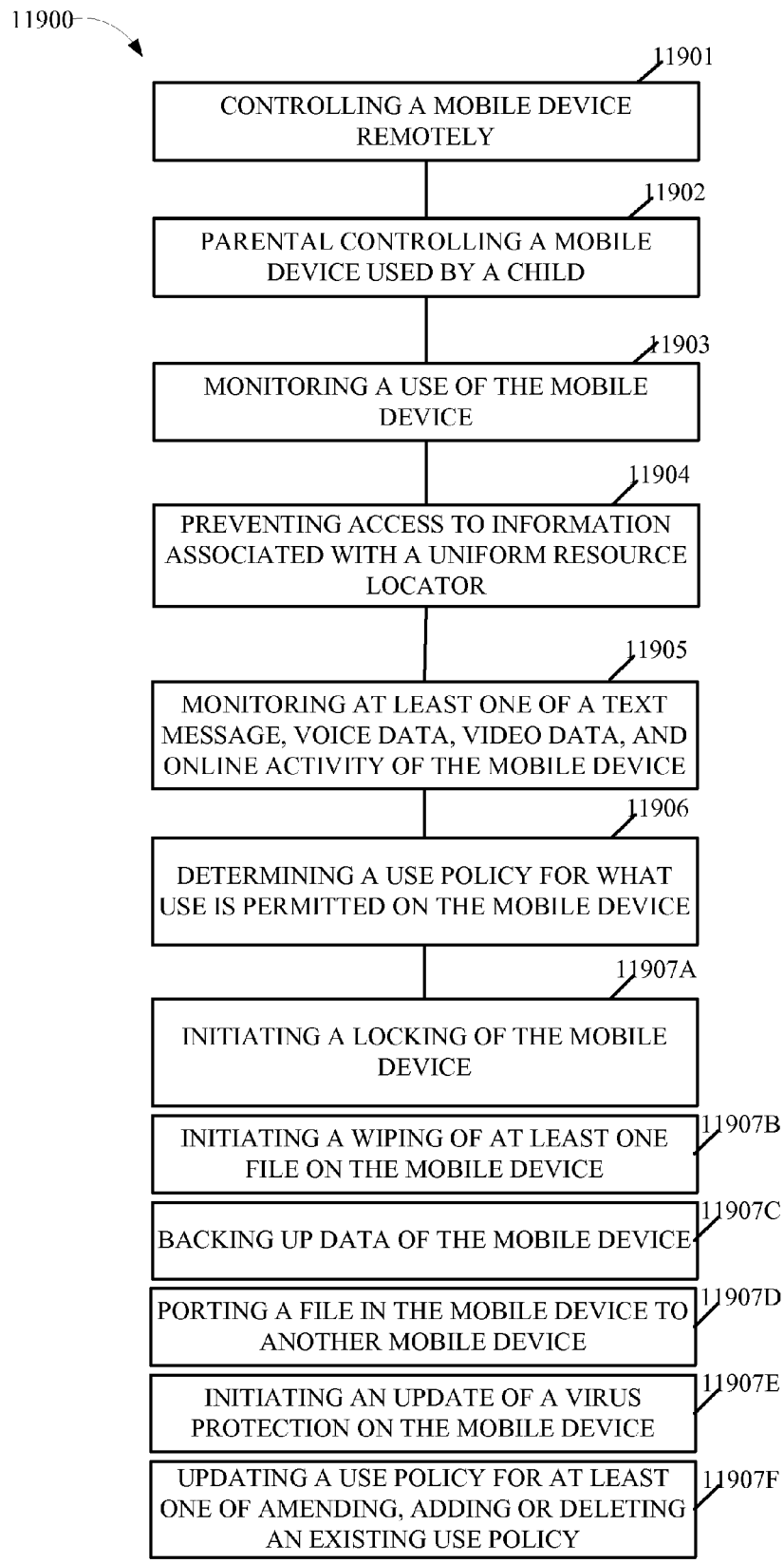
FIG. 119 is an exemplary embodiment of the present invention.

As further exemplified in FIGS. 66, 120, 122, 123, and 124, an exemplary method 6600, 12000, 12200, 12300, or 12400 may include controlling a mobile device remotely at 12401, wherein the controlling step includes parental controlling a mobile device used by a child at 12402, and wherein the parental controlling step may include monitoring a use of the mobile device at 12403 and filtering an inappropriate content at 6604, and the method further may include monitoring centrally information from at least one of a mobile device or a network, and wherein the monitoring step may include monitoring at least one of a text message, voice data, video data, and online activity of the mobile device at 12305, and wherein the monitoring step further may include determining a use policy for what use is permitted on the mobile device at 12406, wherein the monitoring step 12403 further may include any combination of the following: viewing a communication with the mobile device at 12047; (and as shown in FIG. 118) viewing information relating to a party communicating with the mobile device; viewing a log of a call on the mobile device; viewing at least one of a text message and a text message attachment transferred to and from the mobile device; viewing an email transferred to and from the mobile device; viewing a website visited on the mobile device; viewing an image transferred to and from the mobile device; viewing a location of the mobile device; and viewing an application on the mobile device.

As further exemplified in FIGS. 66, 120, 122, 123, and 125, an exemplary method 6600, 12000, 12200, 12300, or 12500 may include controlling a mobile device remotely at 12501, wherein the controlling step includes parental controlling a mobile device used by a child at 12502, and wherein the parental controlling step may include monitoring a use of the mobile device at 12503 and filtering an inappropriate content at 6604, and the method further may include monitoring centrally information from at least one of a mobile device or a network, and wherein the monitoring step may include monitoring at least one of a text message, voice data, video data, and online activity of the mobile device at 12505, wherein the monitoring step further may include determining a use policy for what use is permitted on the mobile device at 12506, and wherein the use policy determining step 12056 may further include any combination of the following: initiating a locking of the mobile device at 12507A; initiating a wiping of at least one file on the mobile device at 12507B; backing up data of the mobile device at 12507C; porting a file in the mobile device to another mobile device at 12507D; initiating an update of a virus protection on the mobile device at 12507E; and updating a use policy for at least one of amending, adding or deleting an existing use policy at 12507F.

Figure 126:
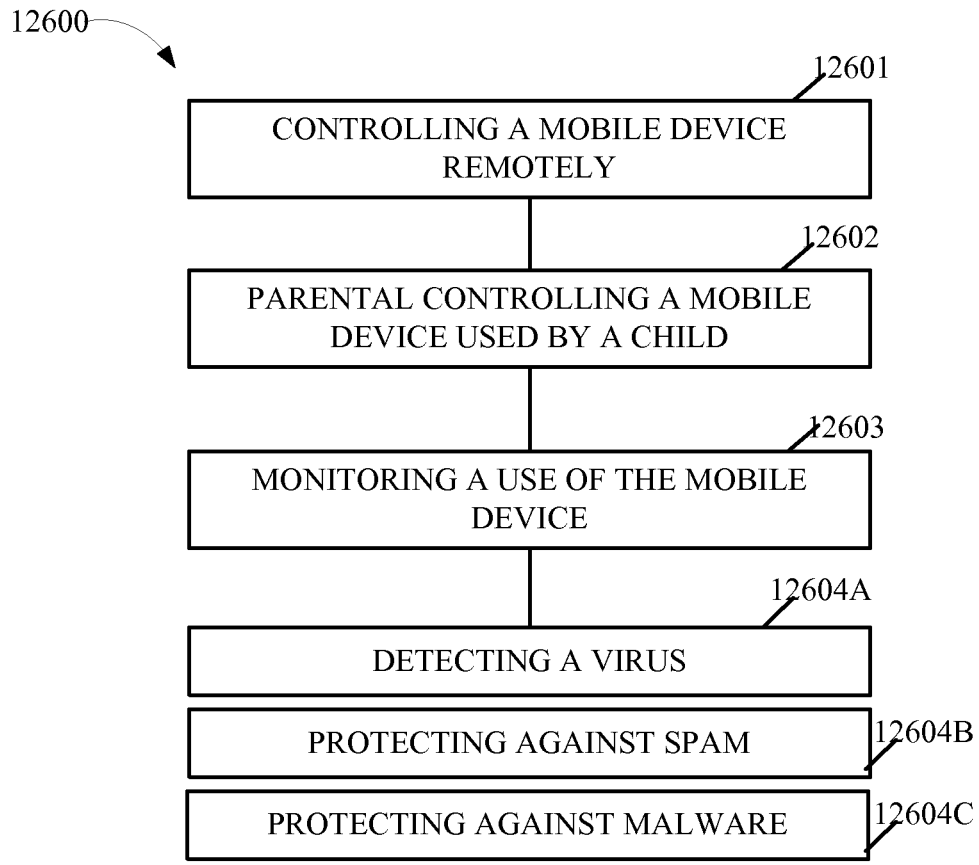
FIG. 126 is an exemplary embodiment of the present invention.

As further exemplified in FIGS. 66 and 126, an exemplary method 6600 or 12600 may include controlling a mobile device remotely at 12601, wherein the controlling step includes parental controlling a mobile device used by a child at 12602, and wherein the parental controlling step may include monitoring a use of the mobile device at 12603 and filtering an inappropriate content at 6604, and wherein the method further may include any combination of the following: detecting a virus at 12604A; protecting against spam at 12604B; and protecting against malware at 12604C.

As noted earlier, the exemplary embodiments described in FIGS. 1-126 need not be implemented in a parental control setting. It can be implemented in other settings such as, business use and governmental use. Thus, the descriptions and the drawing figures corresponding to the parental control module and the method steps, for example, can be deleted in such other types of implementations. Another set of descriptions and drawings directed to such other types of implementations are being omitted for brevity sake.

As noted above, the ability to control a child's cell phone is very helpful. Many parents provide their children with cell phones, which provide parents with the convenience of easily contacting their children. Cell phones provide children a measure of safety by allowing them to instantly contact their parents or authorities if in need. Moreover, among children cell phones are increasingly a means for socializing with school friends. However, cell phone usage by those under the age of 18 presents potential problems for parents. Parents are generally unable to monitor cell phone usage, and often only become aware of inappropriate activity after the fact, sometimes weeks later when the bill arrives. Parents also recognize that cell phone usage during inappropriate times, such as during school, is an undesirable distraction for their children. Further, feature rich cell phones and service contracts allow children unprecedented access to adult-oriented materials and age-inappropriate social interactions. Moreover, cell phones allow children to engage in innocent or seemingly harmless activity that may actually be illegal given the current child pornography laws, many of which were written prior to the advent of cell phones. Therefore, the present invention, as implemented herein, allows parents to monitor their children's cell phone activity, and allow age-appropriate and time-appropriate activity while blocking inappropriate activity.

As an example, the system and method for parental control allows parents to monitor their child's cell phone usage and block the phone from inappropriate or undesirable types of usage. In embodiments, the system and method uses the following general types of components: parental monitors, mobile phone and network monitoring intelligent agents, and centralize monitoring servers. Generally, agents, monitors, and servers are software modules, executables, applications, interfaces to servers, or other software programs that incorporate features of the present invention. In embodiments, the agents, monitors, and servers run on mobile platforms, computers, servers, or distributed computing platforms.

As an example, a parental monitor may be a web-based monitoring console associated with one or more mobile phones on a mobile network. The parental monitor may present a dashboard to the parent for monitoring the location, messaging, voice, image and online activity of the mobile phones, and for making changes to the policies that govern what the child is able to do on their mobile phone. The parental monitor is communicatively connected to one or more agents or servers, for example an agent on the mobile phone itself, or a network accessible centralized monitoring server. The parental monitor provides logged information and/or real-time event monitoring of the child's mobile phone.

As an example, the parental monitor is capable of performing some or all of the following functions: View a transaction list of communications to and from the child's mobile phone; view parties with whom the child is communicating using the child's mobile phone, for example the address book or contacts list on the mobile phone; view call logs of called and calling numbers on the child's mobile phone; view transmitted and received SMS/MMS messages and attachments for the child's mobile phone; view transmitted and received email messages and attachments for the child's mobile phone; view a list of websites visited from the child's mobile phone; view pictures taken, transmitted or received on the child's mobile phone; view current location of the child's mobile phone either provided by network triangulation or through an integrated GPS on the child's mobile phone; functionality is enhanced with the GPS theft command which will automatically update the location of the device in 2 minute increments to assist in the tracking and recovery of lost or stolen device; view locations visited by the child's mobile phone from a network agent or through an integrated GPS on the child's mobile phone; view a list of software on the child's mobile phone; initiate locking of the child's mobile phone; initiate alarm to audibly locate a lost a device in silent or vibrate mode; initiate selective wiping of files, or the wiping of all files, on the child's mobile phone; initiate the backing up or restoring of the child's mobile phone; initiate copying or porting of existing files and policies to a new mobile phone; initiate an update of virus protection on the child's mobile phone; and configure new usage policies and update the child's mobile phone with the new usage policies.

As an example, the on-demand initiation of lock, wipe, locate, backup, GPS theft and alarm functionality are securely delivered to a mobile device via SMS. The SMS communication is secured in the following manner: HMAC technology is utilized to secure SMS messages delivering commands to the client on mobile devices. Commands are specially formatted command strings embedded in a text message. The format of such a command is: STRING:{hash code}:{time}:{optional parameter}.

As an example, to the above command string STRING and all colons are literal strings. The {and} characters indicate a value determined at runtime.

The {hash code} portion is the output of the HMAC algorithm1. The input to the hash is another string of the form: {command id}:{time client key}:{optional parameter}.

In that string {command id} is a standard command codes. The {time} field is a Unix style timestamp. It must match the {time} string in the command string The {client key} is a secret key shared between the client and server generated upon client registration. The {client key} is also used as part of the HMAC algorithm. Most implementations of HMAC require this value in order to initialize the HMAC instance. Finally, the {optional parameter} string is used by some commands that require more information. For example, application revocation commands must specify the application to be uninstalled. This string must also be identical in the hash input and the command string. If the command does not use a parameter, this filed and the preceding colon must be omitted.

With children and adolescents downloading and installing their own software onto mobile phones, control over these applications presents a growing challenge to parents. Many third party applications such as Instant Messaging, VoIP, and P2P file sharing can introduce new security threats, and expose underage users to illicit, inappropriate, or illegal content. The Application Control Agent enables a parent to control the applications allowed to run on their child's mobile phone. The parent may block or authorize applications according to a pre-defined policy.

As an example, the Application Control Agent is an intelligent agent that runs on the mobile phone. In embodiments, the Application Control Agent runs silently and cannot be disabled, uses a password protected uninstall program to prevent a child from uninstalling it, includes a heartbeat monitor to automatically restart the agent if it terminates or is terminated, and/or provides notification to the parent if there is an attempt to uninstall the agent. The Application Control Agent uses policies configured by the parent that allow or prevent actions by the child.

In non-limiting examples, the policies allow a parent to set time-of-day restrictions, for example by restricting phone calls and text message during school hours except from the parents, or enabling communications only from known users or groups of users in the child's address book, or blocking emails and MMS messages containing attachments such as photos, music, or executables. The policies allow the parent to monitor and control the child's mobile phone to prevent inappropriate use of the mobile phone.

As an example, the Application Control Agent is capable of performing some or all of the following policy management functions: Send a notification to the parent if certain actions are performed, for example, the calling of a particular number; Scan email and MMS attachments and send notification to the parent regarding the attachment; Identify software running on the child's mobile phone; Enable time-of-day restrictions for software applications; Block or enable communications with certain users or groups based on time-of-day restrictions; Block or enable email and MMS attachments based on users or groups; Block or enable individual software applications from running on the child's mobile phone; Block or enable groups of software applications from running on the child's mobile phone using "blacklist" and "whitelist" methodology; Block software applications based on particular system calls or function calls; Configure and associate connections that each software application is allowed to utilize; Block the use of the mobile phone camera; Emergency lock down of mobile phone connectivity and installation activity, for example in the event of a virus or hacker attack; Backup and restoring applications and data on the mobile phone; Provides Anti-Theft and Identify Protection by locking the mobile phone, wiping the contents to prevent identity theft, and locating the phone through network triangulation and/or an internal GPS device in the mobile phone; Training mode for pre-configuring application rights during initial setup of the mobile phone; and Communication Control to block unwanted voice and text communication from specified sources.

As an example, the Application Control agent is capable of performing application and device control for the following applications and functions:
  Communications:
    Instant Messaging;
    P2P File Sharing;
    Telephony;
    Conferencing;
    Fax;
    VoIP;
    Email; and
    Web Browsing.
  Audio and Video:
    Media players for playback of audio or video;
    Media recorders including audio capture, video capture, picture capture from built in microphones or camera
  Access and Privacy:
    Proxy avoidance—applications that enable bypassing of proxy server features;
    Remote access—Software that lets user access a desktop computer or private network;
    Device Audit—Software used to monitor and log activity on the mobile phone;
  Age-Appropriate Entertainment
    Adult sites
    Gambling Software and Sites
    Games As an example, the application control agent communicates to the monitoring server by utilizing available device data interfaces and SOAP delivered via the HTTPS protocol. Monitoring data is stored in a log on the client device and based upon policy parameters, is communicated to the server when thresholds are met. These thresholds include:
  The number of events—Options include, but are not limited to 1, 5, 10 and 15 events. An event consists of any monitored activity, such as an incoming or outgoing voice call or incoming or outgoing text message Log Size—Options include, but are not limited to 1 k, 2 k, 5 k and denote the size of the log storing the monitored data On-Demand—By sending a command to a monitored device, all monitored data contained within logs will be uploaded.

As an example, Image Filter Agent is an intelligent agent that communicates with third party providers of databases of known illegal child images, highly illicit images, or pornographic images and blocks inappropriate images from the child's mobile phone. Images, identified by name and or a hash of the image, are checked against these third party databases or a local cache of names or hashes. In embodiments, images are further rated as G, PG, PG-13, R, NC-17, X, or any similar age or maturity rating system As an example, The Image Filter Agent, in the network or on a mobile phone, scans internet traffic, MMS messages, and Email messages including attachments for inappropriate images. On mobile phones, the Image Filter Agent also monitors Bluetooth communications, web browsers, and P2P networking. An Image Filter Agent on a mobile phone will block the images based on the category and/or the parental setting. In embodiments, an Image Filter Agent in the network takes actions based on the category of image found such as terminating the session containing the image, logging and reporting the image to a centralized monitoring server, such as CoreStats, alerting national Law Enforcement in the case of illegal images, and/or providing a notification to the parental control module, parent, or mobile phone receiving the image so that appropriate action can be taken For example, forensic analysis is performed on the image to identify the camera or software used to create the image, serial number of the camera or software, the camera owner's name, the creation, modification, or save date, and information regarding other attributes of the image.

In addition to known pornographic images, the solution utilizes technology capable of dynamically analyzing image content to determine if images contain pornographic materials. The analysis flow consists of: 1. An image is sent, received or taken by a mobile device; 2. A thumbnail copy of that image is communicated to the monitoring console; 3. The monitoring console analyzes the thumbnail image and determines if nudity is present; and 4. If nudity is present, an alert is created and the parent is notified.

As an example, the URL Filter Agent is an intelligent agent that is configurable to allow domain "blacklists" that prevent the child's mobile phone from accessing inappropriate websites. In embodiments, the blacklist prevents the mobile phone from accessing: Adult and pornographic URLs or domains; URLs for websites containing links to illegal images or pornographic images; and URLs of websites containing content having a rating higher than is allowed for the particular child.

As an example, the blacklist database is created from both commercial list providers and open list providers. The database is typically validated 40 days, and domains which are "dead" or have no content are removed from the blacklist Additionally, URLs for any websites having links to illegal images are added to the blacklist In embodiments, the IP address or domain of the website is also added to the blacklist In embodiments, URLs for websites not having links to illegal images are added to a safe "whitelist". In embodiments, the entries in the blacklist are hashed for fast access As an example, on the mobile phone, websites are first checked against a local cache of the blacklist database or one of the third party databases before the browser is allowed to access the website. In embodiments, websites are further rated as G, PG, PG-13, R, NC-17, X, or any similar age or maturity rating system. In embodiments, the URL Filter Agent communicates with third party providers of databases of known adult sites.

As an example, functional elements of the URL filter agent include: Browsing Control Mechanism—Permits or denies access to user-requested Internet sites based upon the On-Device Policy Store and Website Category Parameter received by the Website Category Database. This element will makes decisions about permitting or denying access to websites and also contains the technology to enforce restrictions to sites; On-Device Policy Store—Contains the Internet Filtering and Control policy as received from the Policy Configuration Module; Website Category Database—Database of all known Internet sites and the associated category. Communicates this category to the Browsing Control Mechanism on the mobile device; Website Query—Information from the mobile device to the Website Category Database regarding the address of the desired site to be accessed. This information will contain the URL of the site being attempting to be accessed; On-Device Reporting Module—Logs and communicates to the Parental Control Dashboard and Enterprise Management Console data relating to sites visited or site blocked.

As an example, centralized monitoring servers are computer systems or distributed computing systems, for example CoreStats, that receive information from intelligent agents in mobile phones and/or intelligent agents in the network and facilitate the following actions: Provide information to Parental Monitors; Send notifications to Parental Monitors or to parents via email or text messaging; Provide a collection server for receiving reports from intelligent agents; Send security warnings, instructions, or updates to intelligent agents; and Provide a user interference that allows human experts to monitor network activity and analyze reports from intelligent agents.

The Parental Control System and Method may be combined with virus detection software, anti-spam software, and/or a malware monitoring systems as a comprehensive solution for mobile platforms. Exemplary virus detection software is disclosed in patent application Ser. No. 11/697,664, US Publication 20070240220A1, entitled "MALWARE DETECTION SYSTEM AND METHOD FOR LIMITED ACCESS MOBILE PLATFORMS". An exemplary monitoring system is disclosed in patent application Ser. No. 11/869,729, US Publication 20080086773A1, entitled "SYSTEM AND METHOD OF REPORTING AND VISUALIZING MALWARE ON MOBILE NETWORKS"

It should be appreciated that the particular embodiments of systems and processes described herein are merely possible implementations of the present disclosure, and that the present disclosure is not limited to the particular implementations described herein and shown in the accompanying figures. For example, in alternative implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques may be described and implemented in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A system, comprising:
    a mobile device comprising a processing unit; and
    a controlling module for controlling the mobile device remotely, the controlling module comprising:
        a monitoring module for monitoring a use of the mobile device, the monitoring module comprising a policy setting module for determining a use policy for what use is permitted on the mobile device; and
    an application control module, executed by the processing unit of the mobile device, for controlling whether applications are allowed to run on the mobile device, wherein the application control module executes silently on the mobile device and cannot be disabled, the application control module comprising:
        an application blocking module for blocking an installation of an unauthorized application in accordance with the use policy; and
        an application authorization policy module for authorizing an installation of an authorized application in accordance with the use policy,
        wherein to prevent the application control module from being disabled, the application control module further comprises:
            a heartbeat monitoring module for automatically restarting the application control module if the application control module terminates.

2. The system of claim 1, wherein to prevent the application control module from being disabled, the application control module further comprises:
    a password protected uninstall module for preventing an uninstalling of the application control module with password protection.

3. The system of claim 1, wherein to prevent the application control module from being disabled, the application control module further comprises:
    an uninstall notification module for notifying sending a notification indicating an occurrence of at least one of an attempted uninstall or an attempted modification of the application control module in response to the occurrence.

4. A method, comprising:
    receiving, by an application control module executed by a processing unit of a mobile device from a monitoring module for monitoring use of the mobile device, data defining a use policy for what use is permitted on the mobile device;
    controlling, by the application control module, whether applications are allowed to run on the mobile device in accordance with the use policy, wherein controlling comprises:
        blocking installation of an unauthorized application in accordance with the use policy; and
        authorizing installation of an authorized application in accordance with the use policy; and
    preventing disabling of the application control module, wherein preventing disabling of the application control module comprises:
        monitoring a heartbeat of the application control module to determine whether the application control module has terminated without authorization; and
        automatically restarting the application control module if the application control module terminates without authorization.

5. The method of claim 4, wherein preventing disabling of the application control module comprises:
    preventing an uninstalling of the application control module with password protection.

6. The method of claim 4, wherein preventing disabling of the application control module comprises:
    sending a notification indicating an occurrence of at least one of an attempted uninstall or an attempted modification of the application control module in response to the occurrence.

7. A non-transitory computer-readable storage medium comprising instructions that, when executed, cause a processor of a mobile device to:
    execute an application control module;
    receive, by the application control module from a monitoring module for monitoring use of the mobile device, data defining a use policy for what use is permitted on the mobile device; and
    control, by the application control module, whether applications are allowed to run on the mobile device in accordance with the use policy, wherein the instructions that cause the processor to control whether applications are allowed to run comprise instructions that cause the processor to:
    block installation of an unauthorized application in accordance with the use policy,
    authorize installation of an authorized application in accordance with the use policy; and
    prevent disabling of the application control module, wherein the instructions that cause the processor to prevent disabling of the application control module comprise instructions that cause the processor to:
        monitor a heartbeat of the application control module to determine whether the application control module has terminated without authorization; and automatically restart the application control module if the application control module terminates without authorization.

8. The non-transitory computer-readable storage medium of claim 7, wherein the instructions that cause the processor to prevent disabling of the application control module comprise instructions that cause the processor to:

prevent an uninstalling of the application control module with password protection.

9. The non-transitory computer-readable storage medium of claim 7, wherein the instructions that cause the processor to prevent disabling of the application control module comprise instructions that cause the processor to:

send a notification indicating an occurrence of at least one of an attempted uninstall or an attempted modification of the application control module in response to the occurrence.

10. A mobile device, comprising:
- a computer-readable medium having stored thereon instructions for an application control module comprising an application blocking module and an application authorization policy module; and
- a processing unit configured to execute the application control module, such that the application control module executes silently on the mobile device and cannot be disabled, wherein the application control module is configured to receive, from a monitoring module for monitoring use of the mobile device, data defining a use policy for what use is permitted on the mobile device, and control whether applications are allowed to run on the mobile device,
- wherein the application blocking module is configured to block an installation of an unauthorized application in accordance with the use policy, and wherein the application authorization policy module is configured to authorize an installation of an authorized application in accordance with the use policy, and
- wherein to prevent the application control module from being disabled, the application control module comprises a heartbeat monitoring module configured to automatically restart the application control module if the application control module terminates.

11. The mobile device of claim 10, wherein to prevent the application control module from being disabled, the application control module comprises a password protected uninstall module configured to prevent an uninstalling of the application control module with password protection.

12. The mobile device of claim 10, wherein to prevent the application control module from being disabled, the application control module comprises an uninstall notification module configured to send a notification indicating an occurrence of at least one of an attempted uninstall or an attempted modification of the application control module in response to the occurrence.

* * * * *